US009517448B2

(12) United States Patent
Kearl et al.

(10) Patent No.: US 9,517,448 B2
(45) Date of Patent: Dec. 13, 2016

(54) COMPOSITIONS OF LEAN NO$_x$ TRAP (LNT) SYSTEMS AND METHODS OF MAKING AND USING SAME

(71) Applicant: SDCmaterials, Inc., Tempe, AZ (US)

(72) Inventors: Bryant Kearl, Phoenix, AZ (US); Qinghua Yin, Tempe, AZ (US); Xiwang Qi, Scottsdale, AZ (US); David Leamon, Gilbert, AZ (US); Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 0 days.

(21) Appl. No.: 14/521,334

(22) Filed: Oct. 22, 2014

(65) Prior Publication Data

US 2015/0165418 A1 Jun. 18, 2015

Related U.S. Application Data

(60) Provisional application No. 61/894,346, filed on Oct. 22, 2013.

(51) Int. Cl.
F01N 1/00 (2006.01)
F02B 27/04 (2006.01)
(Continued)

(52) U.S. Cl.
CPC ............ *B01J 23/10* (2013.01); *B01D 53/9422* (2013.01); *B01D 53/9431* (2013.01); *B01J 23/02* (2013.01);
(Continued)

(58) Field of Classification Search
CPC ........... B01J 21/04; B01J 21/066; B01J 23/63; B01J 35/0006; B01J 35/04; B01D 53/945
(Continued)

(56) References Cited

U.S. PATENT DOCUMENTS 1,477,664 A 12/1923 Rankin
2,021,936 A 11/1935 Johnstone
(Continued)

FOREIGN PATENT DOCUMENTS

CN 1647858 A 8/2005
CN 101011664 A 8/2007
(Continued)

OTHER PUBLICATIONS

Li, J-G. et al. (2009). "Cobalt-Doped TiO2 Nanocrystallites: Radio-Frequency Thermal Plasma Processing, Phase Structure, and Magnetic Properties," *J. Phys. Chem.* 113 (19): 8009-8015.
(Continued)

*Primary Examiner* — Cam N. Nguyen
(74) *Attorney, Agent, or Firm* — Morrison & Foerster LLP

(57) ABSTRACT

The present disclosure relates to a substrate comprising nanoparticle catalysts and NO$_x$ storage materials for treatment of gases, and washcoats for use in preparing such a substrate. Also provided are methods of preparation of the nanoparticle catalysts and NO$_x$ storage materials, as well as methods of preparation of the substrate comprising the nanoparticle catalysts and NO$_x$ storage materials. More specifically, the present disclosure relates to a coated substrate comprising nanoparticle catalysts and NO$_x$ storage materials for lean NO$_x$ trap (LNT) systems, useful in the treatment of exhaust gases.

61 Claims, 5 Drawing Sheets

(51) Int. Cl.

| | | |
|---|---|---|
| *B01D 50/00* | (2006.01) | |
| *B01D 53/34* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 20/00* | (2006.01) | |
| *B01J 21/04* | (2006.01) | |
| *B01D 53/94* | (2006.01) | |
| *B01J 23/46* | (2006.01) | |
| *B01J 35/04* | (2006.01) | |
| *B01J 37/02* | (2006.01) | |
| *B01J 37/34* | (2006.01) | |
| *B01J 23/63* | (2006.01) | |
| *B01J 35/00* | (2006.01) | |

(52) U.S. Cl.
CPC ............ *B01J 23/44* (2013.01); *B01J 23/464* (2013.01); *B01J 23/63* (2013.01); *B01J 35/006* (2013.01); *B01J 35/0013* (2013.01); *B01J 35/04* (2013.01); *B01J 37/0248* (2013.01); *B01J 37/349* (2013.01); *B01D 2255/104* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/20715* (2013.01); *B01D 2255/20738* (2013.01); *B01D 2255/20776* (2013.01); *B01D 2255/20792* (2013.01); *B01D 2255/40* (2013.01); *B01D 2255/407* (2013.01); *B01D 2255/908* (2013.01); *B01D 2255/91* (2013.01); *B01D 2255/9202* (2013.01)

(58) Field of Classification Search
USPC ................ 502/302–304, 327–328, 332–334, 339,502/349, 355, 415, 439, 527.12, 527.13; 423/212; 422/177; 60/272, 273
See application file for complete search history.

(56) References Cited

U.S. PATENT DOCUMENTS

| | | |
|---|---|---|
| 2,284,554 A | 5/1942 | Beyerstedt |
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,042,511 A | 7/1962 | Reding, Jr. |
| 3,067,025 A | 12/1962 | Chisholm |
| 3,108,006 A | 10/1963 | Kenedi et al. |
| 3,145,287 A | 8/1964 | Siebein et al. |
| 3,178,121 A | 4/1965 | Wallace, Jr. |
| 3,179,782 A | 4/1965 | Matvay |
| 3,181,947 A | 5/1965 | Vordahl |
| 3,235,700 A | 2/1966 | Mondain-Monval et al. |
| 3,290,723 A | 12/1966 | Jaques et al. |
| 3,309,873 A | 3/1967 | Cann |
| 3,313,908 A | 4/1967 | Unger et al. |
| 3,387,110 A | 6/1968 | Wendler et al. |
| 3,401,465 A | 9/1968 | Larwill |
| 3,450,926 A | 6/1969 | Kiernan |
| 3,457,788 A | 7/1969 | Miyajima |
| 3,520,656 A | 7/1970 | Yates et al. |
| 3,537,513 A | 11/1970 | Austin |
| 3,552,653 A | 1/1971 | Inoue |
| 3,589,351 A | 6/1971 | Shoupp et al. |
| 3,617,358 A | 11/1971 | Dittrich |
| 3,667,111 A | 6/1972 | Chartet |
| 3,676,638 A | 7/1972 | Stand |
| 3,730,827 A | 5/1973 | Matchen et al. |
| 3,741,001 A | 6/1973 | Fletcher et al. |
| 3,743,708 A | 7/1973 | Chase et al. |
| 3,752,172 A | 8/1973 | Cohen et al. |
| 3,761,360 A | 9/1973 | Auvil et al. |
| 3,774,442 A | 11/1973 | Gustavsson |
| 3,804,034 A | 4/1974 | Stiglich, Jr. |
| 3,830,756 A | 8/1974 | Sanchez et al. |
| 3,857,744 A | 12/1974 | Moss |
| 3,871,448 A | 3/1975 | Vann et al. |
| 3,892,882 A | 7/1975 | Guest et al. |
| 3,914,573 A | 10/1975 | Muehlberger |
| 3,959,094 A | 5/1976 | Steinberg |
| 3,959,420 A | 5/1976 | Geddes et al. |
| 3,969,482 A | 7/1976 | Teller |
| 4,006,340 A | 2/1977 | Gorinas |
| 4,008,620 A | 2/1977 | Narato et al. |
| 4,018,388 A | 4/1977 | Andrews |
| 4,021,021 A | 5/1977 | Hall et al. |
| 4,127,760 A | 11/1978 | Meyer et al. |
| 4,139,497 A | 2/1979 | Castor et al. |
| 4,146,654 A | 3/1979 | Guyonnet |
| 4,157,316 A | 6/1979 | Thompson et al. |
| 4,171,288 A | 10/1979 | Keith et al. |
| 4,174,298 A | 11/1979 | Antos |
| 4,189,925 A | 2/1980 | Long |
| 4,227,928 A | 10/1980 | Wang |
| 4,248,387 A | 2/1981 | Andrews |
| 4,252,843 A | 2/1981 | Dorer et al. |
| 4,253,917 A | 3/1981 | Wang |
| 4,260,649 A | 4/1981 | Dension et al. |
| 4,284,609 A | 8/1981 | deVries |
| 4,315,874 A | 2/1982 | Ushida et al. |
| 4,326,492 A | 4/1982 | Leibrand, Sr. et al. |
| 4,335,080 A | 6/1982 | Davis et al. |
| 4,344,779 A | 8/1982 | Isserlis |
| 4,369,167 A | 1/1983 | Weir, Jr. |
| 4,388,274 A | 6/1983 | Rourke et al. |
| 4,419,331 A | 12/1983 | Montalvo |
| 4,431,750 A | 2/1984 | McGinnis et al. |
| 4,436,075 A | 3/1984 | Campbell et al. |
| 4,440,733 A | 4/1984 | Lawson et al. |
| 4,458,138 A | 7/1984 | Adrian et al. |
| 4,459,327 A | 7/1984 | Wang |
| 4,505,945 A | 3/1985 | Dubust et al. |
| 4,506,136 A | 3/1985 | Smyth et al. |
| 4,513,149 A | 4/1985 | Gray et al. |
| 4,523,981 A | 6/1985 | Ang et al. |
| 4,545,872 A | 10/1985 | Sammells et al. |
| RE32,244 E | 9/1986 | Andersen |
| 4,609,441 A | 9/1986 | Frese, Jr. et al. |
| 4,610,857 A | 9/1986 | Ogawa et al. |
| 4,616,779 A | 10/1986 | Serrano et al. |
| 4,642,207 A | 2/1987 | Uda et al. |
| 4,665,296 A | 5/1987 | Iwata et al. |
| 4,723,589 A | 2/1988 | Iyer et al. |
| 4,731,517 A | 3/1988 | Cheney |
| 4,751,021 A | 6/1988 | Mollon et al. |
| 4,764,283 A | 8/1988 | Ashbrook et al. |
| 4,765,805 A | 8/1988 | Wahl et al. |
| 4,780,591 A | 10/1988 | Bernecki et al. |
| 4,824,624 A | 4/1989 | Palicka et al. |
| 4,836,084 A | 6/1989 | Vogelesang et al. |
| 4,855,505 A | 8/1989 | Koll |
| 4,866,240 A | 9/1989 | Webber |
| 4,869,936 A | 9/1989 | Moskowitz et al. |
| 4,877,937 A | 10/1989 | Müller |
| 4,885,038 A | 12/1989 | Anderson, Jr. et al. |
| 4,902,870 A | 2/1990 | Frind et al. |
| 4,916,107 A | 4/1990 | Brand et al. |
| 4,921,586 A | 5/1990 | Molter |
| 4,970,364 A | 11/1990 | Müller |

(56) References Cited

U.S. PATENT DOCUMENTS

| | | |
|---|---|---|
| 4,982,050 A | 1/1991 | Gammie et al. |
| 4,983,555 A | 1/1991 | Roy et al. |
| 4,987,033 A | 1/1991 | Abkowitz et al. |
| 5,006,163 A | 4/1991 | Benn et al. |
| 5,013,883 A | 5/1991 | Fuimefreddo et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,133,190 A | 7/1992 | Abdelmalek |
| 5,151,296 A | 9/1992 | Tokunaga |
| 5,157,007 A | 10/1992 | Domesle et al. |
| 5,187,140 A | 2/1993 | Thorsteinson et al. |
| 5,192,130 A | 3/1993 | Endo et al. |
| 5,217,746 A | 6/1993 | Lenling et al. |
| 5,225,656 A | 7/1993 | Frind |
| 5,230,844 A | 7/1993 | Macaire et al. |
| 5,233,153 A | 8/1993 | Coats |
| 5,243,169 A | 9/1993 | Tateno et al. |
| 5,260,241 A | 11/1993 | Addiego et al. |
| 5,269,848 A | 12/1993 | Nakagawa |
| 5,276,693 A | 1/1994 | Long et al. |
| 5,280,757 A | 1/1994 | Carter et al. |
| 5,294,242 A | 3/1994 | Zurecki et al. |
| 5,330,945 A | 7/1994 | Beckmeyer et al. |
| 5,338,716 A | 8/1994 | Triplett et al. |
| 5,357,075 A | 10/1994 | Muehlberger |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,408,066 A | 4/1995 | Trapani et al. |
| 5,436,080 A | 7/1995 | Inoue et al. |
| 5,439,865 A | 8/1995 | Abe et al. |
| 5,442,153 A | 8/1995 | Marantz et al. |
| 5,452,854 A | 9/1995 | Keller |
| 5,460,701 A | 10/1995 | Parker et al. |
| 5,464,458 A | 11/1995 | Yamamoto |
| 5,485,941 A | 1/1996 | Guyomard et al. |
| 5,486,675 A | 1/1996 | Taylor et al. |
| 5,487,916 A | 1/1996 | Christensen |
| 5,489,449 A | 2/1996 | Umeya et al. |
| 5,510,086 A | 4/1996 | Hemingway et al. |
| 5,534,149 A | 7/1996 | Birkenbeil et al. |
| 5,534,270 A | 7/1996 | De Castro |
| 5,543,173 A | 8/1996 | Horn, Jr. et al. |
| 5,553,507 A | 9/1996 | Basch et al. |
| 5,558,771 A | 9/1996 | Hagen et al. |
| 5,562,966 A | 10/1996 | Clarke et al. |
| 5,582,807 A | 12/1996 | Liao et al. |
| 5,596,973 A | 1/1997 | Grice |
| 5,611,896 A | 3/1997 | Swanepoel et al. |
| 5,630,322 A | 5/1997 | Heilmann et al. |
| 5,652,304 A | 7/1997 | Calderon et al. |
| 5,676,912 A | 10/1997 | Sharma et al. |
| 5,714,644 A | 2/1998 | Irgang et al. |
| 5,723,027 A | 3/1998 | Serole |
| 5,723,187 A | 3/1998 | Popoola et al. |
| 5,726,414 A | 3/1998 | Kitahashi et al. |
| 5,726,415 A | 3/1998 | Luo et al. |
| 5,733,662 A | 3/1998 | Bogachek |
| 5,749,938 A | 5/1998 | Coombs |
| 5,776,359 A | 7/1998 | Schultz et al. |
| 5,788,738 A | 8/1998 | Pirzada et al. |
| 5,804,155 A | 9/1998 | Farrauto et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,858,470 A | 1/1999 | Bernecki et al. |
| 5,884,473 A | 3/1999 | Noda et al. |
| 5,905,000 A | 5/1999 | Yadav et al. |
| 5,928,806 A | 7/1999 | Olah et al. |
| 5,935,293 A | 8/1999 | Detering et al. |
| 5,973,289 A | 10/1999 | Read et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,001,426 A | 12/1999 | Witherspoon et al. |
| 6,004,620 A | 12/1999 | Camm |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,066,587 A | 5/2000 | Kurokawa et al. |
| 6,084,197 A | 7/2000 | Fusaro, Jr. |
| 6,093,306 A | 7/2000 | Hanrahan et al. |
| 6,093,378 A | 7/2000 | Deeba et al. |
| 6,102,106 A | 8/2000 | Manning et al. |
| 6,117,376 A | 9/2000 | Merkel |
| 6,139,813 A | 10/2000 | Narula et al. |
| 6,140,539 A | 10/2000 | Sander et al. |
| 6,168,694 B1 | 1/2001 | Huang et al. |
| 6,190,627 B1 | 2/2001 | Hoke et al. |
| 6,213,049 B1 | 4/2001 | Yang |
| 6,214,195 B1 | 4/2001 | Yadav et al. |
| 6,228,904 B1 | 5/2001 | Yadav et al. |
| 6,231,792 B1 | 5/2001 | Overbeek et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,362,449 B1 | 3/2002 | Hadidi et al. |
| 6,365,016 B1 | 4/2002 | Iacovangelo et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,399,030 B1 | 6/2002 | Nolan |
| 6,409,851 B1 | 6/2002 | Sethuram et al. |
| 6,413,781 B1 | 7/2002 | Geis et al. |
| 6,413,898 B1 | 7/2002 | Faber et al. |
| 6,416,818 B1 | 7/2002 | Aikens et al. |
| RE37,853 E | 9/2002 | Detering et al. |
| 6,444,009 B1 | 9/2002 | Liu et al. |
| 6,444,298 B1 | 9/2002 | Tadokoro et al. |
| 6,475,951 B1 | 11/2002 | Domesle et al. |
| 6,488,904 B1 | 12/2002 | Cox et al. |
| 6,491,423 B1 | 12/2002 | Skibo et al. |
| 6,491,985 B2 | 12/2002 | He |
| 6,506,995 B1 | 1/2003 | Fusaro, Jr. et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,393 B1 | 5/2003 | Hoke et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zomes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |

(56) References Cited

U.S. PATENT DOCUMENTS

| | | |
|---|---|---|
| 6,744,006 B2 | 6/2004 | Johnson et al. |
| 6,746,791 B2 | 6/2004 | Yadav et al. |
| 6,772,584 B2 | 8/2004 | Chun et al. |
| 6,780,350 B1 | 8/2004 | Kodas et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,858,170 B2 | 2/2005 | Van Thillo et al. |
| 6,886,545 B1 | 5/2005 | Holm |
| 6,891,319 B2 | 5/2005 | Dean et al. |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,065 B2 | 7/2005 | Zhou et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,066,976 B2 | 6/2006 | Hampden-Smith et al. |
| 7,073,559 B2 | 7/2006 | O'Larey et al. |
| 7,074,364 B2 | 7/2006 | Jähn et al. |
| 7,081,267 B2 | 7/2006 | Yadav |
| 7,094,370 B2 | 8/2006 | Kodas et al. |
| 7,101,819 B2 | 9/2006 | Rosenflanz et al. |
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,255,498 B2 | 8/2007 | Bush et al. |
| 7,265,076 B2 | 9/2007 | Taguchi et al. |
| 7,282,167 B2 | 10/2007 | Carpenter |
| 7,307,195 B2 | 12/2007 | Polverejan et al. |
| 7,323,655 B2 | 1/2008 | Kim |
| 7,384,447 B2 | 6/2008 | Kodas et al. |
| 7,402,899 B1 | 7/2008 | Whiting et al. |
| 7,417,008 B2 | 8/2008 | Richards et al. |
| 7,494,527 B2 | 2/2009 | Jurewicz et al. |
| 7,507,495 B2 | 3/2009 | Wang et al. |
| 7,517,826 B2 | 4/2009 | Fujdala et al. |
| 7,534,738 B2 | 5/2009 | Fujdala et al. |
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. |
| 7,576,029 B2 | 8/2009 | Saito et al. |
| 7,576,031 B2 | 8/2009 | Beutel et al. |
| 7,601,294 B2 | 10/2009 | Ripley et al. |
| 7,604,843 B1 | 10/2009 | Robinson et al. |
| 7,611,686 B2 | 11/2009 | Alekseeva et al. |
| 7,615,097 B2 | 11/2009 | McKechnie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,635,218 B1 | 12/2009 | Lott |
| 7,674,744 B2 | 3/2010 | Shiratori et al. |
| 7,678,419 B2 | 3/2010 | Kevwitch et al. |
| 7,704,369 B2 | 4/2010 | Olah et al. |
| 7,709,411 B2 | 5/2010 | Zhou et al. |
| 7,709,414 B2 | 5/2010 | Fujdala et al. |
| 7,745,367 B2 | 6/2010 | Fujdala et al. |
| 7,750,265 B2 | 7/2010 | Belashchenko |
| 7,759,279 B2 | 7/2010 | Shiratori et al. |
| 7,759,281 B2 | 7/2010 | Kezuka et al. |
| 7,803,210 B2 | 9/2010 | Sekine et al. |
| 7,842,515 B2 | 11/2010 | Zou et al. |
| 7,851,405 B2 | 12/2010 | Wakamatsu et al. |
| 7,874,239 B2 | 1/2011 | Howland |
| 7,875,573 B2 | 1/2011 | Beutel et al. |
| 7,897,127 B2 | 3/2011 | Layman et al. |
| 7,897,536 B2 | 3/2011 | Saito et al. |
| 7,902,104 B2 | 3/2011 | Kalck et al. |
| 7,905,942 B1 | 3/2011 | Layman |
| 7,935,655 B2 | 5/2011 | Tolmachev |
| 7,951,428 B2 | 5/2011 | Hoerr et al. |
| 8,003,020 B2 | 8/2011 | Jankowiak et al. |
| 8,051,724 B1 | 11/2011 | Layman et al. |
| 8,076,258 B1 | 12/2011 | Biberger |
| 8,080,494 B2 | 12/2011 | Yasuda et al. |
| 8,089,495 B2 | 1/2012 | Keller |
| 8,129,654 B2 | 3/2012 | Lee et al. |
| 8,142,619 B2 | 3/2012 | Layman et al. |
| 8,168,561 B2 | 5/2012 | Virkar |
| 8,173,572 B2 | 5/2012 | Feaviour |
| 8,176,830 B1 | 5/2012 | Tan |
| 8,211,392 B2 | 7/2012 | Grubert et al. |
| 8,258,070 B2 | 9/2012 | Fujdala et al. |
| 8,278,240 B2 | 10/2012 | Tange et al. |
| 8,294,060 B2 | 10/2012 | Mohanty et al. |
| 8,309,489 B2 | 11/2012 | Roldan Cuenya et al. |
| 8,349,761 B2 | 1/2013 | Xia et al. |
| 8,404,611 B2 | 3/2013 | Nakamura et al. |
| 8,470,112 B1 | 6/2013 | Biberger |
| 8,481,449 B1 | 7/2013 | Biberger et al. |
| 8,507,401 B1 | 8/2013 | Biberger et al. |
| 8,507,402 B1 | 8/2013 | Biberger et al. |
| 8,518,846 B2 | 8/2013 | Uchikawa et al. |
| 8,524,631 B2 | 9/2013 | Biberger |
| 8,545,652 B1 | 10/2013 | Biberger |
| 8,557,727 B2 | 10/2013 | Yin et al. |
| 8,574,408 B2 | 11/2013 | Layman |
| 8,574,520 B2 | 11/2013 | Koplin et al. |
| 8,575,059 B1 | 11/2013 | Biberger et al. |
| 8,604,398 B1 | 12/2013 | Layman |
| 8,652,992 B2 | 2/2014 | Yin et al. |
| 8,668,803 B1 | 3/2014 | Biberger |
| 8,669,202 B2 | 3/2014 | van den Hoek et al. |
| 8,679,433 B2 | 3/2014 | Yin et al. |
| 8,821,786 B1 | 9/2014 | Biberger |
| 8,828,328 B1 | 9/2014 | Leamon et al. |
| 8,859,035 B1 | 10/2014 | Leamon |
| 8,877,357 B1 | 11/2014 | Biberger |
| 8,893,651 B1 | 11/2014 | Biberger et al. |
| 8,906,498 B1 | 12/2014 | Biberger |
| 8,927,403 B2 | 1/2015 | Huotari et al. |
| 8,932,514 B1 | 1/2015 | Yin et al. |
| 8,969,237 B2 | 3/2015 | Yin et al. |
| 8,992,820 B1 | 3/2015 | Yin et al. |
| 9,023,754 B2 | 5/2015 | Biberger |
| 9,039,916 B1 | 5/2015 | Lehman, Jr. |
| 9,089,840 B2 | 7/2015 | Biberger et al. |
| 9,090,475 B1 | 7/2015 | Lehman, Jr. |
| 9,119,309 B1 | 8/2015 | Lehman, Jr. |
| 9,126,191 B2 | 9/2015 | Yin et al. |
| 9,132,404 B2 | 9/2015 | Layman |
| 9,149,797 B2 | 10/2015 | Leamon |
| 9,156,025 B2 | 10/2015 | Qi et al. |
| 9,180,423 B2 | 11/2015 | Biberger et al. |
| 9,186,663 B2 | 11/2015 | Biberger et al. |
| 9,216,398 B2 | 12/2015 | Biberger et al. |
| 9,216,406 B2 | 12/2015 | Van Den Hoek et al. |
| 9,308,524 B2 | 4/2016 | Yin et al. |
| 9,332,636 B2 | 5/2016 | Biberger |
| 2001/0004009 A1 | 6/2001 | MacKelvie |
| 2001/0042802 A1 | 11/2001 | Youds |
| 2001/0055554 A1 | 12/2001 | Hoke et al. |
| 2002/0018815 A1 | 2/2002 | Sievers et al. |
| 2002/0068026 A1 | 6/2002 | Murrell et al. |

(56) References Cited

U.S. PATENT DOCUMENTS

| | | |
|---|---|---|
| 2002/0071800 A1 | 6/2002 | Hoke et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0168466 A1 | 11/2002 | Tapphorn et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0047617 A1 | 3/2003 | Shanmugham et al. |
| 2003/0066800 A1 | 4/2003 | Saim et al. |
| 2003/0085663 A1 | 5/2003 | Horsky |
| 2003/0102099 A1 | 6/2003 | Yadav et al. |
| 2003/0108459 A1 | 6/2003 | Wu et al. |
| 2003/0110931 A1 | 6/2003 | Aghajanian et al. |
| 2003/0129098 A1 | 7/2003 | Endo et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0007092 A1 | 1/2004 | Yoshimura |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0065170 A1 | 4/2004 | Wu et al. |
| 2004/0077494 A1 | 4/2004 | LaBarge et al. |
| 2004/0103751 A1 | 6/2004 | Joseph et al. |
| 2004/0109523 A1 | 6/2004 | Singh et al. |
| 2004/0119064 A1 | 6/2004 | Narayan et al. |
| 2004/0127586 A1 | 7/2004 | Jin et al. |
| 2004/0129222 A1 | 7/2004 | Nylen et al. |
| 2004/0166036 A1 | 8/2004 | Chen et al. |
| 2004/0167009 A1 | 8/2004 | Kuntz et al. |
| 2004/0176246 A1 | 9/2004 | Shirk et al. |
| 2004/0178530 A1 | 9/2004 | Yadav |
| 2004/0208805 A1 | 10/2004 | Fincke et al. |
| 2004/0213998 A1 | 10/2004 | Hearley et al. |
| 2004/0235657 A1 | 11/2004 | Xiao et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0058797 A1 | 3/2005 | Sen et al. |
| 2005/0066805 A1 | 3/2005 | Park et al. |
| 2005/0070431 A1 | 3/2005 | Alvin et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0119398 A1 | 6/2005 | Zhang |
| 2005/0133121 A1 | 6/2005 | Subramanian et al. |
| 2005/0153069 A1 | 7/2005 | Tapphorn et al. |
| 2005/0163673 A1 | 7/2005 | Johnson et al. |
| 2005/0199739 A1 | 9/2005 | Kuroda et al. |
| 2005/0211018 A1 | 9/2005 | Jurewicz et al. |
| 2005/0220695 A1 | 10/2005 | Abatzoglou et al. |
| 2005/0227864 A1 | 10/2005 | Sutorik et al. |
| 2005/0233380 A1 | 10/2005 | Pesiri et al. |
| 2005/0240069 A1 | 10/2005 | Polverejan et al. |
| 2005/0258766 A1 | 11/2005 | Kim |
| 2005/0274646 A1 | 12/2005 | Lawson et al. |
| 2005/0275143 A1 | 12/2005 | Toth |
| 2006/0043651 A1 | 3/2006 | Yamamoto et al. |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0211569 A1 | 9/2006 | Dang et al. |
| 2006/0213326 A1 | 9/2006 | Gollob et al. |
| 2006/0222780 A1 | 10/2006 | Gurevich et al. |
| 2006/0231525 A1 | 10/2006 | Asakawa et al. |
| 2007/0009752 A1 | 1/2007 | Lefebvre et al. |
| 2007/0014919 A1 | 1/2007 | Hamalainen et al. |
| 2007/0020167 A1 | 1/2007 | Han et al. |
| 2007/0044513 A1 | 3/2007 | Kear et al. |
| 2007/0048206 A1 | 3/2007 | Hung et al. |
| 2007/0049484 A1 | 3/2007 | Kear et al. |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0092768 A1 | 4/2007 | Lee et al. |
| 2007/0153390 A1 | 7/2007 | Nakamura et al. |
| 2007/0161506 A1 | 7/2007 | Saito et al. |
| 2007/0163385 A1 | 7/2007 | Takahashi et al. |
| 2007/0172721 A1 | 7/2007 | Pak et al. |
| 2007/0173403 A1 | 7/2007 | Koike et al. |
| 2007/0178673 A1 | 8/2007 | Gole et al. |
| 2007/0221404 A1 | 9/2007 | Das et al. |
| 2007/0253874 A1 | 11/2007 | Foret |
| 2007/0259768 A1 | 11/2007 | Kear et al. |
| 2007/0266825 A1 | 11/2007 | Ripley et al. |
| 2007/0292321 A1 | 12/2007 | Plischke et al. |
| 2008/0006954 A1 | 1/2008 | Yubuta et al. |
| 2008/0026041 A1 | 1/2008 | Tepper et al. |
| 2008/0026932 A1 | 1/2008 | Satoh et al. |
| 2008/0031806 A1 | 2/2008 | Gavenonis et al. |
| 2008/0038578 A1 | 2/2008 | Li |
| 2008/0045405 A1 | 2/2008 | Beutel et al. |
| 2008/0047261 A1 | 2/2008 | Han et al. |
| 2008/0056977 A1 | 3/2008 | Hung et al. |
| 2008/0057212 A1 | 3/2008 | Dorier et al. |
| 2008/0064769 A1 | 3/2008 | Sato et al. |
| 2008/0104735 A1 | 5/2008 | Howland |
| 2008/0105083 A1 | 5/2008 | Nakamura et al. |
| 2008/0107586 A1 | 5/2008 | Smalley et al. |
| 2008/0108005 A1 | 5/2008 | Carpenter |
| 2008/0116118 A1 | 5/2008 | Zhu et al. |
| 2008/0116178 A1 | 5/2008 | Weidman |
| 2008/0125308 A1 | 5/2008 | Fujdala et al. |
| 2008/0125313 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1 | 8/2008 | Wakamatsu et al. |
| 2008/0202288 A1 | 8/2008 | McKechnie et al. |
| 2008/0206562 A1 | 8/2008 | Stucky et al. |
| 2008/0207858 A1 | 8/2008 | Kowaleski et al. |
| 2008/0248704 A1 | 10/2008 | Mathis et al. |
| 2008/0268270 A1 | 10/2008 | Chen et al. |
| 2008/0274344 A1 | 11/2008 | Vieth et al. |
| 2008/0277092 A1 | 11/2008 | Layman et al. |
| 2008/0277264 A1 | 11/2008 | Sprague |
| 2008/0277266 A1 | 11/2008 | Layman et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2008/0283411 A1 | 11/2008 | Eastman et al. |
| 2008/0283498 A1 | 11/2008 | Yamazaki |
| 2008/0307960 A1 | 12/2008 | Hendrickson et al. |
| 2009/0010801 A1 | 1/2009 | Murphy et al. |
| 2009/0018008 A1 | 1/2009 | Jankowiak et al. |
| 2009/0054230 A1 | 2/2009 | Veeraraghavan et al. |
| 2009/0080592 A1 | 3/2009 | Arsenlis et al. |
| 2009/0081092 A1 | 3/2009 | Yang et al. |
| 2009/0088585 A1 | 4/2009 | Schammel et al. |
| 2009/0092887 A1 | 4/2009 | McGrath et al. |
| 2009/0098402 A1 | 4/2009 | Kang et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |

(56) References Cited

U.S. PATENT DOCUMENTS

| | | |
|---|---|---|
| 2009/0181474 A1 | 7/2009 | Nagai |
| 2009/0200180 A1 | 8/2009 | Capote et al. |
| 2009/0208367 A1 | 8/2009 | Calio et al. |
| 2009/0209408 A1 | 8/2009 | Kitamura et al. |
| 2009/0223410 A1 | 9/2009 | Jun et al. |
| 2009/0238736 A1 | 9/2009 | Takahashi |
| 2009/0253037 A1 | 10/2009 | Park et al. |
| 2009/0274897 A1 | 11/2009 | Kaner et al. |
| 2009/0274903 A1 | 11/2009 | Addiego |
| 2009/0286899 A1 | 11/2009 | Hofmann et al. |
| 2009/0320449 A1 | 12/2009 | Beutel et al. |
| 2009/0324468 A1 | 12/2009 | Golden et al. |
| 2010/0050868 A1 | 3/2010 | Kuznicki et al. |
| 2010/0089002 A1 | 4/2010 | Merkel |
| 2010/0089742 A1 | 4/2010 | Suslov |
| 2010/0092358 A1 | 4/2010 | Koegel et al. |
| 2010/0124514 A1 | 5/2010 | Chelluri et al. |
| 2010/0166629 A1 | 7/2010 | Deeba |
| 2010/0180581 A1 | 7/2010 | Grubert et al. |
| 2010/0180582 A1 | 7/2010 | Mueller-Stach et al. |
| 2010/0180820 A1 | 7/2010 | Ishimaru et al. |
| 2010/0186375 A1 | 7/2010 | Kazi et al. |
| 2010/0240525 A1 | 9/2010 | Golden et al. |
| 2010/0260652 A1 | 10/2010 | Nakane et al. |
| 2010/0275781 A1 | 11/2010 | Tsangaris |
| 2010/0283013 A1 | 11/2010 | Sato et al. |
| 2010/0323118 A1 | 12/2010 | Mohanty et al. |
| 2011/0006463 A1 | 1/2011 | Layman |
| 2011/0030346 A1 | 2/2011 | Neubauer et al. |
| 2011/0049045 A1 | 3/2011 | Hurt et al. |
| 2011/0052467 A1 | 3/2011 | Chase et al. |
| 2011/0052698 A1 | 3/2011 | Benoit et al. |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0154807 A1 | 6/2011 | Chandler et al. |
| 2011/0158871 A1 | 6/2011 | Arnold et al. |
| 2011/0174604 A1 | 7/2011 | Duesel, Jr. et al. |
| 2011/0180750 A1 | 7/2011 | Kleine Jaeger et al. |
| 2011/0243808 A1 | 10/2011 | Fossey et al. |
| 2011/0245073 A1 | 10/2011 | Oljaca et al. |
| 2011/0247336 A9 | 10/2011 | Farsad et al. |
| 2011/0271658 A1 | 11/2011 | Hoyer et al. |
| 2011/0305612 A1 | 12/2011 | Müller-Stach et al. |
| 2012/0023909 A1 | 2/2012 | Lambert et al. |
| 2012/0045373 A1 | 2/2012 | Biberger |
| 2012/0063963 A1 | 3/2012 | Watanabe et al. |
| 2012/0097033 A1 | 4/2012 | Arnold et al. |
| 2012/0122660 A1 | 5/2012 | Andersen et al. |
| 2012/0124974 A1 | 5/2012 | Li et al. |
| 2012/0171098 A1 | 7/2012 | Hung et al. |
| 2012/0214666 A1 | 8/2012 | van den Hoek et al. |
| 2012/0263633 A1 | 10/2012 | Koplin et al. |
| 2012/0285548 A1 | 11/2012 | Layman et al. |
| 2012/0308467 A1 | 12/2012 | Carpenter et al. |
| 2012/0313269 A1 | 12/2012 | Kear et al. |
| 2013/0034472 A1 | 2/2013 | Cantrell et al. |
| 2013/0064750 A1 | 3/2013 | Zettl |
| 2013/0079216 A1 | 3/2013 | Biberger et al. |
| 2013/0125970 A1 | 5/2013 | Ko et al. |
| 2013/0213018 A1 | 8/2013 | Yin et al. |
| 2013/0270355 A1 | 10/2013 | Cotler et al. |
| 2013/0280528 A1 | 10/2013 | Biberger |
| 2013/0281288 A1 | 10/2013 | Biberger et al. |
| 2013/0294989 A1 | 11/2013 | Koch et al. |
| 2013/0316896 A1 | 11/2013 | Biberger |
| 2013/0331257 A1 | 12/2013 | Barcikowski et al. |
| 2013/0345047 A1 | 12/2013 | Biberger et al. |
| 2014/0018230 A1 | 1/2014 | Yin et al. |
| 2014/0120355 A1 | 5/2014 | Biberger |
| 2014/0128245 A1 | 5/2014 | Yin et al. |
| 2014/0140909 A1 | 5/2014 | Qi et al. |
| 2014/0148331 A1 | 5/2014 | Biberger et al. |
| 2014/0161693 A1 | 6/2014 | Brown et al. |
| 2014/0209451 A1 | 7/2014 | Biberger et al. |
| 2014/0228201 A1 | 8/2014 | Mendoza Gómez et al. |
| 2014/0243187 A1 | 8/2014 | Yin et al. |
| 2014/0249021 A1 | 9/2014 | Van Den Hoek et al. |
| 2014/0252270 A1 | 9/2014 | Lehman, Jr. |
| 2014/0263190 A1 | 9/2014 | Biberger et al. |
| 2014/0318318 A1 | 10/2014 | Layman et al. |
| 2014/0338519 A1 | 11/2014 | Biberger |
| 2015/0093312 A1 | 4/2015 | Yin et al. |
| 2015/0140317 A1 | 5/2015 | Biberger et al. |
| 2015/0141236 A1 | 5/2015 | Yin et al. |
| 2015/0165434 A1 | 6/2015 | Yin et al. |
| 2015/0196884 A1 | 7/2015 | Layman |
| 2015/0217229 A1 | 8/2015 | Yin et al. |
| 2015/0266002 A1 | 9/2015 | Biberger et al. |
| 2015/0314260 A1 | 11/2015 | Biberger |
| 2015/0314581 A1 | 11/2015 | Biberger |
| 2015/0367331 A1 | 12/2015 | Biberger |
| 2016/0045867 A1 | 2/2016 | Kearl et al. |
| 2016/0067679 A1 | 3/2016 | Yin et al. |
| 2016/0074855 A1 | 3/2016 | Qi et al. |
| 2016/0138870 A1 | 5/2016 | Biberger et al. |
| 2016/0144346 A1 | 5/2016 | Biberger et al. |
| 2016/0144352 A1 | 5/2016 | van den Hoek et al. |

FOREIGN PATENT DOCUMENTS

| | | |
|---|---|---|
| CN | 101301610 A | 11/2008 |
| DE | 34 45 273 A1 | 6/1986 |
| EP | 0 223 104 A1 | 5/1987 |
| EP | 0 347 386 A1 | 12/1989 |
| EP | 0 385 742 A1 | 9/1990 |
| EP | 1 134 302 A1 | 9/2001 |
| EP | 1 256 378 A2 | 11/2002 |
| EP | 1 619 168 A1 | 1/2006 |
| EP | 1 721 690 A1 | 11/2006 |
| EP | 1 790 612 A1 | 5/2007 |
| EP | 1 955 765 A1 | 8/2008 |
| GB | 1 307 941 A | 2/1973 |
| JP | 30-13577 U | 9/1955 |
| JP | 47-21256 U | 2/1971 |
| JP | 49-31571 A | 3/1974 |
| JP | 51-7582 U | 7/1974 |
| JP | 52-165360 U | 6/1976 |
| JP | 56-146804 A | 11/1981 |
| JP | 58-160794 A | 9/1983 |
| JP | 59-59410 A | 4/1984 |
| JP | 61-086815 A | 5/1986 |
| JP | 61-242644 A | 10/1986 |
| JP | 62-102827 A | 5/1987 |
| JP | 63-214342 A | 9/1988 |
| JP | 1-164795 A | 6/1989 |
| JP | 1-275708 A | 11/1989 |
| JP | 2-6339 A | 1/1990 |
| JP | 2-160040 A | 6/1990 |
| JP | 2-203932 A | 8/1990 |
| JP | 3-226509 A | 10/1991 |
| JP | 5-193909 A | 8/1993 |
| JP | 05-228361 A | 9/1993 |
| JP | 05-324094 A | 12/1993 |
| JP | 6-91162 A | 4/1994 |
| JP | 6-93309 A | 4/1994 |
| JP | 6-135797 A | 5/1994 |
| JP | 6-172820 A | 6/1994 |
| JP | 6-272012 A | 9/1994 |
| JP | H6-065772 U | 9/1994 |
| JP | 07-031873 A | 2/1995 |
| JP | 7-20553 B2 | 3/1995 |
| JP | 7-120176 A | 5/1995 |
| JP | 7-138020 A | 5/1995 |
| JP | 7-207381 A | 8/1995 |
| JP | 07-256116 A | 10/1995 |
| JP | 8-158033 A | 6/1996 |
| JP | 8-215576 A | 8/1996 |
| JP | 8-217420 A | 8/1996 |

(56) References Cited

FOREIGN PATENT DOCUMENTS

| | | |
|---|---|---|
| JP | 9-141087 A | 6/1997 |
| JP | 10-130810 A | 5/1998 |
| JP | 10-249198 A | 9/1998 |
| JP | 11-502760 A | 3/1999 |
| JP | 11-300198 A | 11/1999 |
| JP | 2000-220978 A | 8/2000 |
| JP | 2002-88486 A | 3/2002 |
| JP | 2002-241812 A | 8/2002 |
| JP | 2002-263496 A | 9/2002 |
| JP | 2002-336688 A | 11/2002 |
| JP | 2003-126694 A | 5/2003 |
| JP | 2003-170043 A | 6/2003 |
| JP | 2003-261323 A | 9/2003 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-87965 A | 4/2006 |
| JP | 2006-181484 A | 7/2006 |
| JP | 2006-247446 A | 9/2006 |
| JP | 2006-260385 A | 9/2006 |
| JP | 2006-272265 A | 10/2006 |
| JP | 2006-326554 A | 12/2006 |
| JP | 2007-29859 A | 2/2007 |
| JP | 2007-44585 A | 2/2007 |
| JP | 2007-46162 A | 2/2007 |
| JP | 2007-138287 A | 6/2007 |
| JP | 2007-203129 A | 8/2007 |
| JP | 2007-222732 A | 9/2007 |
| JP | 2007-253037 A | 10/2007 |
| JP | 2009-254929 A | 11/2009 |
| JP | 2009-279544 A | 12/2009 |
| SU | 493241 A | 3/1976 |
| TW | 200611449 | 4/2006 |
| TW | 201023207 | 6/2010 |
| WO | WO-96/28577 A1 | 9/1996 |
| WO | WO-00/16882 | 3/2000 |
| WO | WO-00/72965 A1 | 12/2000 |
| WO | WO-02/92503 A1 | 11/2002 |
| WO | WO-03/094195 A1 | 11/2003 |
| WO | WO-2004/052778 A2 | 6/2004 |
| WO | WO-2005/063390 A1 | 7/2005 |
| WO | WO-2006/079213 A1 | 8/2006 |
| WO | WO-2006/096205 A2 | 9/2006 |
| WO | WO-2007/144447 A1 | 12/2007 |
| WO | WO-2008/088649 A1 | 7/2008 |
| WO | WO-2008/092478 A1 | 8/2008 |
| WO | WO-2008/130451 A2 | 10/2008 |
| WO | WO-2008/130451 A3 | 10/2008 |
| WO | WO-2009/017479 A1 | 2/2009 |
| WO | WO-2011/081833 A1 | 7/2011 |
| WO | WO-2011/081834 A1 | 7/2011 |
| WO | WO-2012/028695 A2 | 3/2012 |
| WO | WO-2013/028575 A1 | 2/2013 |
| WO | WO-2013/093597 A2 | 6/2013 |
| WO | WO-2013/151557 A1 | 10/2013 |

OTHER PUBLICATIONS

Magdassi, S. et al. (Apr. 2010). "Triggering the Sintering of Silver Nanoparticles at Room Temperature," *ACS Nano* 4(4): 1943-1948.

Büchel, R. et al. (2009). "Influence of Pt Location on $BaCO_3$ or $Al_2O_3$ During $NO_x$ Storage Reduction," *Journal of Catalysis* 261: 201-207.

Date, A. R. et al. (1987). "The Potential of Fire Assay and Inductively Coupled Plasama Source Mass Spectrometry for the Determination of Platinum Group Elements in Geological Materials," *Analyst* 112: 1217-1222.

Lamouroux, E. et al. (2007). "Identification of Key Parameters for the Selective Growth of Single or Double Wall Carbon Nanotubes on $FeMo/Al_2O_3$ CVD Catalysts," *Applied Catalysts A: General* 323: 162-173.

Martinez-Hansen, V. et al. (2009). "Development of Aligned Carbon Nanotubes Layers Over Stainless Steel Mesh Monoliths," *Catalysis Today* 147S: S71-S75.

Panchula, M. L. et al. (2003). "Nanocrystalline Aluminum Nitride: I, Vapor-Phase Synthesis in a Forced-Flow Reactor," *Journal of the American Ceramic Society* 86(7): 1114-1120.

Strobel, R. et al. (2003). "Flame-made Platinum/Alumina: Structural Properties and Catalytic Behaviour in Enantioselective Hydrogenation," *Journal of Catalysis* 213: 296-304.

International Search Report mailed Jan. 2, 2015, for PCT Patent Application No. PCT/US14/61812, filed Oct. 22, 2014; 3 pages.

Written Opinion mailed Jan. 2, 2015, for PCT Patent Application No. PCT/US14/61812, filed Oct. 22, 2014; 19 pages.

Birlik, I. et al. (Jun. 15, 2010). "Nanoparticle Doped YBCO Films Prepared by Chemical Solution Deposition Method," *6th Nanoscience and Nanotechnology Conference, Izmir, Turkey*: 1 page.

Cospheric LLC. (Mar. 13, 2010). "Porous Ceramics: Application for Polyethylene Microspheres," Microspheres Online, located at http://microspheres.us/microsphere-manufacturing/porous-ceramics-polyethylene-microspheres/177.html, last accessed Mar. 17, 2015, 6 pages.

Ahmad, K. et al. (2008). "Hybrid Nanocomposites: A New Route Towards Tougher Alumina Ceramics," *Composites Science and Technology* 68: 1321-1327.

Babin, A. et al. (1985). "Solvents Used in the Arts," *Center for Safety in the Arts*: 16 pages.

Bateman, J. E. et al. (Dec. 17, 1998). "Alkylation of Porous Silicon by Direct Reaction with Alkenes and Alkynes," *Angew. Chem Int. Ed.* 37(19):2683-2685.

Carrot, G. et al. (Sep. 17, 2002). "Surface-Initiated Ring-Opening Polymerization: A Versatile Method for Nanoparticle Ordering," *Macromolecules* 35(22):8400-8404.

Chaim, R. et al. (2009). "Densification of Nanocrystalline Y2O3 Ceramic Powder by Spark Plasma Sintering," *Journal of European Ceramic Society* 29: 91-98.

Chau, J. K. H. et al. (2005). "Microwave Plasma Synthesis of Silver Nanopowders," *Materials Letters* 59: 905-908.

Chen, H.-S. et al. (Jul. 3, 2001). "On the Photoluminescence of Si Nanoparticles," *Mater. Phys. Mech.* 4:62-66.

Chen, W.-J. et al. (Mar. 18, 2008). "Functional $Fe_3O_4/TiO_2$ Core/Shell Magnetic Nanoparticles as Photokilling Agents for Pathogenic Bacteria," *Small* 4(4): 485-491.

Das, N. et al. (2001). "Influence of the Metal Function in the "One-Pot"Synthesis of 4-Methyl2-Pentanone (Methyl Isobutyl Ketone) from Acetone Over Palladium Supported on Mg(Al)O Mixed Oxides Catalysts," *Catalysis Letters* 71(3-4): 181-185.

Faber, K. T. et al. (Sep. 1988). "Toughening by Stress-Induced Microcracking in Two-Phase Ceramics," *Journal of the American Ceramic Society* 71: C-399-C401.

Fauchais, P. et al. (Jun. 1989). "La Projection Par Plasma: Une Revue," *Ann. Phys. Fr.* 14(3):261-310.

Fauchais, P. et al. (Jan. 1993). "Les Dépôts Par Plasma Thermique," *Revue Générale De L'Electricité*, RGE, Paris, France, No. 2, pp. 7-12 (in French).

Fauchais, P. et al. (Jan. 1996). "Plasma Spray: Study of the Coating Generation," *Ceramics International* 22(4):295-303.

Fojtik, A. et al. (Apr. 29, 1994). "Luminescent Colloidal Silicon Particles,"*Chemical Physics Letters* 221:363-367.

Fojtik, A. (Jan. 13, 2006). "Surface Chemistry of Luminescent Colloidal Silicon Nanoparticles," *J. Phys. Chem. B.* 110(5):1994-1998.

Gangeri, M. et al. (2009). "Fe and Pt Carbon Nanotubes for the Electrocatalytic Conversion of Carbon Dioxide to Oxygenates," *Catalysis Today* 143: 57-63.

Gutsch, A. et al. (2002). "Gas-Phase Production of Nanoparticles," *Kona* No. 20, pp. 24-37.

Han, B. Q. et al. (Jan. 2004). "Deformation Mechanisms and Ductility of Nanostructured Al Alloys", *Mat. Res. Soc. Symp. Proc.* 821:P9.1.1-P9.1.6.

(56) References Cited

OTHER PUBLICATIONS

Heberlein, J. (2002). "New Approaches in Thermal Plasma Technology", *Pure Appl. Chem.* 74(3):327-335.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Ihlein, G. et al.(1998). "Ordered Porous Materials as Media for the Organization of Matter on the Nanoscale," *Applied Organometallic Chemistry* 12: 305-314.

Ji, Y. et al. (Nov. 2002) "Processing and Mechanical Properties of $Al_2O_3$-5 vol.% Cr Nanocomposites," *Journal of the European Ceramic Society* 22(12):1927-1936.

Jouet, R. J. et al. (Jan. 25, 2005). "Surface Passivation of Bare Aluminum Nanoparticles Using Perfluoroalkyl Carboxylic Acids," *Chem. Mater.*17(11):2987-2996.

Kenvin, J. C. et al. (1992). "Supported Catalysts Prepared from Mononuclear Copper Complexes: Catalytic Properties", *J. Catalysis* 135:81-91.

Konrad, H. et al. (1996). "Nanostructured Cu-Bi Alloys Prepared by Co-Evaporation in a Continuous Gas Flow," *NanoStructured Materials* 7(6):605-610.

Kim, N. Y. et al. (Mar. 5, 1997). "Thermal Derivatization of Porous Silicon with Alcohols," *J. Am. Chem. Soc.* 119(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Lakis, R. E. et al. (1995). "Alumina-Supported Pt-Rh Catalysts: I. Microstructural Characterization," *Journal of Catalysis* 154: 261-275.

Langner, A. et al. (Aug. 25, 2005). "Controlled Silicon Surface Functionalization by Alkene Hydrosilylation," *J. Am. Chem. Soc.* 127(37):12798-12799.

Li, D. et al. (Apr. 9, 2005). "Environmentally Responsive "Hairy"Nanoparticles: Mixed Homopolymer Brushes on Silica Nanoparticles Synthesized by Living Radical Polymerization Techniques," *J. Am. Chem. Soc.* 127(7):6248-6256.

Li, X. et al. (May 25, 2004). "Surface Functionalization of Silicon Nanoparticles Produced by Laser-Driven Pyrolysis of Silane Followed by HF-$HNO_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc.* 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater.* 18(3):637-642.

Luo, J. et al. (2008). "Core/Shell Nanoparticles as Electrocatalysts for Fuel Cell Reactions," *Advanced Materials* 20: 4342-4347.

Mignard, D. et al. (2003). "Methanol Synthesis from Flue-Gas $CO_2$ and Renewable Electricity: A Feasibility Study," *International Journal of Hydrogen Energy* 28: 455-464.

Mühlenweg, H. et al. (2004). "Gas-Phase Reactions—Open Up New Roads to Nanoproducts," *Degussa ScienceNewsletter* No. 08, pp. 12-16.

Nagai, Y. et al. (Jul. 3, 2006). "Sintering Inhibition Mechanism of Platinum Supported on Ceria-Based Oxide and Pt-Oxide-Support Interaction," *J. Catalysis* 242:103-109.

Nasa (2009). "Enthalpy," Article located at http://www.grc.nasa.gov/WWW/K-12/airplane/enthalpy.htrnl, published by National Aeronautics and Space Administration on Nov. 23, 2009, 1 page.

Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.

Netzer, L. et al. (1983). "A New Approach to Construction of Artificial Monolayer Assemblies," *J. Am. Chem. Soc.* 105(3):674-676.

Park, H.-Y. et al. (May 30, 2007). "Fabrication of Magnetic Core@Shell Fe Oxide@Au Nanoparticles for Interfacial Bioactivity and Bio-Separation," *Langmuir* 23: 9050-9056.

Park, N.-G. et al. (Feb. 17, 2004). "Morphological and Photoelectrochemical Characterization of Core-Shell Nanoparticle Films for Dye-Sensitized Solar Cells: Zn—O Type Shell on $SnO_2$ and $TiO_2$ Cores," *Langmuir* 20: 4246-4253.

"Plasma Spray and Wire Flame Spray Product Group," located at http://www.processmaterials.com/spray.html, published by Process Materials, Inc., last accessed Aug. 5, 2013, 2 pages.

"Platinum Group Metals: Annual Review 1996" (Oct. 1997). Engineering and Mining Journal, p. 63.

Rahaman, R. A. et al. (1995). "Synthesis of Powders," in *Ceramic Processing and Sintering*. Marcel Decker, Inc., New York, pp. 71-77.

Sailor, M. J. (1997). "Surface Chemistry of Luminescent Silicon Nanocrystallites," *Adv. Mater.* 9(10):783-793.

Schimpf, S. et al. (2002). "Supported Gold Nanoparticles: In-Depth Catalyst Characterization and Application in Hydrogenation and Oxidation Reactions," *Catalysis Today* 2592: 1-16.

Stiles, A. B. (Jan. 1, 1987). "Manufacture of Carbon-Supported Metal Catalysts," in *Catalyst Supports and Supported Catalysts*, Butterworth Publishers, MA, pp. 125-132.

Subramanian, S. et al. (1991). "Structure and Activity of Composite Oxide Supported Platinum-Iridium Catalysts," *Applied Catalysts* 74: 65-81.

Tao, Y.-T. (May 1993). "Structural Comparison of Self-Assembled Monolayers of *n*-Alkanoic Acids on the surfaces of Silver, Copper, and Aluminum," *J. Am. Chem. Soc.* 115(10):4350-4358.

Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," *Journal of the European Ceramic Society* (31)13: 2267-2275.

Vardelle, A. et al. (1996). "Coating Generation: Vaporization of Particles in Plasma Spraying and Splat Formation," Universite de Limoges, 123 Avenue A. Thomas 87000, Limoges, France, *Pure & Appl. Chem.* 68(5):1093-1099.

Vardelle, M. et al. (Jun. 1991). "Experimental Investigation of Powder Vaporization in Thermal Plasma Jets," *Plasma Chemistry and Plasma Processing* 11(2):185-201.

Viswanathan, V. et al. (2006). "Challenges and Advances in Nanocomposite Processing Techniques," *Materials Science and Engineering* R 54: 121-285.

Wan, J. et al. (2005). "Spark Plasma Sintering of Silicon Nitride/Silicon Carbide Nanocomposites with Reduced Additive Amounts," *Scripta Materialia* 53: 663-667.

Yoshida, T. (1994). "The Future of Thermal Plasma Processing for Coating", *Pure & Appl. Chem.* 66(6):1223-1230.

Zou, J. et al. (Jun. 4, 2004). "Solution Synthesis of Ultrastable Luminescent Siloxane-Coated Silicon Nanoparticles," *Nano Letters* 4(7):1181-1186.

U.S. Appl. No. 13/291,983, filed Nov. 8, 2011, for Layman et al. (copy not attached).

U.S. Appl. No. 12/152,084, filed May 9, 2008, for Biberger. (copy not attached).

U.S. Appl. No. 13/028,693, filed Feb. 16, 2011, for Biberger. (copy not attached).

U.S. Appl. No. 12/943,909, filed Nov. 10, 2010, for Layman. (copy not attached).

U.S. Appl. No. 12/152,111, filed May 9, 2008, for Biberger et al. (copy not attached).

U.S. Appl. No. 12/151,830, filed May 8, 2008, for Biberger et al. (copy not attached).

U.S. Appl. No. 12/968,248, filed Dec. 14, 2010, for Biberger. (copy not attached).

U.S. Appl. No. 12/968,245, filed Dec. 14, 2010, for Biberger. (copy not attached).

U.S. Appl. No. 12/968,241, filed Dec. 14, 2010, for Biberger. (copy not attached).

U.S. Appl. No. 12/968,239, filed Dec. 14, 2010, for Biberger. (copy not attached).

U.S. Appl. No. 12/969,128, filed Dec. 15, 2010, for Biberger. (copy not attached).

U.S. Appl. No. 12/962,463, filed Dec. 7, 2010, for Leamon. (copy not attached).

(56) References Cited

OTHER PUBLICATIONS

U.S. Appl. No. 12/961,030, filed Dec. 6, 2010, for Lehman. (copy not attached).
U.S. Appl. No. 12/961,108, filed Dec. 6, 2010, for Lehman. (copy not attached).
U.S. Appl. No. 12/961,200, filed Dec. 6, 2010, for Lehman. (copy not attached).
U.S. Appl. No. 12/968,253, filed Dec. 14, 2010, for Biberger. (copy not attached).
U.S. Appl. No. 12/968,235, filed Dec. 14, 2010, for Biberger. (copy not attached).
U.S. Appl. No. 12/969,306, filed Dec. 15, 2010, for Lehman et al. (copy not attached).
U.S. Appl. No. 12/969,447, filed Dec. 15, 2010, for Biberger et al. (copy not attached).
U.S. Appl. No. 12/969,087, filed Dec. 15, 2010, for Biberger. (copy not attached).
U.S. Appl. No. 12/962,533, filed Dec. 7, 2010, for Yin et al. (copy not attached).
U.S. Appl. No. 12/962,523, filed Dec. 7, 2010, for Yin et al. (copy not attached).
U.S. Appl. No. 12/001,643, filed Dec. 11, 2007, for Biberger et al. (copy not attached).
U.S. Appl. No. 12/474,081, filed May 28, 2009, for Biberger et al. (copy not attached).
U.S. Appl. No. 12/001,602, filed Dec. 11, 2007, for Biberger et al. (copy not attached).
U.S. Appl. No. 12/001,644, filed Dec. 11, 2007, for Biberger et al. (copy not attached).
U.S. Appl. No. 12/969,457, filed Nov. 15, 2010, for Leamon et al. (copy not attached).
U.S. Appl. No. 12/969,503, filed Nov. 15, 2010, for Leamon et al. (copy not attached).
U.S. Appl. No. 12/954,813, filed Nov. 26, 2010, for Biberger. (copy not attached).
U.S. Appl. No. 12/954,822, filed Nov. 26, 2010, for Biberger. (copy not attached).
Jensen, J. et al. (2000). "Preparation of ZnO—$Al_2O_3$ Particles in a Premixed Flame," *Journal of Nanoparticle Research* 2: 363-373.

COMPOSITIONS OF LEAN $NO_x$ TRAP (LNT) SYSTEMS AND METHODS OF MAKING AND USING SAME

CROSS-REFERENCE TO RELATED APPLICATIONS

This application claims priority benefit of U.S. Provisional Patent Application No. 61/894,346, filed Oct. 22, 2013. The entire contents of that application are hereby incorporated by reference herein.

FIELD OF THE INVENTION

The present disclosure relates to the field of catalysts. More specifically, the present invention relates to nanoparticle catalysts and storage materials for nitrogen oxides as part of a lean $NO_x$ trap (LNT) system.

BACKGROUND OF THE INVENTION

Car exhaust primarily contains harmful gases such as carbon monoxide (CO), nitrogen oxides ($NO_x$), and hydrocarbons. Environmental concerns and government regulations have led efforts to remove these noxious combustion products from vehicle exhaust by conversion to more benign gases such as carbon dioxide ($CO_2$), nitrogen ($N_2$), and water ($H_2O$). In order to accomplish this conversion, the exhaust gases must pass through a treatment system that contains materials that can oxidize CO to $CO_2$, reduce $NO_x$ to $N_2$ and $H_2O$, and oxidize hydrocarbons to $CO_2$ and $H_2O$. Recently, lean-burn gasoline and diesel engines have increased in popularity due to their improved fuel economy. These engines, however, have high amounts of oxygen present in the exhaust gas, which leads to inhibition of the catalytic reduction of $NO_x$.

One solution to this problem has been the use of lean $NO_x$ traps (LNTs). LNTs absorb, store, or trap nitrogen oxides during lean-burn engine operation (i.e., when excess oxygen is present), and release and convert these gases when the oxygen content in the exhaust gas is reduced. LNTs are typically composed of one or more platinum group metals (PGMs) such as platinum, palladium, or rhodium, and an alkali earth metal such as barium. Although these traps are effective at removing $NO_x$ from the exhaust of lean-burn vehicles, high loadings of expensive PGMs are required. As such, there is a significant cost associated with the use of these LNTs.

Accordingly, there is a need for non-platinum group metal materials that effectively reduce and/or store $NO_x$ for use as less expensive alternatives in LNTs.

SUMMARY OF THE INVENTION

Described herein are coated substrates for use as NOx traps, washcoat formulations for preparing coated substrates for use as NOx traps, methods for preparing coated substrates for use as NOx traps, and systems incorporating coated substrates employed as NOx traps in an emission-control system. The NOx traps are, in one embodiment, lean NOx traps, which can trap NOx species from engine emissions during lean-cycle engine operation, and which can be purged of NOx species during rich-cycle engine operation.

The present invention provides, in a general embodiment, a coated substrate comprising:
a substrate;
a washcoat layer comprising oxidative catalytically active composite nanoparticles attached/bonded to or embedded in a first micron-sized support particle, the oxidative catalytically active composite nanoparticles comprising a first support nanoparticle and an oxidative catalytic nanoparticle;
a washcoat layer comprising reductive catalytically active composite nanoparticles attached/bonded to or embedded in a second micron-sized support particle, the reductive catalytically active composite nanoparticles comprising a second support nanoparticle and a reductive catalytic nanoparticle;
wherein either:
(i) the washcoat layer comprising reductive catalytically active composite nanoparticles further comprises NOx trapping particles, the NOx trapping particles comprising micron-sized cerium oxide; or
(ii) the coated substrate comprises a further washcoat layer comprising NOx trapping particles, the NOx trapping particles comprising micron-sized cerium oxide. Such a coated substrate may have any of the preferred and optional features described below.

The present invention also provides, in a general embodiment, a method of making a coated substrate comprising, in any order:
coating the substrate with a washcoat layer comprising oxidative catalytically active composite nanoparticles attached/bonded to or embedded in a first micron-sized support particle, the oxidative catalytically active composite nanoparticles comprising a first support nanoparticle and an oxidative catalytic nanoparticle;
coating the substrate with a washcoat layer comprising reductive catalytically active composite nanoparticles attached/bonded to or embedded in a second micron-sized support particle, the reductive catalytically active composite nanoparticles comprising a second support nanoparticle and a reductive catalytic nanoparticle;
wherein either:
(i) the washcoat layer comprising reductive catalytically active composite nanoparticles further comprises NOx trapping particles, the NOx trapping particles comprising micron-sized cerium oxide; or
(ii) the method additionally comprises, in any order with respect to coating the substrate with other washcoat layers, coating the substrate with a washcoat layer comprising NOx trapping particles, the NOx trapping particles comprising micron-sized cerium oxide. Such a method of making a coated substrate, as well as the coated substrate so prepared, may have any of the preferred and optional features described below.

Described herein is a coated substrate comprising a substrate; a washcoat layer comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; and a washcoat layer comprising reductive catalytically active Nano-on-Nano-on-micro (NNm) particles and $NO_x$ trapping particles, the reductive catalytically active Nano-on-Nano-on-micro (NNm) particles comprising composite nanoparticles bonded to a second micron-sized carrier particle, the composite nanoparticles comprising a second support nanoparticle and a reductive catalytic nanoparticle, and the $NO_x$ trapping particles comprising micron-sized cerium oxide or micron-sized cerium oxide-containing material. In further embodiments, the $NO_x$ trapping particles further comprise barium oxide impregnated in the micron-sized cerium oxide or micron-sized cerium oxide-containing material, and/or further comprise platinum, palladium, or both platinum and palladium impregnated in the micron-sized cerium oxide or micron-sized cerium oxide-containing material. In any of the disclosed embodiments of the NOx trapping particles, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

The barium oxide of any of the embodiments disclosed herein can be plasma-generated and subsequently impregnated in the micron-sized cerium oxide or micron-sized cerium oxide-containing material; in alternative embodiments, the barium oxide can be impregnated in the micron-sized cerium oxide or micron-sized cerium oxide-containing material by the use of wet chemistry employing barium oxide precursors (such as barium acetate). The platinum and/or palladium of any of the preceding embodiments can be plasma-generated and subsequently impregnated in the micron-sized cerium oxide or micron-sized cerium oxide-containing material; in alternative embodiments, the platinum and/or palladium can be impregnated in the micron-sized cerium oxide or micron-sized cerium oxide-containing material by the use of wet chemistry employing platinum precursors and/or palladium precursors. In any of the disclosed embodiments, including the foregoing embodiments, the $NO_x$ trapping particles can further comprise the perovskite $FeBaO_3$ impregnated in the micron-sized cerium oxide or micron-sized cerium oxide-containing material. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, the $NO_x$ trapping particles can further comprise metal oxides selected from the group consisting of samarium, zinc, copper, iron, and silver impregnated in the micron-sized cerium oxide or micron-sized cerium oxide-containing material. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, the $NO_x$ trapping particles can be prepared by wet chemistry.

In any of the disclosed embodiments, including the foregoing embodiments, the $NO_x$ trapping particles can further comprise micron-sized aluminum oxide particles.

In any of the disclosed embodiments, including the foregoing embodiments, the micron-sized aluminum oxide particles are Nano-on-Nano-on-micro (NNm) particles. In any of the disclosed embodiments, including the foregoing embodiments, the Nano-on-Nano-on-micro (NNm) particles can comprise platinum and/or palladium; and/or can comprise a non-platinum group metal. The non-platinum group metal can be selected from the group consisting of tungsten, molybdenum, niobium, manganese, chromium, and mixtures thereof.

In any of the disclosed embodiments, including the foregoing embodiments, the oxidative catalytically active Nano-on-Nano-on-micro (NNm) particles can comprise at least one platinum group metal. The platinum group metal can be platinum, palladium, or both platinum and palladium. In any of the disclosed embodiments, including the foregoing embodiments, the platinum and palladium is an alloy of platinum and palladium. In any of the disclosed embodiments, including the foregoing embodiments, the platinum and palladium are added as individual metals.

In any of the disclosed embodiments, including the foregoing embodiments, the reductive catalytically active Nano-on-Nano-on-micro (NNm) particles can comprise a platinum group metal. The platinum group metal can be rhodium.

In any of the disclosed embodiments, including the foregoing embodiments, the $NO_x$ trapping particles comprising micron-sized cerium oxide or micron-sized cerium oxide-containing material can further comprise zirconium oxide. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, the first support nanoparticle and/or the first micron-sized carrier particle can comprise aluminum oxide. In any of the disclosed embodiments, including the foregoing embodiments, the second support nanoparticle and/or the second micron-sized carrier particle can comprise cerium oxide. In any of the disclosed embodiments, including the foregoing embodiments, the first and second support nanoparticles can have an average diameter of about 10 nm to about 20 nm, for example, about 1 nm to about 5 nm. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, of the coated substrate, the washcoat layer can comprise oxidative catalytically active Nano-on-Nano-on-micro (NNm) particles, metal oxide particles, and boehmite particles.

In any of the disclosed embodiments, including the foregoing embodiments, the metal oxide particles can be aluminum oxide particles.

In any of the disclosed embodiments, including the foregoing embodiments, the oxidative catalytically active Nano-on-Nano-on-micro (NNm) particles can comprise 35% to 75% by weight of the combination of the oxidative catalytically active Nano-on-Nano-on-micro (NNm) particles, boehmite particles, and aluminum oxide particles; and/or the aluminum oxide particles can comprise 30% to 70% by weight of the combination of the oxidative catalytically active Nano-on-Nano-on-micro (NNm) particles, boehmite particles, and aluminum oxide particles; and/or the boehmite particles can comprise 2% to 5% by weight of the combination of the oxidative catalytically active Nano-on-Nano-on-micro (NNm) particles, boehmite particles, and aluminum oxide particles.

In any of the disclosed embodiments, including the foregoing embodiments, the washcoat layer can comprise 50% by weight of the oxidative catalytically active Nano-on-Nano-on-micro (NNm) particles, 3% by weight of the boehmite particles, and 47% by weight of the aluminum oxide particles.

In any of the disclosed embodiments, including the foregoing embodiments, the washcoat layer comprising reductive catalytically active Nano-on-Nano-on-micro (NNm) particles and $NO_x$ trapping particles can further comprise boehmite. In any of the disclosed embodiments, including the foregoing embodiments, the reductive catalytically active Nano-on-Nano-on-micro (NNm) particles comprise 3% to 40% by weight of the combination of the reductive catalytically active Nano-on-Nano-on-micro (NNm) particles, $NO_x$ trapping particles, and boehmite particles, the $NO_x$ trapping particles can comprise 30% to 98% by weight of the combination of the reductive catalytically active Nano-on-Nano-on-micro (NNm) particles, $NO_x$ trapping particles, and boehmite particles, and the boehmite particles can comprise 1% to 5% by weight of the combination of the reductive catalytically active Nano-on-Nano-on-micro (NNm) particles, $NO_x$ trapping particles, and boehmite particles.

In any of the disclosed embodiments, including the foregoing embodiments, the washcoat layer can comprise reductive catalytically active Nano-on-Nano-on-micro (NNm) particles and $NO_x$ trapping particles comprises 15% by weight of the reductive catalytically active Nano-on-Nano-on-micro (NNm) particles, 83% by weight of the $NO_x$ trapping particles, and 2% by weight of the boehmite particles.

In any of the disclosed embodiments, including the foregoing embodiments, the substrate can comprise cordierite. In any of the disclosed embodiments, including the foregoing embodiments, the substrate can comprise a honeycomb structure.

In any of the disclosed embodiments, including the foregoing embodiments, the washcoat layer on the coated substrate comprising oxidative catalytically active Nano-on-Nano-on-micro (NNm) particles has a thickness of 25 g/L to 150 g/L.

In any of the disclosed embodiments, including the foregoing embodiments, the washcoat layer on the coated substrate comprising reductive catalytically active Nano-on-Nano-on-micro (NNm) particles and $NO_x$ trapping particles has a thickness of 100 g/L to 400 g/L.

In any of the disclosed embodiments, including the foregoing embodiments, the coated substrate has a platinum group metal loading of 4 g/L or less and a light-off temperature for carbon monoxide at least 5° C. lower than the light-off temperature of a substrate with the same platinum group metal loading deposited by wet-chemistry methods.

In any of the disclosed embodiments, including the foregoing embodiments, the coated substrate has a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

In any of the disclosed embodiments, including the foregoing embodiments, the coated substrate has a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Further described herein is a catalytic converter comprising a coated substrate of any one of the disclosed embodiments, including the foregoing embodiments. Further described herein is an exhaust treatment system comprising a conduit for exhaust gas and the foregoing catalytic converter. Further described herein is a vehicle comprising the foregoing catalytic converter.

Further described herein is a method of treating an exhaust gas, comprising contacting the coated substrate of any of the foregoing embodiments with the exhaust gas. In further embodiments, the substrate can be housed within a catalytic converter configured to receive the exhaust gas.

Further described herein is a coated substrate comprising a substrate; a washcoat layer comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; and a washcoat layer comprising reductive catalytically active Nano-on-Nano-in-Micro (NNiM) particles and $NO_x$ trapping particles, the reductive catalytically active Nano-on-Nano-in-Micro (NNiM) particles comprising composite nanoparticles embedded in a second micron-sized porous carrier, the composite nanoparticles comprising a second support nanoparticle and a reductive catalytic nanoparticle, and the $NO_x$ trapping particles comprising micron-sized cerium oxide or micron-sized cerium oxide-containing material. The variations described above for the previously described coated substrate using NNm material are also applicable to this substrate using NNiM material where compatible. In all embodiments disclosed herein, oxidative catalytically active Nano-on-Nano-in-Micro (NNiM) particles can comprise nano-on-nano composite nanoparticles comprise a platinum catalytic nanoparticle disposed on an aluminum oxide support particle; where the nano-on-nano composite nanoparticles comprise a palladium catalytic nanoparticle disposed on an aluminum oxide support particle; or where the nano-on-nano composite nanoparticles comprise a platinum/palladium alloy catalytic nanoparticle disposed on an aluminum oxide support particle; and one or more of those NN particles is then embedded in a porous carrier formed of aluminum oxide which is formed around the NN particles, which carrier is then ground or milled into micron-sized particles. In all embodiments disclosed herein, reductive catalytically active Nano-on-Nano-in-Micro (NNiM) particles can comprise nano-on-nano composite nanoparticles comprising a rhodium catalytic nanoparticle disposed on a cerium oxide support particle; where the nano-on-nano composite nanoparticles comprise a rhodium catalytic nanoparticle disposed on a cerium-zirconium oxide support particle; where the nano-on-nano composite nanoparticles comprise a rhodium catalytic nanoparticle disposed on a cerium-zirconium-lanthanum oxide support particle; or where the nano-on-nano composite nanoparticles comprise a rhodium catalytic nanoparticle disposed on a cerium-zirconium-lanthanum-yttrium oxide support particle; and one or more of those NN particles is then embedded in a porous carrier formed of porous cerium oxide, cerium-zirconium oxide, cerium-zirconium-lanthanum oxide, or cerium-zirconium-lanthanum-yttrium oxide carrier, where the porous carrier is formed around the NN particles, which carrier is then ground or milled into micron-sized particles. Aluminum oxide porous material can also be used as the porous material in which any of the foregoing rhodium-containing composite NN nanoparticles can be embedded. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Further described is a coated substrate comprising a substrate; a washcoat layer comprising oxidative catalytically active composite nanoparticles attached to a first micron-sized support particle, the oxidative catalytically active composite nanoparticles being plasma-generated and comprising a first support nanoparticle and an oxidative catalytic nanoparticle; and a washcoat layer comprising $NO_x$ trapping particles and reductive catalytically active composite nanoparticles attached to a second micron-sized support particle, the reductive catalytically active composite nanoparticles being plasma-generated and comprising a second support nanoparticle and a reductive catalytic nanoparticle, and the $NO_x$ trapping particles comprising micron-sized cerium oxide or micron-sized cerium oxide-containing material. The variations described above for the previously described coated substrate are also applicable to this substrate. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Also described herein is a coated substrate comprising a substrate; a first washcoat layer comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; a second washcoat layer comprising reductive catalytically active Nano-on-Nano-on-micro (NNm) particles, the reductive catalytically active Nano-on-Nano-on-micro (NNm) particles comprising composite nanoparticles bonded to a second micron-sized carrier particle, the composite nanoparticles comprising a second support nanoparticle and a reductive catalytic nanoparticle, and a third washcoat layer comprising $NO_x$ trapping particles, the $NO_x$ trapping particles comprising micron-sized cerium oxide or micron-sized cerium oxide-containing material. The washcoat layers can be disposed in any order with respect to the substrate (that is, S-1-2-3, S-1-3-2, S-2-1-3, S-2-3-1, S-3-1-2, S-3-2-1, where S is the substrate and 1, 2, and 3 represent the first, second, and third washcoat layers, respectively). In further embodiments, the $NO_x$ trapping particles further comprise barium oxide impregnated in the micron-sized cerium oxide or micron-sized cerium oxide-containing material, and/or further comprise platinum, palladium, or both platinum and palladium impregnated in the micron-sized cerium oxide or micron-sized cerium oxide-containing material. In any of the disclosed embodiments of the NOx trapping particles, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

The barium oxide of any of the embodiments disclosed herein can be plasma-generated and subsequently impregnated in the micron-sized cerium oxide or micron-sized cerium oxide-containing material; in alternative embodiments, the barium oxide can be impregnated in the micron-sized cerium oxide or micron-sized cerium oxide-containing material by the use of wet chemistry employing barium oxide precursors (such as barium acetate). The platinum and/or palladium of any of the preceding embodiments can be plasma-generated and subsequently impregnated in the micron-sized cerium oxide or micron-sized cerium oxide-containing material; in alternative embodiments, the platinum and/or palladium can be impregnated in the micron-sized cerium oxide or micron-sized cerium oxide-containing material by the use of wet chemistry employing platinum precursors and/or palladium precursors. In any of the disclosed embodiments, including the foregoing embodiments, the $NO_x$ trapping particles can further comprise the perovskite $FeBaO_3$ impregnated in the micron-sized cerium oxide or micron-sized cerium oxide-containing material. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, the $NO_x$ trapping particles can further comprise metal oxides selected from the group consisting of samarium, zinc, copper, iron, and silver impregnated in the micron-sized cerium oxide or micron-sized cerium oxide-containing material. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, the $NO_x$ trapping particles can be prepared by wet chemistry.

In any of the disclosed embodiments, including the foregoing embodiments, the $NO_x$ trapping particles can further comprise micron-sized aluminum oxide particles.

In any of the disclosed embodiments, including the foregoing embodiments, the micron-sized aluminum oxide particles are Nano-on-Nano-on-micro (NNm) particles. In any of the disclosed embodiments, including the foregoing embodiments, the Nano-on-Nano-on-micro (NNm) particles can comprise platinum and/or palladium; and/or can comprise a non-platinum group metal. The non-platinum group metal can be selected from the group consisting of tungsten, molybdenum, niobium, manganese, chromium, and mixtures thereof.

In any of the disclosed embodiments, including the foregoing embodiments, the oxidative catalytically active Nano-on-Nano-on-micro (NNm) particles can comprise at least one platinum group metal. The platinum group metal can be platinum, palladium, or both platinum and palladium. In any of the disclosed embodiments, including the foregoing embodiments, the platinum and palladium is an alloy of platinum and palladium. In any of the disclosed embodiments, including the foregoing embodiments, the platinum and palladium are added as individual metals.

In any of the disclosed embodiments, including the foregoing embodiments, the reductive catalytically active Nano-on-Nano-on-micro (NNm) particles can comprise a platinum group metal. The platinum group metal can be rhodium.

In any of the disclosed embodiments, including the foregoing embodiments, the $NO_x$ trapping particles comprising micron-sized cerium oxide or micron-sized cerium oxide-containing material can further comprise zirconium oxide. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, the first support nanoparticle and/or the first micron-sized carrier particle can comprise aluminum oxide. In any of the disclosed embodiments, including the foregoing embodiments, the second support nanoparticle and/or the second micron-sized carrier particle can comprise cerium oxide. In any of the disclosed embodiments, including the foregoing embodiments, the first and second support nanoparticles can have an average diameter of about 10 nm to about 20 nm, for example, about 1 nm to about 5 nm. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments, including the foregoing embodiments, of the coated substrate, the washcoat layer can comprise oxidative catalytically active Nano-on-Nano-on-micro (NNm) particles, metal oxide particles, and boehmite particles.

In any of the disclosed embodiments, including the foregoing embodiments, the metal oxide particles can be aluminum oxide particles.

In any of the disclosed embodiments, including the foregoing embodiments, the oxidative catalytically active Nano-on-Nano-on-micro (NNm) particles can comprise 35% to 75% by weight of the combination of the oxidative catalytically active Nano-on-Nano-on-micro (NNm) particles, boehmite particles, and aluminum oxide particles; and/or the aluminum oxide particles can comprise 30% to 70% by weight of the combination of the oxidative catalytically active Nano-on-Nano-on-micro (NNm) particles, boehmite particles, and aluminum oxide particles; and/or the boehmite particles can comprise 2% to 5% by weight of the combination of the oxidative catalytically active Nano-on-Nano-on-micro (NNm) particles, boehmite particles, and aluminum oxide particles.

In any of the disclosed embodiments, including the foregoing embodiments, the washcoat layer can comprise 50% by weight of the oxidative catalytically active Nano-on-Nano-on-micro (NNm) particles, 3% by weight of the boehmite particles, and 47% by weight of the aluminum oxide particles.

In any of the disclosed embodiments, including the foregoing embodiments, the washcoat layer comprising reductive catalytically active Nano-on-Nano-on-micro (NNm) particles and $NO_x$ trapping particles can further comprise boehmite. In any of the disclosed embodiments, including the foregoing embodiments, the reductive catalytically active Nano-on-Nano-on-micro (NNm) particles comprise 3% to 40% by weight of the combination of the reductive catalytically active Nano-on-Nano-on-micro (NNm) particles, $NO_x$ trapping particles, and boehmite particles, the $NO_x$ trapping particles can comprise 30% to 98% by weight of the combination of the reductive catalytically active Nano-on-Nano-on-micro (NNm) particles, $NO_x$ trapping particles, and boehmite particles, and the boehmite particles can comprise 1% to 5% by weight of the combination of the reductive catalytically active Nano-on-Nano-on-micro (NNm) particles, $NO_x$ trapping particles, and boehmite particles.

In any of the disclosed embodiments, including the foregoing embodiments, the washcoat layer can comprise reductive catalytically active Nano-on-Nano-on-micro (NNm) particles and $NO_x$ trapping particles comprises 15% by weight of the reductive catalytically active Nano-on-Nano-on-micro (NNm) particles, 83% by weight of the $NO_x$ trapping particles, and 2% by weight of the boehmite particles.

In any of the disclosed embodiments, including the foregoing embodiments, the substrate can comprise cordierite. In any of the disclosed embodiments, including the foregoing embodiments, the substrate can comprise a honeycomb structure.

In any of the disclosed embodiments, including the foregoing embodiments, the washcoat layer on the coated substrate comprising oxidative catalytically active Nano-on-Nano-on-micro (NNm) particles has a thickness of 25 g/L to 150 g/L.

In any of the disclosed embodiments, including the foregoing embodiments, the washcoat layer on the coated substrate comprising reductive catalytically active Nano-on-Nano-on-micro (NNm) particles has a thickness of 25 g/L to 150 g/L.

In any of the disclosed embodiments, including the foregoing embodiments, the washcoat layer on the coated substrate comprising $NO_x$ trapping particles has a thickness of 100 g/L to 400 g/L.

In any of the disclosed embodiments, including the foregoing embodiments, the coated substrate has a platinum group metal loading of 4 g/L or less and a light-off temperature for carbon monoxide at least 5° C. lower than the light-off temperature of a substrate with the same platinum group metal loading deposited by wet-chemistry methods.

In any of the disclosed embodiments, including the foregoing embodiments, the coated substrate has a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

In any of the disclosed embodiments, including the foregoing embodiments, the coated substrate has a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Further described herein is a catalytic converter comprising a coated substrate of any one of the disclosed embodiments, including the foregoing embodiments. Further described herein is an exhaust treatment system comprising a conduit for exhaust gas and the foregoing catalytic converter. Further described herein is a vehicle comprising the foregoing catalytic converter.

Further described herein is a method of treating an exhaust gas, comprising contacting the coated substrate of any of the foregoing embodiments with the exhaust gas. In further embodiments, the substrate can be housed within a catalytic converter configured to receive the exhaust gas.

Further described herein is a coated substrate comprising a substrate; a first washcoat layer comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; a second washcoat layer comprising reductive catalytically active Nano-on-Nano-in-Micro (NNiM) particles, the reductive catalytically active Nano-on-Nano-in-Micro (NNiM) particles comprising composite nanoparticles embedded in a second micron-sized porous carrier, the composite nanoparticles comprising a second support nanoparticle and a reductive catalytic nanoparticle; and a third washcoat layer comprising $NO_x$ trapping particles, and the $NO_x$ trapping particles comprising micron-sized cerium oxide or micron-sized cerium oxide-containing material. The washcoat layers can be disposed in any order with respect to the substrate (that is, S-1-2-3, S-1-3-2, S-2-1-3, S-2-3-1, S-3-1-2, S-3-2-1, where S is the substrate and 1, 2, and 3 represent the first, second, and third washcoat layers, respectively). The variations described above for the previously described coated substrate using NNm material are also applicable to this substrate using NNiM material where compatible. In all embodiments disclosed herein, oxidative catalytically active Nano-on-Nano-in-Micro (NNiM) particles can comprise nano-on-nano composite nanoparticles comprise a platinum catalytic nanoparticle disposed on an aluminum oxide support particle; where the nano-on-nano composite nanoparticles comprise a palladium catalytic nanoparticle disposed on an aluminum oxide support particle; or where the nano-on-nano composite nanoparticles comprise a platinum/palladium alloy catalytic nanoparticle disposed on an aluminum oxide support particle; and one or more of those NN particles is then embedded in a porous carrier formed of aluminum oxide which is formed around the NN particles, which carrier is then ground or milled into micron-sized particles. In all embodiments disclosed herein, reductive catalytically active Nano-on-Nano-in-Micro (NNiM) particles can comprise nano-on-nano composite nanoparticles comprising a rhodium catalytic nanoparticle disposed on a cerium oxide support particle; where the nano-on-nano composite nanoparticles comprise a rhodium catalytic nanoparticle disposed on a cerium-zirconium oxide support particle; where the nano-on-nano composite nanoparticles comprise a rhodium catalytic nanoparticle disposed on a cerium-zirconium-lanthanum oxide support particle; or where the nano-on-nano composite nanoparticles comprise a rhodium catalytic nanoparticle disposed on a cerium-zirconium-lanthanum-yttrium oxide support particle; and one or more of those NN particles is then embedded in a porous carrier formed of porous cerium oxide, cerium-zirconium oxide, cerium-zirconium-lanthanum oxide, or cerium-zirconium-lanthanum-yttrium oxide carrier, where the porous carrier is formed around the NN particles, which carrier is then ground or milled into micron-sized particles. Aluminum oxide porous material can also be used as the porous material in which any of the foregoing rhodium-containing composite NN nanoparticles can be embedded. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Further described is a coated substrate comprising a substrate; a washcoat layer comprising oxidative catalytically active composite nanoparticles attached to a first micron-sized support particle, the oxidative catalytically active composite nanoparticles being plasma-generated and comprising a first support nanoparticle and an oxidative catalytic nanoparticle; and a washcoat layer comprising $NO_x$ trapping particles and reductive catalytically active composite nanoparticles attached to a second micron-sized support particle, the reductive catalytically active composite nanoparticles being plasma-generated and comprising a second support nanoparticle and a reductive catalytic nanoparticle, and the reductive catalytically active composite nanoparticles attached to or embedded in the $NO_x$ trapping particles, the $NO_x$ trapping particles comprising micron-sized cerium oxide or micron-sized cerium oxide-containing material. In further embodiments, the $NO_x$ trapping particles comprise barium oxide in an amount between 5% and 12%, such as 8%, by weight; the barium oxide can be plasma-generated or deposited on the $NO_x$ trapping particle by wet-chemistry methods. The variations described above for the previously described coated substrate are also applicable to this substrate. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Further described is a method of forming a coated substrate, the method comprising a) coating a substrate with a washcoat composition comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; and b) coating the substrate with a washcoat composition comprising reductive catalytically active Nano-on-Nano-on-micro (NNm) particles and $NO_x$ trapping particles, the reductive catalytically active Nano-on-Nano-on-micro (NNm) particles comprising composite nanoparticles bonded to second micron-sized carrier particle, and the composite nanoparticles comprising a second support nanoparticle and a reductive catalytic nanoparticle, and the $NO_x$ trapping particles comprising micron-sized cerium oxide or micron-sized cerium oxide-containing material. The steps a) and b) can be performed in any order. The variations described above for the previously described coated substrates are also applicable to the substrate recited in this method. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Further described is a method of forming a coated substrate, the method comprising a) coating a substrate with a washcoat composition comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; and b) coating the substrate with a washcoat composition comprising reductive catalytically active Nano-on-Nano-in-Micro (NNiM) particles and $NO_x$ trapping particles, the reductive catalytically active Nano-on-Nano-in-Micro (NNiM) particles comprising composite nanoparticles embedded in a second micron-sized porous carrier, and the composite nanoparticles comprising a second support nanoparticle and an oxidative catalytic nanoparticle, and the $NO_x$ trapping particles comprising micron-sized cerium oxide or micron-sized cerium oxide-containing material. The steps a) and b) can be performed in any order. The variations described above for the previously described coated substrates are also applicable to the substrate recited in this method. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Further described is a method of forming a coated substrate, the method comprising a) coating a substrate with a washcoat composition comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; b) coating the substrate with a washcoat composition comprising reductive catalytically active Nano-on-Nano-on-micro (NNm) particles, the reductive catalytically active Nano-on-Nano-on-micro (NNm) particles comprising composite nanoparticles bonded to second micron-sized carrier particle, and the composite nanoparticles comprising a second support nanoparticle and a reductive catalytic nanoparticle, and c) and coating the substrate with a washcoat composition comprising $NO_x$ trapping particles, the $NO_x$ trapping particles comprising micron-sized cerium oxide or micron-sized cerium oxide-containing material. The steps a), b), and c) can be performed in any order. The variations described above for the previously described coated substrates are also applicable to the substrate recited in this method. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Further described is a method of forming a coated substrate, the method comprising a) coating a substrate with a washcoat composition comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; b) coating the substrate with a washcoat composition comprising reductive catalytically active Nano-on-Nano-in-Micro (NNiM) particles, the reductive catalytically active Nano-on-Nano-in-Micro (NNiM) particles comprising composite nanoparticles embedded in a second micron-sized porous carrier, and the composite nanoparticles comprising a second support nanoparticle and an oxidative catalytic nanoparticle and c) coating the substrate with a washcoat composition comprising $NO_x$ trapping particles, and the $NO_x$ trapping particles comprising micron-sized cerium oxide or micron-sized cerium oxide-containing material. The steps a), b), and c) can be performed in any order. The variations described above for the previously described coated substrates are also applicable to the substrate recited in this method. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In any of the disclosed embodiments herein, the cerium oxide-containing material, including micron-sized cerium oxide-containing material, can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In the cerium-zirconium oxide, cerium can comprise from about 20% to 99%, and zirconium can comprise from about 1% to 80%, of the cerium-zirconium oxide by weight of the corresponding pure metal oxides. (That is, were the mixed metal oxide to be purified into separate oxides, there would be from about 20% to 99% by weight cerium oxide and from about 1 to 80% by weight zirconium oxide.) In the cerium-zirconium-lanthanum oxide, cerium can comprise from about 20% to 99%, zirconium can comprise up to about 1% to about 80%, and lanthanum can comprise up to about 30% of the cerium-zirconium-lanthanum oxide by weight of the corresponding pure metal oxides. In the cerium-zirconium-lanthanum-yttrium oxide, cerium can comprise from about 20% to 99%, zirconium can comprise up to about 1% to about 80%, lanthanum can comprise up to about 30%, and yttrium can comprise up to about 30% of the cerium-zirconium-lanthanum-yttrium oxide by weight of the corresponding pure metal oxides. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide by the weight of the corresponding pure metal oxides. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide by the weight of the corresponding pure metal oxides.

In any of the disclosed embodiments, including the foregoing embodiments, the substrate can comprise cordierite. In any of the disclosed embodiments, including the foregoing embodiments, the substrate can comprise a honeycomb structure.

In any of the disclosed embodiments, including the foregoing embodiments, the washcoat layer on the coated substrate comprising oxidative catalytically active Nano-in-Nano-on-micro (NNm) particles has a thickness of 25 g/L to 150 g/L.

In any of the disclosed embodiments, including the foregoing embodiments, the washcoat layer on the coated substrate comprising reductive catalytically active Nano-in-Nano-on-micro (NNm) particles has a thickness of 25 g/L to 150 g/L.

In any of the disclosed embodiments, including the foregoing embodiments, the washcoat layer on the coated substrate comprising $NO_x$ trapping particles has a thickness of 100 g/L to 400 g/L.

In any of the disclosed embodiments, including the foregoing embodiments, the coated substrate has a platinum group metal loading of 4 g/L or less and a light-off temperature for carbon monoxide at least 5° C. lower than the light-off temperature of a substrate with the same platinum group metal loading deposited by wet-chemistry methods.

In any of the disclosed embodiments, including the foregoing embodiments, the coated substrate has a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

In any of the disclosed embodiments, including the foregoing embodiments, the coated substrate has a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Further described herein is a catalytic converter comprising a coated substrate of any one of the disclosed embodiments, including the foregoing embodiments. Further described herein is an exhaust treatment system comprising a conduit for exhaust gas and the foregoing catalytic converter. Further described herein is a vehicle comprising the foregoing catalytic converter.

Further described herein is a method of treating an exhaust gas, comprising contacting the coated substrate of any of the foregoing embodiments with the exhaust gas. In further embodiments, the substrate can be housed within a catalytic converter configured to receive the exhaust gas.

DETAILED DESCRIPTION OF THE INVENTION

Figure 1:
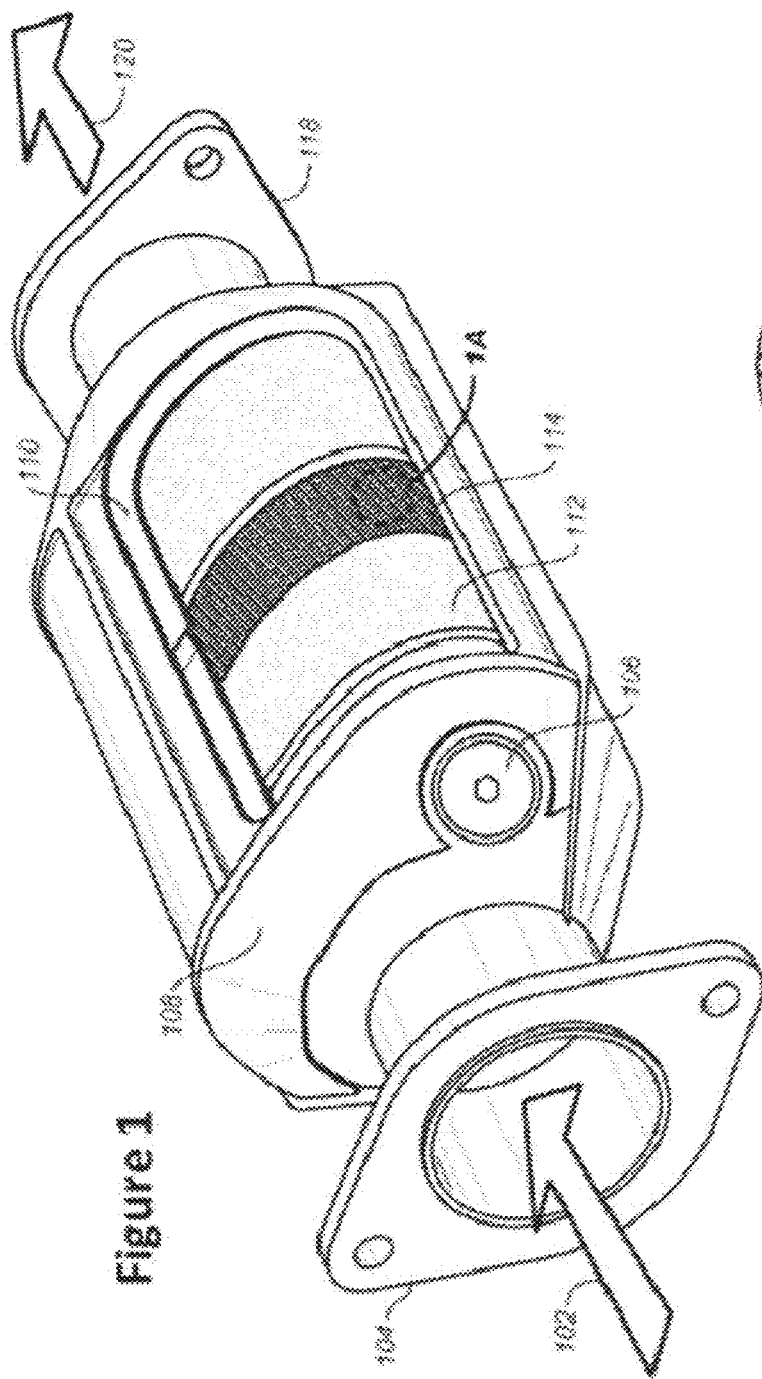
FIG. 1 illustrates a catalytic converter in accordance with some embodiments of the present invention.

Described are LNT systems and methods of making LNT systems by combining washcoat layers of oxidative catalytically active particles, reductive catalytically active particles, and $NO_x$ trapping materials. Also described are composite nanoparticle catalysts, washcoat formulations, coated substrates, catalytic converters, and methods of making and using these composite nanoparticle catalysts, washcoat formulations, coated substrates, and catalytic converters. The described LNT systems may use a reduced amount of precious metal relative to typical LNT systems. Accordingly, these LNT systems may provide a more economical alternative to commercially available LNTs.

In addition, the described substrates, composite nanoparticle catalysts, and washcoat solutions may provide for comparable or increased performance relative to prior LNTs when used to produce catalytic converters, allowing for the production of catalytic converters having reduced light-off temperatures and reduced emissions using reduced platinum group metal loading requirements. The described coated substrates include washcoat layers in which the $NO_x$ trapping particles are composed entirely of non-PGMs, or a combination of PGM and non-PGM. These coated substrates can be used to make an effective catalytic converter in a more economical fashion than has been previously possible.

The composite nanoparticles described herein include catalytic nanoparticles and support nanoparticles that are bonded together to form nano-on-nano composite nanoparticles. The composite nanoparticles may be produced, for example, in a plasma reactor so that consistent and tightly bonded nano-on-nano composite particles are produced. These composite nanoparticles can then be bonded to a micron-sized carrier particle to form micron-sized catalytically active particles ("nano-on-nano-on-micro" particles or NNm particles). The nano-on-nano composite particles are predominantly located at or near the surface of the resulting micron-sized particles. Alternatively, the composite nanoparticles can be embedded within a porous carrier to produce micron-sized catalytic particles ("nano-on-nano-in-micro" particles or NNiM particles). In this configuration, the nano-on-nano composite nanoparticles are distributed throughout the micron-sized carrier particles. Both types of micron-sized catalytically active particles bearing composite nanoparticles (i.e., NNm and NNiM) may offer better initial engine start-up performance, better performance over the lifetime of the catalyst and/or $NO_x$ storage material, and/or less decrease in performance over the life of the catalyst and/or $NO_x$ storage material, as compared to previous catalysts and $NO_x$ storage materials used in catalytic converters.

Further, the LNT system can include two or more layers of washcoats on a catalyst substrate, such as a catalytic converter substrate. The micron-sized particles bearing composite oxidative nanoparticles and micron-sized particles bearing composite reductive nanoparticles are in different washcoat layers. In some embodiments, the $NO_x$ trapping particles and the micron-sized particles bearing composite reductive nanoparticles are in the same washcoat layer. In some embodiments, the $NO_x$ trapping particles and the micron-sized particles bearing composite reductive nanoparticles are in separate washcoat layers. When the $NO_x$ trapping particles and the micron-sized particles bearing composite reductive nanoparticles are in separate washcoat layers, the order and placement of these two layers on a substrate may vary in different embodiments. In some embodiments, additional washcoat layers may also be used over, under, or between these washcoat layers. In other embodiments, the two layers can be directly disposed on each other, without intervening layers between the first and second washcoat layers.

The coated substrates, catalytic converters, and exhaust treatment systems described herein are useful for vehicles employing a lean $NO_x$ trap (LNT) or $NO_x$ storage catalyst (NSC) system. It is understood that the coated substrates, catalytic converters, and exhaust treatment systems described herein are useful for either gasoline or diesel engines, and either gasoline or diesel vehicles. These coated substrates, catalytic converters, and exhaust treatment systems are especially useful for light-duty engines and light-duty vehicles.

Various aspects of the disclosure can be described through the use of flowcharts. Often, a single instance of an aspect of the present disclosure is shown. As is appreciated by those of ordinary skill in the art, however, the protocols, processes, and procedures described herein can be repeated continuously or as often as necessary to satisfy the needs described herein. In addition, it is contemplated that certain method steps can be performed in alternative sequences to those disclosed in the flowcharts.

When numerical values are expressed herein using the term "about" or the term "approximately," it is understood that both the value specified, as well as values reasonably close to the value specified, are included. For example, the description "about 50° C." or "approximately 50° C." includes both the disclosure of 50° C. itself, as well as values close to 50° C. Thus, the phrases "about X" or "approximately X" include a description of the value X itself. If a range is indicated, such as "approximately 50° C. to 60° C.," it is understood that both the values specified by the endpoints are included, and that values close to each endpoint or both endpoints are included for each endpoint or both endpoints; that is, "approximately 50° C. to 60° C." is equivalent to reciting both "50° C. to 60° C." and "approximately 50° C. to approximately 60° C."

Percentages of materials represent weight percentages, unless otherwise specified.

By "substantial absence of any platinum group metals" is meant that less than about 5%, less than about 2%, less than about 1%, less than about 0.5%, less than about 0.1%, less than about 0.05%, less than about 0.025%, or less than about 0.01% of platinum group metals are present by weight. Preferably, substantial absence of any platinum group metals indicates that less than about 1% of platinum group metals are present by weight.

By "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

It should be noted that, during fabrication or during operation (particularly over long periods of time), small amounts of materials present in one washcoat layer may diffuse, migrate, or otherwise move into other washcoat layers. Accordingly, use of the terms "substantial absence of" and "substantially free of" is not to be construed as absolutely excluding minor amounts of the materials referenced.

By "substantially each" of a specific component, a specific composition, a specific compound, or a specific ingredient in various embodiments, is meant that at least about 95%, at least about 98%, at least about 99%, at least about 99.5%, at least about 99.9%, at least about 99.95%, at least about 99.975%, or at least about 99.99% of the specific component, the specific composition, the specific compound, or the specific ingredient is present by number or by weight. Preferably, "substantially each" of a specific component, a specific composition, a specific compound, or a specific ingredient is meant that at least about 99% of the specific component, the specific composition, the specific compound, or the specific ingredient is present by number or by weight.

By "reductive catalytic nanoparticle" is meant a nanoparticle that catalyzes a reducing reaction, especially the reduction of $NO_x$ (such as $NO_2$) to $N_2$ and $H_2O$. Most commonly, the reductive catalytic nanoparticle comprises rhodium. Under appropriate operating conditions, such as a fuel-rich "purge" cycle (where fuel is in stoichiometric excess relative to oxygen), rhodium catalyzes the reduction of $NO_x$ (such as $NO_2$) to $N_2$ and $H_2O$.

By "oxidative catalytic nanoparticle" is meant a nanoparticle that catalyzes an oxidation reaction, especially the oxidation of hydrocarbons (such as the unburnt hydrocarbons in the exhaust stream of a combustion engine) to $CO_2$ and $H_2O$, and/or the oxidation of CO (such as occurs in the exhaust stream of a combustion engine) to $CO_2$. Most commonly, the oxidative catalytic nanoparticle comprises platinum, palladium, combinations of platinum or palladium, or a platinum/palladium alloy. Under appropriate operating conditions, such as a fuel-lean "$NO_x$ storage" cycle (where oxygen is in stoichiometric excess relative to fuel), platinum, palladium, combinations of platinum and palladium, or a platinum/palladium alloy catalyze the oxidation of hydrocarbons to $CO_2$ and $H_2O$, and/or the oxidation of CO to $CO_2$. The oxidative catalytic nanoparticle can also oxidize NO to $NO_2$, as $NO_2$ may be easier to store temporarily than NO.

By "$NO_x$ trapping particle" or "$NO_x$ storage particle" is meant a particle capable of storing $NO_x$ (such as $NO_2$) during a fuel-lean $NO_x$ storage cycle, while releasing NOx (such as $NO_2$) during a fuel-rich $NO_x$ (or $NO_2$) purge cycle.

This disclosure provides several embodiments. It is contemplated that any features from any embodiment can be combined with any features from any other embodiment. In this fashion, hybrid configurations of the disclosed features are within the scope of the present invention. For the avoidance of doubt, it is confirmed that in the general description herein, in the usual way, features described as part of "one" embodiment or "some" embodiments are generally combinable with features of another embodiment, in so far as they are compatible.

It is understood that reference to relative weight percentages in a composition assumes that the combined total weight percentages of all components in the composition add up to 100. It is further understood that relative weight percentages of one or more components may be adjusted upwards or downwards such that the weight percent of the components in the composition combine to a total of 100, provided that the weight percent of any particular component does not fall outside the limits of the range specified for that component.

This disclosure refers to both particles and powders. These two terms are equivalent, except for the caveat that a singular "powder" refers to a collection of particles. The present invention can apply to a wide variety of powders and particles. The terms "nanoparticle" and "nano-sized particle" are generally understood by those of ordinary skill in the art to encompass a particle on the order of nanometers in diameter, typically between about 0.5 nm to 500 nm, about 1 nm to 500 nm, about 1 nm to 100 nm, or about 1 nm to 50 nm. Preferably, the nanoparticles have an average grain size less than 250 nanometers and an aspect ratio between one and one million. In some embodiments, the nanoparticles have an average grain size of about 50 nm or less, about 30 nm or less, or about 20 nm or less. In additional embodiments, the nanoparticles have an average diameter of about 50 nm or less, about 30 nm or less, or about 20 nm or less. The aspect ratio of the particles, defined as the longest dimension of the particle divided by the shortest dimension of the particle, is preferably between one and one hundred, more preferably between one and ten, yet more preferably between one and two. "Grain size" is measured using the ASTM (American Society for Testing and Materials) standard (see ASTM E112-10). When calculating a diameter of a particle, the average of its longest and shortest dimension is taken; thus, the diameter of an ovoid particle with long axis 20 nm and short axis 10 nm would be 15 nm. The average diameter of a population of particles is the average of diameters of the individual particles, and can be measured by various techniques known to those of skill in the art.

In additional embodiments, the nanoparticles have a grain size of about 50 nm or less, about 30 nm or less, or about 20 nm or less. In additional embodiments, the nanoparticles have a diameter of about 50 nm or less, about 30 nm or less, or about 20 nm or less.

The terms "micro-particle," "micro-sized particle," "micron-particle," and "micron-sized particle" are generally understood to encompass a particle on the order of micrometers in diameter, typically between about 0.5 μm to 1000 μm, about 1 μm to 1000 μm, about 1 μm to 100 am, or about 1 μm to 50 μm. Additionally, the term "platinum group metals" (abbreviated "PGM") used in this disclosure refers to the collective name used for six metallic elements clustered together in the periodic table. The six platinum group metals are ruthenium, rhodium, palladium, osmium, iridium, and platinum.

Composite Nanoparticle Catalyst

LNTs may include three different types of composite nanoparticles. One type of composite nanoparticle is an oxidative composite nanoparticle. A second type of composite nanoparticle is a reductive composite nanoparticle. A third type of composite nanoparticle is an $NO_x$ trapping composite nanoparticle.

A composite nanoparticle catalyst may include a catalytic nanoparticle attached to a support nanoparticle to form a "nano-on-nano" composite nanoparticle. Multiple nano-on-nano particles may then be bonded to or embedded in a micron-sized carrier particle to form a composite micro/ nanoparticle, that is, a micro-particle bearing composite nanoparticles. These composite micro/nanoparticles may be used in washcoat formulations and catalytic converters as described herein. The use of these particles can reduce requirements for platinum group metal content and/or significantly enhance performance, particularly in terms of reduced light-off temperature, as compared with currently available commercial catalytic converters prepared by wet-chemistry methods. The wet-chemistry methods generally involve use of a solution of platinum group metal ions or metal salts, which are impregnated into supports (typically micron-sized particles), and reduced to platinum group metal in elemental form for use as the catalyst. For example, a solution of chloroplatinic acid, $H_2PtCl_6$, can be applied to alumina micro-particles, followed by drying and calcining, resulting in precipitation of platinum onto the alumina. The platinum group metals deposited by wet-chemical methods onto metal oxide supports, such as alumina and cerium oxide, are mobile at high temperatures, such as temperatures encountered in catalytic converters. That is, at elevated temperatures, the PGM atoms can migrate over the surface on which they are deposited, and will clump together with other PGM atoms. The finely-divided portions of PGM combine into larger and larger agglomerations of platinum group metal as the time of exposure to high temperature increases. This agglomeration leads to reduced catalyst surface area and degrades the performance of the catalytic converter. This phenomenon is referred to as "aging" of the catalytic converter.

In contrast, the composite platinum group metal catalysts are prepared by plasma-based methods. In one embodiment, the platinum group nano-sized metal particle is deposited on a nano-sized metal oxide support, which has much lower mobility than the PGM deposited by wet chemistry methods. The resulting plasma-produced catalysts age at a much slower rate than the catalysts produced by wet-chemistry. Thus, catalytic converters using plasma-produced catalysts can maintain a larger surface area of exposed catalyst to gases emitted by the engine over a longer period of time, leading to better emissions performance.

Impregnation of a support, such as a micron-sized support, using wet-chemistry methods tends to deposit the material throughout the material, that is, deep into the interior of the material. For example, applying a solution of chloroplatinic acid to a micron-sized aluminum oxide particle will result in penetration of the solution throughout the particle. When followed by drying and calcining, platinum precipitates from solution onto the alumina in finely-divided portions (typically on the order of tenths of nanometers, i.e., clusters of a few atoms, or on the order of nanometers) throughout the entire volume of the particle. Thus, a support impregnated with a metal salt via wet-chemistry methods will have material distributed substantially evenly throughout the volume of the support, or at the very least throughout the volume of the particle accessible to the metal salt solution.

In contrast, impregnation of a support, such as a micron-sized support, with composite nanoparticles ("nano-on-nano" or "NN" particles) tends to result in the catalytic material distributed primarily on or near the surface of the support particle. As the nano-on-nano particles are applied to the support particle in a suspension, they cannot penetrate as deeply into the interior of the support particle as the solution of metal salt used in the wet-chemistry methods, resulting in an "eggshell" distribution, where a thin layer of NN particles coats the surface (and the pores closest to the surface) of the support. Thus, the majority of NN particles tend to be located on or near the surface of the support. The NN particles cannot penetrate into pores of the support which are not large enough to accept the NN particles, and are restricted to the exterior surface, and the interior portions of the support particle that are accessible to the NN particles. The nano-on-nano-on-micro ("NNm") particles thus have composite nanoparticles distributed on the exterior surface and on the nano-on-nano accessible interior surface of the micron-sized support particle.

The nano-on-nano-in-micro (NNiM) particles described herein, and described in more detail in co-owned U.S. Provisional Patent Appl. No. 61/881,337 filed Sep. 23, 2013, U.S. patent application Ser. No. 14/494,156 filed Sep. 23, 2014, and International Patent Appl. No. PCT/US2014/057036 filed Sep. 23, 2014, the disclosures of which are hereby incorporated by reference in their entirety, were designed in order to remedy the uneven distribution of the composite nanoparticles on the micron-sized support. By forming a matrix of the support material around the composite nanoparticles (nano-on-nano or "NN" particles), the composite nanoparticles can be substantially evenly distributed throughout the support material. The support material containing the composite nanoparticles can be milled or ground to the desired micron-sized dimension, thus creating a micron-sized support particle with a substantially uniform distribution of composite nanoparticles throughout its entire volume. This nano-on-nano-IN-micro (NNiM) configuration permits loading much more catalyst per unit volume of support material (i.e., per unit volume of micron-sized support particle) than the nano-on-nano-ON-micro (NNm) configuration.

Oxidative Composite Nanoparticle (Oxidative "Nano-on-Nano" Particle)

As discussed above, one type of composite nanoparticle is an oxidative composite nanoparticle catalyst. An oxidative composite nanoparticle may include one or more oxidative catalyst nanoparticles attached to a first support nanoparticle to form an oxidative "nano-on-nano" composite nanoparticle. Platinum (Pt) and palladium (Pd) are oxidative to the hydrocarbon gases and carbon monoxide. In certain embodiments, the oxidative nanoparticle is platinum. In other embodiments, the oxidative nanoparticle is palladium. In some embodiments, the oxidative nanoparticle is a mixture of platinum and palladium. A suitable support nanoparticle for the oxidative catalyst nanoparticle includes, but is not limited to, nano-sized aluminum oxide (alumina or $Al_2O_3$).

Each oxidative catalyst nanoparticle may be supported on a first support nanoparticle. The first support nanoparticle may include one or more oxidative nanoparticles. The oxidative catalyst nanoparticles on the first support nanoparticle may include platinum, palladium, or a mixture thereof. At the high temperatures involved in gasoline or diesel exhaust engines, both palladium and platinum are effective oxidative catalysts. Accordingly, in some embodiments, the oxidative catalyst is palladium alone. In other embodiments, platinum may be used alone. In further embodiments, platinum may be used in combination with palladium. For example, the first support nanoparticle may contain a mixture of 5:1 to 100:1 platinum to palladium. In some embodiments, the first support nanoparticle may contain a mixture of 6:1 to 75:1 platinum to palladium. In some embodiments, the first support nanoparticle may contain a mixture of 7:1 to 50:1 platinum to palladium. In some embodiments, the first support nanoparticle may contain a mixture of 8:1 to 25:1 platinum to palladium. In some embodiments, the first support nanoparticle may contain a mixture of 9:1 to 15:1 platinum to palladium. In some embodiments, the first support nanoparticle may contain a mixture of 10:1 platinum to palladium, or approximately 10:1 platinum to palladium.

Reductive Composite Nanoparticle (Reductive "Nano-on-Nano" Particle)

As discussed above, another type of composite nanoparticle is a reductive composite nanoparticle catalyst. A reductive composite nanoparticle may include one or more reductive catalyst nanoparticles attached to a second support nanoparticle to form a reductive "nano-on-nano" composite nanoparticle. Rhodium (Rh) is reductive to the nitrogen oxides in fuel-rich conditions. In certain embodiments, the reductive catalyst nanoparticle is rhodium. The second support may be the same or different than the first support. A suitable second support nanoparticle for the reductive nanoparticle includes, but is not limited to, nano-sized cerium oxide ($CeO_2$). The nano-sized cerium oxide particles may contain zirconium oxide. In a preferred embodiment, the nano-sized cerium oxide particles are substantially free of zirconium oxide. In other embodiments, the nano-sized cerium oxide particles contain up to 60% zirconium oxide. In some embodiments, the nano-sized cerium oxide particles may contain both zirconium oxide and lanthanum. In some embodiments, the nano-sized cerium oxide particles contain 40-80% cerium oxide, 10-50% zirconium oxide, and 10% lanthanum oxide. In one embodiment, the nano-sized cerium oxide particles contain 80% cerium oxide, 10% zirconium oxide, and 10% lanthanum oxide. In another embodiment, the nano-sized cerium oxide particles contain 40% cerium oxide, 50% zirconium oxide, and 10% lanthanum oxide. In another embodiment, the second support nanoparticle for the reductive nanoparticle comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide, such as $Ce_{0.83}Zr_{0.13}La_{0.04}O$, a material that comprises about 86% cerium oxide, 10% zirconium oxide, and 4% lanthanum oxide, $Ce_{0.35}Zr_{0.62}La_{0.044}Y_{0.06}O$, or a material that comprises about 40% cerium oxide, 50% zirconium oxide, 5% lanthanum oxide, and 5% yttrium oxide. (Percentages are weight percent.)

Each reductive catalyst nanoparticle may be supported on a second support nanoparticle. The second support nanoparticle may include one or more reductive catalyst nanoparticles. The ratios of rhodium to cerium oxide or other support and sizes of the reductive composite nanoparticle catalyst are further discussed below in the sections describing production of composite nanoparticles by plasma-based methods and production of micron-sized carrier particles bearing composite nanoparticles.

Production of Composite Nanoparticles by Plasma-Based Methods ("Nano-on-Nano" Particles or "NN" Particles)

The oxidative composite nanoparticle catalysts and reductive composite nanoparticle catalysts can be produced by plasma-based methods, that is, they can be plasma-generated. These particles have many advantageous properties as compared to catalysts produced by wet chemistry. For example, the metals in the composite nanoparticle catalysts are relatively less mobile under the high temperature environment of a catalytic converter than the metals in washcoat mixtures used in typical commercial catalytic converters produced using wet chemistry methods.

The oxidative composite nanoparticle catalysts, reductive composite nanoparticle catalysts, and $NO_x$ trapping composite nanoparticles may be formed by plasma reactor methods. These methods include feeding metal(s) and support material into a plasma gun, where the materials are vaporized. Plasma guns such as those disclosed in U.S. Patent Publication No. 2011/0143041 can be used, and techniques such as those disclosed in U.S. Pat. Nos. 5,989,648, 6,689,192, 6,755,886, and U.S. Patent Publication No. 2005/0233380, the entire disclosures of which are hereby incorporated by reference herein, can be used to generate plasma. The high-throughput system disclosed in U.S. Published Patent Application No. 2014/0263190 and International Patent Application No. PCT/US2014/024933 (published as WO 2014/159736), the entire disclosures of which are hereby incorporated by reference herein, can be used to generate the composite nanoparticles. A working gas, such as argon, is supplied to the plasma gun for the generation of plasma. In one embodiment, an argon/hydrogen mixture (for example, in the ratio of 10:2 $Ar/H_2$ or 10:1 $Ar/H_2$) may be used as the working gas.

The platinum group metal or metals (such as platinum, palladium, a mixture of platinum/palladium in any ratio, such as 5:1 up to 100:1 Pt:Pd by weight, rhodium, or ruthenium) generally in the form of metal particles of about 1 to 6 microns in diameter, can be introduced into the plasma reactor as a fluidized powder in a carrier gas stream such as argon. Metal oxide, typically aluminum oxide or cerium oxide with a particle size of about 15 to 25 microns diameter, is also introduced as a fluidized powder in carrier gas. However, other methods of introducing the materials into the reactor can be used, such as in a liquid slurry. Typically, for oxidative composite nanoparticles, palladium, platinum, or a mixture thereof is deposited on aluminum oxide. Typically, for reductive composite nanoparticles, rhodium is deposited on cerium oxide. However, rhodium can be deposited on other materials, such as a material that comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide, such as $Ce_{0.83}Zr_{0.13}La_{0.04}O$, a material that comprises about 86% cerium oxide, 10% zirconium oxide, and 4% lanthanum oxide, $Ce_{0.35}Zr_{0.62}La_{0.044}Y_{0.06}O$, or a material that comprises about 40% cerium oxide, 50% zirconium oxide, 5% lanthanum oxide, and 5% yttrium oxide.

For preparation of oxidative composite nanoparticles, a composition of 1% to 5% platinum group metal(s) and 55% to 99% metal oxide (by weight) is typically used. Examples of ranges of materials that can be used for oxidative composite nanoparticles in which palladium is the oxidation catalyst are from about 1% to 20% palladium, to 80% to 99% aluminum oxide; and 5% to 20% palladium to 80% to 95% aluminum oxide. Examples of ranges of materials that can be used for oxidative composite nanoparticles in which platinum is the oxidation catalyst are from about 35% to 45% platinum to 55% to 65% aluminum oxide. Examples of ranges of materials that can be used for oxidative composite nanoparticles in which both platinum and palladium are the oxidation catalyst are from about 23.3% to about 30% platinum, 11.7% to 15% palladium, and 55% to 65% aluminum oxide. In a certain embodiment, a composition contains about 26.7% platinum, 13.3% palladium, and 60% aluminum oxide.

The oxidative composite nanoparticles may contain a mixture of 5:1 to 100:1 platinum to palladium. In some embodiments, the oxidative composite nanoparticles may contain a mixture of 6:1 to 75:1 platinum to palladium. In some embodiments, the oxidative composite nanoparticles may contain a mixture of 7:1 to 50:1 platinum to palladium. In some embodiments, the oxidative composite nanoparticles may contain a mixture of 8:1 to 25:1 platinum to palladium. In some embodiments, the oxidative composite nanoparticles may contain a mixture of 9:1 to 15:1 platinum to palladium. In some embodiments, the oxidative composite nanoparticles may contain a mixture of 10:1 platinum to palladium, or approximately 10:1 platinum to palladium.

Examples of ranges of materials that can be used for reductive composite nanoparticles are from about 1% to about 10% rhodium and 90% to 99% cerium oxide or cerium oxide-containing material. In one embodiment, the composition contains about 5% rhodium and 95% cerium oxide. In any of these embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In a plasma reactor, any solid or liquid materials are rapidly vaporized or turned into plasma. The kinetic energy of the superheated material, which can reach temperatures of 20,000 to 30,000 Kelvin, ensures extremely thorough mixture of all components.

The superheated material of the plasma stream is then rapidly quenched, using methods such as the turbulent quench chamber disclosed in U.S. Publication No. 2008/0277267. Argon quench gas at high flow rates, such as 2400 to 2600 liters per minute, may be injected into the superheated material. The material may be further cooled in a cool-down tube, and collected and analyzed to ensure proper size ranges of material.

The plasma production method described above produces highly uniform composite nanoparticles, where the composite nanoparticles comprise a catalytic nanoparticle bonded to a support nanoparticle. The catalytic nanoparticle comprises the platinum group metal or metals, such as Pd, Pt, or Rh. In some embodiments, the catalytic nanoparticles have an average diameter or average grain size between approximately 0.3 nm and approximately 10 nm, preferably between approximately 1 nm to approximately 5 nm, that is, approximately 3 nm±2 nm. In some embodiments, the support nanoparticles, comprising the metal oxide such as aluminum oxide or cerium oxide, have an average diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm. In some embodiments, the support nanoparticles, comprising the metal oxide such as aluminum oxide or cerium oxide, have a diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm. In one preferred combination, the catalytic nanoparticles have an average diameter between approximately 1 nm to approximately 5 nm, and the support nanoparticles have an average diameter between approximately 10 nm and approximately 20 nm. In another combination, the catalytic nanoparticles have an average diameter between approximately 0.3 nm to approximately 10 nm, and the support nanoparticles have an average diameter between approximately 10 nm and approximately 20 nm.

The Pd-alumina, Pt-alumina, and Pt/Pd-alumina composite nanoparticles, when produced under reducing conditions, such as by using argon/hydrogen working gas, results in a partially reduced alumina surface on the support nanoparticle to which the PGM nanoparticle is bonded, as described in U.S. Publication No. 2011/0143915 at paragraphs 0014-0022. The partially reduced alumina surface, or $Al_2O_{(3-x)}$ where x is greater than zero but less than three, inhibits migration of the platinum group metal on the alumina surface at high temperatures. This, in turn, limits the agglomeration of platinum group metal when the particles are exposed to prolonged elevated temperatures. Such agglomeration is undesirable for many catalytic applications, as it reduces the surface area of PGM catalyst available for reaction.

The composite nanoparticles comprising two nanoparticles (catalytic and support) are referred to as "nano-on-nano" particles or "NN" particles.

Production of Micron-Sized Carrier Particles Bearing Composite Nanoparticles ("Nano-on-Nano-on-Micro" Particles or "NNm"™ Particles)

The composite nanoparticles (nano-on-nano particles) may be further bonded to micron-sized carrier particles to produce composite micro/nanoparticles, referred to as "nano-on-nano-on-micro" particles or "NNm"™ particles, which are catalytically active particles.

An oxidative catalytically active particle includes an oxidative catalyst nanoparticle (such as palladium, platinum, or a mixture thereof) and nano-sized metal oxide (such as nano-sized aluminum oxide) which are bonded to a micron-sized carrier particle (such as micron-sized aluminum oxide). A reductive catalytically active particle includes a reductive catalyst nanoparticle (such as rhodium) and a nano-sized metal oxide (such as nano-sized cerium oxide) which are bonded to micron-sized carrier particles (such as micron-sized cerium oxide or micron-sized cerium oxide-containing material).

The micron-sized particles can have an average size between about 1 micron and about 100 microns, such as between about 1 micron and about 10 microns, between about 3 microns and about 7 microns, or between about 4 microns and about 6 microns. In one preferred embodiment, the catalytic nanoparticles have an average diameter between approximately 1 nm to approximately 5 nm, the support nanoparticles have an average diameter between approximately 10 nm and approximately 20 nm, and the micron-sized particles have an average diameter between approximately 1 micron and 10 microns. In another embodiment, the catalytic nanoparticles have an average diameter between approximately 0.3 nm to approximately 10 nm, the support nanoparticles have an average diameter between approximately 10 nm and approximately 20 nm, and the micron-sized particles have an average diameter between approximately 1 micron and 10 microns.

In general, the nano-on-nano-on-micro particles are produced by a process of suspending the composite nanoparticles (nano-on-nano particles) in water, adjusting the pH of the suspension to between about 2 and about 7, between about 3 and about 5, or about 4, adding one or more surfactants to the suspension (or, alternatively, adding the surfactants to the water before suspending the composite nanoparticles in the water) to form a first solution. The process includes sonicating the composite nanoparticle suspension and applying the suspension to micron-sized metal oxide particles until the point of incipient wetness, thereby impregnating the micron-sized particles with composite nanoparticles and nano-sized metal oxide.

In some embodiments, the micron-sized metal oxide particles are pre-treated with a gas at high temperature. The pre-treatment of the micron-sized metal oxide particles allows the nano-on-nano-on-micro particles to withstand the high temperatures of an engine. Without pre-treatment, the nano-on-nano-on-micro particles would more likely change phase on exposure to high temperature, compared to the nano-on-nano-on-micro particles that have been pretreated. In some embodiments, pre-treatment includes exposure of the micron-sized metal oxide particles at temperatures, such as about 700° C. to about 1500° C.; 700° C. to about 1400° C.; 700° C. to about 1300° C.; and 700° C. to about 1200° C. In some embodiments, pre-treatment includes exposure of the micron-sized metal oxide particles at temperatures, such as about 700° C., 1110° C., 1120° C., 1130° C., 1140° C., 1150° C., 1155° C., 1160° C., 1165° C., 1170° C., 1175° C., 1180° C., 1190° C., and 1200° C.

The process includes drying the micron-sized metal oxide particles which have been impregnated with composite nanoparticles and nano-sized metal oxide, and calcining the micron-sized metal oxide particles which have been impregnated with composite nanoparticles and nano-sized metal oxide.

Typically, the composite nanoparticles and nano-sized metal oxide are suspended in water, and the suspension is adjusted to have a pH of between about 2 and about 7, preferably between about 3 and about 5, more preferably a pH of about 4 (the pH is adjusted with acetic acid or another organic acid). Dispersants and/or surfactants may be added to the composite nanoparticles and nano-sized metal oxide. Surfactants suitable for use include Jeffsperse® X3202 (Chemical Abstracts Registry No. 68123-18-2, described as 4,4'-(1-methylethylidene)bis-phenol polymer with 2-(chloromethyl)oxirane, 2-methyloxirane, and oxirane), Jeffsperse® X3204, and Jeffsperse® X3503 surfactants from Huntsman (JEFFSPERSE is a registered trademark of Huntsman Corporation, The Woodlands, Tex., United States of America for chemicals for use as dispersants and stabilizers), which are non-ionic polymeric dispersants. Other suitable surfactants include Solsperse® 24000 and Solsperse® 46000 from Lubrizol (SOLSPERSE is a registered trademark of Lubrizol Corporation, Derbyshire, United Kingdom for chemical dispersing agents). The Jeffsperse® X3202 surfactant, Chemical Abstracts Registry No. 68123-18-2 (described as 4,4'-(1-methylethylidene)bis-phenol polymer with 2-(chloromethyl)oxirane, 2-methyloxirane, and oxirane), is preferred. The surfactant may be added in a range, for example, of about 0.5% to about 5%, with about 2% being a typical value.

The mixture of aqueous surfactants, composite nanoparticles, and nano-sized metal oxide may be sonicated to disperse the composite nanoparticles and nano-sized metal oxide. The quantity of composite nanoparticles and nano-sized metal oxide in the dispersion may be in the range of about 2% to about 15% (by mass).

General Procedures for Preparation of Catalysts for Oxidation Reaction (Oxidative "Nano-on-Nano-on-Micro" Particles or "NNm"™ Particles)

To prepare an oxidative catalytically active particle, a dispersion of oxidative composite nanoparticles may be applied to porous, micron-sized $Al_2O_3$, which may be purchased, for example, from companies such as Rhodia or Sasol. The porous, micron-sized, $Al_2O_3$ powders may be stabilized with a small percentage of lanthanum (about 2% to about 4% La). One commercial alumina powder suitable for use is MI-386, which may be purchased from Grace Davison or Rhodia. The usable surface for this powder, defined by pore sizes greater than 0.28 μm, is approximately 2.8 $m^2/g$. The ratio of composite nanoparticles used to micron-sized carrier particles used may be from about 3:100 to about 10:100, about 5:100 to about 8:100, or about 6.5:100, in terms of (weight of composite nanoparticle): (weight of micron carrier particle). In some embodiments, about 8 grams of composite nanoparticles may be used with about 122 grams of carrier micro-particles. The aqueous dispersion of composite nanoparticles may be applied in small portions (such as by dripping or other methods) to the micron-sized powder until the point of incipient wetness, producing a material similar to damp sand as described below.

In some instances, the sizes of the nano-sized oxidative catalysts, for example Pd, Pt, or Pt/Pd are about 1 nm and the sizes of the nano-sized $Al_2O_3$ are about 10 nm. In some instances, the sizes of the nano-sized oxidative catalysts are approximately 1 nm or less and the sizes of the nano-sized $Al_2O_3$ are approximately 10 nm or less. In some instances, Pd is used as the oxidative catalyst and the weight ratio of nano-sized Pd:nano-sized aluminum oxide is about 5%:95%. In some instances, the weight percentage of nano-sized Pd is between about 5% to about 20% of nano-sized Pd on nano-sized aluminum oxide. The nano-on-nano material that contains nano-sized Pd on nano-sized $Al_2O_3$ shows a dark black color. In some instances, Pt is used as the oxidative catalyst and the weight ratio of nano-sized Pt:nano-sized aluminum oxide is about 40%:60%. In some instances, a mixture of Pt and Pd is used as the oxidative catalyst. In some embodiments, the weight ratio of nano-sized Pt/Pd:nano-sized aluminum oxide is about 5%:95%. In some embodiments, the weight ratio of nano-sized Pt/Pd: nano-sized aluminum oxide is about 10%:90%. In some embodiments, the weight ratio of nano-sized Pt/Pd:nano-sized aluminum oxide is about 20%:80%. In some embodiments, the weight ratio of nano-sized Pt/Pd:nano-sized aluminum oxide is about 30%:70%. In some embodiments, the weight ratio of nano-sized Pt/Pd:nano-sized aluminum oxide is about 40%:60%.

A solution containing dispersed nano-on-nano material can be prepared using a sonication process to disperse nano-on-nano particles into water with pH ~4. Subsequently, 100 g of micron-sized MI-386 $Al_2O_3$ is put into a mixer, and a 100 g dispersion containing the nano-on-nano material is injected into the mixing aluminum oxide. This process is referred to as the incipient wetness process or method.

Next, the wet powder is dried at 60° C. in a convection oven overnight until it is fully dried. Once the powder is dried, calcination is performed. The dried powder from the previous step, that is, the nanomaterials on the micron-sized material, is baked at 550° C. for two hours under ambient air conditions. During the calcination, the surfactant is burned off and the nanomaterials are glued or fixed onto the surface of the micron-sized materials or onto the surface of the pores of the micron-materials. One explanation for why the nanomaterials can be glued or fixed more permanently onto the micron-sized material during the calcination is because oxygen-oxygen (O—O) bonds, oxide-oxide bonds, or covalent bonds are formed during the calcination step. The oxide-oxide bonds can be formed between the nanomaterials (nano-on-nano with nano-on-nano, nano-on-nano with nano-sized aluminum oxide, and nano-sized aluminum oxide with nano-sized aluminum oxide), between the nano-materials and the micron-sized materials, and between the micron-sized materials themselves. The oxide-oxide bond formation is sometimes referred to as a solid state reaction. At this stage, the material produced contains a micron-sized particle having nano-on-nano and nano-sized $Al_2O_3$ randomly distributed on the surface.

The oxidative NNm™ particles may contain from about 0.5% to about 5% palladium by weight, or in another embodiment from about 1% to 3% by weight, or in another embodiment, about 1.2% to 2.5% by weight, of the total mass of the NNm™ particle. The oxidative NNm™ particles may contain from about 1% to about 6% platinum by weight, of the total mass of the NNm™ particle. The oxidative NNm™ particles may contain from about 1% to about 6% platinum/palladium by weight, or in another embodiment, about 2% to 3% by weight, of the total mass of the NNm™ particle.

General Procedures for Preparation of Catalysts for Reduction Reaction (Reductive "Nano-on-Nano-on-Micro" Particles or "NNm"™ Particles)

To prepare a reductive catalytically active particle, a dispersion of reductive composite nanoparticles may be applied to porous, micron-sized cerium oxide or micron-sized cerium oxide-containing material, which may be purchased, for example, from companies such as Rhodia-Solvay or Sigma-Aldrich, or prepared as desired using methods analogous to those known in the art (see, e.g., Rossignol et al., J. Mater. Chem. 9:1615 (1999)). One commercial cerium oxide powder suitable for use is HSA5, available from Rhodia-Solvay. The micron-sized cerium oxide may contain zirconium oxide. In some embodiments, the micron-sized cerium oxide is substantially free of zirconium oxide. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In one embodiment, the reductive composite nanoparticle comprises rhodium; that is, the reductive catalytic nanoparticle comprises rhodium. Under appropriate operating conditions, such as a fuel-rich "purge" cycle, rhodium catalyzes the reduction of $NO_x$ (such as $NO_2$) to $N_2$ and $H_2O$.

The micron-sized carrier particles, impregnated with the composite reductive nanoparticles and nano-sized metal oxide, may then be dried (for example, at about 30° C. to about 95° C., preferably about 60° C. to about 70° C., at atmospheric pressure or at reduced pressure, such as from about 1 pascal to about 90,000 pascal). After drying, the particles may be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon) to yield the composite micro/nanoparticles, also referred to as nano-on-nano-on-micro particles, or NNm™ particles. The drying step may be performed before the calcining step to remove water prior to heating at the higher calcining temperatures; this avoids boiling of the water, which would disrupt the impregnated nanoparticles, which are lodged in the pores of the micron-sized carrier.

The catalyst for reduction reactions can be made using a procedure similar to that employed for production of the catalyst for oxidation reactions. The nano-on-nano materials, for example nano-sized Rh on nano-sized cerium oxide, can be prepared using the method described above. In some instances, the sizes of the nano-sized Rh are about 1 nm and the sizes of the nano-sized cerium oxide are about 10 nm. In some instances, the sizes of the nano-sized Rh are approximately 1 nm or less and the sizes of the nano-sized cerium oxide are approximately 10 nm or less. In some embodiments, the weight ratio of nano-sized Rh:nano-sized cerium oxide is from 1%:99% to 20%:80%. In some embodiments, the weight ratio of nano-sized Rh:nano-sized cerium oxide is from 2%:98% to 15%:85%. In some embodiments, the weight ratio of nano-sized Rh:nano-sized cerium oxide is from 3%:97% to 10%:90%. In some embodiments, the weight ratio of nano-sized Rh:nano-sized cerium oxide is from 4%:96% to 6%:94%. In some embodiments, the weight ratio of nano-sized Rh:nano-sized cerium oxide is about 5%:95%. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Next, calcination can be performed. The dried powder from the previous step, that is, the nanomaterials on the micron-sized material, can be baked at 550° C. for two hours under ambient air conditions. During the calcination step, the surfactant is evaporated and the nanomaterials are glued or fixed onto the surface of the micron-sized materials or the surface of the pores of the micron-sized materials. At this stage, the material produced (a catalytic active material) contains a micron-sized particle (such as micron-sized cerium oxide or micron-sized cerium oxide-containing material) having nano-on-nano (such as nano-sized Rh on nano-sized cerium oxide) and nano-sized cerium oxide randomly distributed on the surface.

The reductive NNm™ particles may contain from about 0.1% to 1.0% rhodium by weight, or in another embodiment from about 0.2% to 0.5% by weight, or in another embodiment, about 0.3% by weight, or in another embodiment, about 0.4% by weight, of the total mass of the NNm™ particle. The NNm™ particles can then be used for formulations for coating substrates, where the coated substrates may be used in catalytic converters.

Examples of production of NNm™ material are described in the following co-owned patents and patent applications, the disclosures of which are hereby incorporated by reference in their entireties: U.S. Patent Publication No. 2005/0233380, U.S. Patent Publication No. 2006/0096393, U.S. patent application Ser. No. 12/151,810, U.S. patent application Ser. No. 12/152,084, U.S. patent application Ser. No. 2/151,809, U.S. Pat. No. 7,905,942, U.S. patent application Ser. No. 12/152,111, U.S. Patent Publication 2008/0280756, U.S. Patent Publication 2008/0277270, U.S. patent application Ser. No. 12/001,643, U.S. patent application Ser. No. 12/474,081, U.S. patent application Ser. No. 12/001,602, U.S. patent application Ser. No. 12/001,644, U.S. patent application Ser. No. 12/962,518, U.S. patent application Ser. No. 12/962,473, U.S. patent application Ser. No. 12/962,490, U.S. patent application Ser. No. 12/969,264, U.S. patent application Ser. No. 12/962,508, U.S. patent application Ser. No. 12/965,745, U.S. patent application Ser. No. 12/969,503, and U.S. patent application Ser. No. 13/033,514, WO 2011/081834 (PCT/US2010/59763) and US 2011/0143915 (U.S. patent application Ser. No. 12/962,473).

Porous Materials for Use in "Nano-on-Nano-in-Micro" Particles ("NNiM" Particles)

Porous materials, production of porous materials, micron-sized particles comprising composite nanoparticles and a porous carrier ("Nano-on-Nano-in-Micro" particles or "NNiM" particles), and production of micron-sized particles comprising composite nanoparticles and a porous carrier ("Nano-on-Nano-in-Micro" particles or "NNiM" particles) are described in the co-owned U.S. Provisional Patent Appl. No. 61/881,337 filed Sep. 23, 2013, U.S. patent application Ser. No. 14/494,156 filed Sep. 23, 2014, and International Patent Appl. No. PCT/US2014/057036 filed Sep. 23, 2014, the disclosures of which are hereby incorporated by reference in their entirety. In NNiM material, particles, such as catalytic nanoparticles or catalytic composite nanoparticles, are embedded within the porous carrier which has been formed around the nanoparticles.

Generally, a preferred porous material comprises a material that contains a large number of interconnected pores, holes, channels, or pits, with an average pore, hole, channel, or pit width (diameter) ranging from 1 nm to about 200 nm, or about 1 nm to about 100 nm, or about 2 nm to about 50 nm, or about 3 nm to about 25 nm. In some embodiments, the porous material has a mean pore, hole, channel, or pit width (diameter) of less than about 1 nm, while in some embodiments, a porous carrier has a mean pore, hole, channel, or pit width (diameter) of greater than about 100 nm. In some embodiments, the porous material has an average pore surface area in a range of about 50 $m^2/g$ to about 500 $m^2/g$. In some embodiments, the porous material has an average pore surface area in a range of about 100 $m^2/g$ to about 400 $m^2/g$. In some embodiments, a porous material has an average pore surface area in a range of about 150 $m^2/g$ to about 300 $m^2/g$. In some embodiments, the porous material has an average pore surface area of less than about 50 $m^2/g$. In some embodiments, the porous material has an average pore surface area of greater than about 200 $m^2/g$. In some embodiments, the porous material has an average pore surface area of greater than about 300 $m^2/g$. In some embodiments, a porous material has an average pore surface area of about 200 $m^2/g$. In some embodiments, a porous material has an average pore surface area of about 300 $m^2/g$.

In some embodiments, the porous material may comprise porous metal oxide, such as aluminum oxide or cerium oxide, or cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide, such as $Ce_{0.83}Zr_{0.13}La_{0.04}O$, a material that comprises about 86% cerium oxide, 10% zirconium oxide, and 4% lanthanum oxide, $Ce_{0.35}Zr_{0.62}La_{0.044}Y_{0.06}O$, or a material that comprises about 40% cerium oxide, 50% zirconium oxide, 5% lanthanum oxide, and 5% yttrium oxide. In some embodiments, a porous material may comprise an organic polymer, such as polymerized resorcinol. In some embodiments, the porous material may comprise amorphous carbon. In some embodiments, the porous material may comprise silica. In some embodiments, a porous material may be porous ceramic. In some embodiments, the porous material may comprise a mixture of two or more different types of interspersed porous materials, for example, a mixture of aluminum oxide and polymerized resorcinol. In some embodiments, the porous carrier may comprise aluminum oxide after a spacer material has been removed. For example, in some embodiments, a composite material may be formed with interspersed aluminum oxide and polymerized resorcinol, and the polymerized resorcinol is removed, for example, by calcination, resulting in a porous carrier. In another embodiment, a composite material may be formed with interspersed aluminum oxide and carbon black, and the carbon black is removed, for example, by calcination, resulting in a porous carrier.

In some embodiments, the porous material is a micron-sized particle, with an average size between about 1 micron and about 100 microns, between about 1 micron and about 10 microns, between about 3 microns and about 7 microns, or between about 4 microns and about 6 microns. In other embodiments, the porous material may be particles larger than about 7 microns. In some embodiments, the porous material may not be in the form of particles, but a continuous material.

The porous materials may allow gases and fluids to slowly flow throughout the porous material via the interconnected channels, being exposed to the high surface area of the porous material. The porous materials can therefore serve as an excellent carrier material for embedding particles in which high surface area exposure is desirable, such as catalytic nanoparticles, as described below.

Production of Porous Materials for Use in "Nano-on-Nano-in-Micro" Particles ("NNiM" Particles)

A catalyst may be formed using a porous material. This porous material includes, for example, catalyst particles embedded within the porous structure of the material. In some embodiments, the porous structure comprises alumina. Alumina porous structures may be formed, for example, by the methods described in U.S. Pat. No. 3,520,654, the disclosure of which is hereby incorporated by reference in its entirety. In some embodiments, a sodium aluminate solution, prepared by dissolving sodium oxide and aluminum oxide in water, can be treated with sulfuric acid or aluminum sulfate to reduce the pH to a range of about 4.5 to about 7. The decrease in pH results in a precipitation of porous hydrous alumina which may be spray dried, washed, and flash dried, resulting in a porous alumina material. Optionally, the porous alumina material may be stabilized with silica, as described in EP0105435 A2, the disclosure of which is hereby incorporated by reference in its entirety. A sodium aluminate solution can be added to an aluminum sulfate solution, forming a mixture with a pH of about 8.0.

An alkaline metal silicate solution, such as a sodium silicate solution, can be slowly added to the mixture, resulting in the precipitation of a silica-stabilized porous alumina material. In other embodiments, the porous structure comprises cerium oxide. In other embodiments, the porous structure is a material that comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide, such as $Ce_{0.83}Zr_{0.13}La_{0.04}O$, a material that comprises about 86% cerium oxide, 10% zirconium oxide, and 4% lanthanum oxide, $Ce_{0.35}Zr_{0.62}La_{0.044}Y_{0.06}O$, or a material that comprises about 40% cerium oxide, 50% zirconium oxide, 5% lanthanum oxide, and 5% yttrium oxide.

A porous material may also be generated by co-precipitating aluminum oxide nanoparticles and amorphous carbon particles, such as carbon black. Upon drying and calcination of the precipitate in an ambient or oxygenated environment, the amorphous carbon is exhausted. Simultaneously, the heat from the calcination process causes the aluminum oxide nanoparticles to sinter together, resulting in pores throughout the precipitated aluminum oxide where the carbon black once appeared in the structure. In some embodiments, aluminum oxide nanoparticles can be suspended in ethanol, water, or a mix of ethanol and water. In some embodiments, dispersant, such as DisperBYK®-145 from BYK (DisperBYK is a registered trademark of BYK-Chemie GmbH LLC, Wesel, Germany for chemicals for use as dispersing and wetting agents) may be added to the aluminum oxide nanoparticle suspension. Carbon black with an average grain size ranging from about 1 nm to about 200 nm, or about 20 nm to about 100 nm, or about 20 nm to about 50 nm, or about 35 nm, may be added to the aluminum oxide suspension. In some embodiments, sufficient carbon black is added to obtain a pore surface area of about 50 $m^2/g$ to about 500 $m^2/g$ should be used, such as about 50 $m^2/g$, about 100 $m^2/g$, about 150 $m^2/g$, about 200 $m^2/g$, about 250 $m^2/g$, about 300 $m^2/g$, about 350 $m^2/g$, about 400 $m^2/g$, about 450 $m^2/g$, or about 500 $m^2/g$. The pH of the resulting mixture can be adjusted to a range of about 2 to about 7, such as a pH of between about 3 and about 5, preferably a pH of about 4, allowing the particles to precipitate. In some embodiments, the precipitant can be dried, for example by warming the precipitant (for example, at about 30° C. to about 95° C., preferably about 60° C. to about 70° C., at atmospheric pressure or at reduced pressure such as from about 1 pascal to about 90,000 pascal). Alternatively, in some embodiments, the precipitant may be freeze-dried.

After drying, the material may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the aluminum oxide nanoparticles sinter together, yielding a porous aluminum oxide material.

In some embodiments, a porous material may be made using the sol-gel process. For example, an alumina porous material may be formed by reacting aluminum chloride with propylene oxide. Propylene oxide can be added to a solution of aluminum chloride dissolved in a mixture of ethanol and water, which forms a porous material that may be dried and calcined. In some embodiments, epichlorodydrin may be used in place of propylene oxide. Other methods of producing a porous material using the sol-gel method known in the art may also be used, for example, a porous material formed using the sol-gel process may be also be formed using tetraethyl orthosilicate.

In some embodiments, the porous material may be formed by mixing the precursors of a combustible gel with the precursors of a metal oxide material prior to polymerization of the gel, allowing the polymerization of the gel, drying the composite material, and calcining the composite material, thereby exhausting the organic gel components. In some embodiments, a gel activation solution comprising a mixture of formaldehyde and propylene oxide can be mixed with a gel monomer solution comprising a mixture of aluminum chloride and resorcinol. Upon mixing of the gel activation solution and the gel monomer solution, a combustible organic gel component forms as a result of the mixing of formaldehyde and resorcinol, and a non-combustible inorganic metal oxide material forms as a result of mixing the propylene oxide and aluminum chloride. The resulting composite material can be calcined, causing the combustible organic gel component to burn away, resulting in a porous metal oxide material.

In some embodiments, the gel activation solution may be prepared by mixing aqueous formaldehyde and propylene oxide. The formaldehyde is preferably in an aqueous solution. In some embodiments, the concentration of the aqueous formaldehyde solution is about 5 wt % to about 50 wt % formaldehyde, about 20 wt % to about 40 wt % formaldehyde, or about 30 wt % to about 40 wt % formaldehyde. Preferably, the aqueous formaldehyde is about 37 wt % formaldehyde. In some embodiments, the aqueous formaldehyde may contain about 5 wt % to about 15 wt % methanol to stabilize the formaldehyde in solution. The aqueous formaldehyde can be added in a range of about 25% to about 50% of the final weight of the gel activation solution, with the remainder being propylene oxide. Preferably, the gel activation solution comprises 37.5 wt % of the aqueous formaldehyde solution (which itself comprises 37 wt % formaldehyde) and 62.5 wt % propylene oxide, resulting in a final formaldehyde concentration of about 14 wt % of the final gel activation solution.

Separately from the gel activation solution, a gel monomer solution may be produced by dissolving aluminum chloride in a mixture of resorcinol and ethanol. Resorcinol can be added at a range of about 2 wt % to about 10 wt %, with about 5 wt % being a typical value. Aluminum chloride can be added at a range of about 0.8 wt % to about 5 wt %, with about 1.6 wt % being a typical value.

The gel activation solution and gel monomer solution can be mixed together at a ratio at about 1:1 in terms of (weight of gel activation solution):(weight of gel monomer solution). The final mixture may then be dried (for example, at about 30° C. to about 95° C., preferably about 50° C. to about 60° C., at atmospheric pressure or at reduced pressure such as from about 1 pascal to about 90,000 pascal, for about one day to about 5 days, or for about 2 days to about 3 days). After drying, the material may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere, for about 12 hours to about 2 days, or about 16 hours to about 24 hours) to burn off the combustible organic gel component and yield a porous aluminum oxide carrier.

Micron-Sized Particles Comprising Composite Nanoparticles and a Porous Carrier ("Nano-on-Nano-in-Micro" Particles or "NNiM" Particles)

Nanoparticles or composite nanoparticles produced by plasma production or other methods may be embedded within a porous material to enhance the surface area of catalytic components. The porous material may then serve as a carrier for the composite nanoparticles, allowing gases and fluids to slowly flow throughout the porous material via the interconnected channels. The high porosity of the carrier results in a high surface area within the carrier allowing increased contact of the gases and fluids with the embedded catalytic components, such as composite nanoparticles. Embedding the composite nanoparticles within the porous carrier results in a distinct advantage over those technologies where catalytically active nanoparticles are positioned on the surface of carrier micro-particles or do not penetrate as effectively into the pores of the support. When catalytically active nanoparticles are position on the surface of carrier micro-particles, some catalytically active nanoparticles can become buried by other catalytically active nanoparticles, causing them to be inaccessible to target gases because of the limited exposed surface area. When the composite nanoparticles are embedded within the porous carrier, however, gases can flow through the pores of the carrier to catalytically active components.

The porous carrier may contain any large number of interconnected pores, holes, channels, or pits, preferably with an average pore, hole, channel, or pit width (diameter) ranging from 1 nm to about 200 nm, or about 1 nm to about 100 nm, or about 2 nm to about 50 nm, or about 3 nm to about 25 nm. In some embodiments, the porous carrier has a mean pore, hole, channel, or pit width (diameter) of less than about 1 nm, while in some embodiments, a porous carrier has a mean pore, hole, channel, or pit width (diameter) of greater than about 100 nm. In some embodiments, a porous material has an average pore surface area in a range of about 50 $m^2/g$ to about 500 $m^2/g$. In some embodiments, a porous material has an average pore surface area in a range of about 100 $m^2/g$ to about 400 $m^2/g$. In some embodiments, a porous material has an average pore surface area in a range of about 150 $m^2/g$ to about 300 $m^2/g$. In some embodiments, a porous material has an average pore surface area of less than about 50 $m^2/g$. In some embodiments, a porous material has an average pore surface area of greater than about 200 $m^2/g$. In some embodiments, a porous material has an average pore surface area of greater than about 300 $m^2/g$. In some embodiments, a porous material has an average pore surface area of about 200 $m^2/g$. In some embodiments, a porous material has an average pore surface area of about 300 $m^2/g$.

A porous carrier embedded with nanoparticles can be formed with any porous material. A porous carrier may include, but is not limited to, any gel produced by the sol-gel method, for example, alumina ($Al_2O_3$), cerium oxide, or silica aerogels as described herein. In some embodiments, the porous carrier may comprise a porous metal oxide, such as aluminum oxide. In some embodiments, a porous carrier may comprise an organic polymer, such as polymerized resorcinol. In some embodiments, the porous carrier may comprise amorphous carbon. In some embodiments, the porous carrier may comprise silica. In some embodiments, a porous carrier may be porous ceramic. In some embodiments, the porous carrier may comprise a mixture of two or more different types of interspersed porous materials, for example, a mixture of aluminum oxide and polymerized resorcinol.

In some embodiments, a carrier may comprise a combustible component, for example amorphous carbon or a polymerized organic gel such as polymerized resorcinol, and a non-combustible component, for example a metal oxide such as aluminum oxide. A catalytic material can include composite nanoparticles embedded in a carrier comprising a combustible component and a non-combustible component.

Catalytic particles, such as the catalytic nanoparticles or catalytic composite nanoparticles described herein, are embedded within the porous carrier. This can be accomplished by including the catalytic particles in the mixture used to form the porous carrier. In some embodiments, the catalytic particles are evenly distributed throughout the porous carrier. In other embodiments, the catalytic particles are clustered throughout the porous carrier. In some embodiments, platinum group metals comprise about 0.001 wt % to about 10 wt % of the total catalytic material (catalytic particles and porous carrier). For example, platinum group metals may comprise about 1 wt % to about 8 wt % of the total catalytic material (catalytic particles and porous carrier). In some embodiments, platinum group metals may comprise less than about 10 wt %, less than about 8 wt %, less than about 6 wt %, less than about 4 wt %, less than about 2 wt %, or less than about 1 wt % of the total catalytic material (catalytic particles and porous carrier). In some embodiments, platinum group metals may comprise about 1 wt %, about 2 wt %, about 3 wt %, about 4 wt %, about 5 wt %, about 6 wt %, about 7 wt %, about 8 wt %, about 9 wt %, or about 10 wt % of the total catalytic material (catalytic particles and porous carrier).

In some embodiments, the catalytic nanoparticles comprise one or more platinum group metals. In embodiments with two or more platinum group metals, the metals may be in any ratio. In some embodiments, the catalytic nanoparticles comprise platinum group metal or metals, such as Pt:Pd in about a 5:1 ratio to about 100:1 ratio by weight, or about 6:1 to about 75:1 ratio by weight, or about 7:1 to about 50:1 ratio by weight, or about 8:1 to about 25:1 ratio by weight, or about 9:1 to about 15:1 ratio by weight. In one embodiment, the catalytic nanoparticles comprise platinum group metal or metals, such as Pt:Pd in about 10:1 ratio by weight.

The composite nanoparticles (nano-on-nano particles) embedded within a porous carrier may take the form of a powder to produce composite catalytic micro-particles, referred to as "nano-on-nano-in-micron" particles or "NNiM" particles. The micron-sized NNiM particles can have an average size between about 1 micron and about 100 microns, such as between about 1 micron and about 10 microns, between about 3 microns and about 7 microns, or between about 4 microns and about 6 microns. The NNiM particles may comprise about 0.001 wt % to about 10 wt % of the total mass of the NNiM particle (catalytic particles and porous carrier). For example, platinum group metals may comprise about 1 wt % to about 8 wt % of the total mass of the NNiM particle (catalytic particles and porous carrier). In some embodiments, platinum group metals may comprise less than about 10 wt %, less than about 8 wt %, less than about 6 wt %, less than about 4 wt %, less than about 2 wt %, or less than about 1 wt % of the total mass of the NNiM particle (catalytic particles and porous carrier). In some embodiments, platinum group metals may comprise about 1 wt %, about 2 wt %, about 3 wt %, about 4 wt %, about 5 wt %, about 6 wt %, about 7 wt %, about 8 wt %, about 9 wt %, or about 10 wt % of the total mass of the NNiM particle (catalytic particles and porous carrier).

NNiM particles may be used for any catalytic purpose. For example, NNiM particles may be suspended in a liquid, for example ethanol or water, which may catalyze dissolved compounds. Alternatively, the NNiM particles may be used as a solid state catalyst. For example, the NNiM particles can then be used in catalytic converters.

Production of Micron-Sized Particles Comprising Composite Nanoparticles and a Porous Carrier ("Nano-on-Nano-in-Micro" Particles or "NNiM" Particles)

In some embodiments, catalytic nanoparticles or composite nanoparticles can be embedded in a porous carrier by forming a suspension or colloid of nanoparticles, and mixing the suspension or colloid of nanoparticles with a porous material precursor solution. Upon solidification of the porous material with the mixture, such as by polymerization, precipitation, or freeze-drying, the porous material will form around the nanoparticles, resulting in a catalytic material comprising nanoparticles embedded in a porous carrier. In some embodiments, the catalytic material is then processed, such as by grinding or milling, into a micron-sized powder, resulting in NNiM particles.

Described below is the production of NNiM particles using a porous aluminum oxide carrier formed using a composite carrier comprising a combustible organic gel component and an aluminum oxide component, followed by drying and calcination. However, one skilled in the art would understand any manner of porous carrier originating from soluble precursors may be used to produce catalytic material comprising composite nanoparticles embedded within a porous carrier using the methods described herein.

For typical NNiM particles produced using a porous aluminum oxide carrier formed using a composite carrier comprising a combustible organic gel component and an aluminum oxide component, the composite nanoparticles are initially dispersed in ethanol. In some embodiments, at least 95 vol % ethanol is used. In some embodiments, at least 99 vol % ethanol is used. In some embodiments, at least 99.9 vol % ethanol is used. Dispersants and/or surfactants are typically added to the ethanol before suspension of the composite nanoparticles. A suitable surfactant includes DisperBYK®-145 from BYK-Chemie GmbH LLC, Wesel, which can be added in a range of about 2 wt % to about 12 wt %, with about 7 wt % being a typical value, and dodecylamine, which can be added in a range of about 0.25 wt % to about 3 wt %, with about 1 wt % being a typical value. Preferably, both DisperBYK®-145 and dodecylamine are used at about 7 wt % and 1 wt %, respectively. In some embodiments, the mixture of ethanol, composite nanoparticles, and surfactants and/or dispersants is sonicated to uniformly disperse the composite nanoparticles. The quantity of composite nanoparticles particles in the dispersion may be in the range of about 5 wt % to about 20 wt %.

Separately from the composite nanoparticle suspension, a gel activation solution is prepared by mixing formaldehyde and propylene oxide. The formaldehyde is preferably in an aqueous solution. In some embodiments, the concentration of the aqueous formaldehyde solution is about 5 wt % to about 50 wt % formaldehyde, about 20 wt % to about 40 wt % formaldehyde, or about 30 wt % to about 40 wt % formaldehyde. Preferably, the aqueous formaldehyde is about 37 wt % formaldehyde. In some embodiments, the aqueous formaldehyde may contain about 5 wt % to about 15 wt % methanol to stabilize the formaldehyde in solution. The aqueous formaldehyde solution can be added in a range of about 25% to about 50% of the final weight of the gel activation solution, with the remainder being propylene oxide. Preferably, the gel activation solution comprises 37.5 wt % of the aqueous formaldehyde solution (which itself comprises 37 wt % formaldehyde) and 62.5 wt % propylene oxide, resulting in a final formaldehyde concentration of about 14 wt % of the final gel activation solution.

Separately from the composite nanoparticle suspension and gel activation solution, an aluminum chloride solution is produced by dissolving aluminum chloride in a mixture of resorcinol and ethanol. Resorcinol can be added at a range of about 10 wt % to about 30 wt %, with about 23 wt % being a typical value. Aluminum chloride can be added at a range of about 2 wt % to about 12 wt %, with about 7 wt % being a typical value.

The composite nanoparticle suspension, gel activation solution, and aluminum chloride solution can be mixed together at a ratio from of about 100:10:10 to about 100:40:40, or about 100:20:20 to about 100:30:30, or about 100:25:25, in terms of (weight of composite nanoparticle suspension):(weight of gel activation solution):(weight of aluminum chloride solution). The final mixture will begin to polymerize into a carrier embedded with composite nanoparticles. The carrier comprises a combustible component, an organic gel, and a non-combustible component, aluminum oxide. The resulting carrier may then be dried (for example, at about 30° C. to about 95° C., preferably about 50° C. to about 60° C., at atmospheric pressure or at reduced pressure such as from about 1 pascal to about 90,000 pascal, for about one day to about 5 days, or for about 2 days to about 3 days). After drying, the resulting carrier may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere or under an inert atmosphere such as nitrogen or argon), to yield a porous carrier comprising composite catalytic nanoparticles and aluminate. When the composite carrier is calcined under ambient atmosphere or other oxygenated conditions, organic material, such as polymerized resorcinol, formaldehyde, or propylene oxide, is burnt off, resulting in a substantially pure aluminum oxide porous carrier embedded with composite nanoparticles. If the composite carrier is calcined under an inert atmosphere, such as argon or nitrogen, the organic materials may become substantially porous amorphous carbon interspersed with the porous aluminum oxide embedded with composite nanoparticles. The resulting porous carrier can be processed, such as by grinding or milling, into a micro-sized powder of NNiM particles.

In another embodiment, a composite catalytic nanoparticles may be mixed with a dispersion comprising metal oxide nanoparticles, such as aluminum oxide nanoparticles, and amorphous carbon, such as carbon black. The dispersed solid particles from resulting dispersed colloid may be separated from the liquid by co-precipitation, dried, and calcined. Upon calcination of the solid material in an ambient or oxygenated environment, the amorphous carbon is exhausted. Simultaneously, the heat from the calcination process causes the aluminum oxide nanoparticles to sinter together, resulting in pores throughout the precipitated aluminum oxide.

In some embodiments, aluminum oxide nanoparticles can be suspended in ethanol, water, or a mix of ethanol and water. Carbon black with an average grain size ranging from about 1 nm to about 200 nm, or about 20 nm to about 100 nm, or about 20 nm to about 50 nm, or about 35 nm, may be added to the aluminum oxide suspension. In some embodiments, sufficient carbon black to obtain a pore surface area of about 50 m$^2$/g to about 500 m$^2$/g should be used, such as about 50 m$^2$/g, about 100 m$^2$/g, about 150 m$^2$/g, about 200 m$^2$/g, about 250 m$^2$/g, about 300 m$^2$/g, about 350 m$^2$/g, about 400 m$^2$/g, about 450 m$^2$/g, or about 500 m$^2$/g. Composite nanoparticles may be mixed into the dispersion comprising aluminum oxide nanoparticles and carbon black. In some embodiments, the composite nanoparticles are dispersed in a separate colloid, optionally with dispersants or surfactants, before being mixed with the dispersion comprising aluminum oxide nanoparticles and carbon black. The pH of the resulting mixture can be adjusted to a range of about 2 to about 7, such as a pH of between about 3 and about 5, preferably a pH of about 4, allowing the particles to precipitate. The precipitant can be dried (for example, at about 30° C. to about 95° C., preferably about 50° C. to about 70° C., at atmospheric pressure or at reduced pressure such as from about 1 pascal to about 90,000 pascal, for about one day to about 5 days, or for about 2 days to about 3 days). After drying, the carrier may then be calcined (at elevated temperatures, such as from 400° C. to about 700° C., preferably about 500° C. to about 600° C., more preferably at about 540° C. to about 560° C., still more preferably at about 550° C. to about 560° C., or at about 550° C.; at atmospheric pressure or at reduced pressure, for example, from about 1 pascal to about 90,000 pascal, in ambient atmosphere). The calcination process causes the carbon black to substantially burn away and the aluminum oxide nanoparticles sinter together, yielding a porous aluminum oxide carrier embedded with composite nanoparticles.

The resulting carrier may be further processed, for example by grinding or milling, into micron-sized NNiM particles.

NNm™ and NNiM Particles with Inhibited Migration of Platinum Group Metals

The oxidative NNm™ particles including an aluminum oxide micron-sized carrier particle bearing composite nanoparticles, where the composite nanoparticles are produced under reducing conditions, are particularly advantageous for use in catalytic converter applications. The NNiM particles, including those made using an aluminum oxide porous carrier and composite nanoparticles, where the carrier is produced by methods described herein and composite nanoparticles produced under reducing conditions, are also particularly advantageous for use in catalytic converter applications. The platinum group metal of the catalytic nanoparticle has a greater affinity for the partially reduced $Al_2O_{(3-x)}$ surface of the support nanoparticle than for the $Al_2O_3$ surface of the micron-sized carrier particles. Thus, at elevated temperatures, neighboring PGM nanoparticles bound to neighboring $Al_2O_{(3-x)}$ support nano-particles are less likely to migrate on the $Al_2O_3$ micron-sized carrier particle surface and agglomerate into larger catalyst clumps. Since the larger agglomerations of catalyst have less surface area and are less effective as catalysts, the inhibition of migration and agglomeration provides a significant advantage for the NNm™ and NNiM particles. In contrast, palladium and platinum particles deposited by wet-chemical precipitation onto alumina support demonstrate higher mobility and migration, forming agglomerations of catalyst and leading to decreased catalytic efficacy over time (that is, catalyst aging).

Barium-Oxide Nanoparticles and Micron-Particles

Barium oxide nanoparticles may be combined with porous micron supports as described below, and may be included in the oxidative washcoat layer, the reductive washcoat layer, the NO$_x$ storage layer, or any combination of the oxidative, reductive, and NO$_x$ storage washcoat layers. As an alternative embodiment, micron-sized barium oxide particles may be included in the oxidative washcoat layer, or any combination of the oxidative, reductive, and NO$_x$ storage washcoat layers. In another alternative embodiment, both barium oxide nanoparticles and barium oxide micron particles may be included in the oxidative washcoat layer, the reductive washcoat layer, or any combination of the oxidative, reductive, and NO$_x$ storage washcoat layers. When the NO$_x$ storage particles and reductive particles are in the same layer, barium oxide nanoparticles and/or barium oxide micron particles may be included in this combination layer.

The barium oxide is an absorber that binds and holds NO$_x$ compounds, particularly NO$_2$, as well as sulfur compounds such SO$_x$, particularly SO$_2$, during lean burn times of engine operation. These gases are then released and reduced by the catalysts during a period of rich engine operation. When used alone or in combination with other NO$_x$ trapping materials, such as those described herein, the amount of PGM needed to store NO$_x$ gases can be substantially reduced or eliminated.

Barium oxide nanoparticles and barium oxide micron particles may be produced by the plasma-based methods described above with respect to the oxidative and reductive nano-on-nano particles. The barium oxide feed material can be fed into the into a plasma gun, where the material is vaporized.

In some embodiments, the barium oxide nanoparticles have an average diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm. In some embodiments, the barium oxide nanoparticles have a diameter of approximately 20 nm or less, or approximately 15 nm or less, or between approximately 10 nm and approximately 20 nm, that is, approximately 15 nm±5 nm, or between approximately 10 nm and approximately 15 nm, that is, approximately 12.5 nm±2.5 nm.

In some embodiments, the barium oxide micron particles have an average diameter of approximately 10 µm or less, or approximately 8 µm or less, or approximately 5 µm or less, or approximately 2 µm or less, or approximately 1.5 µm or less, or approximately 1 µm or less, or approximately 0.5 µm or less. In some embodiments, the barium oxide micron particles have an average diameter between approximately 6 µm and approximately 10 µm, that is, approximately 8 µm±2 µm, or between approximately 7 µm and approximately 9 µm, that is, approximately 8 µm±1 µm. In some embodiments, the barium oxide micron particles have an average diameter between approximately 0.5 µm and approximately 2 µm, that is, approximately 1.25 µm±0.75 µm, or between approximately 1.0 µm and approximately 1.5 µm, that is, approximately 1.25 µm±0.25 µm.

The barium oxide nanoparticles may be impregnated into micron-sized alumina supports. The procedure for impregnating these supports may be similar to the process described above with respect to impregnating the oxidative composite nanoparticles into micron-sized aluminum oxide supports. Preferably, the barium oxide nanoparticles are prepared by applying a dispersion of barium oxide nanoparticles to porous, micron-sized aluminum oxide, as described with respect to the oxidative nanoparticles. The porous, micron-sized aluminum oxide powders may be stabilized with a small percentage of lanthanum (about 2% to about 4% La). One commercial alumina powder suitable for use is MI-386.

Exemplary ranges for the nano-sized BaO-alumina ratio include 1-20% BaO to 80% to 99% aluminum oxide micron support; 2-15% BaO to 85% to 98% aluminum oxide micron support; 5%-12% BaO to 88% to 95% aluminum oxide micron support; and about 10% BaO to about 90% aluminum oxide micron support, expressed as weight percentages. In one embodiment, the nano-BaO-impregnated aluminum oxide comprises 10%, or about 10%, nano-BaO by weight and 90%, or about 90%, aluminum oxide by weight.

The barium oxide nanoparticles may be impregnated into micron-sized cerium oxide supports or micron-sized cerium oxide-containing material supports. The procedure for impregnating these supports may be similar to the process described above with respect to impregnating the reductive composite nanoparticles into micron-sized cerium oxide supports or micron-sized cerium oxide-containing material supports. Preferably, the barium oxide nanoparticles are prepared by applying a dispersion of barium oxide nanoparticles to porous, micron-sized cerium oxide or micron-sized cerium oxide-containing material, as described with respect to the reductive nanoparticles. The micron-sized cerium oxide may contain zirconium oxide. In some embodiments, the micron-sized cerium oxide is substantially free of zirconium oxide. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide. One commercial cerium oxide powder suitable for use is HSA5.

Exemplary ranges for the nano-sized BaO-cerium oxide ratio include 1-20% BaO to 80% to 99% cerium oxide micron support (or cerium oxide-containing material micron support); 2-15% BaO to 85% to 98% cerium oxide micron support (or cerium oxide-containing material micron support); 5%-12% BaO to 88% to 95% cerium oxide micron support (or cerium oxide-containing material micron support); and about 10% BaO to about 90% cerium oxide micron support (or cerium oxide-containing material micron support), expressed as weight percentages. In one embodiment, the nano-BaO-impregnated cerium oxide comprises 8%, or about 8%, nano-BaO by weight and 92%, or about 92%, cerium oxide by weight. These ratios can be also be used with other support materials containing cerium oxide, such as cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide.

In some embodiments, the cerium oxide support (or support comprising cerium oxide and other materials, such as cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide) is impregnated with barium oxide using wet chemistry techniques.

Barium oxide micron particles are used simply by adding them to the washcoat when desired, in the amount desired, along with the other solid ingredients.

$NO_x$ Trapping Particles $NO_x$ trapping particles are also referred to herein as $NO_x$ trapping materials, $NO_x$ storage particles, or $NO_x$ storage materials. An $NO_x$ trapping particle is a particle that holds $NO_x$ gases during lean-burn engine operation and releases the gases when the oxygen content in the exhaust gas is reduced. $NO_x$ trapping particles can be a single type of particle or multiple types of particles.

$NO_x$ trapping particles comprise micron-sized cerium oxide particles or micron-sized cerium oxide-containing material particles. Suitable micron-sized cerium oxide particles or micron-sized cerium oxide-containing material particles include, but are not limited to, HSA5. In some embodiments, the micron-sized cerium oxide particles or micron-sized cerium oxide-containing material particles may include platinum, palladium, or a mixture thereof. In some embodiments, the micron-sized cerium oxide particles or micron-sized cerium oxide-containing material particles may include barium oxide. In some embodiments, the micron-sized cerium oxide particles or micron-sized cerium oxide-containing material particles may include barium oxide in addition to platinum, palladium, or a mixture thereof. The micron-sized cerium oxide may contain zirconium oxide. In some embodiments, the micron-sized cerium oxide is substantially free of zirconium oxide. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

The barium oxide is an absorber that binds and holds $NO_x$ compounds during lean burn times of engine operation. These gases are then released and reduced by the catalysts during a period of rich engine operation. During lean burn times of engine operation, barium oxide particles promote the dimerization of $NO_x$ gases to yield $N_2O_4$ and barium nitrate. Subsequently, during fuel rich burn times of engine operation, the barium nitrate and the $N_2O_4$ dimer are converted to barium oxide and $NO_2$, respectively. In this way, the released $NO_2$ can then be reduced to the benign gases $N_2$ and $H_2O$.

$NO_x$ Trapping Particles: Use of Wet Chemistry Techniques

In some embodiments, the $NO_x$ trapping particles comprising micron-sized cerium oxide particles or micron-sized cerium oxide-containing material particles may be prepared using wet chemistry techniques. In some embodiments, the $NO_x$ trapping particles can be a single type of particle. In some embodiments, the micron-sized cerium oxide particles or micron-sized cerium oxide-containing material particles contain platinum, palladium, or a mixture thereof. In some embodiments, platinum is used alone. In other embodiments, palladium is used alone. In further embodiments, platinum may be used in combination with palladium. For example, the micron-sized cerium oxide particles or micron-sized cerium oxide-containing material particles may contain a mixture of 5:1 to 100:1 platinum to palladium. In some embodiments, the micron-sized cerium oxide particles or micron-sized cerium oxide-containing material particles may contain a mixture of 6:1 to 75:1 platinum to palladium. In some embodiments, the micron-sized cerium oxide particles or micron-sized cerium oxide-containing material particles may contain a mixture of 7:1 to 50:1 platinum to palladium. In some embodiments, the micron-sized cerium oxide particles or micron-sized cerium oxide-containing material particles may contain a mixture of 8:1 to 25:1 platinum to palladium. In some embodiments, the micron-sized cerium oxide particles or micron-sized cerium oxide-containing material particles may contain a mixture of 9:1 to 15:1 platinum to palladium. In some embodiments, the micron-sized cerium oxide particles or micron-sized cerium oxide-containing material particles may contain a mixture of 10:1 platinum to palladium, or approximately 10:1 platinum to palladium. The platinum, palladium, or mixture thereof may be added to the micron-sized cerium oxide particles or micron-sized cerium oxide-containing material particles using wet chemistry techniques. The platinum, palladium, or mixture thereof may be added to the micron-sized cerium oxide particles or micron-sized cerium oxide-containing material particles using nitrate and/or chloride salts of platinum and/or palladium such as $Pt(NO_3)_4$, $Pd(NO_3)_4$, $H_2PtCl_6$, and $H_2PdCl_6$. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the micron-sized cerium oxide particles or micron-sized cerium oxide-containing material particles may contain barium oxide particles, which are discussed above. The barium oxide particles may be added to the micron-sized cerium oxide particles or micron-sized cerium oxide-containing material particles using wet chemistry techniques. The barium oxide particles may be added to the micron-sized cerium oxide particles or micron-sized cerium oxide-containing material particles using barium acetate. In some embodiments, the micron-sized cerium oxide particles or micron-sized cerium oxide-containing material particles may contain 5-15% barium oxide particles. In some embodiments, the micron-sized cerium oxide particles or micron-sized cerium oxide-containing material particles may contain 6-12% barium oxide particles. In some embodiments, the micron-sized cerium oxide particles or micron-sized cerium oxide-containing material particles may contain 7-9% barium oxide particles. In some embodiments, the micron-sized cerium oxide particles or micron-sized cerium oxide-containing material particles may contain about 8% barium oxide particles. The micron-sized cerium oxide may contain zirconium oxide. In some embodiments, the micron-sized cerium oxide is substantially free of zirconium oxide. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the micron-sized cerium oxide particles or micron-sized cerium oxide-containing material particles may contain barium oxide particles and platinum. In other embodiments, the micron-sized cerium oxide particles or micron-sized cerium oxide-containing material particles may contain barium oxide particles and palladium. In some embodiments, the micron-sized cerium oxide particles or micron-sized cerium oxide-containing material particles may contain barium oxide particles and a mixture of platinum and palladium. For example, the micron-sized cerium oxide particles or micron-sized cerium oxide-containing material particles may contain barium oxide particles and a mixture of 5:1 to 100:1 platinum to palladium. In some embodiments, the micron-sized cerium oxide particles or micron-sized cerium oxide-containing material particles may contain barium oxide particles and a mixture of 6:1 to 75:1 platinum to palladium. In some embodiments, the micron-sized cerium oxide particles or micron-sized cerium oxide-containing material particles may contain barium oxide particles and a mixture of 7:1 to 50:1 platinum to palladium. In some embodiments, the micron-sized cerium oxide particles or micron-sized cerium oxide-containing material particles may contain barium oxide particles and a mixture of 8:1 to 25:1 platinum to palladium. In some embodiments, the micron-sized cerium oxide particles or micron-sized cerium oxide-containing material particles may contain barium oxide particles and a mixture of 9:1 to 15:1 platinum to palladium. In some embodiments, the micron-sized cerium oxide particles or micron-sized cerium oxide-containing material particles may contain barium oxide particles and a mixture of 10:1 platinum to palladium, or approximately 10:1 platinum to palladium. In a preferred embodiment, the micron-sized cerium oxide particles or micron-sized cerium oxide-containing material particles contain about 8% barium oxide and a mixture of about 10:1 platinum to palladium. The barium oxide particles and platinum, palladium, or mixture thereof may be added to the micron-sized cerium oxide particles or micron-sized cerium oxide-containing material particles using wet chemistry techniques. In some embodiments, the barium oxide particles and the platinum, palladium, or mixture thereof are on the same micron-sized cerium oxide particle or micron-sized cerium oxide-containing material particle. In other embodiments, the barium oxide particles and the platinum, palladium, or mixture thereof are on different micron-sized cerium oxide particles or micron-sized cerium oxide-containing material particles. The micron-sized cerium oxide may contain zirconium oxide. In some embodiments, the micron-sized cerium oxide is substantially free of zirconium oxide. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

$NO_x$ Trapping Particles: "Nano-on-Nano-on-Micro" Particles ("NNm™" Particles)

In some embodiments, the $NO_x$ trapping particles include different types of particles. In some embodiments, the $NO_x$ trapping particles comprise a first particle and a second particle. In some embodiments, the first particle is comprised of micron-sized cerium oxide or micron-sized cerium oxide-containing material. In some embodiments, the micron-sized cerium oxide particles or micron-sized cerium oxide-containing material particles may contain barium oxide particles. The barium oxide particles may be added to the micron-sized cerium oxide particles or micron-sized cerium oxide-containing material particles using wet chemistry techniques. In some embodiments, the micron-sized cerium oxide particles or micron-sized cerium oxide-containing material particles may contain 5-15% barium oxide particles. In some embodiments, the micron-sized cerium oxide particles or micron-sized cerium oxide-containing material particles may contain 6-12% barium oxide particles. In some embodiments, the micron-sized cerium oxide particles or micron-sized cerium oxide-containing material particles may contain 7-9% barium oxide particles. In some embodiments, the micron-sized cerium oxide particles or micron-sized cerium oxide-containing material particles may contain about 8% barium oxide particles. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the second particle is an NNm™ particle comprising composite nanoparticles. In other embodiments, the second particle is an NNiM particle comprising composite nanoparticles. The following discussion will be exemplified using NNm™ particles, but applies equally well to NNiM particles. The composite nanoparticle may include one or more nanoparticles attached to a support nanoparticle to form a "nano-on-nano" composite nanoparticle that can trap, absorb, or store $NO_x$ gases. Platinum group metals may be used to prepare the composite nanoparticle. In certain embodiments, the composite nanoparticle may contain platinum. In other embodiments, the composite nanoparticle may contain palladium. In some embodiments, the composite nanoparticle may contain a mixture of platinum and palladium. A suitable support nanoparticle for the composite nanoparticles includes, but is not limited to, nano-sized aluminum oxide.

Each composite nanoparticle may be supported on a single support nanoparticle or each support nanoparticle may include one or more composite nanoparticles. The composite nanoparticles may include platinum, palladium, or a mixture thereof. In some embodiments, palladium is used alone. In other embodiments, platinum may be used alone. In further embodiments, platinum may be used in combination with palladium. For example, the nanoparticle may contain a mixture of 5:1 to 100:1 platinum to palladium. In some embodiments, the nanoparticle may contain a mixture of 6:1 to 75:1 platinum to palladium. In some embodiments, the nanoparticle may contain a mixture of 7:1 to 50:1 platinum to palladium. In some embodiments, the nanoparticle may contain a mixture of 8:1 to 25:1 platinum to palladium. In some embodiments, the nanoparticle may contain a mixture of 9:1 to 15:1 platinum to palladium. In some embodiments, the nanoparticle may contain a mixture of 10:1 platinum to palladium, or approximately 10:1 platinum to palladium.

The composite nanoparticles for use as components of the $NO_x$ trapping particles can be produced by plasma-based methods as described above for the oxidative composite nanoparticle catalysts and reductive composite nanoparticle catalysts. Platinum group metals (such as platinum, palladium, or a mixture thereof) can be introduced into the plasma reactor as a fluidized powder in a carrier gas stream. The resulting nano-on-nano particles have similar properties (i.e., diameter or grain size) to that of the oxidative nano-on-nano particles and reductive nano-on-nano particles. Typically, for $NO_x$ trapping composite nanoparticles, platinum, palladium, or a mixture of palladium and platinum is deposited on nano-sized aluminum oxide.

To prepare an NOx trapping particle that is a nano-on-nano-on-micro particle (NNm), a dispersion of the composite nanoparticles is prepared. The composite nanoparticles may be applied to porous micron-sized cerium oxide, porous micron-sized cerium oxide-containing material, or aluminum oxide. The micron-sized cerium oxide may contain zirconium oxide. In some embodiments, the micron-sized cerium oxide is substantially free of zirconium oxide. In other embodiments, the micron-sized cerium oxide contains up to 80% zirconium oxide. The micron-sized cerium oxide may contain zirconium oxide. In some embodiments, the micron-sized cerium oxide is substantially free of zirconium oxide. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide. In one embodiment, the nanoparticle is a PGM. In one embodiment, the PGM is platinum, palladium, or a mixture thereof. In another embodiment, the PGM is ruthenium. In other embodiments, the nanoparticle is a non-PGM. In some embodiments, the non-PGM is tungsten, molybdenum, niobium, manganese, or chromium.

The micron-sized carrier particles, impregnated with the composite nanoparticles and nano-sized metal oxide, may be prepared as described above for the oxidative Nano-on-Nano-on-Micro particles and the reductive Nano-on-Nano-on-Micro particles. In addition, the resulting properties, such as particle size, are as described above for the oxidative NNm™ particles and the reductive NNm™ particles.

In some embodiments, the $NO_x$ trapping particles are multiple types of particles comprising micron-sized cerium oxide particles or micron-sized cerium oxide-containing material particles impregnated with barium oxide, and separate NNm™ particles comprising platinum and palladium. In a preferred embodiment, the $NO_x$ trapping particles comprise micron-sized cerium oxide particles or micron-sized cerium oxide-containing material particles impregnated with 8% barium oxide, and separate NNm™ particles comprising platinum and palladium in a 10:1 weight ratio. In any of these embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some instances, the weight ratio of nano-sized Pt, Pd, or Pt/Pd:nano-sized aluminum oxide is about 5%:95%. In some instances, the weight percentage of nano-sized Pt, Pd, or Pt/Pd is between about 5% to about 20% nano-sized Pt, Pd, or Pt/Pd on nano-sized aluminum oxide.

The NNm™ particles may contain from about 0.1% to 1.0% Pt, Pd, or Pt/Pd by weight, or in another embodiment from about 0.4% to 0.8% by weight, or in another embodiment, about 0.5% by weight, or in another embodiment, about 0.6% by weight, of the total mass of the NNm™ particle. The NNm™ particles can then be used for formulations for coating substrates, where the coated substrates may be used in catalytic converters.

In further embodiments, the NNm™ particles may be comprised of metals such as Ru, W, Mo, Nb, Mn, or Cr produced using the plasma-based methods described above.

$NO_x$ Trapping Particles: Use of Perovskites and Non-PGM Metal Oxides

In some embodiments, the $NO_x$ trapping particles comprise micron-sized cerium oxide particles or micron-sized cerium oxide-containing material particles impregnated with a perovskite. In one embodiment, the perovskite is $FeBaO_3$. In other embodiments, the perovskite is $RuBaO_3$ or $OsBaO_3$. In other embodiments, the perovskite is $FeBeO_3$, $FeMgO_3$, $FeCaO_3$, or $FeSrO_3$. In other embodiments, the micron-sized cerium oxide or micron-sized cerium oxide-containing material is impregnated with a non-platinum group metal oxide. In some embodiments, the non-platinum group metal oxide is samarium, zinc, copper, iron, or silver oxide. The micron-sized cerium oxide or micron-sized cerium oxide-containing material can be impregnated with the perovskite or non-platinum group metal oxide using wet chemistry procedures. In some embodiments, the $NO_x$ trapping particles comprising micron-sized cerium oxide or micron-sized cerium oxide-containing material impregnated with a perovskite or a non-platinum group metal oxide can further include barium oxide particles. In other embodiments, the barium oxide particles and the perovskite or non-platinum group metal oxide are on the same micron-sized cerium oxide particle or micron-sized cerium oxide-containing material particle. In other embodiments, the barium oxide particles and the perovskite or non-platinum group metal oxide are on different micron-sized cerium oxide particles or micron-sized cerium oxide-containing material particles. In some embodiments, the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Substrates

The initial substrate is preferably a catalytic converter substrate that demonstrates good thermal stability, including resistance to thermal shock, and to which the described washcoats can be affixed in a stable manner. Suitable substrates include, but are not limited to, substrates formed from cordierite or other ceramic materials, and substrates formed from metal. The substrates may include a grid array structure or coiled foil structure, which provide numerous channels and result in a high surface area. The high surface area of the coated substrate with its applied washcoats in the catalytic converter provides for effective treatment of the exhaust gas flowing through the catalytic converter. A corner fill layer, or a buffer layer or adhesion layer such as a thin Boehmite layer, may be applied to the substrate prior to applying any of the active washcoat layers, but is not required.

Washcoat Comprising Catalytically Active Composite Nanoparticles

The catalytically active particles bound to support particles can be applied to a substrate of a catalytic converter as part of a washcoat. In some embodiments, the catalytically active particles are nano-on-nano-on-micro particles (NNm particles). In other embodiments, the catalytically active particles are nano-on-nano-in-micro particles (NNiM particles). The catalytically active particles are reactive to different gases in the exhausts. For example, catalytically active particles containing platinum and/or palladium nanoparticles supported on aluminum oxide are oxidative to the hydrocarbon gases and carbon monoxide, whereas catalytically active particles containing rhodium supported on cerium oxide are reductive to the nitrogen oxides.

The $NO_x$ trapping particles can be applied to a substrate of a catalytic converter as part of a washcoat. The $NO_x$ trapping particles store nitrogen oxide gases during lean-burn engine operation. In some embodiments, the nano-sized barium oxide particles or micron-sized barium oxide particles used with the alumina supports are included in the washcoat as an absorber. In other embodiments, the nano-sized barium oxide particles or micron-sized barium oxide particles used with the cerium oxide supports are included in the washcoat as an absorber. In other embodiments, the nano-sized barium oxide particles or micron-sized barium oxide particles used with the cerium/zirconium/lanthanum/yttrium oxide supports are included in the washcoat as an absorber. In other embodiments, any combination of $NO_x$ trapping particles containing barium oxide particles, PGM and/or non-PGM can be included in the washcoat to trap $NO_x$ gases.

The washcoat may contain oxidative nanoparticles, reductive nanoparticles, or $NO_x$ trapping particles. A washcoat containing oxidative nanoparticles on micron supports or reductive nanoparticles on micron supports may be used to coat a substrate such that the oxidative catalytically active particles bearing composite nanoparticles and reductive catalytically active particles bearing composite nanoparticles are in separate washcoat layers on the substrate. A washcoat containing reductive nanoparticles on micron supports or $NO_x$ trapping particles may be used to coat a substrate such that the reductive catalytically active particles bearing composite nanoparticles and $NO_x$ trapping particles are in either the same or in a separate washcoat layer on the substrate. In one embodiment, a washcoat containing reductive nanoparticles comprised of rhodium on micron supports is substantially free of $NO_x$ trapping particles bearing composite nanoparticles comprised of platinum. In one embodiment, a washcoat containing reductive nanoparticles on micron supports is substantially free of $NO_x$ trapping particles bearing composite nanoparticles comprised of palladium.

The washcoat layers can include materials that are less active or inert to exhausts. Such materials can be incorporated as supports for the reactive catalysts or to provide surface area for the metals. In some embodiments, the catalyst-containing washcoat composition further includes "spacer" or "filler" particles, where the spacer particles may, for example, be ceramic, metal oxide, or metallic particles. In some embodiments, the spacer particles may be alumina or boehmite.

In certain embodiments, the washcoat layer can contain an oxygen storage component. An oxygen storage component has oxygen storage capacity with which the catalyst can accumulate oxygen when exhaust gas is in an oxygen-excess state (oxidative atmosphere), and releases the accumulated oxygen when exhaust gas is in an oxygen-deficient state (reductive atmosphere). With an oxygen storage component, carbon monoxide and hydrocarbons can be efficiently oxidized to $CO_2$ even in an oxygen-deficient state. Materials such as cerium oxide or cerium oxide-containing material can be used as oxygen storage components. The cerium oxide particles may contain zirconium oxide. In a preferred embodiment, the cerium oxide particles are substantially free of zirconium oxide. In other embodiments, the cerium oxide particles contain up to 60% zirconium oxide. In some embodiments, the cerium oxide particles may contain both zirconium oxide and lanthanum. In some embodiments, the cerium oxide particles contain 40-80% cerium oxide, 10-50% zirconium oxide, and 10% lanthanum. In one embodiment, the cerium oxide particles contain 80% cerium oxide, 10% zirconium oxide, and 10% lanthanum. In another embodiment, the cerium oxide particles contain 40% cerium oxide, 50% zirconium oxide, and 10% lanthanum. In some embodiments, micron-sized cerium oxide or micron-sized cerium oxide-containing material is included in the washcoat as an oxygen storage component. In other embodiments, oxygen storage component particles are used that comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the oxygen storage component particles comprise $Ce_{0.83}Zr_{0.13}La_{0.04}O$. In some preferred embodiments, the oxygen storage component particles comprise a material that comprises about 86% cerium oxide, 10% zirconium oxide, and 4% lanthanum oxide. In some preferred embodiments, the oxygen storage component particles comprise $Ce_{0.35}Zr_{0.62}La_{0.044}Y_{0.06}O$. In some preferred embodiments, oxygen storage component particles comprise a material that comprises about 40% cerium oxide, 50% zirconium oxide, 5% lanthanum oxide, and 5% yttrium oxide.

Washcoat Comprising $NO_x$ Storage Particles

The $NO_x$ trapping particles can be applied to a substrate of a catalytic converter as part of a washcoat. The $NO_x$ trapping particles store nitrogen oxide gases during lean-burn engine operation. In some embodiments, the $NO_x$ trapping particles in the $NO_x$ storage washcoat can be micron-sized cerium oxide or micron-sized cerium oxide-containing material containing barium oxide. The barium oxide can be nano-sized or micron-sized, as described above. In some embodiments, the $NO_x$ trapping particles can be micron-sized cerium oxide particles or micron-sized cerium oxide-containing material particles impregnated with platinum, palladium, or a mixture thereof. In some embodiments, the $NO_x$ trapping particles can be micron-sized cerium oxide particles or micron-sized cerium oxide-containing material particles impregnated with barium oxide in addition to platinum, palladium, or a mixture thereof. In some embodiments, the barium oxide and platinum, palladium, or mixture thereof are added to the micron-sized cerium oxide or micron-sized cerium oxide-containing material using wet chemistry techniques. In some embodiments, the barium oxide and the PGM are on the same micron-sized cerium oxide particle or micron-sized cerium oxide-containing material particle. In other embodiments, the barium oxide and the PGM are on different micron-sized cerium oxide particles or micron-sized cerium oxide-containing material particles. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In other embodiments, the $NO_x$ trapping particles can be different types of particles. In some embodiments, the $NO_x$ trapping particles include micron-sized cerium oxide particles or micron-sized cerium oxide-containing material particles impregnated with barium oxide and separate NNm or NNiM particles. In one embodiment, the NNm particles are platinum group metals supported on aluminum oxide. In another embodiment, the NNiM particles are platinum group metals supported on aluminum oxide. In some embodiments, the platinum group metal is Pt, Pd, or a mixture thereof. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In other embodiments, the NNm or NNiM particles include Ru, W, Mo, Nb, Mn, or Cr. In further embodiments, the $NO_x$ trapping particles in the $NO_x$ storage washcoat can be micron-sized cerium oxide particles or micron-sized cerium oxide-containing material particles impregnated with a perovskite. The perovskite can be $FeBaO_3$, $RuBaO_3$, $OsBaO_3$, $FeBeO_3$, $FeMgO_3$, $FeCaO_3$, or $FeSrO_3$. In other embodiments, the micron-sized cerium oxide or micron-sized cerium oxide-containing material is impregnated with a non-platinum group metal oxide. In some embodiments, the non-platinum group metal oxide is samarium, zinc, copper, iron, or silver oxide. Typically, the micron-sized cerium oxide or micron-sized cerium oxide-containing material is impregnated with the perovskite or non-platinum group metal oxide using wet chemistry procedures. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

The washcoat containing $NO_x$ trapping particles may be used to coat a substrate such that $NO_x$ trapping particles and the reductive catalytically active particles bearing composite nanoparticles are in either the same or in separate washcoat layers on the substrate.

The washcoat layers can include materials that are less active or inert to exhausts. Such materials can be incorporated as supports for the reactive catalysts or to provide surface area for the metals. In some embodiments, the catalyst-containing washcoat composition further includes "spacer" or "filler" particles, where the spacer particles may, for example, be ceramic, metal oxide, or metallic particles. In some embodiments, the spacer particles may be boehmite.

In certain embodiments, the washcoat layer can contain an oxygen storage component. An oxygen storage component has oxygen storage capacity with which the catalyst can accumulate oxygen when exhaust gas is in an oxygen-excess state (oxidative atmosphere), and releases the accumulated oxygen when exhaust gas is in an oxygen-deficient state (reductive atmosphere). With an oxygen storage component, carbon monoxide and hydrocarbons can be efficiently oxidized to $CO_2$ even in an oxygen-deficient state. Materials such as cerium oxide or cerium-oxide containing material can be used as oxygen storage components. The cerium oxide particles may contain zirconium oxide. In a preferred embodiment, the cerium oxide particles are substantially free of zirconium oxide. the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide. In some embodiments, micron-sized cerium oxide or micron-sized cerium oxide-containing material is included in the washcoat as an oxygen storage component.

In the following washcoat descriptions, the composite nanoparticles are described as a component of the NNm™ particles for illustrative purposes only. However, the composite nanoparticles could equally well be a component of the NNiM particles. In the following descriptions, the percentages of the components of the washcoat compositions are provided in terms of the amount of solids present in the washcoat compositions, as the washcoat compositions can be provided in an aqueous suspension or, in some instances, as dry powder. The catalyst layer (or catalyst-containing layer) refers to the catalyst-containing washcoat composition after it has been applied to the substrate, dried, and calcined. The catalyst layer referred to herein encompasses a layer including oxidative catalytically active particles or a layer including reductive catalytically active particles. The $NO_x$ storage layer refers to the $NO_x$ trapping particle-containing washcoat composition after it has been applied to the substrate, dried, and calcined.

The following Table 1 provides embodiments of different washcoat layer configurations:

TABLE 1

Washcoat Configurations

| Two-layer Washcoat Configurations-Separate Oxidation and Reduction Washcoat Layers, Combined Reduction and $NO_x$ Storage Layer | Three-layer Washcoat Configurations-Separate Oxidation, Reduction and $NO_x$ Storage Washcoat Layers |
|---|---|
| 1) Substrate-Oxidizing Washcoat Layer-Combined Reducing/$NO_x$ Storage Washcoat Layer<br>2) Substrate-Combined Reducing/$NO_x$ Storage Washcoat Layer-Oxidizing Washcoat Layer | 3) Substrate-Reducing Washcoat Layer-Oxidizing Washcoat Layer-$NO_x$ Storage Washcoat Layer<br>4) Substrate-Reducing Washcoat Layer-$NO_x$ Storage Washcoat Layer-Oxidizing Washcoat Layer<br>5) Substrate-Oxidizing Washcoat Layer-Reducing Washcoat Layer-$NO_x$ Storage Washcoat Layer<br>6) Substrate-Oxidizing Washcoat Layer-$NO_x$ Storage Washcoat Layer-Reducing Washcoat Layer<br>7) Substrate-$NO_x$ Storage Washcoat Layer-Reducing Washcoat Layer-Oxidizing Washcoat Layer<br>8) Substrate-$NO_x$ Storage Washcoat Layer-Oxidizing Washcoat Layer-Reducing Washcoat Layer |

Two-Layer Washcoat Configurations-Separate Oxidation and Reduction Washcoat Layers, Combined Reduction and $NO_x$ Storage Layer Oxidation Washcoat Components In some embodiments, the oxidizing washcoat layer in the two-layer configurations (configurations 1-2 in Table 1) comprises, consists essentially of, or consists of oxidizing nano-on-nano-on-micro (NNm™) particles, boehmite particles, and alumina filler/sealant particles (for example MI-386) with or without BaO. The composition of the oxidizing washcoat components and the reducing washcoat components may be as described below regardless of the order in which the washcoats are deposited.

In some embodiments, the NNm™ particles make up between approximately 35% to approximately 75% by weight of the combination of the NNm™ particles, boehmite particles, and alumina filler/sealant particles. In some embodiments, the NNm™ particles make up between approximately 40% to approximately 60% by weight of the combination of the NNm™ particles, boehmite particles, and alumina filler/sealant particles. In some embodiments, the NNm™ particles make up between approximately 45% to approximately 55% by weight of the combination of the NNm™ particles, boehmite particles, and alumina filler/sealant particles. In some embodiments, the NNm™ particles make up about 50% by weight of the combination of the NNm™ particles, boehmite particles, and alumina filler/sealant particles. Preferably, the catalytically active particle in the oxidizing NNm™ particles is a mixture of platinum and palladium at a loading of 2-3 wt % in the NNm™ particles. Palladium, platinum, and palladium/platinum mixtures may also be used in the loadings described previously.

In some embodiments, the boehmite particles make up between approximately 0.5% to approximately 10% by weight of the combination of the NNm™ particles, boehmite particles, and alumina filler/sealant particles. In some embodiments, the boehmite particles make up between approximately 1% to approximately 7% by weight of the combination of the NNm™ particles, boehmite particles, and alumina filler/sealant particles. In some embodiments, the boehmite particles make up between approximately 2% to approximately 5% by weight of the combination of the NNm™ particles, boehmite particles, and alumina filler/sealant particles. In some embodiments, the boehmite particles make up about 3% by weight of the combination of the NNm™ particles, boehmite particles, and alumina filler/sealant particles.

In some embodiments, the alumina filler/sealant particles make up between approximately 30% to approximately 70% by weight of the combination of the NNm™ particles, boehmite particles, and alumina filler/sealant particles. In some embodiments, the alumina filler/sealant particles make up between approximately 40% to approximately 60% by weight of the combination of the NNm™ particles, boehmite particles, and alumina filler/sealant particles. In some embodiments, the alumina filler/sealant particles make up between approximately 45% to approximately 55% by weight of the combination of the NNm™ particles, boehmite particles, and alumina filler/sealant particles. In some embodiments, the alumina filler/sealant particles make up about 50% by weight of the combination of the NNm™ particles, boehmite particles, and alumina filler/sealant particles. The alumina filler/sealant particles may be porous lanthanum-stabilized alumina, for example MI-386. In some embodiments, a different filler particle may be used in place of some or all of the alumina particles.

In the oxidizing washcoat, from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-80 wt %, or from 30 wt %-60 wt % micron-sized BaO may be used in place of non-BaO-impregnated alumina. In some embodiments, a 50:50 mixture of regular MI-386 and BaO-impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO-impregnated alumina. In one embodiment, 12%, or about 12%, nano-BaO-impregnated alumina is mixed with 88%, or about 88%, alumina without impregnated BaO. In one embodiment, 15%, or about 15%, nano-BaO-impregnated alumina is mixed with 85%, or about 85%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 15%, or about 15%, micron-sized BaO is mixed with 85%, or about 85%, alumina without impregnated BaO.

The ranges for the nano-sized BaO-alumina ratio, that is, the amount of nano-BaO impregnated into the alumina, include 1-25% BaO to 75% to 99% aluminum oxide micron support; 3-20% BaO to 80% to 97% aluminum oxide micron support; 5%-15% BaO to 85% to 95% aluminum oxide micron support; and about 15% BaO to about 85% aluminum oxide micron support, expressed as weight percentages. In one embodiment, the nano-BaO-impregnated aluminum oxide comprises 15%, or about 15%, nano-BaO by weight and 85%, or about 85%, aluminum oxide by weight.

Combined Reducing and NO$_x$ Storage Washcoat Components

In some embodiments, the combined reducing and NO$_x$ storage washcoat layer in the two-layer configurations (configurations 1-2 in Table 1) comprises, consists essentially of, or consists of reducing nano-on-nano-on-micro (NNm™) particles, boehmite particles, and cerium oxide particles (for example HSA5) or cerium oxide-containing material particles for temporarily storing NO$_x$ gases. In some embodiments, the cerium oxide particles or cerium oxide-containing material particles contain Pt, Pd, or a mixture of Pt/Pd. In some embodiments, the cerium oxide particles or cerium oxide-containing material particles contain barium oxide. In some embodiments, the cerium oxide particles or cerium oxide-containing material particles contain barium oxide in addition to Pt, Pd, or a mixture of Pt/Pd. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In other embodiments, the cerium oxide particles or cerium oxide-containing material particles can contain Ru, W, Mo, Nb, Mn, or Cr. In further embodiments, the cerium oxide particles or cerium oxide-containing material particles can contain a perovskite, such as $FeBaO_3$. In still other embodiments, the cerium oxide particles can contain an oxide of Sm, Zn, Cu, Fe, or Ag. In some embodiments, the cerium oxide particles or cerium oxide-containing material particles can contain any combination of Ru, Pt, Pd, Pt/Pd, $FeBaO_3$, W, Mo, Nb, Mn, Cr, Sm, Zn, Cu, Fe, Ag, and barium oxide as described above. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the reducing NNm™ particles make up between approximately 3% to approximately 40% by weight of the combination of the NNm™ particles, boehmite particles, and cerium oxide particles or cerium oxide-containing material particles. In some embodiments, the NNm™ particles make up between approximately 5% to approximately 30% by weight of the combination of the NNm™ particles, boehmite particles, and cerium oxide particles or cerium oxide-containing material particles. In some embodiments, the NNm™ particles make up between approximately 10% to approximately 20% by weight of the combination of the NNm™ particles, boehmite particles, and cerium oxide particles or cerium oxide-containing material particles. In some embodiments, the NNm™ particles make up about 15% by weight of the combination of the NNm™ particles, boehmite particles, and cerium oxide particles or cerium oxide-containing material particles. In one embodiment, the catalytically active particle in the NNm™ particles comprises rhodium at a loading of about 0.2 wt % to 0.5 wt % in the NNm™ particles. In another embodiment, the catalytically active particle in the NNm™ particles is rhodium at a loading of about 0.3 wt % in the NNm™ particles. In another embodiment, the catalytically active particle in the NNm™ particles is rhodium at a loading of about 0.4 wt % in the NNm™ particles. Other loadings described previously may also be used. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the micron-sized porous cerium oxide particles make up between approximately 30% to approximately 98% by weight of the combination of the NNm™ particles, boehmite particles, and cerium oxide particles or cerium oxide-containing material particles. In some embodiments, the micron-sized porous cerium oxide particles make up between approximately 50% to approximately 95% by weight of the combination of the NNm™ particles, boehmite particles, and cerium oxide particles or cerium oxide-containing material particles. In some embodiments, the micron-sized porous cerium oxide particles or cerium oxide-containing material particles make up between approximately 70% to approximately 90% by weight of the combination of the NNm™ particles, boehmite particles, and cerium oxide particles or cerium oxide-containing material particles. In some embodiments, the micron-sized porous cerium oxide particles make up between approximately 80% to approximately 85% by weight of the combination of the NNm™ particles, boehmite, and cerium oxide particles or cerium oxide-containing material particles. In some embodiments, the micron-sized porous cerium oxide particles make up about 85% by weight of the combination of the NNm™ particles, boehmite, and cerium oxide particles or cerium oxide-containing material particles. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the boehmite particles make up between approximately 0.5% to approximately 10% by weight of the combination of the NNm™ particles, boehmite particles, and cerium oxide particles or cerium oxide-containing material particles. In some embodiments, the boehmite particles make up between approximately 1% to approximately 7% by weight of the combination of the NNm™ particles, boehmite particles, and cerium oxide particles or cerium oxide-containing material particles. In some embodiments, the boehmite particles make up between approximately 2% to approximately 5% by weight of the combination of the NNm™ particles, boehmite particles, and cerium oxide particles or cerium oxide-containing material particles. In some embodiments, the boehmite particles make up about 3% by weight of the combination of the NNm™ particles, boehmite particles, and cerium oxide particles or cerium oxide-containing material particles. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In the combined reducing and $NO_x$ storage washcoat, from 0 to 100% of the cerium oxide particles may be cerium oxide or cerium oxide-containing material impregnated with nano-sized BaO particles, cerium oxide particles or cerium oxide-containing material particles mixed with micron-sized BaO particles, or both cerium oxide particles or cerium oxide-containing material particles impregnated with nano-sized BaO particles and admixed with micron-sized BaO particles. In some embodiments, from 1 wt %-100 wt %, from 20 wt %-80 wt %, or from 30 wt %-60 wt % micron-sized BaO may be used in place of non-BaO-impregnated alumina. In some embodiments, a 50:50 mixture of regular HSA5 and BaO impregnated HSA5 (impregnated with nano-sized BaO particles), or a 50:50 mixture of HSA5 and micron-sized BaO particles, or a mixture of HSA5 impregnated with nano-sized BaO particles and admixed with micron-sized BaO particles, may be used for this component of the washcoat. In some embodiments, the cerium oxide particles can comprise from 5% to 30% nano-BaO-impregnated cerium oxide and from 70% to 95% non-BaO-impregnated cerium oxide. In some embodiments, the cerium oxide particles can comprise from 5% to 20% nano-BaO-impregnated cerium oxide and from 80% to 95% non-BaO-impregnated cerium oxide. In some embodiments, the cerium oxide particles can comprise from 8% to 16% nano-BaO-impregnated cerium oxide and from 84% to 92% non-BaO-impregnated cerium oxide. In one embodiment, 12%, or about 12%, nano-BaO-impregnated cerium oxide is mixed with 88%, or about 88%, cerium oxide without impregnated BaO. In one embodiment, 8%, or about 8%, nano-BaO-impregnated cerium oxide is mixed with 92%, or about 92%, cerium oxide without impregnated BaO. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Three-Layer Washcoat Configuration: Separate Oxidation, Reduction and $NO_x$ Storage Washcoat Components Oxidation Washcoat Components In some embodiments, the oxidizing washcoat layer in the three-layer configurations (configurations 3-8 in Table 1) comprises, consists essentially of, or consists of oxidizing nano-on-nano-on-micro (NNm™) particles, boehmite particles, and alumina filler/sealant particles (for example MI-386) with or without BaO. The composition of the oxidizing washcoat components and the reducing washcoat components may be as described below regardless of the order in which the washcoats are deposited.

In some embodiments, the NNm™ particles make up between approximately 35% to approximately 75% by weight of the combination of the NNm™ particles, boehmite particles, and alumina filler/sealant particles. In some embodiments, the NNm™ particles make up between approximately 40% to approximately 60% by weight of the combination of the NNm™ particles, boehmite particles, and alumina filler/sealant particles. In some embodiments, the NNm™ particles make up between approximately 45% to approximately 55% by weight of the combination of the NNm™ particles, boehmite particles, and alumina filler/sealant particles. In some embodiments, the NNm™ particles make up about 50% by weight of the combination of the NNm™ particles, boehmite particles, and alumina filler/sealant particles. Preferably, the catalytically active particle in the oxidizing NNm™ particles is a mixture of platinum and palladium at a loading of 2-3 wt % in the NNm™ particles. Palladium, platinum, and palladium/platinum mixtures may also be used in the loadings described previously.

In some embodiments, the boehmite particles make up between approximately 0.5% to approximately 10% by weight of the combination of the NNm™ particles, boehmite particles, and alumina filler/sealant particles. In some embodiments, the boehmite particles make up between approximately 1% to approximately 7% by weight of the combination of the NNm™ particles, boehmite particles, and alumina filler/sealant particles. In some embodiments, the boehmite particles make up between approximately 2% to approximately 5% by weight of the combination of the NNm™ particles, boehmite particles, and alumina filler/sealant particles. In some embodiments, the boehmite particles make up about 3% by weight of the combination of the NNm™ particles, boehmite particles, and alumina filler/sealant particles.

In some embodiments, the alumina filler/sealant particles make up between approximately 30% to approximately 70% by weight of the combination of the NNm™ particles, boehmite particles, and alumina filler/sealant particles. In some embodiments, the alumina filler/sealant particles make up between approximately 40% to approximately 60% by weight of the combination of the NNm™ particles, boehmite particles, and alumina filler/sealant particles. In some embodiments, the alumina filler/sealant particles make up between approximately 45% to approximately 55% by weight of the combination of the NNm™ particles, boehmite particles, and alumina filler/sealant particles. In some embodiments, the alumina filler/sealant particles make up about 50% by weight of the combination of the NNm™ particles, boehmite particles, and alumina filler/sealant particles. The alumina filler/sealant particles may be porous lanthanum-stabilized alumina, for example MI-386. In some embodiments, a different filler particle may be used in place of some or all of the alumina particles.

In the oxidizing washcoat, from 0 to 100% of the alumina filler/sealant particles may be alumina impregnated with nano-sized BaO particles, alumina mixed with micron-sized BaO particles, or both alumina impregnated with nano-sized BaO particles and admixed with micron-sized BaO particles. In some embodiments, from 1 wt %-100 wt %, from 20 wt %-80 wt %, or from 30 wt %-60 wt % micron-sized BaO may be used in place of non-BaO-impregnated alumina. In some embodiments, a 50:50 mixture of regular MI-386 and BaO-impregnated MI-386 (impregnated with nano-sized BaO particles), or a 50:50 mixture of MI-386 and micron-sized BaO particles, or a mixture of MI-386 impregnated with nano-sized BaO particles and admixed with micron-sized BaO particles, may be used for this component of the washcoat. In some embodiments, the alumina can comprise from 5% to 30% nano-BaO-impregnated alumina and from 70% to 95% non-BaO-impregnated alumina. In some embodiments, the alumina can comprise from 5% to 20% nano-BaO-impregnated alumina and from 80% to 95% non-BaO-impregnated alumina. In some embodiments, the alumina can comprise from 8% to 16% nano-BaO-impregnated alumina and from 84% to 92% non-BaO-impregnated alumina. In one embodiment, 12%, or about 12%, nano-BaO-impregnated alumina is mixed with 88%, or about 88%, alumina without impregnated BaO. In one embodiment, 10%, or about 10%, nano-BaO-impregnated alumina is mixed with 90%, or about 90%, alumina without impregnated BaO.

In some embodiments, the alumina can comprise from 5% to 30% micron-sized BaO and from 70% to 95% non-BaO-impregnated alumina. In some embodiments, the alumina can comprise from 5% to 20% micron-sized BaO and from 80% to 95% non-BaO-impregnated alumina. In some embodiments, the alumina can comprise from 8% to 16% micron-sized-BaO and from 84% to 92% non-BaO-impregnated alumina. In one embodiment, 12%, or about 12%, micron-sized BaO is mixed with 88%, or about 88%, alumina without impregnated BaO. In one embodiment, 15%, or about 15%, micron-sized BaO is mixed with 85%, or about 85%, alumina without impregnated BaO.

The ranges for the nano-sized BaO-alumina ratio, that is, the amount of nano-BaO impregnated into the alumina, include 1-25% BaO to 75% to 99% aluminum oxide micron support; 3-20% BaO to 80% to 97% aluminum oxide micron support; 5%-15% BaO to 85% to 95% aluminum oxide micron support; and about 15% BaO to about 85% aluminum oxide micron support, expressed as weight percentages. In one embodiment, the nano-BaO-impregnated aluminum oxide comprises 15%, or about 15%, nano-BaO by weight and 85%, or about 85%, aluminum oxide by weight.

Reducing Washcoat Components

In some embodiments, the reducing washcoat layer in the three-layer configurations (configurations 3-8 in Table 1) comprises, consists essentially of, or consists of reducing nano-on-nano-on-micro (NNm™) particles, boehmite particles, and alumina filler/sealant particles (for example MI-386).

In some embodiments, the reducing NNm™ particles make up between approximately 50% to approximately 95% by weight of the combination of the NNm™ particles, boehmite particles, and alumina filler/sealant particles. In some embodiments, the NNm™ particles make up between approximately 60% to approximately 90% by weight of the combination of the NNm™ particles, boehmite particles, and alumina filler/sealant particles. In some embodiments, the NNm™ particles make up between approximately 75% to approximately 85% by weight of the combination of the NNm™ particles, boehmite particles, and alumina filler/sealant particles. In some embodiments, the NNm™ particles make up about 80% by weight of the combination of the NNm™ particles, boehmite particles, and alumina filler/sealant particles. In some embodiments, the catalytically active particle in the NNm™ particles is rhodium at a loading of about 0.3-2 wt % in the NNm™ particles. In some embodiments, the catalytically active particle in the NNm™ particles is rhodium at a loading of about 0.3-1 wt % in the NNm™ particles. In some embodiments, the catalytically active particle in the NNm™ particles is rhodium at a loading of about 0.3-0.5 wt % in the NNm™ particles. In one embodiment, the catalytically active particle in the NNm™ particles is rhodium at a loading of about 0.3 wt % in the NNm™ particles. Other loadings described previously may also be used.

In some embodiments, the alumina filler/sealant particles make up between approximately 5% to approximately 40% by weight of the combination of the NNm™ particles, boehmite particles, and alumina filler/sealant particles. In some embodiments, the alumina filler/sealant particles make up between approximately 10% to approximately 30% by weight of the combination of the NNm™ particles, boehmite particles, and alumina filler/sealant particles. In some embodiments, the alumina filler/sealant particles make up between approximately 15% to approximately 20% by weight of the combination of the NNm™ particles, boehmite particles, and alumina filler/sealant particles. In some embodiments, the alumina filler/sealant particles make up about 17% by weight of the combination of the NNm™ particles, boehmite particles, and alumina filler/sealant particles. The alumina filler/sealant particles may be porous lanthanum-stabilized alumina, for example MI-386. In some embodiments, a different filler particle may be used in place of some or all of the alumina particles.

In some embodiments, the boehmite particles make up between approximately 0.5% to approximately 10% by weight of the combination of the NNm™ particles, boehmite particles, and alumina filler/sealant particles. In some embodiments, the boehmite particles make up between approximately 1% to approximately 7% by weight of the combination of the NNm™ particles, boehmite particles, and alumina filler/sealant particles. In some embodiments, the boehmite particles make up between approximately 2% to approximately 5% by weight of the combination of the NNm™ particles, boehmite particles, and alumina filler/sealant particles. In some embodiments, the boehmite particles make up about 3% by weight of the combination of the NNm™ particles, boehmite particles, and alumina filler/sealant particles.

$NO_x$ Storage Washcoat Components

In some embodiments, the $NO_x$ storage washcoat layer in the three-layer configurations (configurations 3-8 in Table 1) comprises, consists essentially of, or consists of nano-on-nano-on-micro (NNm™) particles, boehmite particles, and cerium oxide particles (for example HSA5) or cerium oxide-containing material particles for temporarily storing $NO_x$ gases. In some embodiments, the nano-on-nano-on-micro (NNm™) particles contain platinum, palladium, or a mixture thereof. In one embodiment, the nano-on-nano-on-micro (NNm™) particles contain a mixture of Pt and Pd. In some embodiments, the cerium oxide particles or cerium oxide-containing material particles contain barium oxide. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In other embodiments, the cerium oxide particles or cerium oxide-containing material particles contain Pt, Pd, or a mixture of Pt and Pd. In other embodiments, the cerium oxide particles or cerium oxide-containing material particles contain Ru, W, Mo, Nb, Mn, or Cr. In other embodiments, the cerium oxide particles or cerium oxide-containing material particles can contain a perovskite such as FeBaO. In still other embodiments, the cerium oxide particles or cerium oxide-containing material particles can contain samarium, zinc, copper, iron, or silver. In some embodiments, the cerium oxide particles or cerium oxide-containing material particles can contain any combination of the platinum group metal, non-platinum group metal, and barium oxide described above. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the NNm™ particles make up between approximately 10% to approximately 40% by weight of the combination of the NNm™ particles, boehmite particles, and cerium oxide particles. In some embodiments, the NNm™ particles make up between approximately 15% to approximately 30% by weight of the combination of the NNm™ particles, boehmite particles, and cerium oxide particles. In some embodiments, the NNm™ particles make up between approximately 20% to approximately 25% by weight of the combination of the NNm™ particles, boehmite particles, and cerium oxide particles. In some embodiments, the NNm™ particles make up about 23% by weight of the combination of the NNm™ particles, boehmite particles, and cerium oxide particles. In some embodiments, the NNm™ particles are a mixture of platinum and palladium, at a loading of about 0.3-2 wt %, supported on alumina oxide. In some embodiments, the NNm™ particles are a mixture of platinum and palladium, at a loading of about 0.3-1 wt %, supported on alumina oxide. In some embodiments, the NNm™ particles are a mixture of platinum and palladium, at a loading of about 0.3-0.5 wt %, supported on alumina oxide. In one embodiment, the NNm™ particles are a mixture of platinum and palladium, at a loading of about 0.3 wt %, supported on alumina oxide. Platinum, palladium, and platinum/palladium mixtures supported on cerium oxide or cerium oxide-containing material may also be used in the loadings described previously. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the micron-sized porous cerium oxide particles make up between approximately 50% to approximately 90% by weight of the combination of the NNm™ particles, boehmite particles, and cerium oxide particles or cerium oxide-containing material particles. In some embodiments, the micron-sized porous cerium oxide particles or cerium oxide-containing material particles make up between approximately 60% to approximately 80% by weight of the combination of the NNm™ particles, boehmite particles, and cerium oxide particles or cerium oxide-containing material particles. In some embodiments, the micron-sized porous cerium oxide particles or cerium oxide-containing material particles make up between approximately 70% to approximately 75% by weight of the combination of the NNm™ particles, boehmite, and cerium oxide particles or cerium oxide-containing material particles. In some embodiments, the micron-sized porous cerium oxide particles or cerium oxide-containing material particles make up about 73% by weight of the combination of the NNm™ particles, boehmite, and cerium oxide particles or cerium oxide-containing material particles. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In some embodiments, the boehmite particles make up between approximately 0.5% to approximately 10% by weight of the combination of the NNm™ particles, boehmite particles, and cerium oxide particles or cerium oxide-containing material particles. In some embodiments, the boehmite particles make up between approximately 1% to approximately 7% by weight of the combination of the NNm™ particles, boehmite particles, and cerium oxide particles or cerium oxide-containing material particles. In some embodiments, the boehmite particles make up between approximately 2% to approximately 5% by weight of the combination of the NNm™ particles, boehmite particles, and cerium oxide particles or cerium oxide-containing material particles. In some embodiments, the boehmite particles make up about 4% by weight of the combination of the NNm™ particles, boehmite particles, and cerium oxide particles or cerium oxide-containing material particles. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

In the $NO_x$ storage washcoat, from 0 to 100% of the cerium oxide particles or cerium oxide-containing material particles may be cerium oxide particles or cerium oxide-containing material particles impregnated with nano-sized BaO particles, cerium oxide particles or cerium oxide-containing material particles mixed with micron-sized BaO particles, or both cerium oxide particles or cerium oxide-containing material particles impregnated with nano-sized BaO particles and admixed with micron-sized BaO particles. In some embodiments, from 1 wt %-100 wt %, from 20 wt %-80 wt %, or from 30 wt %-60 wt % micron-sized BaO may be used in place of non-BaO-impregnated cerium oxide or non-BaO-impregnated cerium oxide-containing material. In some embodiments, a 50:50 mixture of regular HSA5 and BaO impregnated HSA5 (impregnated with nano-sized BaO particles), or a 50:50 mixture of HSA5 and micron-sized BaO particles, or a mixture of HSA5 impregnated with nano-sized BaO particles and admixed with micron-sized BaO particles, may be used for this component of the washcoat. In some embodiments, the cerium oxide particles can comprise from 5% to 30% nano-BaO-impregnated cerium oxide and from 70% to 95% non-BaO-impregnated cerium oxide. In some embodiments, the cerium oxide particles can comprise from 5% to 20% nano-BaO-impregnated cerium oxide and from 80% to 95% non-BaO-impregnated cerium oxide. In some embodiments, the cerium oxide particles can comprise from 8% to 16% nano-BaO-impregnated cerium oxide and from 84% to 92% non-BaO-impregnated cerium oxide. In one embodiment, 12%, or about 12%, nano-BaO-impregnated cerium oxide is mixed with 88%, or about 88%, cerium oxide without impregnated BaO. In one embodiment, 8%, or about 8%, nano-BaO-impregnated cerium oxide is mixed with 92%, or about 92%, cerium oxide without impregnated BaO. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Procedure for Preparation of Washcoat Containing Catalysts for Oxidation Reaction: Two-Layer Washcoat Configurations The oxidative nano-on-nano-on-micro catalytically active material (for example nano-Pd-on-nano-on-micro, nano-Pt-on-nano-on-micro, or nano-Pt/Pd-on-nano-on-micro) can be mixed with La-stabilized micron-sized $Al_2O_3$, boehmite, and water to form a washcoat slurry. In some instances, the mixture contains about 50% by weight of the catalytic active material (nano-on-nano and nano-sized $Al_2O_3$ without precious metal), about 47% by weight of the micron-sized $Al_2O_3$, and about 3% by weight of the boehmite. In some instances, the washcoat is adjusted to have a pH of 4 or approximately 4.

Procedure for Preparation of Washcoat Containing Catalysts for Reduction Reaction and $NO_x$ Storage Material: Two-Layer Washcoat Configurations The reductive nano-on-nano-on-micro catalytically active material (for example Rh) can be mixed with $NO_x$ trapping particles, boehmite, and water to form a washcoat slurry. In some instances, the mixture comprises 15% by weight of the catalytic active material (for example nano-Rh on nano-cerium oxide on micro-cerium oxide), 2% by weight of boehmite, and 83% HSA5 (for example HSA5 impregnated with barium oxide particles and a mixture of platinum and palladium). In some instances, the washcoat is adjusted to have a pH of 4 or approximately 4.

Procedure for Preparation of Washcoat Containing Catalysts for Oxidation Reaction: Three-Layer Washcoat Configurations The oxidative nano-on-nano-on-micro catalytically active material (for example nano-Pd- or nano-Pt- or nano-Pt/Pd-on-nano-on-micro) can be mixed with La-stabilized micron-sized $Al_2O_3$, boehmite, and water to form a washcoat slurry. In some instances, the mixture contains about 50% by weight of the catalytic active material (nano-on-nano and nano-sized $Al_2O_3$ without precious metal), about 47% by weight of the micron-sized $Al_2O_3$, and about 3% by weight of the boehmite. In some instances, the washcoat is adjusted to have a pH of 4 or approximately 4.

Procedure for Preparation of Washcoat Containing Catalysts for Reduction Reaction: Three-Layer Washcoat Configurations The reductive nano-on-nano-on-micro catalytically active material (for example Rh) can be mixed with La-stabilized micron-sized $Al_2O_3$, boehmite, and water to form a washcoat slurry. In some instances, the mixture contains about 80% by weight of the catalytic active material (such as nano-on-nano and nano-sized $CeO_2$ without precious metal), about 17% by weight of the micron-sized $Al_2O_3$, and about 3% by weight of the boehmite. In some instances, the washcoat is adjusted to have a pH of 4 or approximately 4.

Procedure for Preparation of Washcoat Containing $NO_x$ Storage Material: Three-Layer Washcoat Configurations The nano-on-nano-on-micro material for temporary storage of $NO_x$ gases (for example Pt, Pd, or Pt/Pd on nano-sized $Al_2O_3$ on micron-sized $Al_2O_3$) can be mixed with micron-sized cerium oxide particles or micron-sized cerium oxide-containing material particles (impregnated with, for example, barium oxide), boehmite, and water to form a washcoat slurry. In some instances, the mixture comprises 23% by weight of the NNm particles, 4% by weight of boehmite, and 73% HSA5. In some instances, the washcoat is adjusted to have a pH of 4 or approximately 4.

Coated Substrate with Separate Layers of Reductive Nanoparticles and $NO_x$ Storage Material Reductive Nanoparticles and $NO_x$ Storage Material in the Same Layer A coated substrate may include a first layer washcoat containing oxidative catalytically active nanoparticles, and a second layer washcoat containing reductive catalytically active nanoparticles and $NO_x$ storage material. In certain embodiments, the oxidative catalytically active nanoparticles do not react with the reductive catalytically active nanoparticles. In certain embodiments, the reductive catalytically active nanoparticles do not react with the $NO_x$ storage material. In certain embodiments, the oxidative catalytically active nanoparticles do not react with the $NO_x$ storage material.

The washcoat containing catalysts for oxidation, the washcoat containing catalysts for reduction, and the $NO_x$ storage material can be applied to a monolith of a grid array structure, for example a honeycomb structure. In some instances, the washcoats can form a layered structure in the channels of the monolith. In some instances, the washcoat that contains catalysts for oxidation reactions can be applied first. In some instances, the washcoat that contains catalysts for reduction reaction and the $NO_x$ storage material can be applied first. In some instances, the washcoat that contains catalysts for reduction reaction and the $NO_x$ storage material can be applied second. In some instances, the washcoat that contains catalysts for oxidation reactions can be applied second.

The following are experimental procedures for making a coated substrate containing a reductive catalytically active particles and $NO_x$ storage material in the same washcoat layer. The reductive catalytic active material is mixed with $NO_x$ trapping particles, boehmite, and water to form a washcoat slurry. In some embodiments, the washcoat is adjusted to have a pH of about 4.

The washcoat contains a catalyst for reduction reactions as well as $NO_x$ storage material, and can be applied to a monolith of a grid array structure in a single procedure. The application of the washcoat onto the monolith can be achieved by dipping the monolith into a washcoat slurry. After the slurry is dried, the monolith is baked in an oven at 550° C. for one hour.

Reductive Nanoparticles and $NO_x$ Storage Material in Different Layers

A coated substrate may include a first layer washcoat containing oxidative catalytically active nanoparticles, a second layer washcoat containing reductive catalytically active nanoparticles, and a third layer washcoat containing $NO_x$ storage material. In certain embodiments, the oxidative catalytically active nanoparticles do not react with the reductive catalytically active nanoparticles. In certain embodiments, the reductive catalytically active nanoparticles do not react with the $NO_x$ storage material. In certain embodiments, the oxidative catalytically active nanoparticles do not react with the $NO_x$ storage material.

The washcoat containing catalysts for oxidation, the washcoat containing catalysts for reduction, and the washcoat containing $NO_x$ storage material can be applied to a monolith of a grid array structure, for example a honeycomb structure. In some instances, the washcoats can form a layered structure in the channels of the monolith. In some instances, the washcoat that contains catalysts for oxidation reactions can be applied first. In some instances, the washcoat that contains catalysts for reduction reaction can be applied first. In some instances, the washcoat that contains $NO_x$ storage material can be applied first. In some instances, the washcoat that contains catalysts for oxidation reactions can be applied second. In some instances, the washcoat that contains catalysts for reduction reactions can be applied second. In some instances, the washcoat that contains $NO_x$ storage material can be applied second. In some instances, the washcoat that contains catalysts for oxidation reactions can be applied third. In some instances, the washcoat that contains catalysts for reduction reactions can be applied third. In some instances, the washcoat that contains $NO_x$ storage material can be applied third. The application of the washcoat onto the monolith can be achieved, for example, by dipping the monolith into a washcoat slurry. After the slurry is dried, the monolith can be baked in an oven at 550° C. for one hour. Next, the monolith can be dipped into the second washcoat slurry. After the slurry of the second dip is dried, the monolith can be baked in the oven again at 550° C. for one hour. Subsequently, the monolith can be dipped into the third washcoat slurry. After the slurry of the third dip is dried, the monolith can be baked in the oven again at 550° C. for one hour.

A person having ordinary skill in the art would be able to use typical methods or procedures to apply the washcoat prepared according to the procedures described above to make a catalytic converter, which can be used in various fields, such as for a catalytic converter for gasoline and/or diesel engines.

Catalytic Converters and Methods of Producing Catalytic Converters

In some embodiments, the invention provides for catalytic converters, which can comprise any of the washcoat layers and washcoat configurations described herein. The catalytic converters are useful in a variety of applications, such as in gasoline and diesel vehicles.

Figure 1A:
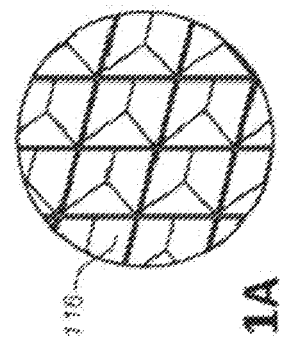
FIG. 1A is a magnified view of a portion of the drawing of FIG. 1 in accordance with some embodiments of the present invention.

FIG. 1 illustrates a catalytic converter in accordance with some embodiments. Catalytically active material is included in a washcoat composition, which is coated onto a substrate to form a coated substrate. The coated substrate 114 is enclosed within an insulating material 112, which in turn is enclosed within a metallic container 110 (of, for example, stainless steel). A heat shield 108 and a gas sensor (for example, an oxygen sensor) 106 are depicted. The catalytic converter may be affixed to the exhaust system of the vehicle through flanges 104 and 118. The exhaust gas, which includes the raw emissions of hydrocarbons, carbon monoxide, and nitrogen oxides, enters the catalytic converter at 102. As the raw emissions pass through the catalytic converter, they react with the catalytically active material on the coated substrate, resulting in tailpipe emissions of water, carbon dioxide, and nitrogen exiting at 120. FIG. 1A is a magnified view of a section of the coated substrate 114, which shows the honeycomb structure of the coated substrate. The coated substrates, as described below, may be incorporated into a catalytic converter for use in a vehicle emissions control system.

Figure 2:
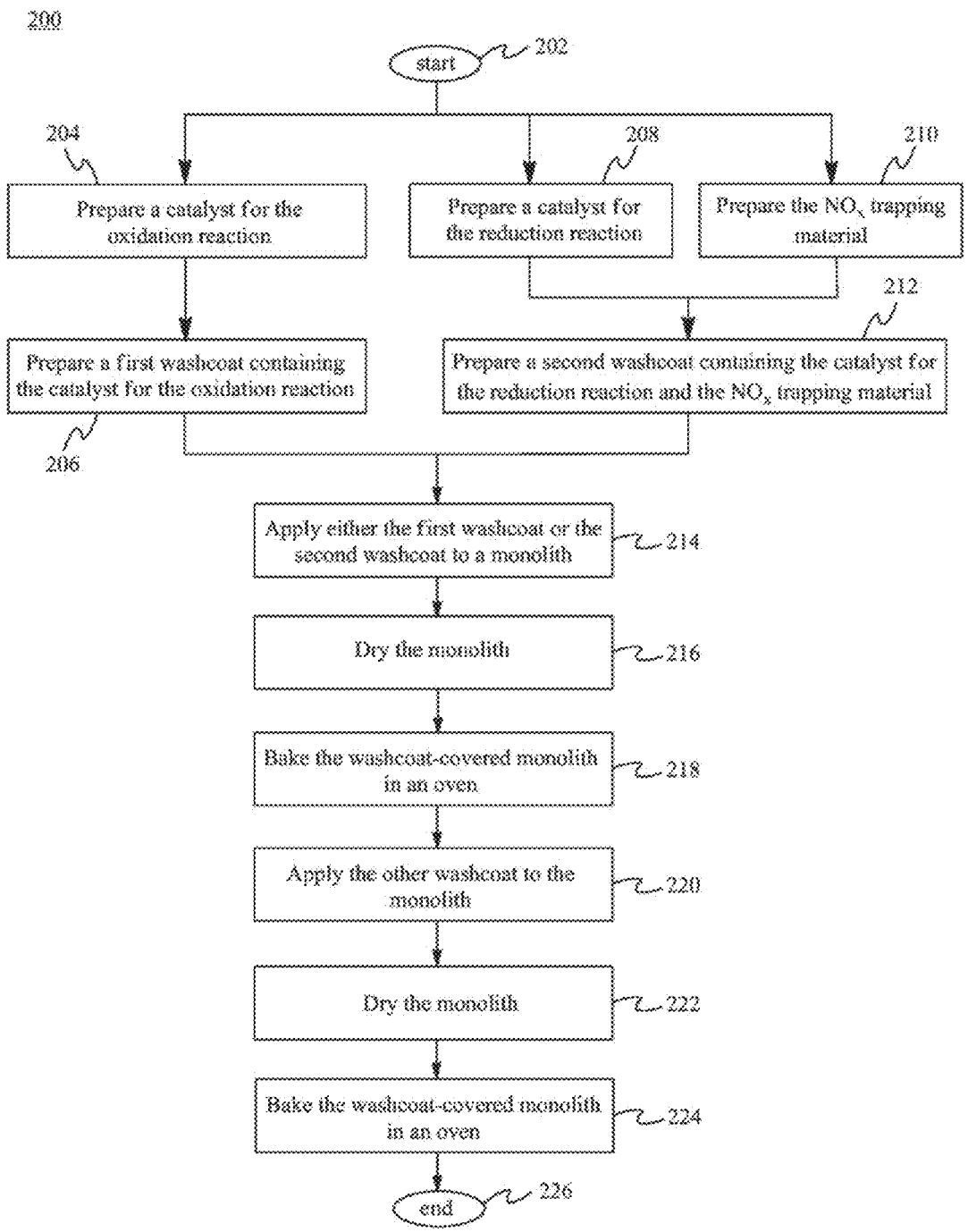
FIG. 2 is a flow chart illustrating a preparation method of a coated substrate comprising oxidative catalytically active particles and reductive catalytically active particles contained in separate washcoat layers, and the reductive catalytically active particles and the $NO_x$ storage material contained in a single washcoat layer, in accordance with some embodiments of the present invention.

FIG. 2 is a flow chart illustrating an LNT system preparation method 200 in accordance with embodiments of the present disclosure. The LNT system includes oxidative catalytically active particles and reductive catalytically active particles in separate washcoat layers on a substrate. The LNT system embodies the reductive catalytically active particles and the $NO_x$ storage material in a single washcoat layer on the substrate.

The LNT system preparation method 200 can start from Step 202. At Step 204, a catalyst for oxidation reaction is prepared. At Step 206, a first washcoat containing the catalyst for oxidation reaction is prepared. At Step 208, a catalyst for reduction reaction is prepared. At step 210, cerium oxide particles or cerium oxide-containing material particles impregnated with $NO_x$ storing materials are prepared. At Step 212, a second washcoat containing the catalyst for reduction reaction and the impregnated cerium oxide particles or cerium oxide-containing material particles for $NO_x$ storage are prepared. At Step 214, either the first washcoat or the second washcoat is applied to a substrate. At Step 216, the substrate is dried. At Step 218, the washcoat-covered substrate is baked in an oven allowing the formation of the oxide-oxide bonds, resulting in immobilized particles. At Step 220, the other washcoat is applied on the substrate. At Step 222, the substrate is dried. At Step 224, the washcoat-covered substrate with oxidative catalytically active particles and reductive catalytically active particles contained in separate layers, and reductive catalytically active particles and $NO_x$ storage material contained in the same layer, is baked in an oven allowing the formation of the oxide-oxide bonds. The method 200 ends at Step 226. The oxide-oxide bonds formed during the baking process firmly retain the nanoparticles, so that the chances for the oxidative nanoparticles and/or the reductive nanoparticles to move at high temperature and to encounter and react with each other are avoided. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Figure 3:
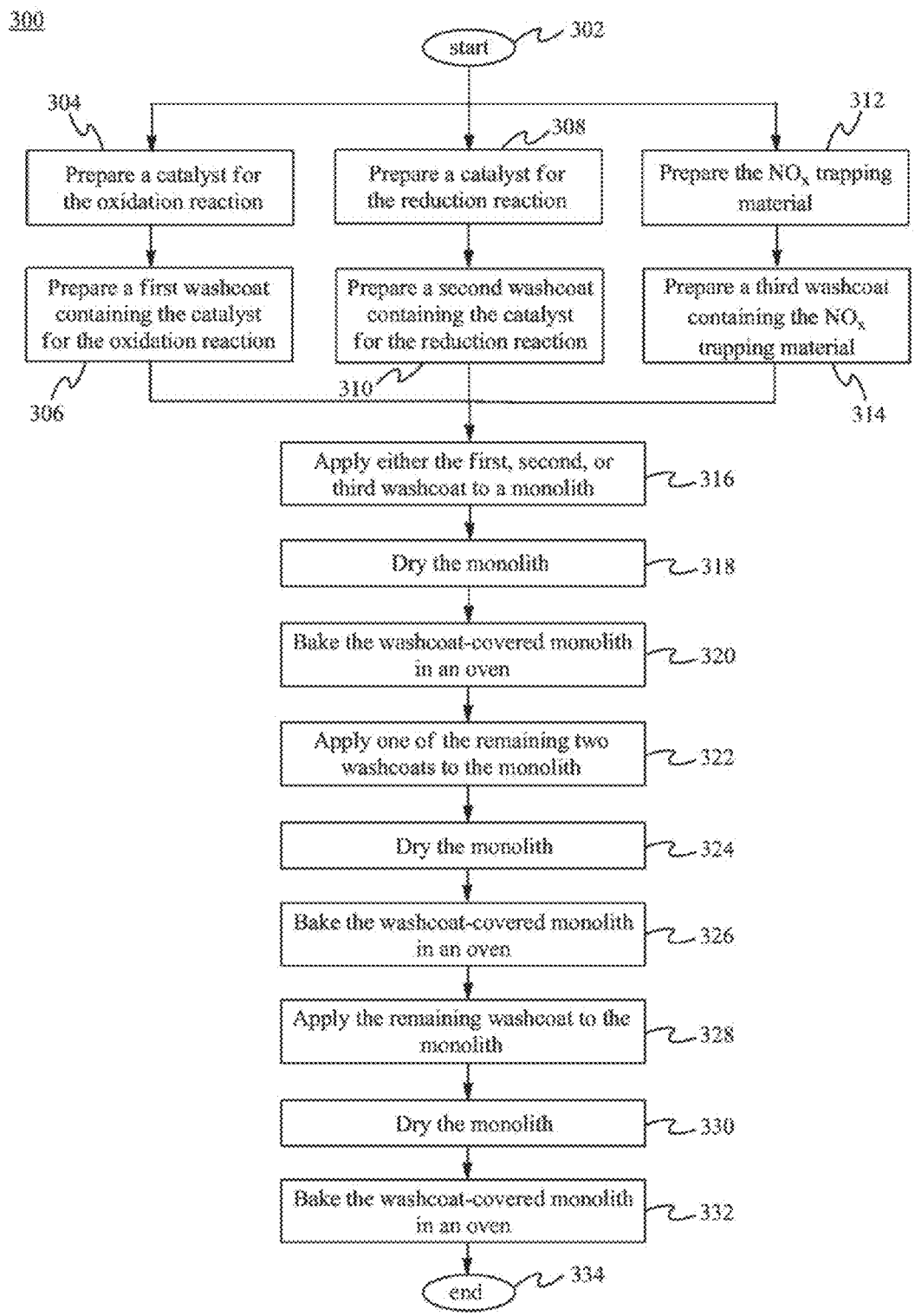
FIG. 3 is a flow chart illustrating a preparation method of a coated substrate comprising oxidative catalytically active particles, reductive catalytically active particles, and the $NO_x$ storage material contained in separate washcoat layers, in accordance with some embodiments of the present invention.

FIG. 3 is a flow chart illustrating an LNT system preparation method 300 in accordance with embodiments of the present disclosure. The LNT system includes oxidative catalytically active particles and reductive catalytically active particles in separate washcoat layers on a substrate. The LNT system embodies the reductive catalytically active particles and the $NO_x$ storage material in separate washcoat layers on the substrate.

The LNT system preparation method 300 can start from Step 302. At Step 304, a catalyst for oxidation reaction is prepared. At Step 306, a first washcoat containing the catalyst for oxidation reaction is prepared. At Step 308, a catalyst for reduction reaction is prepared. At Step 310, a second washcoat containing the catalyst for reduction reaction is prepared. At step 312, cerium oxide particles or cerium oxide-containing material particles impregnated with $NO_x$ storing materials are prepared. At Step 314, a third washcoat containing the cerium oxide particles or cerium oxide-containing material particles impregnated with $NO_x$ storing materials is prepared. At Step 316, either the first washcoat, the second, or the third washcoat is applied to a substrate. At Step 318, the substrate is dried. At Step 320, the washcoat-covered substrate is baked in an oven allowing the formation of the oxide-oxide bonds, resulting in immobilized particles. At Step 322, one of the remaining two washcoats is applied on the substrate. At Step 324, the substrate is dried. At Step 326, the washcoat-covered substrate is baked in an oven allowing the formation of the oxide-oxide bonds. At Step 328, the final remaining washcoat is applied on the substrate. At Step 330, the substrate is dried. At Step 332, the washcoat-covered substrate with oxidative catalytically active particles, reductive catalytically active particles, and cerium oxide particles or cerium oxide-containing material particles impregnated with $NO_x$ storing materials contained in separate layers is baked in an oven allowing the formation of the oxide-oxide bonds. The method 300 ends at Step 334. The oxide-oxide bonds formed during the baking process firmly retain the nanoparticles, so that the chances for the oxidative nanoparticles and/or the reductive nanoparticles to move at high temperature and to encounter and react with each other are avoided. In any of the disclosed embodiments, the micron-sized cerium oxide-containing material can comprise cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide. In some preferred embodiments, the micron-sized cerium oxide-containing material comprises $Ce_{0.83}Zr_{0.13}La_{0.04}O$. In some preferred embodiments, the micron-sized cerium oxide-containing material comprises a material that comprises about 86% cerium oxide, 10% zirconium oxide, and 4% lanthanum oxide. In some preferred embodiments, the micron-sized cerium oxide-containing material comprises $Ce_{0.35}Zr_{0.62}La_{0.044}Y_{0.06}O$. In some preferred embodiments, the micron-sized cerium oxide-containing material comprises a material that comprises about 40% cerium oxide, 50% zirconium oxide, 5% lanthanum oxide, and 5% yttrium oxide.

Exhaust Systems, Vehicles, and Emissions Performance

LNTs have utility in a number of fields including the treatment of exhaust gas streams from internal combustion engines such as automobile, truck, and other gasoline-fueled engines. Emission standards for unburned hydrocarbons, carbon monoxide and nitrogen oxide contaminants have been set by various governments and must be met by older, as well as new, vehicles. In order to meet such standards, catalytic converters containing an LNT system are located in the exhaust gas line of internal combustion engines. LNT systems first store, then reduce, nitrogen oxides to nitrogen.

In some embodiments, a coated substrate as disclosed herein is housed within a catalytic converter in a position configured to receive exhaust gas from an internal combustion engine, such as in an exhaust system of an internal combustion engine. The catalytic converter can be used with the exhaust from a gasoline engine. The catalytic converter can be installed on a vehicle containing a gasoline engine. The catalytic converter can be used with the exhaust from a diesel engine. The catalytic converter can be installed on a vehicle containing a diesel engine.

The coated substrate is placed into a housing, such as that shown in FIG. 1, which can in turn be placed into an exhaust system (also referred to as an exhaust treatment system) of an internal combustion engine. The internal combustion engine can be a gasoline engine or a diesel engine, such as a light-duty engine, such as the engine of a light-duty vehicle. The exhaust system of the internal combustion engine receives exhaust gases from the engine, typically into an exhaust manifold, and delivers the exhaust gases to an exhaust treatment system. The exhaust system can also include other components, such as oxygen sensors, HEGO (heated exhaust gas oxygen) sensors, UEGO (universal exhaust gas oxygen) sensors, sensors for other gases, and temperature sensors. The exhaust system can also include a controller such as an engine control unit (ECU), a microprocessor, or an engine management computer, which can adjust various parameters in the vehicle (fuel flow rate, fuel/air ratio, fuel injection, engine timing, valve timing, etc.) in order to optimize the components of the exhaust gases that reach the exhaust treatment system, so as to manage the emissions released into the environment.

"Treating" an exhaust gas, such as the exhaust gas from a gasoline or diesel engine, refers to having the exhaust gas proceed through an exhaust system (exhaust treatment system) prior to release into the environment.

When used in a catalytic converter, the substrates coated with the washcoat formulations including nano-on-nano-on-micro particles disclosed herein provide a significant improvement over other catalytic converters. The coated substrates may exhibit performance in converting hydrocarbons, carbon monoxide, and nitrogen oxides that is comparable to or better than present commercial coated substrates using wet chemistry techniques with the same or less loading of PGM. The coated substrates, catalytic converters, and exhaust treatment systems described herein are useful for any vehicle employing an LNT or NSC system.

Emissions limits for Europe are summarized at the URL europa.eu/legislation_summaries/environment/air_pollution/128186_en.htm. The Euro 6 emissions standards, scheduled for implementation as of September 2014, specify a limit of 500 mg/km of CO emissions, 80 mg/km of $NO_x$ emissions, and 170 mg/km of HC (hydrocarbon)+$NO_x$ emissions. The disclosed catalytic converter substrates can be used in an emission system to meet or exceed these standards.

In some embodiments, a catalytic converter made with a coated substrate of the invention, loaded with 4.0 g/L of PGM or less displays a carbon monoxide light-off temperature at least 5° C. lower than a catalytic converter made with wet chemistry methods and having the same or similar PGM loading. In some embodiments, a catalytic converter made with a coated substrate of the invention, loaded with 4.0 g/L of PGM or less, displays a carbon monoxide light-off temperature at least 10° C. lower than a catalytic converter made with wet chemistry methods and having the same or similar PGM loading. In some embodiments, a catalytic converter made with a coated substrate of the invention, loaded with 4.0 g/L of PGM or less, displays a carbon monoxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/L of PGM or less, displays a hydrocarbon light-off temperature at least 5° C. lower than a catalytic converter made with wet chemistry methods and having the same or similar PGM loading. In some embodiments, a catalytic converter made with a coated substrate of the invention, loaded with 4.0 g/L of PGM or less, displays a hydrocarbon light-off temperature at least 10° C. lower than a catalytic converter made with wet chemistry methods and having the same or similar PGM loading. In some embodiments, a catalytic converter made with a coated substrate of the invention, loaded with 4.0 g/L of PGM or less, displays a hydrocarbon light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 4.0 g/L of PGM or less, displays a nitrogen oxide light-off temperature at least 5° C. lower than a catalytic converter made with wet chemistry methods and having the same or similar PGM loading. In some embodiments, a catalytic converter made with a coated substrate of the invention, loaded with 4.0 g/L of PGM or less, displays a nitrogen oxide light-off temperature at least 10° C. lower than a catalytic converter made with wet chemistry methods and having the same or similar PGM loading. In some embodiments, a catalytic converter made with a coated substrate of the invention, loaded with 4.0 g/L of PGM or less, displays a nitrogen oxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/L of PGM or less, displays a carbon monoxide light-off temperature at least 5° C. lower than a catalytic converter made with wet chemistry methods and having the same or similar PGM loading. In some embodiments, a catalytic converter made with a coated substrate of the invention, loaded with 3.0 g/L of PGM or less, displays a carbon monoxide light-off temperature at least 10° C. lower than a catalytic converter made with wet chemistry methods and having the same or similar PGM loading. In some embodiments, a catalytic converter made with a coated substrate of the invention, loaded with 3.0 g/L of PGM or less, displays a carbon monoxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/L of PGM or less, displays a hydrocarbon light-off temperature at least 5° C. lower than a catalytic converter made with wet chemistry methods and having the same or similar PGM loading. In some embodiments, a catalytic converter made with a coated substrate of the invention, loaded with 3.0 g/L of PGM or less, displays a hydrocarbon light-off temperature at least 10° C. lower than a catalytic converter made with wet chemistry methods and having the same or similar PGM loading. In some embodiments, a catalytic converter made with a coated substrate of the invention, loaded with 3.0 g/L of PGM or less, displays a hydrocarbon light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention, loaded with 3.0 g/L of PGM or less, displays a nitrogen oxide light-off temperature at least 5° C. lower than a catalytic converter made with wet chemistry methods and having the same or similar PGM loading. In some embodiments, a catalytic converter made with a coated substrate of the invention, loaded with 3.0 g/L of PGM or less, displays a nitrogen oxide light-off temperature at least 10° C. lower than a catalytic converter made with wet chemistry methods and having the same or similar PGM loading. In some embodiments, a catalytic converter made with a coated substrate of the invention, loaded with 3.0 g/L of PGM or less, displays a nitrogen oxide light-off temperature at least 15° C. lower than a catalytic converter made with wet chemistry methods and having the same or similar PGM loading. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±2° C. of the carbon monoxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±1° C. of the carbon monoxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±2° C. of the hydrocarbon light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±1° C. of the hydrocarbon light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±2° C. of the nitrogen oxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention displays a carbon monoxide light-off temperature within ±4° C. of the nitrogen oxide light-off temperature of a catalytic converter made with wet chemistry methods, while the catalytic converter made with a coated substrate employing about 30 to 40% less catalyst than the catalytic converter made with wet chemistry methods. In some embodiments, the catalytic converter made with a coated substrate of the invention demonstrates this performance after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle complies with United States EPA emissions requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with the same standard. In some embodiments, the coated substrate is used in a catalytic converter to meet or exceed these standards. The emissions requirements can be intermediate life requirements or full life requirements. The requirements can be TLEV requirements, LEV requirements, or ULEV requirements. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle complies with EPA TLEV/LEV intermediate life requirements. In some embodiments, a catalytic converter made with a coated substrate of the invention employed on a gasoline engine or gasoline vehicle complies with EPA TLEV/LEV full life requirements. In some embodiments, a catalytic converter made with a coated substrate of the invention employed on a gasoline engine or gasoline vehicle complies with EPA ULEV intermediate life requirements. In some embodiments, a catalytic converter made with a coated substrate of the invention employed on a gasoline engine or gasoline vehicle complies with EPA ULEV full life requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a gasoline engine or gasoline vehicle complies with EPA TLEV/LEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA TLEV/LEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA ULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA ULEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA SULEV intermediate life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, a catalytic converter made with a coated substrate of the invention employed on a gasoline engine or gasoline vehicle complies with EPA SULEV full life requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with that standard. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter). In some embodiments, the requirements above are those for light duty vehicles. In some embodiments, the requirements above are those for light duty trucks. In some embodiments, the requirements above are those for medium duty vehicles.

In some embodiments, a catalytic converter made with a coated substrate of the invention employed on a gasoline engine or gasoline vehicle complies with Euro 6 requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention employed on a gasoline engine or gasoline vehicle complies with Euro 6 requirements, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which complies with Euro 6 requirements. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention employed on a gasoline engine or gasoline vehicle displays carbon monoxide emissions of 4200 mg/mile or less. In some embodiments, a catalytic converter made with a coated substrate of the invention and employed on a gasoline engine or gasoline vehicle displays carbon monoxide emissions of 3400 mg/mile or less. In some embodiments, a catalytic converter made with a coated substrate of the invention and employed on a gasoline engine or gasoline vehicle displays carbon monoxide emissions of 2100 mg/mile or less. In another embodiment, a catalytic converter made with a coated substrate of the invention and employed on a gasoline engine or gasoline vehicle displays carbon monoxide emissions of 1700 mg/mile or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a gasoline engine or gasoline vehicle displays carbon monoxide emissions of 500 mg/km or less. In some embodiments, a catalytic converter made with a coated substrate of the invention and employed on a gasoline engine or gasoline vehicle displays carbon monoxide emissions of 375 mg/km or less. In some embodiments, a catalytic converter made with a coated substrate of the invention and employed on a gasoline engine or gasoline vehicle displays carbon monoxide emissions of 250 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a gasoline engine or gasoline vehicle displays $NO_x$ emissions of 180 mg/km or less. In some embodiments, a catalytic converter made with a coated substrate of the invention and employed on a gasoline engine or gasoline vehicle displays $NO_x$ emissions of 80 mg/km or less. In some embodiments, a catalytic converter made with a coated substrate of the invention and employed on a gasoline engine or gasoline vehicle displays $NO_x$ emissions of 40 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate of the invention and employed on a gasoline engine or gasoline vehicle displays $NO_x$ plus HC emissions of 230 mg/km or less. In some embodiments, a catalytic converter made with a coated substrate of the invention and employed on a gasoline engine or gasoline vehicle displays $NO_x$ plus HC emissions of 170 mg/km or less. In some embodiments, a catalytic converter made with a coated substrate of the invention and employed on a gasoline engine or gasoline vehicle displays $NO_x$ plus HC emissions of 85 mg/km or less. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation.

In some embodiments, a catalytic converter made with a coated substrate and employed on a gasoline engine or gasoline vehicle displays carbon monoxide emissions of 500 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays carbon monoxide emissions of 375 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays carbon monoxide emissions of 250 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a gasoline engine or gasoline vehicle displays $NO_x$ emissions of 180 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ emissions of 80 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ emissions of 40 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, a catalytic converter made with a coated substrate of the invention and employed on a gasoline engine or gasoline vehicle displays $NO_x$ plus HC emissions of 230 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ plus HC emissions of 170 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, a catalytic converter made with a coated substrate of the invention and employed on a gasoline engine or gasoline vehicle displays $NO_x$ plus HC emissions of 85 mg/km or less, while using at least about 30% less, up to about 30% less, at least about 40% less, up to about 40% less, at least about 50% less, or up to about 50% less, platinum group metal or platinum group metal loading, as compared to a catalytic converter made with wet chemistry methods which displays the same or similar emissions. In some embodiments, the coated substrate is used in a catalytic converter to meet or exceed these standards. In some embodiments, the catalytic converter made with a coated substrate of the invention demonstrates any of the foregoing performance standards after about 50,000 km, about 50,000 miles, about 75,000 km, about 75,000 miles, about 100,000 km, about 100,000 miles, about 125,000 km, about 125,000 miles, about 150,000 km, or about 150,000 miles of operation (for both the catalytic converter made with a coated substrate of the invention and the comparative catalytic converter).

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a gasoline engine or gasoline vehicle), or 2) a catalytic converter made with wet chemistry, which uses the minimal amount of platinum group metal to achieve the performance standard indicated.

In some embodiments, for the above-described comparisons, both the coated substrate according to the invention, and the catalyst used in the commercially available catalytic converter or the catalyst prepared using wet chemistry methods, are aged (by the same amount) prior to testing. In some embodiments, both the coated substrate according to the invention, and the catalyst substrate used in the commercially available catalytic converter or the catalyst substrate prepared using wet chemistry methods, are aged to about (or up to about) 50,000 kilometers, about (or up to about) 50,000 miles, about (or up to about) 75,000 kilometers, about (or up to about) 75,000 miles, about (or up to about) 100,000 kilometers, about (or up to about) 100,000 miles, about (or up to about) 125,000 kilometers, about (or up to about) 125,000 miles, about (or up to about) 150,000 kilometers, or about (or up to about) 150,000 miles. In some embodiments, for the above-described comparisons, both the coated substrate according to the invention, and the catalyst substrate used in the commercially available catalytic converter or the catalyst substrate prepared using wet chemistry methods, are artificially aged (by the same amount) prior to testing. In some embodiments, they are artificially aged by heating to about 400° C., about 500° C., about 600° C., about 700° C., about 800° C., about 900° C., about 1000° C., about 1100° C., or about 1200° C. for about (or up to about) 4 hours, about (or up to about) 6 hours, about (or up to about) 8 hours, about (or up to about) 10 hours, about (or up to about) 12 hours, about (or up to about) 14 hours, about (or up to about) 16 hours, about (or up to about) 18 hours, about (or up to about) 20 hours, about (or up to about) 22 hours, or about (or up to about) 24 hours, or about (or up to about) 50 hours In some embodiments, they are artificially aged by heating to about 800° C. for about 16 hours.

In some embodiments, for the above-described comparisons, the thrifting (reduction) of platinum group metal for the catalytic converters made with substrates of the invention is compared with either 1) a commercially available catalytic converter, made using wet chemistry, for the application disclosed (e.g., for use on a gasoline engine or gasoline vehicle), or 2) a catalytic converter made with wet chemistry, which uses the minimal amount of platinum group metal to achieve the performance standard indicated, and after the coated substrate according to the invention and the catalytic substrate used in the commercially available catalyst or catalyst made using wet chemistry with the minimal amount of PGM to achieve the performance standard indicated are aged as described above.

In some embodiments, for the above-described catalytic converters employing the coated substrates of the invention, for the exhaust treatment systems using catalytic converters employing the coated substrates of the invention, and for vehicles employing these catalytic converters and exhaust treatment systems, the catalytic converter is employed as a diesel oxidation catalyst along with a diesel particulate filter, or the catalytic converter is employed as a diesel oxidation catalyst along with a diesel particulate filter and a selective catalytic reduction unit, to meet or exceed the standards for CO and/or $NO_x$, and/or HC described above.

EXEMPLARY EMBODIMENTS

The invention is further described by the following embodiments. The features of each of the embodiments are combinable with any of the other embodiments where appropriate and practical.

Embodiment 1. A coated substrate comprising: a substrate; a washcoat layer comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; and a washcoat layer comprising reductive catalytically active Nano-on-Nano-on-micro (NNm) particles and $NO_x$ trapping particles, the reductive catalytically active Nano-on-Nano-on-micro (NNm) particles comprising composite nanoparticles bonded to a second micron-sized carrier particle, the composite nanoparticles comprising a second support nanoparticle and a reductive catalytic nanoparticle, and the $NO_x$ trapping particles comprising micron-sized cerium oxide.

Embodiment 2. The coated substrate of embodiment 1, wherein the $NO_x$ trapping particles further comprise barium oxide impregnated in the micron-sized cerium oxide.

Embodiment 3. The coated substrate of embodiment 1 or 2, wherein the $NO_x$ trapping particles further comprise platinum and palladium impregnated in the micron-sized cerium oxide.

Embodiment 4. The coated substrate of embodiment 2, wherein the barium oxide is plasma-generated.

Embodiment 5. The coated substrate of embodiment 2, wherein the barium oxide is impregnated in the micron-sized cerium oxide by wet chemistry.

Embodiment 6. The coated substrate of embodiment 3, wherein the platinum and palladium are plasma-generated.

Embodiment 7. The coated substrate of embodiment 3, wherein the platinum and palladium are impregnated in the micron-sized cerium oxide by wet chemistry.

Embodiment 8. The coated substrate of embodiment 1, wherein the $NO_x$ trapping particles further comprise the perovskite $FeBaO_3$ impregnated in the micron-sized cerium oxide.

Embodiment 9. The coated substrate of embodiment 1, wherein the $NO_x$ trapping particles further comprise metal oxides selected from the group consisting of samarium, zinc, copper, iron, and silver impregnated in the micron-sized cerium oxide.

Embodiment 10. The coated substrate of embodiment 8 or 9, wherein the $NO_x$ trapping particles are prepared by wet chemistry.

Embodiment 11. The coated substrate of any one of embodiments 8-10, wherein the $NO_x$ trapping particles further comprise barium oxide impregnated in the micron-sized cerium oxide.

Embodiment 12. The coated substrate of embodiment 1, wherein the $NO_x$ trapping particles further comprise micron-sized aluminum oxide particles.

Embodiment 13. The coated substrate of embodiment 12, wherein the micron-sized aluminum oxide particles are Nano-on-Nano-on-micro (NNm) particles.

Embodiment 14. The coated substrate of embodiment 13, wherein the Nano-on-Nano-on-micro (NNm) particles comprise platinum and/or palladium.

Embodiment 15. The coated substrate of embodiment 12, wherein the Nano-on-Nano-on-micro (NNm) particles comprise a non-platinum group metal.

Embodiment 16. The coated substrate of embodiment 15, wherein the non-platinum group metal is selected from the group consisting of tungsten, molybdenum, niobium, manganese, and chromium.

Embodiment 17. The coated substrate of any one of embodiments 12-16, further comprising barium oxide impregnated in the micron-sized cerium oxide particles.

Embodiment 18. The coated substrate of any one of embodiments 14-17, wherein the Nano-on-Nano-on-micro (NNm) particles further comprise barium oxide impregnated in the NNm particles.

Embodiment 19. The coated substrate of embodiment 17 or 18, wherein the barium oxide is impregnated by wet chemistry.

Embodiment 20. The coated substrate of any one of embodiments 1-19, wherein the composite nanoparticles are plasma-generated.

Embodiment 21. The coated substrate of any one of embodiments 1-20, wherein the oxidative catalytically active Nano-on-Nano-on-micro (NNm) particles comprise at least one platinum group metal.

Embodiment 22. The coated substrate of any one of embodiments 1-21, wherein the oxidative catalytically active Nano-on-Nano-on-micro (NNm) particles comprise platinum.

Embodiment 23. The coated substrate of any one of embodiments 1-21, wherein the oxidative catalytically active Nano-on-Nano-on-micro (NNm) particles comprise palladium.

Embodiment 24. The coated substrate of any one of embodiments 1-23, wherein the oxidative catalytically active Nano-on-Nano-on-micro (NNm) particles comprise platinum and palladium.

Embodiment 25. The coated substrate of any one of embodiments 1-24, wherein the first support nanoparticle comprises aluminum oxide.

Embodiment 26. The coated substrate of any one of embodiments 1-25, wherein the second support nanoparticle comprises cerium oxide.

Embodiment 27. The coated substrate of any one of embodiments 1-26, wherein the first micron-sized carrier particle comprises aluminum oxide.

Embodiment 28. The coated substrate of any one of embodiments 1-27, wherein the second micron-sized carrier particle comprises cerium oxide.

Embodiment 29. The coated substrate of any one of embodiments 1-28, wherein the reductive catalytically active Nano-on-Nano-on-micro (NNm) particles comprise a platinum group metal.

Embodiment 30. The coated substrate of embodiment 29, wherein the platinum group metal is rhodium.

Embodiment 31. The coated substrate of any one of embodiments 1-30, wherein the $NO_x$ trapping particles comprising micron-sized cerium oxide further comprise zirconium oxide.

Embodiment 32. The coated substrate of any one of embodiments 1-31, wherein the support nanoparticles have an average diameter of about 10 nm to about 20 nm.

Embodiment 33. The coated substrate of any one of embodiments 1-31, wherein the support nanoparticles have an average diameter of about 1 nm to about 5 nm.

Embodiment 34. The coated substrate of any one of embodiments 1-33, wherein the washcoat layer comprising oxidative catalytically active Nano-on-Nano-on-micro (NNm) particles further comprises metal oxide particles and boehmite particles.

Embodiment 35. The coated substrate of embodiment 34, wherein the metal oxide particles are aluminum oxide particles.

Embodiment 36. The coated substrate of embodiment 35, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 37. The coated substrate of embodiment 35 or 36, wherein the aluminum oxide particles comprise 30% to 70% by weight of the combination of the oxidative catalytically active Nano-on-Nano-on-micro (NNm) particles, boehmite particles, and aluminum oxide particles.

Embodiment 38. The coated substrate of any one of embodiments 35-37, wherein the boehmite particles comprise 2% to 5% by weight of the combination of the oxidative catalytically active Nano-on-Nano-on-micro (NNm) particles, boehmite particles, and aluminum oxide particles.

Embodiment 39. The coated substrate of embodiment 35, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 40. The coated substrate of any one of embodiments 1-39, wherein the washcoat layer comprising reductive catalytically active Nano-on-Nano-on-micro (NNm) particles and $NO_x$ trapping particles further comprises boehmite.

Embodiment 41. The coated substrate of embodiment 40, wherein the reductive catalytically active Nano-on-Nano-on-micro (NNm) particles comprise 3% to 40% by weight of the combination of the reductive catalytically active Nano-on-Nano-on-micro (NNm) particles, $NO_x$ trapping particles, and boehmite particles.

Embodiment 42. The coated substrate of embodiment 40 or 41, wherein the $NO_x$ trapping particles comprise 30% to 98% by weight of the combination of the reductive catalytically active Nano-on-Nano-on-micro (NNm) particles, $NO_x$ trapping particles, and boehmite particles.

Embodiment 43. The coated substrate of any one of embodiments 40-42, wherein the boehmite particles comprise 1% to 5% by weight of the combination of the reductive catalytically active Nano-on-Nano-on-micro (NNm) particles, $NO_x$ trapping particles, and boehmite particles.

Embodiment 44. The coated substrate of embodiment 40, wherein the washcoat layer comprising reductive catalytically active Nano-on-Nano-on-micro (NNm) particles and $NO_x$ trapping particles comprises 15% by weight of the reductive catalytically active Nano-on-Nano-on-micro (NNm) particles, 83% by weight of the $NO_x$ trapping particles, and 2% by weight of the boehmite particles.

Embodiment 45. The coated substrate of any one of embodiments 1-44, wherein the substrate comprises cordierite.

Embodiment 46. The coated substrate of any one of embodiments 1-45, wherein the substrate comprises a honeycomb structure.

Embodiment 47. The coated substrate of any one of embodiments 1-46, wherein the washcoat layer comprising oxidative catalytically active Nano-on-Nano-on-micro (NNm) particles has a thickness of 25 g/L to 150 g/L.

Embodiment 48. The coated substrate of any one of embodiments 1-47, wherein the washcoat layer comprising reductive catalytically active Nano-on-Nano-on-micro (NNm) particles and $NO_x$ trapping particles has a thickness of 100 g/L to 400 g/L.

Embodiment 49. The coated substrate of any one of embodiments 1-48, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 50. The coated substrate of any one of embodiments 1-49, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 51. The coated substrate of any one of embodiments 1-50, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 52. A catalytic converter comprising a coated substrate of any one of embodiments 1-51.

Embodiment 53. An exhaust treatment system comprising a conduit for exhaust gas and a catalytic converter according to embodiment 52.

Embodiment 54. A vehicle comprising a catalytic converter according to embodiment 52.

Embodiment 55. A method of treating an exhaust gas, comprising contacting the coated substrate of any one of embodiments 1-51 with the exhaust gas.

Embodiment 56. A method of treating an exhaust gas, comprising contacting the coated substrate of any one of embodiments 1-51 with the exhaust gas, wherein the substrate is housed within a catalytic converter configured to receive the exhaust gas.

Embodiment 57. A coated substrate comprising: a substrate; a washcoat layer comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; and a washcoat layer comprising reductive catalytically active Nano-on-Nano-in-Micro (NNiM) particles and $NO_x$ trapping particles, the reductive catalytically active Nano-on-Nano-in-Micro (NNiM) particles comprising composite nanoparticles embedded in a second micron-sized porous carrier, the composite nanoparticles comprising a second support nanoparticle and a reductive catalytic nanoparticle, and the $NO_x$ trapping particles comprising micron-sized cerium oxide.

Embodiment 58. The coated substrate of embodiment 57, wherein the $NO_x$ trapping particles further comprise barium oxide impregnated in the micron-sized cerium oxide.

Embodiment 59. The coated substrate of embodiment 57 or 58, wherein the $NO_x$ trapping particles further comprise platinum and palladium impregnated in the micron-sized cerium oxide.

Embodiment 60. The coated substrate of embodiment 58, wherein the barium oxide is plasma-generated.

Embodiment 61. The coated substrate of embodiment 58, wherein the barium oxide is impregnated in the micron-sized cerium oxide by wet chemistry.

Embodiment 62. The coated substrate of embodiment 59, wherein the platinum and palladium are plasma-generated.

Embodiment 63. The coated substrate of embodiment 59, wherein the platinum and palladium are impregnated in the micron-sized cerium oxide by wet chemistry.

Embodiment 64. The coated substrate of embodiment 57, wherein the $NO_x$ trapping particles further comprise the perovskite $FeBaO_3$ impregnated in the micron-sized cerium oxide.

Embodiment 65. The coated substrate of embodiment 57, wherein the $NO_x$ trapping particles further comprise metal oxides selected from the group consisting of samarium, zinc, copper, iron, and silver impregnated in the micron-sized cerium oxide.

Embodiment 66. The coated substrate of embodiment 64 or 65, wherein the $NO_x$ trapping particles are prepared by wet chemistry.

Embodiment 67. The coated substrate of any one of embodiments 64-66, wherein the $NO_x$ trapping particles further comprise barium oxide impregnated in the micron-sized cerium oxide.

Embodiment 68. The coated substrate of embodiment 57, wherein the $NO_x$ trapping particles further comprise micron-sized aluminum oxide particles.

Embodiment 69. The coated substrate of embodiment 68, wherein the micron-sized aluminum oxide particles are Nano-on-Nano-in-micro (NNiM) particles.

Embodiment 70. The coated substrate of embodiment 69, wherein the Nano-on-Nano-in-Micro (NNiM) particles comprise platinum and/or palladium.

Embodiment 71. The coated substrate of embodiment 68, wherein the Nano-on-Nano-in-Micro (NNiM) particles comprise a non-platinum group metal.

Embodiment 72. The coated substrate of embodiment 71, wherein the non-platinum group metal is selected from the group consisting of tungsten, molybdenum, niobium, manganese, and chromium.

Embodiment 73. The coated substrate of any one of embodiments 68-72, further comprising barium oxide impregnated in the micron-sized cerium oxide particles.

Embodiment 74. The coated substrate of any one of embodiments 68-73, wherein the Nano-on-Nano-in-Micro (NNiM) particles further comprise barium oxide impregnated in the NNm particles.

Embodiment 75. The coated substrate of embodiment 73 or 74, wherein the barium oxide is impregnated by wet chemistry.

Embodiment 76. The coated substrate of any one of embodiments 57-75, wherein the composite nanoparticles are plasma-generated.

Embodiment 77. The coated substrate of any one of embodiments 57-76, wherein the oxidative catalytically active Nano-on-Nano-in-Micro (NNiM) particles comprise at least one platinum group metal.

Embodiment 78. The coated substrate of any one of embodiments 57-77, wherein the oxidative catalytically active Nano-on-Nano-in-Micro (NNiM) particles comprise platinum.

Embodiment 79. The coated substrate of any one of embodiments 57-77, wherein the oxidative catalytically active Nano-on-Nano-in-Micro (NNiM) particles comprise palladium.

Embodiment 80. The coated substrate of any one of embodiments 57-75, wherein the oxidative catalytically active Nano-on-Nano-in-Micro (NNiM) particles comprise platinum and palladium.

Embodiment 81. The coated substrate of any one of embodiments 57-80, wherein the first support nanoparticle comprises aluminum oxide.

Embodiment 82. The coated substrate of any one of embodiments 57-81, wherein the second support nanoparticle comprises cerium oxide.

Embodiment 83. The coated substrate of any one of embodiments 57-82, wherein the first micron-sized carrier particle comprises aluminum oxide.

Embodiment 84. The coated substrate of any one of embodiments 57-83, wherein the second micron-sized carrier particle comprises cerium oxide.

Embodiment 85. The coated substrate of any one of embodiments 57-84, wherein the reductive catalytically active Nano-on-Nano-in-Micro (NNiM) particles comprise a platinum group metal.

Embodiment 86. The coated substrate of embodiment 85, wherein the platinum group metal is rhodium.

Embodiment 87. The coated substrate of any one of embodiments 57-86, wherein the $NO_x$ trapping particles comprising micron-sized cerium oxide further comprise zirconium oxide.

Embodiment 88. The coated substrate of any one of embodiments 57-87, wherein the support nanoparticles have an average diameter of about 10 nm to about 20 nm.

Embodiment 89. The coated substrate of any one of embodiments 57-87, wherein the support nanoparticles have an average diameter of about 1 nm to about 5 nm.

Embodiment 90. The coated substrate of any one of embodiments 57-89, wherein the washcoat layer comprising oxidative catalytically active Nano-on-Nano-in-Micro (NNiM) particles further comprises metal oxide particles and boehmite particles.

Embodiment 91. The coated substrate of embodiment 90, wherein the metal oxide particles are aluminum oxide particles.

Embodiment 92. The coated substrate of embodiment 91, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 93. The coated substrate of embodiment 91 or 92, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 94. The coated substrate of any one of embodiments 91-93, wherein the boehmite particles comprise 2% to 5% by weight of the combination of the oxidative catalytically active Nano-on-Nano-in-Micro (NNiM) particles, boehmite particles, and aluminum oxide particles.

Embodiment 95. The coated substrate of embodiment 91, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 96. The coated substrate of any one of embodiments 57-95, wherein the washcoat layer comprising reductive catalytically active Nano-on-Nano-in-Micro (NNiM) particles and $NO_x$ trapping particles further comprises boehmite.

Embodiment 97. The coated substrate of embodiment 96, wherein the reductive catalytically active Nano-on-Nano-in-Micro (NNiM) particles comprise 3% to 40% by weight of the combination of the reductive catalytically active Nano-on-Nano-in-Micro (NNiM) particles, $NO_x$ trapping particles, and boehmite particles.

Embodiment 98. The coated substrate of embodiment 96 or 97, wherein the $NO_x$ trapping particles comprise 30% to 98% by weight of the combination of the reductive catalytically active Nano-on-Nano-in-Micro (NNiM) particles, $NO_x$ trapping particles, and boehmite particles.

Embodiment 99. The coated substrate of any one of embodiments 96-98, wherein the boehmite particles comprise 1% to 5% by weight of the combination of the reductive catalytically active Nano-on-Nano-in-Micro (NNiM) particles, $NO_x$ trapping particles, and boehmite particles.

Embodiment 100. The coated substrate of embodiment 96, wherein the washcoat layer comprising reductive catalytically active Nano-on-Nano-in-Micro (NNiM) particles and $NO_x$ trapping particles comprises 15% by weight of the reductive catalytically active Nano-on-Nano-in-Micro (NNiM) particles, 83% by weight of the $NO_x$ trapping particles, and 2% by weight of the boehmite particles.

Embodiment 101. The coated substrate of any one of embodiments 57-100, wherein the substrate comprises cordierite.

Embodiment 102. The coated substrate of any one of embodiments 57-101, wherein the substrate comprises a honeycomb structure.

Embodiment 103. The coated substrate of any one of embodiments 57-102, wherein the washcoat layer comprising oxidative catalytically active Nano-on-Nano-in-Micro (NNiM) particles has a thickness of 25 g/L to 150 g/L.

Embodiment 104. The coated substrate of any one of embodiments 57-103, wherein the washcoat layer comprising reductive catalytically active Nano-on-Nano-in-Micro (NNiM) particles and $NO_x$ trapping particles has a thickness of 100 g/L to 400 g/L.

Embodiment 105. The coated substrate of any one of embodiments 57-104, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 106. The coated substrate of any one of embodiments 57-105, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 107. The coated substrate of any one of embodiments 57-106, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 108. A catalytic converter comprising a coated substrate of any one of embodiments 57-107.

Embodiment 109. An exhaust treatment system comprising a conduit for exhaust gas and a catalytic converter according to embodiment 108.

Embodiment 110. A vehicle comprising a catalytic converter according to embodiment 108.

Embodiment 111. A method of treating an exhaust gas, comprising contacting the coated substrate of any one of embodiments 57-107 with the exhaust gas.

Embodiment 112. A method of treating an exhaust gas, comprising contacting the coated substrate of any one of embodiments 57-107 with the exhaust gas, wherein the substrate is housed within a catalytic converter configured to receive the exhaust gas.

Embodiment 113. A coated substrate comprising: a substrate; a washcoat layer comprising oxidative catalytically active composite nanoparticles attached to a first micron-sized support particle, the oxidative catalytically active composite nanoparticles being plasma-generated and comprising a first support nanoparticle and an oxidative catalytic nanoparticle; and a washcoat layer comprising $NO_x$ trapping particles and reductive catalytically active composite nanoparticles attached to a second micron-sized support particle, the reductive catalytically active composite nanoparticles being plasma-generated and comprising a second support nanoparticle and a reductive catalytic nanoparticle, and the $NO_x$ trapping particles comprising micron-sized cerium oxide.

Embodiment 114. The coated substrate of embodiment 113, wherein the $NO_x$ trapping particles further comprise barium oxide impregnated in the micron-sized cerium oxide.

Embodiment 115. The coated substrate of embodiment 113 or 114, wherein the $NO_x$ trapping particles further comprise platinum and palladium impregnated in the micron-sized cerium oxide.

Embodiment 116. The coated substrate of embodiment 114, wherein the barium oxide is plasma-generated.

Embodiment 117. The coated substrate of embodiment 114, wherein the barium oxide is impregnated in the micron-sized cerium oxide by wet chemistry.

Embodiment 118. The coated substrate of embodiment 115, wherein the platinum and palladium are plasma-generated.

Embodiment 119. The coated substrate of embodiment 115, wherein the platinum and palladium are impregnated in the micron-sized cerium oxide by wet chemistry.

Embodiment 120. The coated substrate of embodiment 113, wherein the $NO_x$ trapping particles further comprise the perovskite $FeBaO_3$ impregnated in the micron-sized cerium oxide.

Embodiment 121. The coated substrate of embodiment 113, wherein the $NO_x$ trapping particles further comprise metal oxides selected from the group consisting of samarium, zinc, copper, iron, and silver impregnated in the micron-sized cerium oxide.

Embodiment 122. The coated substrate of embodiment 120 or 121, wherein the $NO_x$ trapping particles are prepared by wet chemistry.

Embodiment 123. The coated substrate of any one of embodiments 120-122, wherein the $NO_x$ trapping particles further comprise barium oxide impregnated in the micron-sized cerium oxide.

Embodiment 124. The coated substrate of embodiment 113, wherein the $NO_x$ trapping particles further comprise micron-sized aluminum oxide particles.

Embodiment 125. The coated substrate of embodiment 124, wherein the micron-sized aluminum oxide particles are Nano-on-Nano-on-micro (NNm) particles or Nano-on-Nano-in-Micro (NNiM) particles.

Embodiment 126. The coated substrate of embodiment 125, wherein the Nano-on-Nano-on-micro (NNm) particles or Nano-on-Nano-in-Micro (NNiM) particles comprise platinum and/or palladium.

Embodiment 127. The coated substrate of embodiment 124, wherein the Nano-on-Nano-on-micro (NNm) particles comprise a non-platinum group metal.

Embodiment 128. The coated substrate of embodiment 127, wherein the non-platinum group metal is selected from the group consisting of tungsten, molybdenum, niobium, manganese, and chromium.

Embodiment 129. The coated substrate of any one of embodiments 124-128, further comprising barium oxide impregnated in the micron-sized cerium oxide particle.

Embodiment 130. The coated substrate of any one of embodiments 124-129, wherein the Nano-on-Nano-on-micro (NNm) particles or Nano-on-Nano-in-Micro (NNiM) particles further comprise barium oxide impregnated in the NNm or NNiM particles.

Embodiment 131. The coated substrate of embodiment 129 or 130, wherein the barium oxide is impregnated by wet chemistry.

Embodiment 132. The coated substrate of embodiment any one of embodiments 113-131, wherein the oxidative catalytically active composite nanoparticles attached to a first micron-sized support particle comprise oxidative catalytically active Nano-on-Nano-on-micro (NNm) particles.

Embodiment 133. The coated substrate of embodiment 113-131, wherein the oxidative catalytically active composite nanoparticles attached to a first micron-sized support particle comprise oxidative catalytically active Nano-on-Nano-in-Micro (NNiM) particles.

Embodiment 134. The coated substrate of any one of embodiments 113-133, wherein the oxidative catalytically active composite nanoparticles comprise at least one platinum group metal.

Embodiment 135. The coated substrate of any one of embodiment 113-134, wherein the oxidative catalytically active composite nanoparticles comprise platinum.

Embodiment 136. The coated substrate of any one of embodiment 113-134, wherein the oxidative catalytically active composite nanoparticles comprise palladium.

Embodiment 137. The coated substrate of any one of embodiments 113-136, wherein the oxidative catalytically active composite nanoparticles comprise platinum and palladium.

Embodiment 138. The coated substrate of any one of embodiments 113-137, wherein the first support nanoparticle comprises aluminum oxide.

Embodiment 139. The coated substrate of any one of embodiments 113-138, wherein the second support nanoparticle comprises cerium oxide.

Embodiment 140. The coated substrate of any one of embodiments 113-139, wherein the first micron-sized support particle comprises aluminum oxide.

Embodiment 141. The coated substrate of any one of embodiments 113-140, wherein the second micron-sized support particle comprises cerium oxide.

Embodiment 142. The coated substrate of any one of embodiments 113-141, wherein the reductive catalytically active composite nanoparticles comprise reductive catalytically active Nano-on-Nano-on-micro (NNm) particles.

Embodiment 143. The coated substrate of embodiment 142, wherein the reductive catalytically active Nano-on-Nano-on-micro (NNm) particles comprise a platinum group metal.

Embodiment 144. The coated substrate of any one of embodiments 113-141, wherein the reductive catalytically active composite nanoparticles comprise reductive catalytically active Nano-on-Nano-in-Micro (NNiM) particles.

Embodiment 145. The coated substrate of embodiment 144, wherein the reductive catalytically active Nano-on-Nano-in-Micro (NNiM) particles comprise a platinum group metal.

Embodiment 146. The coated substrate of embodiment 143 or 145, wherein the platinum group metal is rhodium.

Embodiment 147. The coated substrate of any one of embodiments 113-146, wherein the $NO_x$ trapping particles further comprise zirconium oxide.

Embodiment 148. The coated substrate of any one of embodiments 113-147, wherein the support nanoparticles have an average diameter of about 10 nm to about 20 nm.

Embodiment 149. The coated substrate of any one of embodiments 113-147, wherein the support nanoparticles have an average diameter of about 1 nm to about 5 nm.

Embodiment 150. The coated substrate of embodiment 132, wherein the washcoat layer comprising oxidative catalytically active Nano-on-Nano-on-micro (NNm) particles further comprises metal oxide particles and boehmite particles.

Embodiment 151. The coated substrate of embodiment 150, wherein the metal oxide particles are aluminum oxide particles.

Embodiment 152. The coated substrate of embodiment 151, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 153. The coated substrate of embodiment 151 or 152, wherein the aluminum oxide particles comprise 30% to 70% by weight of the combination of the oxidative catalytically active Nano-on-Nano-on-micro (NNm) particles, boehmite particles, and aluminum oxide particles.

Embodiment 154. The coated substrate of any one of embodiments 151-153, wherein the boehmite particles comprise 2% to 5% by weight of the combination of the oxidative catalytically active Nano-on-Nano-on-micro (NNm) particles, boehmite particles, and aluminum oxide particles.

Embodiment 155. The coated substrate of embodiment 151, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 156. The coated substrate of embodiment 133, wherein the washcoat layer comprising oxidative catalytically active Nano-on-Nano-in-Micro (NNiM) particles further comprises metal oxide particles and boehmite particles.

Embodiment 157. The coated substrate of embodiment 156, wherein the metal oxide particles are aluminum oxide particles.

Embodiment 158. The coated substrate of embodiment 157, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 159. The coated substrate of embodiment 157 or 158, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 160. The coated substrate of any one of embodiments 157-159, wherein the boehmite particles comprise 2% to 5% by weight of the combination of the oxidative catalytically active Nano-on-Nano-in-Micro (NNiM) particles, boehmite particles, and aluminum oxide particles.

Embodiment 161. The coated substrate of embodiment 157, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 162. The coated substrate of embodiment 142, wherein the washcoat layer comprising reductive catalytically active Nano-on-Nano-on-micro (NNm) particles and $NO_x$ trapping particles further comprises boehmite.

Embodiment 163. The coated substrate of embodiment 162, wherein the reductive catalytically active Nano-on-Nano-on-micro (NNm) particles comprise 3% to 40% by weight of the combination of the reductive catalytically active Nano-on-Nano-on-micro (NNm) particles, $NO_x$ trapping particles, and boehmite particles.

Embodiment 164. The coated substrate of embodiment 162 or 163, wherein the $NO_x$ trapping particles comprise 30% to 98% by weight of the combination of the reductive catalytically active Nano-on-Nano-on-micro (NNm) particles, $NO_x$ trapping particles, and boehmite particles.

Embodiment 165. The coated substrate of any one of embodiments 162-164, wherein the boehmite particles comprise 1% to 5% by weight of the combination of the reductive catalytically active Nano-on-Nano-on-micro (NNm) particles, $NO_x$ trapping particles, and boehmite particles.

Embodiment 166. The coated substrate of embodiment 162, wherein the washcoat layer comprising reductive catalytically active Nano-on-Nano-on-micro (NNm) particles and $NO_x$ trapping particles comprises 15% by weight of the reductive catalytically active Nano-on-Nano-on-micro (NNm) particles, 83% by weight of the $NO_x$ trapping particles, and 2% by weight of the boehmite particles.

Embodiment 167. The coated substrate of embodiment 144, wherein the washcoat layer comprising reductive catalytically active Nano-on-Nano-in-Micro (NNiM) particles and $NO_x$ trapping particles further comprises boehmite.

Embodiment 168. The coated substrate of embodiment 167, wherein the reductive catalytically active Nano-on-Nano-in-Micro (NNiM) particles comprise 3% to 40% by weight of the combination of the reductive catalytically active Nano-on-Nano-in-Micro (NNiM) particles, $NO_x$ trapping particles, and boehmite particles.

Embodiment 169. The coated substrate of embodiment 167 or 168, wherein the cerium oxide particles comprise 30% to 98% by weight of the combination of the reductive catalytically active Nano-on-Nano-in-Micro (NNiM) particles, $NO_x$ trapping particles, and boehmite particles.

Embodiment 170. The coated substrate of any one of embodiments 167-169, wherein the boehmite particles comprise 1% to 5% by weight of the combination of the reductive catalytically active Nano-on-Nano-in-Micro (NNiM) particles, $NO_x$ trapping particles, and boehmite particles.

Embodiment 171. The coated substrate of embodiment 167, wherein the washcoat layer comprising reductive catalytically active Nano-on-Nano-in-Micro (NNiM) particles and $NO_x$ trapping particles comprises 15% by weight of the reductive catalytically active Nano-on-Nano-in-Micro (NNiM) particles, 83% by weight of the $NO_x$ trapping particles, and 2% by weight of the boehmite particles.

Embodiment 172. The coated substrate of any one of embodiments 113-171, wherein the substrate comprises cordierite.

Embodiment 173. The coated substrate of any one of embodiments 113-172, wherein the substrate comprises a honeycomb structure.

Embodiment 174. The coated substrate of embodiment 132, wherein the washcoat layer comprising oxidative catalytically active Nano-on-Nano-on-micro (NNm) particles has a thickness of 25 g/L to 150 g/L.

Embodiment 175. The coated substrate of embodiment 133, wherein the washcoat layer comprising oxidative catalytically active Nano-on-Nano-in-Micro (NNiM) particles has a thickness of 25 g/L to 150 g/L.

Embodiment 176. The coated substrate of embodiment 142, wherein the washcoat layer comprising reductive catalytically active Nano-on-Nano-on-micro (NNm) particles and $NO_x$ trapping particles has a thickness of 100 g/L to 400 g/L.

Embodiment 177. The coated substrate of embodiment 144, wherein the washcoat layer comprising reductive catalytically active Nano-on-Nano-in-Micro (NNiM) particles and $NO_x$ trapping particles has a thickness of 100 g/L to 400 g/L.

Embodiment 178. The coated substrate of any one of embodiments 113-177, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 179. The coated substrate of any one of embodiments 113-177, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 180. The coated substrate of any one of embodiments 113-178, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 181. A catalytic converter comprising a coated substrate of any one of embodiments 113-180.

Embodiment 182. An exhaust treatment system comprising a conduit for exhaust gas and a catalytic converter according to embodiment 181.

Embodiment 183. A vehicle comprising a catalytic converter according to embodiment 181.

Embodiment 184. A method of treating an exhaust gas, comprising contacting the coated substrate of any one of embodiments 113-180 with the exhaust gas.

Embodiment 185. A method of treating an exhaust gas, comprising contacting the coated substrate of any one of embodiments 113-180 with the exhaust gas, wherein the substrate is housed within a catalytic converter configured to receive the exhaust gas.

Embodiment 186. A coated substrate comprising: a substrate; a washcoat layer comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; a washcoat layer comprising reductive catalytically active Nano-on-Nano-on-micro (NNm) particles, the reductive catalytically active Nano-on-Nano-on-micro (NNm) particles comprising composite nanoparticles bonded to a second micron-sized carrier particle, and the composite nanoparticles comprising a second support nanoparticle and a reductive catalytic nanoparticle; and a washcoat layer comprising $NO_x$ trapping particles, and the $NO_x$ trapping particles comprising micron-sized cerium oxide.

Embodiment 187. The coated substrate of embodiment 186, wherein the $NO_x$ trapping particles further comprise barium oxide impregnated in the micron-sized cerium oxide.

Embodiment 188. The coated substrate of embodiment 186 or 187, wherein the $NO_x$ trapping particles further comprise platinum and palladium impregnated in the micron-sized cerium oxide.

Embodiment 189. The coated substrate of embodiment 187, wherein the barium oxide is plasma-generated.

Embodiment 190. The coated substrate of embodiment 187, wherein the barium oxide is impregnated in the micron-sized cerium oxide by wet chemistry.

Embodiment 191. The coated substrate of embodiment 188, wherein the platinum and palladium are plasma-generated.

Embodiment 192. The coated substrate of embodiment 188, wherein the platinum and palladium are impregnated in the micron-sized cerium oxide by wet chemistry.

Embodiment 193. The coated substrate of embodiment 186, wherein the $NO_x$ trapping particles further comprise the perovskite $FeBaO_3$ impregnated in the micron-sized cerium oxide.

Embodiment 194. The coated substrate of embodiment 186, wherein the $NO_x$ trapping particles further comprise metal oxides selected from the group consisting of samarium, zinc, copper, iron, and silver impregnated in the micron-sized cerium oxide.

Embodiment 195. The coated substrate of embodiment 193 or 194, wherein the $NO_x$ trapping particles are prepared by wet chemistry.

Embodiment 196. The coated substrate of any one of embodiments 193-195, wherein the $NO_x$ trapping particles further comprise barium oxide impregnated in the micron-sized cerium oxide.

Embodiment 197. The coated substrate of embodiment 186, wherein the $NO_x$ trapping particles further comprise micron-sized aluminum oxide particles.

Embodiment 198. The coated substrate of embodiment 197, wherein the micron-sized aluminum oxide particles are Nano-on-Nano-on-micro (NNm) particles.

Embodiment 199. The coated substrate of embodiment 198, wherein the Nano-on-Nano-on-micro (NNm) particles comprise platinum and/or palladium.

Embodiment 200. The coated substrate of embodiment 197, wherein the Nano-on-Nano-on-micro (NNm) particles comprise a non-platinum group metal.

Embodiment 201. The coated substrate of embodiment 200, wherein the non-platinum group metal is selected from the group consisting of tungsten, molybdenum, niobium, manganese, and chromium.

Embodiment 202. The coated substrate of any one of embodiments 197-201, further comprising barium oxide impregnated in the micron-sized cerium oxide particles.

Embodiment 203. The coated substrate of any one of embodiments 197-202, wherein the Nano-on-Nano-on-micro (NNm) particles further comprise barium oxide impregnated in the NNm particles.

Embodiment 204. The coated substrate of embodiment 202 or 203, wherein the barium oxide is impregnated by wet chemistry.

Embodiment 205. The coated substrate of any one of embodiment 186-204, wherein the composite nanoparticles are plasma-generated.

Embodiment 206. The coated substrate of any one of embodiments 186-205, wherein the oxidative catalytically active Nano-on-Nano-on-micro (NNm) particles comprise at least one platinum group metal.

Embodiment 207. The coated substrate of any one of embodiments 186-206, wherein the oxidative catalytically active Nano-on-Nano-on-micro (NNm) particles comprise platinum.

Embodiment 208. The coated substrate of any one of embodiments 186-206, wherein the oxidative catalytically active Nano-on-Nano-on-micro (NNm) particles comprise palladium.

Embodiment 209. The coated substrate of any one of embodiments 186-208, wherein the oxidative catalytically active Nano-on-Nano-on-micro (NNm) particles comprise platinum and palladium.

Embodiment 210. The coated substrate of any one of embodiments 186-209, wherein the first support nanoparticle comprises aluminum oxide.

Embodiment 211. The coated substrate of any one of embodiments 186-210, wherein the second support nanoparticle comprises cerium oxide.

Embodiment 212. The coated substrate of any one of embodiments 186-211, wherein the first micron-sized carrier particle comprises aluminum oxide.

Embodiment 213. The coated substrate of any one of embodiments 186-212, wherein the second micron-sized carrier particle comprises cerium oxide.

Embodiment 214. The coated substrate of any one of embodiments 186-213, wherein the reductive catalytically active Nano-on-Nano-on-micro (NNm) particles comprise a platinum group metal.

Embodiment 215. The coated substrate of embodiment 214, wherein the platinum group metal is rhodium.

Embodiment 216. The coated substrate of any one of embodiments 186-215, wherein the $NO_x$ trapping particles further comprise zirconium oxide.

Embodiment 217. The coated substrate of any one of embodiments 186-216, wherein the support nanoparticles have an average diameter of about 10 nm to about 20 nm.

Embodiment 218. The coated substrate of any one of embodiments 186-216, wherein the support nanoparticles have an average diameter of about 1 nm to about 5 nm.

Embodiment 219. The coated substrate of any one of embodiments 186-218, wherein the washcoat layer comprising oxidative catalytically active Nano-on-Nano-on-micro (NNm) particles further comprises metal oxide particles and boehmite particles.

Embodiment 220. The coated substrate of embodiment 219, wherein the metal oxide particles are aluminum oxide particles.

Embodiment 221. The coated substrate of embodiment 220, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 222. The coated substrate of embodiment 220 or 221, wherein the aluminum oxide particles comprise 30% to 70% by weight of the combination of the oxidative catalytically active Nano-on-Nano-on-micro (NNm) particles, boehmite particles, and aluminum oxide particles.

Embodiment 223. The coated substrate of any one of embodiments 220-222, wherein the beohmite particles comprise 2% to 5% by weight of the combination of the oxidative catalytically active Nano-on-Nano-on-micro (NNm) particles, boehmite particles, and aluminum oxide particles.

Embodiment 224. The coated substrate of embodiment 220, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 225. The coated substrate of any one of embodiments 186-224, wherein the washcoat layer comprising reductive catalytically active Nano-on-Nano-on-micro (NNm) particles further comprises metal oxide particles and boehmite particles.

Embodiment 226. The coated substrate of embodiment 225, wherein the metal oxide particles are aluminum oxide particles.

Embodiment 227. The coated substrate of embodiment 226, wherein the reductive catalytically active Nano-on-Nano-on-micro (NNm) particles comprise 50% to 95% by weight of the combination of the reductive catalytically active Nano-on-Nano-on-micro (NNm) particles, aluminum oxide particles, and boehmite particles.

Embodiment 228. The coated substrate of embodiment 226 or 227, wherein the aluminum oxide particles comprise 5% to 40% by weight of the combination of the reductive catalytically active Nano-on-Nano-on-micro (NNm) particles, aluminum oxide particles, and boehmite particles.

Embodiment 229. The coated substrate of any one of embodiments 226-228, wherein the boehmite particles comprise 2% to 5% by weight of the combination of the reductive catalytically active Nano-on-Nano-on-micro (NNm) particles, aluminum oxide particles, and boehmite particles.

Embodiment 230. The coated substrate of embodiment 226, wherein the washcoat layer comprising reductive catalytically active Nano-on-Nano-on-micro (NNm) particles comprises 80% by weight of the reductive catalytically active Nano-on-Nano-on-micro (NNm) particles, 17% by weight of the aluminum oxide particles, and 3% by weight of the boehmite particles.

Embodiment 231. The coated substrate of any one of embodiments 186-230, wherein the washcoat layer comprising $NO_x$ trapping particles further comprises Nano-on-Nano-on-micro (NNm) particles and boehmite particles.

Embodiment 232. The coated substrate of embodiment 231, wherein the Nano-on-Nano-on-micro (NNm) particles comprise a platinum group metal.

Embodiment 233. The coated substrate of embodiment 232, wherein the platinum group metal is selected from the group consisting of ruthenium, platinum, and palladium.

Embodiment 234. The coated substrate of embodiment 231, wherein the $NO_x$ trapping Nano-on-Nano-on-micro (NNm) particles comprise a non-platinum group metal.

Embodiment 235. The coated substrate of embodiment 234, wherein the non-platinum group metal is selected from the group consisting of tungsten, molybdenum, niobium, manganese, and chromium.

Embodiment 236. The coated substrate of any one of embodiments 231-235, wherein the Nano-on-Nano-on-micro (NNm) particles comprise 10% to 40% by weight of the combination of the Nano-on-Nano-on-micro (NNm) particles, $NO_x$ trapping particles, and boehmite particles.

Embodiment 237. The coated substrate of any one of embodiments 231-236, wherein the micron-sized cerium oxide particles comprise 50% to 90% by weight of the combination of the Nano-on-Nano-on-micro (NNm) particles, $NO_x$ trapping particles, and boehmite particles.

Embodiment 238. The coated substrate of any one of embodiments 231-237, wherein the boehmite particles comprise 2% to 5% by weight of the combination of the Nano-on-Nano-on-micro (NNm) particles, $NO_x$ trapping particles, and boehmite particles.

Embodiment 239. The coated substrate of any one of embodiments 231-238, wherein the washcoat layer comprising micron-sized cerium oxide particles comprises 73% by weight of the $NO_x$ trapping particles, 23% by weight of the Nano-on-Nano-on-micro (NNm) particles, and 4% by weight of the boehmite particles.

Embodiment 240. The coated substrate of any one of embodiments 186-239, wherein the substrate comprises cordierite.

Embodiment 241. The coated substrate of any one of embodiments 186-240, wherein the substrate comprises a honeycomb structure.

Embodiment 242. The coated substrate of any one of embodiments 186-241, wherein the washcoat layer comprising oxidative catalytically active Nano-on-Nano-on-micro (NNm) particles has a thickness of 25 g/L to 150 g/L.

Embodiment 243. The coated substrate of any one of embodiments 186-242, wherein the washcoat layer comprising reductive catalytically active Nano-on-Nano-on-micro (NNm) particles has a thickness of 25 g/L to 150 g/L.

Embodiment 244. The coated substrate of any one of embodiments 186-243, wherein the washcoat layer comprising $NO_x$ trapping particles has a thickness of 100 g/L to 400 g/L.

Embodiment 245. The coated substrate of any one of embodiments 186-244, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 246. The coated substrate of any one of embodiments 186-245, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 247. The coated substrate of any one of embodiments 186-246 said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 248. A catalytic converter comprising a coated substrate of any one of embodiments 186-247.

Embodiment 249. An exhaust treatment system comprising a conduit for exhaust gas and a catalytic converter according to embodiment 248.

Embodiment 250. A vehicle comprising a catalytic converter according to embodiment 248.

Embodiment 251. A method of treating an exhaust gas, comprising contacting the coated substrate of any one of embodiments 186-247 with the exhaust gas.

Embodiment 252. A method of treating an exhaust gas, comprising contacting the coated substrate of any one of embodiments 186-247 with the exhaust gas, wherein the substrate is housed within a catalytic converter configured to receive the exhaust gas.

Embodiment 253. A coated substrate comprising: a substrate;
a washcoat layer comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; a washcoat layer comprising reductive catalytically active Nano-on-Nano-in-Micro (NNiM) particles, the reductive catalytically active Nano-on-Nano-in-Micro (NNiM) particles comprising composite nanoparticles embedded in a second micron-sized porous carrier, and the composite nanoparticles comprising a second support nanoparticle and an oxidative catalytic nanoparticle; and a washcoat layer comprising $NO_x$ trapping particles, and the $NO_x$ trapping particles comprising micron-sized cerium oxide.

Embodiment 254. The coated substrate of embodiment 253, wherein the $NO_x$ trapping particles further comprise barium oxide impregnated in the micron-sized cerium oxide.

Embodiment 255. The coated substrate of embodiment 253 or 254, wherein the $NO_x$ trapping particles further comprise platinum and palladium impregnated in the micron-sized cerium oxide.

Embodiment 256. The coated substrate of embodiment 254, wherein the barium oxide is plasma-generated.

Embodiment 257. The coated substrate of embodiment 254, wherein the barium oxide is impregnated in the micron-sized cerium oxide by wet chemistry.

Embodiment 258. The coated substrate of embodiment 255, wherein the platinum and palladium are plasma-generated.

Embodiment 259. The coated substrate of embodiment 255, wherein the platinum and palladium are impregnated in the micron-sized cerium oxide by wet chemistry.

Embodiment 260. The coated substrate of embodiment 253, wherein the $NO_x$ trapping particles further comprise the perovskite $FeBaO_3$ impregnated in the micron-sized cerium oxide.

Embodiment 261. The coated substrate of embodiment 253, wherein the $NO_x$ trapping particles further comprise metal oxides selected from the group consisting of samarium, zinc, copper, iron, and silver impregnated in the micron-sized cerium oxide.

Embodiment 262. The coated substrate of embodiment 260 or 261, wherein the $NO_x$ trapping particles are prepared by wet chemistry.

Embodiment 263. The coated substrate of any one of embodiments 260-263, wherein the $NO_x$ trapping particles further comprise barium oxide impregnated in the micron-sized cerium oxide.

Embodiment 264. The coated substrate of embodiment 253, wherein the $NO_x$ trapping particles further comprise micron-sized aluminum oxide particles.

Embodiment 265. The coated substrate of embodiment 264, wherein the micron-sized aluminum oxide particles are Nano-on-Nano-in-Micro (NNiM) particles.

Embodiment 266. The coated substrate of embodiment 265, wherein the Nano-on-Nano-in-Micro (NNiM) particles comprise platinum and/or palladium.

Embodiment 267. The coated substrate of embodiment 264, wherein the Nano-on-Nano-in-Micro (NNiM) particles comprise a non-platinum group metal.

Embodiment 268. The coated substrate of embodiment 267, wherein the non-platinum group metal is selected from the group consisting of tungsten, molybdenum, niobium, manganese, and chromium.

Embodiment 269. The coated substrate of any one of embodiments 264-268, further comprising barium oxide impregnated in the micron-sized cerium oxide particles.

Embodiment 270. The coated substrate of any one of embodiments 264-269, wherein the Nano-on-Nano-in-Micro (NNiM) particles further comprise barium oxide impregnated in the NNiM particles.

Embodiment 271. The coated substrate of embodiment 269 or 270, wherein the barium oxide is impregnated by wet chemistry.

Embodiment 272. The coated substrate of any one of embodiment 253-271, wherein the composite nanoparticles are plasma-generated.

Embodiment 273. The coated substrate of any one of embodiments 253-272, wherein the oxidative catalytically active Nano-on-Nano-in-Micro (NNiM) particles comprise at least one platinum group metal.

Embodiment 274. The coated substrate of any one of embodiments 253-273, wherein the oxidative catalytically active Nano-on-Nano-in-Micro (NNiM) particles comprise platinum.

Embodiment 275. The coated substrate of any one of embodiments 253-273, wherein the oxidative catalytically active Nano-on-Nano-in-Micro (NNiM) particles comprise palladium.

Embodiment 276. The coated substrate of any one of embodiments 253-275, wherein the oxidative catalytically active Nano-on-Nano-in-Micro (NNiM) particles comprise platinum and palladium.

Embodiment 277. The coated substrate of any one of embodiments 253-276, wherein the first support nanoparticle comprises aluminum oxide.

Embodiment 278. The coated substrate of any one of embodiments 253-277, wherein the second support nanoparticle comprises cerium oxide.

Embodiment 279. The coated substrate of any one of embodiments 253-278, wherein the first micron-sized porous carrier comprises aluminum oxide.

Embodiment 280. The coated substrate of any one of embodiments 253-279, wherein the second micron-sized porous carrier comprises cerium oxide.

Embodiment 281. The coated substrate of any one of embodiments 253-280, wherein the reductive catalytically active Nano-on-Nano-in-Micro (NNiM) particles comprise a platinum group metal.

Embodiment 282. The coated substrate of embodiment 281, wherein the platinum group metal is rhodium.

Embodiment 283. The coated substrate of any one of embodiments 253-282, wherein the $NO_x$ trapping particles further comprise zirconium oxide.

Embodiment 284. The coated substrate of any one of embodiments 253-283, wherein the support nanoparticles have an average diameter of about 10 nm to about 20 nm.

Embodiment 285. The coated substrate of any one of embodiments 253-283, wherein the support nanoparticles have an average diameter of about 1 nm to about 5 nm.

Embodiment 286. The coated substrate of any one of embodiments 253-285, wherein the washcoat layer comprising oxidative catalytically active Nano-on-Nano-in-Micro (NNiM) particles further comprises metal oxide particles and boehmite particles.

Embodiment 287. The coated substrate of embodiment 286, wherein the metal oxide particles are aluminum oxide particles.

Embodiment 288. The coated substrate of embodiment 287, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 289. The coated substrate of embodiment 287 or 288, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 290. The coated substrate of any one of embodiments 287-289, wherein the boehmite particles comprise 2% to 5% by weight of the combination of the oxidative catalytically active Nano-on-Nano-in-Micro (NNiM) particles, boehmite particles, and aluminum oxide particles.

Embodiment 291. The coated substrate of embodiment 287, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 292. The coated substrate of any one of embodiments 253-291, wherein the washcoat layer comprising reductive catalytically active Nano-on-Nano-in-Micro (NNiM) particles further comprises metal oxide particles and boehmite particles.

Embodiment 293. The coated substrate of embodiment 292, wherein the metal oxide particles are aluminum oxide particles.

Embodiment 294. The coated substrate of embodiment 293, wherein the reductive catalytically active Nano-on-Nano-in-Micro (NNiM) particles comprise 50% to 95% by weight of the combination of the reductive catalytically active Nano-on-Nano-in-Micro (NNiM) particles, aluminum oxide particles, and boehmite particles.

Embodiment 295. The coated substrate of embodiment 293 or 294, wherein the aluminum oxide particles comprise 5% to 40% by weight of the combination of the reductive catalytically active Nano-on-Nano-in-Micro (NNiM) particles, aluminum oxide particles, and boehmite particles.

Embodiment 296. The coated substrate of any one of embodiments 293-295, wherein the boehmite particles comprise 2% to 5% by weight of the combination of the reductive catalytically active Nano-on-Nano-in-Micro (NNiM) particles, aluminum oxide particles, and boehmite particles.

Embodiment 297. The coated substrate of embodiment 293, wherein the washcoat layer comprising reductive catalytically active Nano-on-Nano-in-Micro (NNiM) particles comprises 80% by weight of the reductive catalytically active Nano-on-Nano-in-Micro (NNiM) particles, 17% by weight of the aluminum oxide particles, and 3% by weight of the boehmite particles.

Embodiment 298. The coated substrate of any one of embodiments 253-297, wherein the washcoat layer comprising $NO_x$ trapping particles further comprises Nano-on-Nano-in-Micro (NNiM) particles and boehmite particles.

Embodiment 299. The coated substrate of embodiment 298, wherein the Nano-on-Nano-in-Micro (NNiM) particles comprise a platinum group metal.

Embodiment 300. The coated substrate of embodiment 299, wherein the platinum group metal is selected from the group consisting of ruthenium, platinum, and palladium.

Embodiment 301. The coated substrate of embodiment 298, wherein the Nano-on-Nano-in-Micro (NNiM) particles comprise a non-platinum group metal.

Embodiment 302. The coated substrate of embodiment 301, wherein the non-platinum group metal is selected from the group consisting of tungsten, molybdenum, niobium, manganese, and chromium.

Embodiment 303. The coated substrate of any one of embodiments 298-302, wherein the Nano-on-Nano-in-Micro (NNiM) particles comprise 10% to 40% by weight of the combination of the Nano-on-Nano-in-Micro (NNiM) particles, $NO_x$ trapping particles, and boehmite particles.

Embodiment 304. The coated substrate of any one of embodiments 298-303, wherein the $NO_x$ trapping particles comprise 50% to 90% by weight of the combination of the Nano-on-Nano-in-Micro (NNiM) particles, $NO_x$ trapping particles, and boehmite particles.

Embodiment 305. The coated substrate of any one of embodiments 298-304, wherein the boehmite particles comprise 2% to 5% by weight of the combination of the Nano-on-Nano-in-Micro (NNiM) particles, $NO_x$ trapping particles, and boehmite particles.

Embodiment 306. The coated substrate of any one of embodiments 298-305, wherein the washcoat layer comprising $NO_x$ trapping particles comprises 73% by weight of the $NO_x$ trapping particles, 23% by weight of the Nano-on-Nano-in-Micro (NNiM) particles, and 4% by weight of the boehmite particles.

Embodiment 307. The coated substrate of any one of embodiments 253-306, wherein the substrate comprises cordierite.

Embodiment 308. The coated substrate of any one of embodiments 253-307, wherein the substrate comprises a honeycomb structure.

Embodiment 309. The coated substrate of any one of embodiments 253-308, wherein the washcoat layer comprising oxidative catalytically active Nano-on-Nano-in-Micro (NNiM) particles has a thickness of 25 g/L to 150 g/L.

Embodiment 310. The coated substrate of any one of embodiments 253-309, wherein the washcoat layer comprising reductive catalytically active Nano-on-Nano-in-Micro (NNiM) particles has a thickness of 25 g/L to 150 g/L.

Embodiment 311. The coated substrate of any one of embodiments 253-310, wherein the washcoat layer comprising $NO_x$ trapping particles has a thickness of 100 g/L to 400 g/L.

Embodiment 312. The coated substrate of any one of embodiments 253-311, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 313. The coated substrate of any one of embodiments 253-312, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 314. The coated substrate of any one of embodiments 253-313, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 315. A catalytic converter comprising a coated substrate of any one of embodiments 253-314.

Embodiment 316. An exhaust treatment system comprising a conduit for exhaust gas and a catalytic converter according to embodiment 315.

Embodiment 317. A vehicle comprising a catalytic converter according to embodiment 315.

Embodiment 318. A method of treating an exhaust gas, comprising contacting the coated substrate of any one of embodiments 253-314 with the exhaust gas.

Embodiment 319. A method of treating an exhaust gas, comprising contacting the coated substrate of any one of embodiments 253-314 with the exhaust gas, wherein the substrate is housed within a catalytic converter configured to receive the exhaust gas.

Embodiment 320. A coated substrate comprising: a substrate; a washcoat layer comprising oxidative catalytically active composite nanoparticles attached to a first micron-sized support particle, the oxidative catalytically active composite nanoparticles being plasma-generated and comprising a first support nanoparticle and an oxidative catalytic nanoparticle; a washcoat layer comprising reductive catalytically active composite nanoparticles attached to a second micron-sized support particle, the reductive catalytically active composite nanoparticles being plasma-generated and comprising a second support nanoparticle and a reductive catalytic nanoparticle; and a washcoat layer comprising $NO_x$ trapping particles, and the $NO_x$ trapping particles comprising micron-sized cerium oxide.

Embodiment 321. The coated substrate of embodiment 320, wherein the $NO_x$ trapping particles further comprise barium oxide impregnated in the micron-sized cerium oxide.

Embodiment 322. The coated substrate of embodiment 320 or 321, wherein the $NO_x$ trapping particles further comprise platinum and palladium impregnated in the micron-sized cerium oxide.

Embodiment 323. The coated substrate of embodiment 321, wherein the barium oxide is plasma-generated.

Embodiment 324. The coated substrate of embodiment 321, wherein the barium oxide is impregnated in the micron-sized cerium oxide by wet chemistry.

Embodiment 325. The coated substrate of embodiment 322, wherein the platinum and palladium are plasma-generated.

Embodiment 326. The coated substrate of embodiment 322, wherein the platinum and palladium are impregnated in the micron-sized cerium oxide by wet chemistry.

Embodiment 327. The coated substrate of embodiment 320, wherein the $NO_x$ trapping particles further comprise the perovskite $FeBaO_3$ impregnated in the micron-sized cerium oxide.

Embodiment 328. The coated substrate of embodiment 320, wherein the $NO_x$ trapping particles further comprise metal oxides selected from the group consisting of samarium, zinc, copper, iron, and silver impregnated in the micron-sized cerium oxide.

Embodiment 329. The coated substrate of embodiment 327 or 328, wherein the $NO_x$ trapping particles are prepared by wet chemistry.

Embodiment 330. The coated substrate of any one of embodiments 327-329, wherein the $NO_x$ trapping particles further comprise barium oxide impregnated in the micron-sized cerium oxide.

Embodiment 331. The coated substrate of embodiment 320, wherein the $NO_x$ trapping particles further comprise micron-sized aluminum oxide particles.

Embodiment 332. The coated substrate of embodiment 331, wherein the micron-sized aluminum oxide particles are Nano-on-Nano-on-micro (NNm) particles or Nano-on-Nano-in-Micro (NNiM) particles.

Embodiment 333. The coated substrate of embodiment 332, wherein the Nano-on-Nano-on-micro (NNm) particles or Nano-on-Nano-in-Micro (NNiM) particles comprise platinum and/or palladium.

Embodiment 334. The coated substrate of embodiment 331, wherein the Nano-on-Nano-on-micro (NNm) particles or Nano-on-Nano-in-Micro (NNiM) particles comprise a non-platinum group metal.

Embodiment 335. The coated substrate of embodiment 334, wherein the non-platinum group metal is selected from the group consisting of tungsten, molybdenum, niobium, manganese, and chromium.

Embodiment 336. The coated substrate of any one of embodiments 331-335, further comprising barium oxide impregnated in the micron-sized cerium oxide particles.

Embodiment 337. The coated substrate of any one of embodiments 331-335, wherein the Nano-on-Nano-on-micro (NNm) particles or Nano-on-Nano-in-Micro (NNiM) particles further comprise barium oxide impregnated in the NNm or NNiM particles.

Embodiment 338. The coated substrate of embodiment 336 or 337, wherein the barium oxide is impregnated by wet chemistry.

Embodiment 339. The coated substrate of any one of embodiment 320-338, wherein the oxidative catalytically active composite nanoparticles attached to a first micron-sized support particle comprise oxidative catalytically active Nano-on-Nano-on-micro (NNm) particles.

Embodiment 340. The coated substrate of any one of embodiments 320-338, wherein the oxidative catalytically active composite nanoparticles attached to a first micron-sized support particle comprise oxidative catalytically active Nano-on-Nano-in-Micro (NNiM) particles.

Embodiment 341. The coated substrate of any one of embodiments 320-340, wherein the oxidative catalytically active composite nanoparticles comprise at least one platinum group metal.

Embodiment 342. The coated substrate of any one of embodiment 320-341, wherein the oxidative catalytically active composite nanoparticles comprise platinum.

Embodiment 343. The coated substrate of any one of embodiment 320-341, wherein the oxidative catalytically active composite nanoparticles comprise palladium.

Embodiment 344. The coated substrate of any one of embodiments 320-343, wherein the oxidative catalytically active composite nanoparticles comprise platinum and palladium.

Embodiment 345. The coated substrate of any one of embodiments 320-344, wherein the first support nanoparticle comprises aluminum oxide.

Embodiment 346. The coated substrate of any one of embodiments 320-345, wherein the second support nanoparticle comprises cerium oxide.

Embodiment 347. The coated substrate of any one of embodiments 320-346, wherein the first micron-sized support particle comprises aluminum oxide.

Embodiment 348. The coated substrate of any one of embodiments 320-347, wherein the second micron-sized support particle comprises cerium oxide.

Embodiment 349. The coated substrate of any one of embodiments 320-348, wherein the reductive catalytically active composite nanoparticles comprise reductive catalytically active Nano-on-Nano-on-micro (NNm) particles.

Embodiment 350. The coated substrate of embodiment 349, wherein the reductive catalytically active Nano-on-Nano-on-micro (NNm) particles comprise a platinum group metal.

Embodiment 351. The coated substrate of any one of embodiments 320-348, wherein the reductive catalytically active composite nanoparticles comprise reductive catalytically active Nano-on-Nano-in-Micro (NNiM) particles.

Embodiment 352. The coated substrate of embodiment 351, wherein the reductive catalytically active Nano-on-Nano-in-Micro (NNiM) particles comprise a platinum group metal.

Embodiment 353. The coated substrate of embodiment 350 or 352, wherein the platinum group metal is rhodium.

Embodiment 354. The coated substrate of any one of embodiments 320-353, wherein the $NO_x$ trapping particles further comprise zirconium oxide.

Embodiment 355. The coated substrate of any one of embodiments 320-354, wherein the support nanoparticles have an average diameter of about 10 nm to about 20 nm.

Embodiment 356. The coated substrate of any one of embodiments 320-354, wherein the support nanoparticles have an average diameter of about 1 nm to about 5 nm.

Embodiment 357. The coated substrate of embodiment 339, wherein the washcoat layer comprising oxidative catalytically active Nano-on-Nano-on-micro (NNm) particles further comprises metal oxide particles and boehmite particles.

Embodiment 358. The coated substrate of embodiment 357, wherein the metal oxide particles are aluminum oxide particles.

Embodiment 359. The coated substrate of embodiment 358, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 360. The coated substrate of embodiment 358 or 359, wherein the aluminum oxide particles comprise 30% to 70% by weight of the combination of the oxidative catalytically active Nano-on-Nano-on-micro (NNm) particles, boehmite particles, and aluminum oxide particles.

Embodiment 361. The coated substrate of any one of embodiments 358-360, wherein the boehmite particles comprise 2% to 5% by weight of the combination of the oxidative catalytically active Nano-on-Nano-on-micro (NNm) particles, boehmite particles, and aluminum oxide particles.

Embodiment 362. The coated substrate of embodiment 358, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 363. The coated substrate of embodiment 340, wherein the washcoat layer comprising oxidative catalytically active Nano-on-Nano-in-Micro (NNiM) particles further comprises metal oxide particles and boehmite particles.

Embodiment 364. The coated substrate of embodiment 363, wherein the metal oxide particles are aluminum oxide particles.

Embodiment 365. The coated substrate of embodiment 364, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 366. The coated substrate of embodiment 364 or 365, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 367. The coated substrate of any one of embodiments 364-366, wherein the boehmite particles comprise 2% to 5% by weight of the combination of the oxidative catalytically active Nano-on-Nano-in-Micro (NNiM) particles, boehmite particles, and aluminum oxide particles.

Embodiment 368. The coated substrate of embodiment 364, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 369. The coated substrate of embodiment 349, wherein the washcoat layer comprising reductive catalytically active Nano-on-Nano-on-micro (NNm) particles further comprises metal oxide particles and boehmite particles.

Embodiment 370. The coated substrate of embodiment 369, wherein the metal oxide particles are aluminum oxide particles.

Embodiment 371. The coated substrate of embodiment 370, wherein the reductive catalytically active Nano-on-Nano-on-micro (NNm) particles comprise 50% to 95% by weight of the combination of the reductive catalytically active Nano-on-Nano-on-micro (NNm) particles, aluminum oxide particles, and boehmite particles.

Embodiment 372. The coated substrate of embodiment 370 or 371, wherein the aluminum oxide particles comprise 5% to 40% by weight of the combination of the reductive catalytically active Nano-on-Nano-on-micro (NNm) particles, aluminum oxide particles, and boehmite particles.

Embodiment 373. The coated substrate of any one of embodiments 370-372, wherein the boehmite particles comprise 2% to 5% by weight of the combination of the reductive catalytically active Nano-on-Nano-on-micro (NNm) particles, aluminum oxide particles, and boehmite particles.

Embodiment 374. The coated substrate of embodiment 370, wherein the washcoat layer comprising reductive catalytically active Nano-on-Nano-on-micro (NNm) particles comprises 80% by weight of the reductive catalytically active Nano-on-Nano-on-micro (NNm) particles, 17% by weight of the aluminum oxide particles, and 3% by weight of the boehmite particles.

Embodiment 375. The coated substrate of embodiment 351, wherein the washcoat layer comprising reductive catalytically active Nano-on-Nano-in-Micro (NNiM) particles further comprises metal oxide particles and boehmite particles.

Embodiment 376. The coated substrate of embodiment 375, wherein the metal oxide particles are aluminum oxide particles.

Embodiment 377. The coated substrate of embodiment 376, wherein the reductive catalytically active Nano-on-Nano-in-Micro (NNiM) particles comprise 50% to 95% by weight of the combination of the reductive catalytically active Nano-on-Nano-in-Micro (NNiM) particles, aluminum oxide particles, and boehmite particles.

Embodiment 378. The coated substrate of embodiment 376 or 377, wherein the aluminum oxide particles comprise 5% to 40% by weight of the combination of the reductive catalytically active Nano-on-Nano-in-Micro (NNiM) particles, aluminum oxide particles, and boehmite particles.

Embodiment 379. The coated substrate of any one of embodiments 376-378, wherein the boehmite particles comprise 2% to 5% by weight of the combination of the reductive catalytically active Nano-on-Nano-in-Micro (NNiM) particles, aluminum oxide particles, and boehmite particles.

Embodiment 380. The coated substrate of embodiment 376, wherein the washcoat layer comprising reductive catalytically active Nano-on-Nano-in-Micro (NNiM) particles comprises 80% by weight of the reductive catalytically active Nano-on-Nano-in-Micro (NNiM) particles, 17% by weight of the aluminum oxide particles, and 3% by weight of the boehmite particles.

Embodiment 381. The coated substrate of any one of embodiments 320-380, wherein the washcoat layer comprising $NO_x$ trapping particles further comprises Nano-on-Nano-on-micro (NNm) particles and boehmite particles.

Embodiment 382. The coated substrate of embodiment 381, wherein the Nano-on-Nano-on-micro (NNm) particles comprise at least one platinum group metal.

Embodiment 383. The coated substrate of embodiment 382, wherein the platinum group metal is selected from the group consisting of ruthenium, platinum, and palladium.

Embodiment 384. The coated substrate of embodiment 381, wherein the Nano-on-Nano-on-micro (NNm) particles comprise a non-platinum group metal.

Embodiment 385. The coated substrate of embodiment 384, wherein the non-platinum group metal is selected from the group consisting of tungsten, molybdenum, niobium, manganese, and chromium.

Embodiment 386. The coated substrate of any one of embodiments 381-385, wherein the Nano-on-Nano-on-micro (NNm) particles comprise 10% to 40% by weight of the combination of the Nano-on-Nano-on-micro (NNm) particles, $NO_x$ trapping particles, and boehmite particles.

Embodiment 387. The coated substrate of any one of embodiments 381-386, wherein the $NO_x$ trapping particles comprise 50% to 90% by weight of the combination of the Nano-on-Nano-on-micro (NNm) particles, $NO_x$ trapping particles, and boehmite particles.

Embodiment 388. The coated substrate of any one of embodiments 381-387, wherein the boehmite particles comprise 2% to 5% by weight of the combination of the Nano-on-Nano-on-micro (NNm) particles, $NO_x$ trapping particles, and boehmite particles.

Embodiment 389. The coated substrate of any one of embodiments 381-388, wherein the washcoat layer comprising $NO_x$ trapping particles comprises 73% by weight of the $NO_x$ trapping particles, 23% by weight of the Nano-on-Nano-on-micro (NNm) particles, and 4% by weight of the boehmite particles.

Embodiment 390. The coated substrate of any one of embodiments 320-389, wherein the substrate comprises cordierite.

Embodiment 391. The coated substrate of any one of embodiments 320-390, wherein the substrate comprises a honeycomb structure.

Embodiment 392. The coated substrate of embodiment 339, wherein the washcoat layer comprising oxidative catalytically active Nano-on-Nano-on-micro (NNm) particles has a thickness of 25 g/L to 150 g/L.

Embodiment 393. The coated substrate of embodiment 340, wherein the washcoat layer comprising oxidative catalytically active Nano-on-Nano-in-Micro (NNiM) particles has a thickness of 25 g/L to 150 g/L.

Embodiment 394. The coated substrate of embodiment 349, wherein the washcoat layer comprising reductive catalytically active Nano-on-Nano-on-micro (NNm) particles has a thickness of 100 g/L to 400 g/L.

Embodiment 395. The coated substrate of embodiment 351, wherein the washcoat layer comprising reductive catalytically active Nano-on-Nano-in-Micro (NNiM) particles has a thickness of 100 g/L to 400 g/L.

Embodiment 396. The coated substrate of any one of embodiments 320-395, wherein the washcoat layer comprising $NO_x$ trapping particles particles has a thickness of 100 g/L to 400 g/L.

Embodiment 397. The coated substrate of any one of embodiments 320-396, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 398. The coated substrate of any one of embodiments 320-397, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 399. The coated substrate of any one of embodiments 320-398, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 400. A catalytic converter comprising a coated substrate of any one of embodiments 320-399.

Embodiment 401. An exhaust treatment system comprising a conduit for exhaust gas and a catalytic converter according to embodiment 400.

Embodiment 402. A vehicle comprising a catalytic converter according to embodiment 400.

Embodiment 403. A method of treating an exhaust gas, comprising contacting the coated substrate of any one of embodiments 320-399 with the exhaust gas.

Embodiment 404. A method of treating an exhaust gas, comprising contacting the coated substrate of any one of embodiments 320-399 with the exhaust gas, wherein the substrate is housed within a catalytic converter configured to receive the exhaust gas.

Embodiment 405. A method of forming a coated substrate, the method comprising: a) coating a substrate with a washcoat composition comprising oxidative catalytically active Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; and b) coating the substrate with a washcoat composition comprising reductive catalytically active Nano-on-Nano-on-micro (NNm) particles and NO$_x$ trapping particles, the reductive catalytically active Nano-on-Nano-on-micro (NNm) particles comprising composite nanoparticles bonded to second micron-sized carrier particle, and the composite nanoparticles comprising a second support nanoparticle and a reductive catalytic nanoparticle, and the NO$_x$ trapping particles comprising micron-sized cerium oxide.

Embodiment 406. The method of embodiment 405, wherein the NO$_x$ trapping particles further comprise barium oxide impregnated in the micron-sized cerium oxide.

Embodiment 407. The method of embodiment 405 or 406, wherein the NO$_x$ trapping particles further comprise platinum and palladium impregnated in the micron-sized cerium oxide.

Embodiment 408. The method of embodiment 406, wherein the barium oxide is plasma-generated.

Embodiment 409. The method of embodiment 406, wherein the barium oxide is impregnated in the micron-sized cerium oxide by wet chemistry.

Embodiment 410. The method of embodiment 407, wherein the platinum and palladium are plasma-generated.

Embodiment 411. The method of embodiment 407, wherein the platinum and palladium are impregnated in the micron-sized cerium oxide by wet chemistry.

Embodiment 412. The method of embodiment 405, wherein the NO$_x$ trapping particles further comprise the perovskite FeBaO$_3$ impregnated in the micron-sized cerium oxide.

Embodiment 413. The method of embodiment 405, wherein the NO$_x$ trapping particles further comprise metal oxides selected from the group consisting of samarium, zinc, copper, iron, and silver impregnated in the micron-sized cerium oxide.

Embodiment 414. The method of embodiment 412 or 413, wherein the NO$_x$ trapping particles are prepared by wet chemistry.

Embodiment 415. The method of any one of embodiments 412-414, wherein the NO$_x$ trapping particles further comprise barium oxide impregnated in the micron-sized cerium oxide.

Embodiment 416. The method of embodiment 405, wherein the NO$_x$ trapping particles further comprise micron-sized aluminum oxide particles.

Embodiment 417. The method of embodiment 416, wherein the micron-sized aluminum oxide particles are Nano-on-Nano-on-micro (NNm) particles.

Embodiment 418. The method of embodiment 417, wherein the Nano-on-Nano-on-micro (NNm) particles comprise platinum and/or palladium.

Embodiment 419. The method of embodiment 416, wherein the Nano-on-Nano-on-micro (NNm) particles comprise a non-platinum group metal.

Embodiment 420. The method of embodiment 419, wherein the non-platinum group metal is selected from the group consisting of tungsten, molybdenum, niobium, manganese, and chromium.

Embodiment 421. The method of any one of embodiments 416-420, further comprising barium oxide impregnated in the micron-sized cerium oxide particles.

Embodiment 422. The method of any one of embodiments 416-421, wherein the Nano-on-Nano-on-micro (NNm) particles further comprise barium oxide impregnated in the NNm particles.

Embodiment 423. The method of embodiment 421 or 422, wherein the barium oxide is impregnated by wet chemistry.

Embodiment 424. The method of any one of embodiments 405-423, wherein the composite nanoparticles are plasma-generated.

Embodiment 425. The method of any one of embodiments 405-424, wherein the oxidative catalytically active Nano-on-Nano-on-micro (NNm) particles comprise at least one platinum group metal.

Embodiment 426. The method of any one of embodiments 405-425, wherein the oxidative catalytically active Nano-on-Nano-on-micro (NNm) particles comprise platinum.

Embodiment 427. The method of any one of embodiments 405-425, wherein the oxidative catalytically active Nano-on-Nano-on-micro (NNm) particles comprise palladium.

Embodiment 428. The method of any one of embodiments 405-427, wherein the oxidative catalytically active Nano-on-Nano-on-micro (NNm) particles comprise platinum and palladium.

Embodiment 429. The method of any one of embodiments 405-428, wherein the first support nanoparticle comprises aluminum oxide.

Embodiment 430. The method of any one of embodiments 405-429, wherein the second support nanoparticle comprises cerium oxide.

Embodiment 431. The method of any one of embodiments 405-430, wherein the first micron-sized carrier particle comprises aluminum oxide.

Embodiment 432. The method of any one of embodiments 405-431, wherein the second micron-sized carrier particle comprises cerium oxide.

Embodiment 433. The method of any one of embodiments 405-432, wherein the reductive catalytically active Nano-on-Nano-on-micro (NNm) particles comprise a platinum group metal.

Embodiment 434. The method of embodiment 433, wherein the platinum group metal is rhodium.

Embodiment 435. The method of any one of embodiments 405-434, wherein the NO$_x$ trapping particles comprising micron-sized cerium oxide further comprise zirconium oxide.

Embodiment 436. The method of any one of embodiments 405-435, wherein the support nanoparticles have an average diameter of about 10 nm to about 20 nm.

Embodiment 437. The method of any one of embodiments 405-435, wherein the support nanoparticles have an average diameter of about 1 nm to about 5 nm.

Embodiment 438. The method of any one of embodiments 405-437, wherein the washcoat layer comprising oxidative catalytically active Nano-on-Nano-on-micro (NNm) particles further comprises metal oxide particles and boehmite particles.

Embodiment 439. The method of embodiment 438, wherein the metal oxide particles are aluminum oxide particles.

Embodiment 440. The method of embodiment 439, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 441. The method of embodiment 439 or 440, wherein the aluminum oxide particles comprise 30% to 70% by weight of the combination of the oxidative catalytically active Nano-on-Nano-on-micro (NNm) particles, boehmite particles, and aluminum oxide particles.

Embodiment 442. The method of any one of embodiments 439-441, wherein the boehmite particles comprise 2% to 5% by weight of the combination of the oxidative catalytically active Nano-on-Nano-on-micro (NNm) particles, boehmite particles, and aluminum oxide particles.

Embodiment 443. The method of embodiment 439, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 444. The method of any one of embodiments 405-443, wherein the washcoat layer comprising reductive catalytically active Nano-on-Nano-on-micro (NNm) particles and $NO_x$ trapping particles further comprises boehmite.

Embodiment 445. The method of embodiment 444, wherein the reductive catalytically active Nano-on-Nano-on-micro (NNm) particles comprise 3% to 40% by weight of the combination of the reductive catalytically active Nano-on-Nano-on-micro (NNm) particles, $NO_x$ trapping particles, and boehmite particles.

Embodiment 446. The method of embodiment 444 or 445, wherein the $NO_x$ trapping particles comprise 30% to 98% by weight of the combination of the reductive catalytically active Nano-on-Nano-on-micro (NNm) particles, $NO_x$ trapping particles, and boehmite particles.

Embodiment 447. The method of any one of embodiments 444-446, wherein the boehmite particles comprise 1% to 5% by weight of the combination of the reductive catalytically active Nano-on-Nano-on-micro (NNm) particles, $NO_x$ trapping particles, and boehmite particles.

Embodiment 448. The method of embodiment 444, wherein the washcoat layer comprising reductive catalytically active Nano-on-Nano-on-micro (NNm) particles and $NO_x$ trapping particles comprises 15% by weight of the reductive catalytically active Nano-on-Nano-on-micro (NNm) particles, 83% by weight of the $NO_x$ trapping particles, and 2% by weight of the boehmite particles.

Embodiment 449. The method of any one of embodiments 405-448, wherein the substrate comprises cordierite.

Embodiment 450. The method of any one of embodiments 405-449, wherein the substrate comprises a honeycomb structure.

Embodiment 451. The method of any one of embodiments 405-450, wherein the washcoat layer comprising oxidative catalytically active Nano-on-Nano-on-micro (NNm) particles has a thickness of 25 g/L to 150 g/L.

Embodiment 452. The method of any one of embodiments 405-451, wherein the washcoat layer comprising reductive catalytically active Nano-on-Nano-on-micro (NNm) particles and $NO_x$ trapping particles has a thickness of 100 g/L to 400 g/L.

Embodiment 453. The method of any one of embodiments 405-452, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 454. The method of any one of embodiments 405-453, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 455. The method of any one of embodiments 1-50, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 456. A method of forming a coated substrate, the method comprising: a) coating a substrate with a washcoat composition comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; and b) coating a substrate with a washcoat composition comprising reductive catalytically active Nano-on-Nano-in-Micro (NNiM) particles and $NO_x$ trapping particles, the reductive catalytically active Nano-on-Nano-in-Micro (NNiM) particles comprising composite nanoparticles embedded in a second micron-sized porous carrier, and the composite nanoparticles comprising a second support nanoparticle and an oxidative catalytic nanoparticle, and the $NO_x$ trapping particles comprising micron-sized cerium oxide.

Embodiment 457. The method of embodiment 456, wherein the $NO_x$ trapping particles further comprise barium oxide impregnated in the micron-sized cerium oxide.

Embodiment 458. The method of embodiment 456 or 457, wherein the $NO_x$ trapping particles further comprise platinum and palladium impregnated in the micron-sized cerium oxide.

Embodiment 459. The method of embodiment 457, wherein the barium oxide is plasma-generated.

Embodiment 460. The method of embodiment 457, wherein the barium oxide is impregnated in the micron-sized cerium oxide by wet chemistry.

Embodiment 461. The method of embodiment 458, wherein the platinum and palladium are plasma-generated.

Embodiment 462. The method of embodiment 458, wherein the platinum and palladium are impregnated in the micron-sized cerium oxide by wet chemistry.

Embodiment 463. The method of embodiment 456, wherein the $NO_x$ trapping particles further comprise the perovskite $FeBaO_3$ impregnated in the micron-sized cerium oxide.

Embodiment 464. The method of embodiment 456, wherein the $NO_x$ trapping particles further comprise metal oxides selected from the group consisting of samarium, zinc, copper, iron, and silver impregnated in the micron-sized cerium oxide.

Embodiment 465. The method of embodiment 463 or 464, wherein the $NO_x$ trapping particles are prepared by wet chemistry.

Embodiment 466. The method of any one of embodiments 463-465, wherein the $NO_x$ trapping particles further comprise barium oxide impregnated in the micron-sized cerium oxide.

Embodiment 467. The method of embodiment 456, wherein the $NO_x$ trapping particles further comprise micron-sized aluminum oxide particles.

Embodiment 468. The method of embodiment 467, wherein the micron-sized aluminum oxide particles are Nano-on-Nano-in-Micro (NNiM) particles.

Embodiment 469. The method of embodiment 468, wherein the Nano-on-Nano-in-Micro (NNiM) particles comprise platinum and/or palladium.

Embodiment 470. The method of embodiment 467, wherein the Nano-on-Nano-in-Micro (NNiM) particles comprise a non-platinum group metal.

Embodiment 471. The method of embodiment 470, wherein the non-platinum group metal is selected from the group consisting of tungsten, molybdenum, niobium, manganese, and chromium.

Embodiment 472. The method of any one of embodiments 467-471, further comprising barium oxide impregnated in the micron-sized cerium oxide particles.

Embodiment 473. The method of any one of embodiments 467-472, wherein the Nano-on-Nano-in-Micro (NNiM) particles further comprise barium oxide impregnated in the NNiM particles.

Embodiment 474. The method of embodiment 472 or 473, wherein the barium oxide is impregnated by wet chemistry.

Embodiment 475. The method of any one of embodiments 456-474, wherein the composite nanoparticles are plasma-generated.

Embodiment 476. The method of any one of embodiments 456-475, wherein the oxidative catalytically active Nano-on-Nano-in-Micro (NNiM) particles comprise at least one platinum group metal.

Embodiment 477. The method of any one of embodiments 456-476, wherein the oxidative catalytically active Nano-on-Nano-in-Micro (NNiM) particles comprise platinum.

Embodiment 478. The method of any one of embodiments 456-476, wherein the oxidative catalytically active Nano-on-Nano-in-Micro (NNiM) particles comprise palladium.

Embodiment 479. The method of any one of embodiments 456-478, wherein the oxidative catalytically active Nano-on-Nano-in-Micro (NNiM) particles comprise platinum and palladium.

Embodiment 480. The method of any one of embodiments 456-479, wherein the first support nanoparticle comprises aluminum oxide.

Embodiment 481. The method of any one of embodiments 456-480, wherein the second support nanoparticle comprises cerium oxide.

Embodiment 482. The method of any one of embodiments 456-481, wherein the first micron-sized carrier particle comprises aluminum oxide.

Embodiment 483. The method of any one of embodiments 456-482, wherein the second micron-sized carrier particle comprises cerium oxide.

Embodiment 484. The method of any one of embodiments 456-483, wherein the reductive catalytically active Nano-on-Nano-in-Micro (NNiM) particles comprise a platinum group metal.

Embodiment 485. The method of embodiment 484, wherein the platinum group metal is rhodium.

Embodiment 486. The method of any one of embodiments 456-485, wherein the $NO_x$ trapping particles comprising micron-sized cerium oxide further comprise zirconium oxide.

Embodiment 487. The method of any one of embodiments 456-486, wherein the support nanoparticles have an average diameter of about 10 nm to about 20 nm.

Embodiment 488. The method of any one of embodiments 456-486, wherein the support nanoparticles have an average diameter of about 1 nm to about 5 nm.

Embodiment 489. The method of any one of embodiments 456-488, wherein the washcoat layer comprising oxidative catalytically active Nano-on-Nano-in-Micro (NNiM) particles further comprises metal oxide particles and boehmite particles.

Embodiment 490. The method of embodiment 489, wherein the metal oxide particles are aluminum oxide particles.

Embodiment 491. The method of embodiment 490, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 492. The method of embodiment 490 or 491, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 493. The method of any one of embodiments 490-492, wherein the boehmite particles comprise 2% to 5% by weight of the combination of the oxidative catalytically active Nano-on-Nano-in-Micro (NNiM) particles, boehmite particles, and aluminum oxide particles.

Embodiment 494. The method of embodiment 490, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 495. The method of any one of embodiments 456-494, wherein the washcoat layer comprising reductive catalytically active Nano-on-Nano-in-Micro (NNiM) particles and $NO_x$ trapping particles further comprises boehmite.

Embodiment 496. The method of embodiment 495, wherein the reductive catalytically active Nano-on-Nano-in-Micro (NNiM) particles comprise 3% to 40% by weight of the combination of the reductive catalytically active Nano-on-Nano-in-Micro (NNiM) particles, $NO_x$ trapping particles, and boehmite particles.

Embodiment 497. The method of embodiment 495 or 496, wherein the $NO_x$ trapping particles comprise 30% to 98% by weight of the combination of the reductive catalytically active Nano-on-Nano-in-Micro (NNiM) particles, $NO_x$ trapping particles, and boehmite particles.

Embodiment 498. The method of any one of embodiments 495-497, wherein the boehmite particles comprise 1% to 5% by weight of the combination of the reductive catalytically active Nano-on-Nano-in-Micro (NNiM) particles, $NO_x$ trapping particles, and boehmite particles.

Embodiment 499. The method of embodiment 495, wherein the washcoat layer comprising reductive catalytically active Nano-on-Nano-in-Micro (NNiM) particles and $NO_x$ trapping particles comprises 15% by weight of the reductive catalytically active Nano-on-Nano-in-Micro (NNiM) particles, 83% by weight of the $NO_x$ trapping particles, and 2% by weight of the boehmite particles.

Embodiment 500. The method of any one of embodiments 456-499, wherein the substrate comprises cordierite.

Embodiment 501. The method of any one of embodiments 456-500, wherein the substrate comprises a honeycomb structure.

Embodiment 502. The method of any one of embodiments 456-501, wherein the washcoat layer comprising oxidative catalytically active Nano-on-Nano-in-Micro (NNiM) particles has a thickness of 25 g/L to 150 g/L.

Embodiment 503. The method of any one of embodiments 456-502, wherein the washcoat layer comprising reductive catalytically active Nano-on-Nano-in-Micro (NNiM) particles and $NO_x$ trapping particles has a thickness of 100 g/L to 400 g/L.

Embodiment 504. The method of any one of embodiments 456-503, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 505. The method of any one of embodiments 456-504, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 506. The method of any one of embodiments 456-505, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 507. A method of forming a coated substrate, the method comprising: a) coating a substrate with a washcoat composition comprising oxidative catalytically active composite nanoparticles attached to a first micron-sized support particle, the oxidative catalytically active composite nanoparticles being plasma-generated and comprising a first support nanoparticle and an oxidative catalytic nanoparticle; and b) coating a substrate with a washcoat composition comprising $NO_x$ trapping particles and reductive catalytically active composite nanoparticles attached to a second micron-sized support particle, the reductive catalytically active composite nanoparticles being plasma-generated and comprising a second support nanoparticle and a reductive catalytic nanoparticle, and the $NO_x$ trapping particles comprising micron-sized cerium oxide.

Embodiment 508. The method of embodiment 507, wherein the $NO_x$ trapping particles further comprise barium oxide impregnated in the micron-sized cerium oxide.

Embodiment 509. The method of embodiment 507 or 508, wherein the $NO_x$ trapping particles further comprise platinum and palladium impregnated in the micron-sized cerium oxide.

Embodiment 510. The method of embodiment 508, wherein the barium oxide is plasma-generated.

Embodiment 511. The method of embodiment 508, wherein the barium oxide is impregnated in the micron-sized cerium oxide by wet chemistry.

Embodiment 512. The method of embodiment 509, wherein the platinum and palladium are plasma-generated.

Embodiment 513. The method of embodiment 509, wherein the platinum and palladium are impregnated in the micron-sized cerium oxide by wet chemistry.

Embodiment 514. The method of embodiment 507, wherein the $NO_x$ trapping particles further comprise the perovskite $FeBaO_3$ impregnated in the micron-sized cerium oxide.

Embodiment 515. The method of embodiment 507, wherein the $NO_x$ trapping particles further comprise metal oxides selected from the group consisting of samarium, zinc, copper, iron, and silver impregnated in the micron-sized cerium oxide.

Embodiment 516. The method of embodiment 514 or 515, wherein the $NO_x$ trapping particles are prepared by wet chemistry.

Embodiment 517. The method of any one of embodiments 514-516, wherein the $NO_x$ trapping particles further comprise barium oxide impregnated in the micron-sized cerium oxide.

Embodiment 518. The method of embodiment 507, wherein the $NO_x$ trapping particles further comprise micron-sized aluminum oxide particles.

Embodiment 519. The method of embodiment 518, wherein the micron-sized aluminum oxide particles are Nano-on-Nano-on-micro (NNm) particles or Nano-on-Nano-in-Micro (NNiM) particles.

Embodiment 520. The method of embodiment 519, wherein the Nano-on-Nano-on-micro (NNm) particles or Nano-on-Nano-in-Micro (NNiM) particles comprise platinum and/or palladium.

Embodiment 521. The method of embodiment 518, wherein the Nano-on-Nano-on-micro (NNm) particles or Nano-on-Nano-in-Micro (NNiM) particles comprise a non-platinum group metal.

Embodiment 522. The method of embodiment 521, wherein the non-platinum group metal is selected from the group consisting of tungsten, molybdenum, niobium, manganese, and chromium.

Embodiment 523. The method of any one of embodiments 518-522, further comprising barium oxide impregnated in the micron-sized cerium oxide particles.

Embodiment 524. The method of any one of embodiments 518-522, wherein the Nano-on-Nano-on-micro (NNm) particles or Nano-on-Nano-in-Micro (NNiM) particles further comprise barium oxide impregnated in the NNm or NNiM particles.

Embodiment 525. The method of embodiment 523 or 524, wherein the barium oxide is impregnated by wet chemistry.

Embodiment 526. The method of any one of embodiments 507-525, wherein the oxidative catalytically active composite nanoparticles attached to a first micron-sized support particle comprise oxidative catalytically active Nano-on-Nano-on-micro (NNm) particles.

Embodiment 527. The method of any one of embodiments 507-525, wherein the oxidative catalytically active composite nanoparticles attached to a first micron-sized support particle comprise oxidative catalytically active Nano-on-Nano-in-Micro (NNiM) particles.

Embodiment 528. The method of any one of embodiments 507-527, wherein the oxidative catalytically active composite nanoparticles comprise at least one platinum group metal.

Embodiment 529. The method of any one of embodiments 507-528, wherein the oxidative catalytically active composite nanoparticles comprise platinum.

Embodiment 530. The method of any one of embodiments 507-528, wherein the oxidative catalytically active composite nanoparticles comprise palladium.

Embodiment 531. The method of any one of embodiments 507-530, wherein the oxidative catalytically active composite nanoparticles comprise platinum and palladium.

Embodiment 532. The method of any one of embodiments 507-531, wherein the first support nanoparticle comprises aluminum oxide.

Embodiment 533. The method of any one of embodiments 507-532, wherein the second support nanoparticle comprises cerium oxide.

Embodiment 534. The method of any one of embodiments 507-533, wherein the first micron-sized support particle comprises aluminum oxide.

Embodiment 535. The method of any one of embodiments 507-534, wherein the second micron-sized support particle comprises cerium oxide.

Embodiment 536. The method of any one of embodiments 507-535, wherein the reductive catalytically active composite nanoparticles comprise reductive catalytically active Nano-on-Nano-on-micro (NNm) particles.

Embodiment 537. The method of embodiment 536, wherein the reductive catalytically active Nano-on-Nano-on-micro (NNm) particles comprise a platinum group metal.

Embodiment 538. The method of any one of embodiments 507-535, wherein the reductive catalytically active composite nanoparticles comprise reductive catalytically active Nano-on-Nano-in-Micro (NNiM) particles.

Embodiment 539. The method of embodiment 538, wherein the reductive catalytically active Nano-on-Nano-in-Micro (NNiM) particles comprise a platinum group metal.

Embodiment 540. The method of embodiment 537 or 539, wherein the platinum group metal is rhodium.

Embodiment 541. The method of any one of embodiments 507-540, wherein the $NO_x$ trapping particles further comprise zirconium oxide.

Embodiment 542. The method of any one of embodiments 507-541, wherein the support nanoparticles have an average diameter of about 10 nm to about 20 nm.

Embodiment 543. The method of any one of embodiments 507-541, wherein the support nanoparticles have an average diameter of about 1 nm to about 5 nm.

Embodiment 544. The method of embodiment 526, wherein the washcoat layer comprising oxidative catalytically active Nano-on-Nano-on-micro (NNm) particles further comprises metal oxide particles and boehmite particles.

Embodiment 545. The method of embodiment 544, wherein the metal oxide particles are aluminum oxide particles.

Embodiment 546. The method of embodiment 545, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 547. The method of embodiment 545 or 546, wherein the aluminum oxide particles comprise 30% to 70% by weight of the combination of the oxidative catalytically active Nano-on-Nano-on-micro (NNm) particles, boehmite particles, and aluminum oxide particles.

Embodiment 548. The method of any one of embodiments 545-547, wherein the boehmite particles comprise 2% to 5% by weight of the combination of the oxidative catalytically active Nano-on-Nano-on-micro (NNm) particles, boehmite particles, and aluminum oxide particles.

Embodiment 549. The method of embodiment 545, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 550. The method of embodiment 527, wherein the washcoat layer comprising oxidative catalytically active Nano-on-Nano-in-Micro (NNiM) particles further comprises metal oxide particles and boehmite particles.

Embodiment 551. The method of embodiment 550, wherein the metal oxide particles are aluminum oxide particles.

Embodiment 552. The method of embodiment 551, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 553. The method of embodiment 551 or 552, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 554. The method of any one of embodiments 551-553, wherein the boehmite particles comprise 2% to 5% by weight of the combination of the oxidative catalytically active Nano-on-Nano-in-Micro (NNiM) particles, boehmite particles, and aluminum oxide particles.

Embodiment 555. The method of embodiment 551, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 556. The method of embodiment 536, wherein the washcoat layer comprising reductive catalytically active Nano-on-Nano-on-micro (NNm) particles and $NO_x$ trapping particles further comprises boehmite.

Embodiment 557. The method of embodiment 556, wherein the reductive catalytically active Nano-on-Nano-on-micro (NNm) particles comprise 3% to 40% by weight of the combination of the reductive catalytically active Nano-on-Nano-on-micro (NNm) particles, $NO_x$ trapping particles, and boehmite particles.

Embodiment 558. The method of embodiment 556 or 557, wherein the $NO_x$ trapping particles comprise 30% to 98% by weight of the combination of the reductive catalytically active Nano-on-Nano-on-micro (NNm) particles, $NO_x$ trapping particles, and boehmite particles.

Embodiment 559. The method of any one of embodiments 556-558, wherein the boehmite particles comprise 1% to 5% by weight of the combination of the reductive catalytically active Nano-on-Nano-on-micro (NNm) particles, $NO_x$ trapping particles, and boehmite particles.

Embodiment 560. The method of embodiment 556, wherein the washcoat layer comprising reductive catalytically active Nano-on-Nano-on-micro (NNm) particles and $NO_x$ trapping particles comprises 15% by weight of the reductive catalytically active Nano-on-Nano-on-micro (NNm) particles, 83% by weight of the $NO_x$ trapping particles, and 2% by weight of the boehmite particles.

Embodiment 561. The method of embodiment 538, wherein the washcoat layer comprising reductive catalytically active Nano-on-Nano-in-Micro (NNiM) particles and $NO_x$ trapping particles further comprises boehmite.

Embodiment 562. The method of embodiment 561, wherein the reductive catalytically active Nano-on-Nano-in-Micro (NNiM) particles comprise 3% to 40% by weight of the combination of the reductive catalytically active Nano-on-Nano-in-Micro (NNiM) particles, $NO_x$ trapping particles, and boehmite particles.

Embodiment 563. The method of embodiment 561 or 562, wherein the cerium oxide particles comprise 30% to 98% by weight of the combination of the reductive catalytically active Nano-on-Nano-in-Micro (NNiM) particles, $NO_x$ trapping particles, and boehmite particles.

Embodiment 564. The method of any one of embodiments 561-563, wherein the boehmite particles comprise 1% to 5% by weight of the combination of the reductive catalytically active Nano-on-Nano-in-Micro (NNiM) particles, $NO_x$ trapping particles, and boehmite particles.

Embodiment 565. The method of embodiment 561, wherein the washcoat layer comprising reductive catalytically active Nano-on-Nano-in-Micro (NNiM) particles and $NO_x$ trapping particles comprises 15% by weight of the reductive catalytically active Nano-on-Nano-in-Micro (NNiM) particles, 83% by weight of the $NO_x$ trapping particles, and 2% by weight of the boehmite particles.

Embodiment 566. The method of any one of embodiments 507-565, wherein the substrate comprises cordierite.

Embodiment 567. The method of any one of embodiments 507-566, wherein the substrate comprises a honeycomb structure.

Embodiment 568. The method of embodiment 526, wherein the washcoat layer comprising oxidative catalytically active Nano-on-Nano-on-micro (NNm) particles has a thickness of 25 g/L to 150 g/L.

Embodiment 569. The method of embodiment 527, wherein the washcoat layer comprising oxidative catalytically active Nano-on-Nano-in-Micro (NNiM) particles has a thickness of 25 g/L to 150 g/L.

Embodiment 570. The method of embodiment 536, wherein the washcoat layer comprising reductive catalytically active Nano-on-Nano-on-micro (NNm) particles and $NO_x$ trapping particles has a thickness of 100 g/L to 400 g/L.

Embodiment 571. The method of embodiment 538, wherein the washcoat layer comprising reductive catalytically active Nano-on-Nano-in-Micro (NNiM) particles and $NO_x$ trapping particles has a thickness of 100 g/L to 400 g/L.

Embodiment 572. The method of any one of embodiments 507-571, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 573. The method of any one of embodiments 507-572, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 574. The method of any one of embodiments 507-573, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 575. A method of forming a coated substrate, the method comprising: a) coating the substrate with a washcoat layer comprising oxidative catalytically active particles comprising Nano-on-Nano-on-micro (NNm) particles, the oxidative catalytically active Nano-on-Nano-on-micro (NNm) particles comprising composite nanoparticles bonded to a first micron-sized carrier particle, and the composite nanoparticles comprising a first support nanoparticle and an oxidative catalytic nanoparticle; b) coating a substrate with a washcoat layer comprising reductive catalytically active Nano-on-Nano-on-micro (NNm) particles, the reductive catalytically active Nano-on-Nano-on-micro (NNm) particles comprising composite nanoparticles bonded to a second micron-sized carrier particle, and the composite nanoparticles comprising a second support nanoparticle and a reductive catalytic nanoparticle; and c) coating the substrate with a washcoat layer comprising $NO_x$ trapping particles, and the $NO_x$ trapping particles comprising micron-sized cerium oxide.

Embodiment 576. The method of embodiment 575, wherein the $NO_x$ trapping particles further comprise barium oxide impregnated in the micron-sized cerium oxide.

Embodiment 577. The method of embodiment 575 or 576 wherein the $NO_x$ trapping particles further comprise platinum and palladium impregnated in the micron-sized cerium oxide.

Embodiment 578. The method of embodiment 576, wherein the barium oxide is plasma-generated.

Embodiment 579. The method of embodiment 576, wherein the barium oxide is impregnated in the micron-sized cerium oxide by wet chemistry.

Embodiment 580. The method of embodiment 577, wherein the platinum and palladium are plasma-generated.

Embodiment 581. The method of embodiment 577, wherein the platinum and palladium are impregnated in the micron-sized cerium oxide by wet chemistry.

Embodiment 582. The method of embodiment 575, wherein the $NO_x$ trapping particles further comprise the perovskite $FeBaO_3$ impregnated in the micron-sized cerium oxide.

Embodiment 583. The method of embodiment 575, wherein the $NO_x$ trapping particles further comprise metal oxides selected from the group consisting of samarium, zinc, copper, iron, and silver impregnated in the micron-sized cerium oxide.

Embodiment 584. The method of embodiment 582 or 583, wherein the $NO_x$ trapping particles are prepared by wet chemistry.

Embodiment 585. The method of any one of embodiments 582-584, wherein the $NO_x$ trapping particles further comprise barium oxide impregnated in the micron-sized cerium oxide.

Embodiment 586. The method of embodiment 575, wherein the $NO_x$ trapping particles further comprise micron-sized aluminum oxide particles.

Embodiment 587. The method of embodiment 586, wherein the micron-sized aluminum oxide particles are Nano-on-Nano-on-micro (NNm) particles.

Embodiment 588. The method of embodiment 587, wherein the Nano-on-Nano-on-micro (NNm) particles comprise platinum and/or palladium.

Embodiment 589. The method of embodiment 586, wherein the Nano-on-Nano-on-micro (NNm) particles comprise a non-platinum group metal.

Embodiment 590. The method of embodiment 589, wherein the non-platinum group metal is selected from the group consisting of tungsten, molybdenum, niobium, manganese, and chromium.

Embodiment 591. The method of any one of embodiments 586-590, further comprising barium oxide impregnated in the micron-sized cerium oxide particles.

Embodiment 592. The method of any one of embodiments 586-591, wherein the Nano-on-Nano-on-micro (NNm) particles further comprise barium oxide impregnated in the NNm particles.

Embodiment 593. The method of embodiment 591 or 592, wherein the barium oxide is impregnated by wet chemistry.

Embodiment 594. The method of any one of embodiment 575-593, wherein the composite nanoparticles are plasma-generated.

Embodiment 595. The method of any one of embodiments 575-594, wherein the oxidative catalytically active Nano-on-Nano-on-micro (NNm) particles comprise at least one platinum group metal.

Embodiment 596. The method of any one of embodiments 575-595, wherein the oxidative catalytically active Nano-on-Nano-on-micro (NNm) particles comprise platinum.

Embodiment 597. The method of any one of embodiments 575-595, wherein the oxidative catalytically active Nano-on-Nano-on-micro (NNm) particles comprise palladium.

Embodiment 598. The method of any one of embodiments 575-597, wherein the oxidative catalytically active Nano-on-Nano-on-micro (NNm) particles comprise platinum and palladium.

Embodiment 599. The method of any one of embodiments 575-598, wherein the first support nanoparticle comprises aluminum oxide.

Embodiment 600. The method of any one of embodiments 575-599, wherein the second support nanoparticle comprises cerium oxide.

Embodiment 601. The method of any one of embodiments 575-600, wherein the first micron-sized carrier particle comprises aluminum oxide.

Embodiment 602. The method of any one of embodiments 575-601, wherein the second micron-sized carrier particle comprises cerium oxide.

Embodiment 603. The method of any one of embodiments 575-602, wherein the reductive catalytically active Nano-on-Nano-on-micro (NNm) particles comprise a platinum group metal.

Embodiment 604. The method of embodiment 603, wherein the platinum group metal is rhodium.

Embodiment 605. The method of any one of embodiments 575-604, wherein the $NO_x$ trapping particles further comprise zirconium oxide.

Embodiment 606. The method of any one of embodiments 575-605, wherein the support nanoparticles have an average diameter of about 10 nm to about 20 nm.

Embodiment 607. The method of any one of embodiments 575-605, wherein the support nanoparticles have an average diameter of about 1 nm to about 5 nm.

Embodiment 608. The method of any one of embodiments 575-607, wherein the washcoat layer comprising oxidative catalytically active Nano-on-Nano-on-micro (NNm) particles further comprises metal oxide particles and boehmite particles.

Embodiment 609. The method of embodiment 608, wherein the metal oxide particles are aluminum oxide particles.

Embodiment 610. The method of embodiment 609, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 611. The method of embodiment 609 or 610, wherein the aluminum oxide particles comprise 30% to 70% by weight of the combination of the oxidative catalytically active Nano-on-Nano-on-micro (NNm) particles, boehmite particles, and aluminum oxide particles.

Embodiment 612. The method of any one of embodiments 609-611, wherein the beohmite particles comprise 2% to 5% by weight of the combination of the oxidative catalytically active Nano-on-Nano-on-micro (NNm) particles, boehmite particles, and aluminum oxide particles.

Embodiment 613. The method of embodiment 609, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 614. The method of any one of embodiments 575-613, wherein the washcoat layer comprising reductive catalytically active Nano-on-Nano-on-micro (NNm) particles further comprises metal oxide particles and boehmite particles.

Embodiment 615. The method of embodiment 614, wherein the metal oxide particles are aluminum oxide particles.

Embodiment 616. The method of embodiment 615, wherein the reductive catalytically active Nano-on-Nano-on-micro (NNm) particles comprise 50% to 95% by weight of the combination of the reductive catalytically active Nano-on-Nano-on-micro (NNm) particles, aluminum oxide particles, and boehmite particles.

Embodiment 617. The method of embodiment 615 or 616, wherein the aluminum oxide particles comprise 5% to 40% by weight of the combination of the reductive catalytically active Nano-on-Nano-on-micro (NNm) particles, aluminum oxide particles, and boehmite particles.

Embodiment 618. The method of any one of embodiments 615-617, wherein the boehmite particles comprise 2% to 5% by weight of the combination of the reductive catalytically active Nano-on-Nano-on-micro (NNm) particles, aluminum oxide particles, and boehmite particles.

Embodiment 619. The method of embodiment 615, wherein the washcoat layer comprising reductive catalytically active Nano-on-Nano-on-micro (NNm) particles comprises 80% by weight of the reductive catalytically active Nano-on-Nano-on-micro (NNm) particles, 17% by weight of the aluminum oxide particles, and 3% by weight of the boehmite particles.

Embodiment 620. The method of any one of embodiments 575-619, wherein the washcoat layer comprising $NO_x$ trapping particles further comprises Nano-on-Nano-on-micro (NNm) particles and boehmite particles.

Embodiment 621. The method of embodiment 620, wherein the Nano-on-Nano-on-micro (NNm) particles comprise a platinum group metal.

Embodiment 622. The method of embodiment 621, wherein the platinum group metal is selected from the group consisting of ruthenium, platinum, and palladium.

Embodiment 623. The method of embodiment 620, wherein the $NO_x$ trapping Nano-on-Nano-on-micro (NNm) particles comprise a non-platinum group metal.

Embodiment 624. The method of embodiment 623, wherein the non-platinum group metal is selected from the group consisting of tungsten, molybdenum, niobium, manganese, and chromium.

Embodiment 625. The method of any one of embodiments 620-624, wherein the Nano-on-Nano-on-micro (NNm) particles comprise 10% to 40% by weight of the combination of the Nano-on-Nano-on-micro (NNm) particles, $NO_x$ trapping particles, and boehmite particles.

Embodiment 626. The method of any one of embodiments 620-625, wherein the micron-sized cerium oxide particles comprise 50% to 90% by weight of the combination of the Nano-on-Nano-on-micro (NNm) particles, $NO_x$ trapping particles, and boehmite particles.

Embodiment 627. The method of any one of embodiments 620-626, wherein the boehmite particles comprise 2% to 5% by weight of the combination of the Nano-on-Nano-on-micro (NNm) particles, $NO_x$ trapping particles, and boehmite particles.

Embodiment 628. The method of any one of embodiments 620-627, wherein the washcoat layer comprising micron-sized cerium oxide particles comprises 73% by weight of the $NO_x$ trapping particles, 23% by weight of the Nano-on-Nano-on-micro (NNm) particles, and 4% by weight of the boehmite particles.

Embodiment 629. The method of any one of embodiments 575-628, wherein the substrate comprises cordierite.

Embodiment 630. The method of any one of embodiments 575-629, wherein the substrate comprises a honeycomb structure.

Embodiment 631. The method of any one of embodiments 575-630, wherein the washcoat layer comprising oxidative catalytically active Nano-on-Nano-on-micro (NNm) particles has a thickness of 25 g/L to 150 g/L.

Embodiment 632. The method of any one of embodiments 575-631, wherein the washcoat layer comprising reductive catalytically active Nano-on-Nano-on-micro (NNm) particles has a thickness of 25 g/L to 150 g/L.

Embodiment 633. The method of any one of embodiments 575-632, wherein the washcoat layer comprising $NO_x$ trapping particles has a thickness of 100 g/L to 400 g/L.

Embodiment 634. The method of any one of embodiments 575-633, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 635. The method of any one of embodiments 575-634, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 636. The method of any one of embodiments 575-635 said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 637. A method of forming a coated substrate, the method comprising: a) coating a substrate with a washcoat composition comprising oxidative catalytically active Nano-on-Nano-in-Micro (NNiM) particles, the oxidative catalytically active Nano-on-Nano-in-Micro (NNiM) particles comprising composite nanoparticles embedded in a first micron-sized porous carrier, and the composite nanoparticles comprising a first support nanoparticle and an oxidative catalytic nanoparticle; b) coating a substrate with a washcoat composition comprising reductive catalytically active Nano-on-Nano-in-Micro (NNiM) particles, the reductive catalytically active Nano-on-Nano-in-Micro (NNiM) particles comprising composite nanoparticles embedded in a second micron-sized porous carrier, and the composite nanoparticles comprising a second support nanoparticle and an oxidative catalytic nanoparticle; and c) coating the substrate with a washcoat composition comprising $NO_x$ trapping particles, and the $NO_x$ trapping particles comprising micron-sized cerium oxide.

Embodiment 638. The method of embodiment 637, wherein the $NO_x$ trapping particles further comprise barium oxide impregnated in the micron-sized cerium oxide.

Embodiment 639. The method of embodiment 637 or 638, wherein the $NO_x$ trapping particles further comprise platinum and palladium impregnated in the micron-sized cerium oxide.

Embodiment 640. The method of embodiment 638, wherein the barium oxide is plasma-generated.

Embodiment 641. The method of embodiment 638, wherein the barium oxide is impregnated in the micron-sized cerium oxide by wet chemistry.

Embodiment 642. The method of embodiment 639, wherein the platinum and palladium are plasma-generated.

Embodiment 643. The method of embodiment 639, wherein the platinum and palladium are impregnated in the micron-sized cerium oxide by wet chemistry.

Embodiment 644. The method of embodiment 637, wherein the $NO_x$ trapping particles further comprise the perovskite $FeBaO_3$ impregnated in the micron-sized cerium oxide.

Embodiment 645. The method of embodiment 637, wherein the $NO_x$ trapping particles further comprise metal oxides selected from the group consisting of samarium, zinc, copper, iron, and silver impregnated in the micron-sized cerium oxide.

Embodiment 646. The method of embodiment 644 or 645, wherein the $NO_x$ trapping particles are prepared by wet chemistry.

Embodiment 647. The method of any one of embodiments 644-646, wherein the $NO_x$ trapping particles further comprise barium oxide impregnated in the micron-sized cerium oxide.

Embodiment 648. The method of embodiment 637, wherein the $NO_x$ trapping particles further comprise micron-sized aluminum oxide particles.

Embodiment 649. The method of embodiment 648, wherein the micron-sized aluminum oxide particles are Nano-on-Nano-in-Micro (NNiM) particles.

Embodiment 650. The method of embodiment 649, wherein the Nano-on-Nano-in-Micro (NNiM) particles comprise platinum and/or palladium.

Embodiment 651. The method of embodiment 648, wherein the Nano-on-Nano-in-Micro (NNiM) particles comprise a non-platinum group metal.

Embodiment 652. The method of embodiment 651, wherein the non-platinum group metal is selected from the group consisting of tungsten, molybdenum, niobium, manganese, and chromium.

Embodiment 653. The method of any one of embodiments 648-652, further comprising barium oxide impregnated in the micron-sized cerium oxide particles.

Embodiment 654. The method of any one of embodiments 648-653, wherein the Nano-on-Nano-in-Micro (NNiM) particles further comprise barium oxide impregnated in the NNiM particles.

Embodiment 655. The method of embodiment 653 or 654, wherein the barium oxide is impregnated by wet chemistry.

Embodiment 656. The method of any one of embodiment 637-655, wherein the composite nanoparticles are plasma-generated.

Embodiment 657. The method of any one of embodiments 637-656, wherein the oxidative catalytically active Nano-on-Nano-in-Micro (NNiM) particles comprise at least one platinum group metal.

Embodiment 658. The method of any one of embodiments 637-657, wherein the oxidative catalytically active Nano-on-Nano-in-Micro (NNiM) particles comprise platinum.

Embodiment 659. The method of any one of embodiments 637-657, wherein the oxidative catalytically active Nano-on-Nano-in-Micro (NNiM) particles comprise palladium.

Embodiment 660. The method of any one of embodiments 637-659, wherein the oxidative catalytically active Nano-on-Nano-in-Micro (NNiM) particles comprise platinum and palladium.

Embodiment 661. The method of any one of embodiments 637-660, wherein the first support nanoparticle comprises aluminum oxide.

Embodiment 662. The method of any one of embodiments 637-661, wherein the second support nanoparticle comprises cerium oxide.

Embodiment 663. The method of any one of embodiments 637-662, wherein the first micron-sized porous carrier comprises aluminum oxide.

Embodiment 664. The method of any one of embodiments 637-663, wherein the second micron-sized porous carrier comprises cerium oxide.

Embodiment 665. The method of any one of embodiments 637-664, wherein the reductive catalytically active Nano-on-Nano-in-Micro (NNiM) particles comprise a platinum group metal.

Embodiment 666. The method of embodiment 665, wherein the platinum group metal is rhodium.

Embodiment 667. The method of any one of embodiments 637-666, wherein the $NO_x$ trapping particles further comprise zirconium oxide.

Embodiment 668. The method of any one of embodiments 637-667, wherein the support nanoparticles have an average diameter of about 10 nm to about 20 nm.

Embodiment 669. The method of any one of embodiments 637-667, wherein the support nanoparticles have an average diameter of about 1 nm to about 5 nm.

Embodiment 670. The method of any one of embodiments 637-669, wherein the washcoat layer comprising oxidative catalytically active Nano-on-Nano-in-Micro (NNiM) particles further comprises metal oxide particles and boehmite particles.

Embodiment 671. The method of embodiment 670, wherein the metal oxide particles are aluminum oxide particles.

Embodiment 672. The method of embodiment 671, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 673. The method of embodiment 671 or 672, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 674. The method of any one of embodiments 671-673, wherein the boehmite particles comprise 2% to 5% by weight of the combination of the oxidative catalytically active Nano-on-Nano-in-Micro (NNiM) particles, boehmite particles, and aluminum oxide particles.

Embodiment 675. The method of embodiment 671, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 676. The method of any one of embodiments 637-675, wherein the washcoat layer comprising reductive catalytically active Nano-on-Nano-in-Micro (NNiM) particles further comprises metal oxide particles and boehmite particles.

Embodiment 677. The method of embodiment 676, wherein the metal oxide particles are aluminum oxide particles.

Embodiment 678. The method of embodiment 677, wherein the reductive catalytically active Nano-on-Nano-in-Micro (NNiM) particles comprise 50% to 95% by weight of the combination of the reductive catalytically active Nano-on-Nano-in-Micro (NNiM) particles, aluminum oxide particles, and boehmite particles.

Embodiment 679. The method of embodiment 677 or 678, wherein the aluminum oxide particles comprise 5% to 40% by weight of the combination of the reductive catalytically active Nano-on-Nano-in-Micro (NNiM) particles, aluminum oxide particles, and boehmite particles.

Embodiment 680. The method of any one of embodiments 677-679, wherein the boehmite particles comprise 2% to 5% by weight of the combination of the reductive catalytically active Nano-on-Nano-in-Micro (NNiM) particles, aluminum oxide particles, and boehmite particles.

Embodiment 681. The method of embodiment 677, wherein the washcoat layer comprising reductive catalytically active Nano-on-Nano-in-Micro (NNiM) particles comprises 80% by weight of the reductive catalytically active Nano-on-Nano-in-Micro (NNiM) particles, 17% by weight of the aluminum oxide particles, and 3% by weight of the boehmite particles.

Embodiment 682. The method of any one of embodiments 637-681, wherein the washcoat layer comprising $NO_x$ trapping particles further comprises Nano-on-Nano-in-Micro (NNiM) particles and boehmite particles.

Embodiment 683. The method of embodiment 682, wherein the Nano-on-Nano-in-Micro (NNiM) particles comprise at least one platinum group metal.

Embodiment 684. The method of embodiment 683, wherein the platinum group metal is selected from the group consisting of ruthenium, platinum, and palladium.

Embodiment 685. The method of embodiment 682, wherein the Nano-on-Nano-in-Micro (NNiM) particles comprise a non-platinum group metal.

Embodiment 686. The method of embodiment 685, wherein the non-platinum group metal is selected from the group consisting of tungsten, molybdenum, niobium, manganese, and chromium.

Embodiment 687. The method of any one of embodiments 682-686, wherein the Nano-on-Nano-in-Micro (NNiM) particles comprise 10% to 40% by weight of the combination of the Nano-on-Nano-in-Micro (NNiM) particles, $NO_x$ trapping particles, and boehmite particles.

Embodiment 688. The method of any one of embodiments 682-687, wherein the $NO_x$ trapping particles comprise 50% to 90% by weight of the combination of the Nano-on-Nano-in-Micro (NNiM) particles, $NO_x$ trapping particles, and boehmite particles.

Embodiment 689. The method of any one of embodiments 682-688, wherein the boehmite particles comprise 2% to 5% by weight of the combination of the Nano-on-Nano-in-Micro (NNiM) particles, $NO_x$ trapping particles, and boehmite particles.

Embodiment 690. The method of any one of embodiments 682-689, wherein the washcoat layer comprising $NO_x$ trapping particles comprises 73% by weight of the $NO_x$ trapping particles, 23% by weight of the Nano-on-Nano-in-Micro (NNiM) particles, and 4% by weight of the boehmite particles.

Embodiment 691. The method of any one of embodiments 637-690, wherein the substrate comprises cordierite.

Embodiment 692. The method of any one of embodiments 637-691, wherein the substrate comprises a honeycomb structure.

Embodiment 693. The method of any one of embodiments 637-692, wherein the washcoat layer comprising oxidative catalytically active Nano-on-Nano-in-Micro (NNiM) particles has a thickness of 25 g/L to 150 g/L.

Embodiment 694. The method of any one of embodiments 637-693, wherein the washcoat layer comprising reductive catalytically active Nano-on-Nano-in-Micro (NNiM) particles has a thickness of 25 g/L to 150 g/L.

Embodiment 695. The method of any one of embodiments 637-694, wherein the washcoat layer comprising $NO_x$ trapping particles has a thickness of 100 g/L to 400 g/L.

Embodiment 696. The method of any one of embodiments 637-695, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 697. The method of any one of embodiments 637-696, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 698. The method of any one of embodiments 637-697, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

Embodiment 699. A method of forming a coated substrate, the method comprising: a) coating a substrate with a washcoat composition comprising oxidative catalytically active composite nanoparticles attached to a first micron-sized support particle, the oxidative catalytically active composite nanoparticles being plasma-generated and comprising a first support nanoparticle and an oxidative catalytic nanoparticle; b) coating a substrate with a washcoat composition comprising reductive catalytically active composite nanoparticles attached to a second micron-sized support particle, the reductive catalytically active composite nanoparticles being plasma-generated and comprising a second support nanoparticle and a reductive catalytic nanoparticle; and c) coating the substrate with a washcoat composition comprising $NO_x$ trapping particles, and the $NO_x$ trapping particles comprising micron-sized cerium oxide.

Embodiment 700. The method of embodiment 699, wherein the $NO_x$ trapping particles further comprise barium oxide impregnated in the micron-sized cerium oxide.

Embodiment 701. The method of embodiment 699 or 700, wherein the $NO_x$ trapping particles further comprise platinum and palladium impregnated in the micron-sized cerium oxide.

Embodiment 702. The method of embodiment 700, wherein the barium oxide is plasma-generated.

Embodiment 703. The method of embodiment 700, wherein the barium oxide is impregnated in the micron-sized cerium oxide by wet chemistry.

Embodiment 704. The method of embodiment 701, wherein the platinum and palladium are plasma-generated.

Embodiment 705. The method of embodiment 701, wherein the platinum and palladium are impregnated in the micron-sized cerium oxide by wet chemistry.

Embodiment 706. The method of embodiment 699, wherein the $NO_x$ trapping particles further comprise the perovskite $FeBaO_3$ impregnated in the micron-sized cerium oxide.

Embodiment 707. The method of embodiment 699, wherein the $NO_x$ trapping particles further comprise metal oxides selected from the group consisting of samarium, zinc, copper, iron, and silver impregnated in the micron-sized cerium oxide.

Embodiment 708. The method of embodiment 706 or 707, wherein the $NO_x$ trapping particles are prepared by wet chemistry.

Embodiment 709. The method of any one of embodiments 706-708, wherein the $NO_x$ trapping particles further comprise barium oxide impregnated in the micron-sized cerium oxide.

Embodiment 710. The method of embodiment 699, wherein the $NO_x$ trapping particles further comprise micron-sized aluminum oxide particles.

Embodiment 711. The method of embodiment 710, wherein the micron-sized aluminum oxide particles are Nano-on-Nano-on-micro (NNm) particles or Nano-on-Nano-in-Micro (NNiM) particles.

Embodiment 712. The method of embodiment 711, wherein the Nano-on-Nano-on-micro (NNm) particles or Nano-on-Nano-in-Micro (NNiM) particles comprise platinum and/or palladium.

Embodiment 713. The method of embodiment 710, wherein the Nano-on-Nano-on-micro (NNm) particles or Nano-on-Nano-in-Micro (NNiM) particles comprise a non-platinum group metal.

Embodiment 714. The method of embodiment 713, wherein the non-platinum group metal is selected from the group consisting of tungsten, molybdenum, niobium, manganese, and chromium.

Embodiment 715. The method of any one of embodiments 699-714, further comprising barium oxide impregnated in the micron-sized cerium oxide particles.

Embodiment 716. The method of any one of embodiments 699-714, wherein the Nano-on-Nano-on-micro (NNm) particles or or Nano-on-Nano-in-Micro (NNiM) particles further comprise barium oxide impregnated in the NNm or NNiM particles.

Embodiment 717. The method of embodiment 715 or 716, wherein the barium oxide is impregnated by wet chemistry.

Embodiment 718. The method of any one of embodiment 699-717, wherein the oxidative catalytically active composite nanoparticles attached to a first micron-sized support particle comprise oxidative catalytically active Nano-on-Nano-on-micro (NNm) particles.

Embodiment 719. The method of any one of embodiments 699-717, wherein the oxidative catalytically active composite nanoparticles attached to a first micron-sized support particle comprise oxidative catalytically active Nano-on-Nano-in-Micro (NNiM) particles.

Embodiment 720. The method of any one of embodiments 699-719, wherein the oxidative catalytically active composite nanoparticles comprise at least one platinum group metal.

Embodiment 721. The method of any one of embodiment 699-720, wherein the oxidative catalytically active composite nanoparticles comprise platinum.

Embodiment 722. The method of any one of embodiment 699-720, wherein the oxidative catalytically active composite nanoparticles comprise palladium.

Embodiment 723. The method of any one of embodiments 699-722, wherein the oxidative catalytically active composite nanoparticles comprise platinum and palladium.

Embodiment 724. The method of any one of embodiments 699-723, wherein the first support nanoparticle comprises aluminum oxide.

Embodiment 725. The method of any one of embodiments 699-724, wherein the second support nanoparticle comprises cerium oxide.

Embodiment 726. The method of any one of embodiments 699-725, wherein the first micron-sized support particle comprises aluminum oxide.

Embodiment 727. The method of any one of embodiments 699-726, wherein the second micron-sized support particle comprises cerium oxide.

Embodiment 728. The method of any one of embodiments 699-727, wherein the reductive catalytically active composite nanoparticles comprise reductive catalytically active Nano-on-Nano-on-micro (NNm) particles.

Embodiment 729. The method of embodiment 728, wherein the reductive catalytically active Nano-on-Nano-on-micro (NNm) particles comprise a platinum group metal.

Embodiment 730. The method of any one of embodiments 699-727, wherein the reductive catalytically active composite nanoparticles comprise reductive catalytically active Nano-on-Nano-in-Micro (NNiM) particles.

Embodiment 731. The method of embodiment 730, wherein the reductive catalytically active Nano-on-Nano-in-Micro (NNiM) particles comprise a platinum group metal.

Embodiment 732. The method of embodiment 729 or 731, wherein the platinum group metal is rhodium.

Embodiment 733. The method of any one of embodiments 699-732, wherein the $NO_x$ trapping particles further comprise zirconium oxide.

Embodiment 734. The method of any one of embodiments 699-733, wherein the support nanoparticles have an average diameter of about 10 nm to about 20 nm.

Embodiment 735. The method of any one of embodiments 699-733, wherein the support nanoparticles have an average diameter of about 1 nm to about 5 nm.

Embodiment 736. The method of embodiment 718, wherein the washcoat layer comprising oxidative catalytically active Nano-on-Nano-on-micro (NNm) particles further comprises metal oxide particles and boehmite particles.

Embodiment 737. The method of embodiment 736, wherein the metal oxide particles are aluminum oxide particles.

Embodiment 738. The method of embodiment 737, wherein the oxidative catalytically active Nano-on-Nano-on-micro (NNm) particles comprise 35% to 75% by weight of the combination of the oxidative catalytically active Nano-on-Nano-on-micro (NNm) particles, boehmite particles, and aluminum oxide particles.

Embodiment 739. The method of embodiment 737 or 738, wherein the aluminum oxide particles comprise 30% to 70% by weight of the combination of the oxidative catalytically active Nano-on-Nano-on-micro (NNm) particles, boehmite particles, and aluminum oxide particles.

Embodiment 740. The method of any one of embodiments 737-739, wherein the boehmite particles comprise 2% to 5% by weight of the combination of the oxidative catalytically active Nano-on-Nano-on-micro (NNm) particles, boehmite particles, and aluminum oxide particles.

Embodiment 741. The method of embodiment 737, wherein the washcoat layer comprising oxidative catalytically active Nano-on-Nano-on-micro (NNm) particles comprises 50% by weight of the oxidative catalytically active Nano-on-Nano-on-micro (NNm) particles, 3% by weight of the boehmite particles, and 47% by weight of the aluminum oxide particles.

Embodiment 742. The method of embodiment 719, wherein the washcoat layer comprising oxidative catalytically active Nano-on-Nano-in-Micro (NNiM) particles further comprises metal oxide particles and boehmite particles.

Embodiment 743. The method of embodiment 742, wherein the metal oxide particles are aluminum oxide particles.

Embodiment 744. The method of embodiment 743, wherein the oxidative catalytically active Nano-on-Nano-in-Micro (NNiM) particles comprise 35% to 75% by weight of the combination of the oxidative catalytically active Nano-on-Nano-in-Micro (NNiM) particles, boehmite particles, and aluminum oxide particles.

Embodiment 745. The method of embodiment 743 or 744, wherein the aluminum oxide particles comprise 30% to 70% by weight of the combination of the oxidative catalytically active Nano-on-Nano-in-Micro (NNiM) particles, boehmite particles, and aluminum oxide particles.

Embodiment 746. The method of any one of embodiments 743-745, wherein the boehmite particles comprise 2% to 5% by weight of the combination of the oxidative catalytically active Nano-on-Nano-in-Micro (NNiM) particles, boehmite particles, and aluminum oxide particles.

Embodiment 747. The method of embodiment 743, wherein the washcoat layer comprising oxidative catalytically active Nano-on-Nano-in-Micro (NNiM) particles comprises 50% by weight of the oxidative catalytically active Nano-on-Nano-in-Micro (NNiM) particles, 3% by weight of the boehmite particles, and 47% by weight of the aluminum oxide particles.

Embodiment 748. The method of embodiment 728, wherein the washcoat layer comprising reductive catalytically active Nano-on-Nano-on-micro (NNm) particles further comprises metal oxide particles and boehmite particles.

Embodiment 749. The method of embodiment 748, wherein the metal oxide particles are aluminum oxide particles.

Embodiment 750. The method of embodiment 749, wherein the reductive catalytically active Nano-on-Nano-on-micro (NNm) particles comprise 50% to 95% by weight of the combination of the reductive catalytically active Nano-on-Nano-on-micro (NNm) particles, aluminum oxide particles, and boehmite particles.

Embodiment 751. The method of embodiment 749 or 750, wherein the aluminum oxide particles comprise 5% to 40% by weight of the combination of the reductive catalytically active Nano-on-Nano-on-micro (NNm) particles, aluminum oxide particles, and boehmite particles.

Embodiment 752. The method of any one of embodiments 749-751, wherein the boehmite particles comprise 2% to 5% by weight of the combination of the reductive catalytically active Nano-on-Nano-on-micro (NNm) particles, aluminum oxide particles, and boehmite particles.

Embodiment 753. The method of embodiment 749, wherein the washcoat layer comprising reductive catalytically active Nano-on-Nano-on-micro (NNm) particles comprises 80% by weight of the reductive catalytically active Nano-on-Nano-on-micro (NNm) particles, 17% by weight of the aluminum oxide particles, and 3% by weight of the boehmite particles.

Embodiment 754. The method of embodiment 730, wherein the washcoat layer comprising reductive catalytically active Nano-on-Nano-in-Micro (NNiM) particles further comprises metal oxide particles and boehmite particles.

Embodiment 755. The method of embodiment 754, wherein the metal oxide particles are aluminum oxide particles.

Embodiment 756. The method of embodiment 755, wherein the reductive catalytically active Nano-on-Nano-in-Micro (NNiM) particles comprise 50% to 95% by weight of the combination of the reductive catalytically active Nano-on-Nano-in-Micro (NNiM) particles, aluminum oxide particles, and boehmite particles.

Embodiment 757. The method of embodiment 755 or 756, wherein the aluminum oxide particles comprise 5% to 40% by weight of the combination of the reductive catalytically active Nano-on-Nano-in-Micro (NNiM) particles, aluminum oxide particles, and boehmite particles.

Embodiment 758. The method of any one of embodiments 755-757, wherein the boehmite particles comprise 2% to 5% by weight of the combination of the reductive catalytically active Nano-on-Nano-in-Micro (NNiM) particles, aluminum oxide particles, and boehmite particles.

Embodiment 759. The method of embodiment 755, wherein the washcoat layer comprising reductive catalytically active Nano-on-Nano-in-Micro (NNiM) particles comprises 80% by weight of the reductive catalytically active Nano-on-Nano-in-Micro (NNiM) particles, 17% by weight of the aluminum oxide particles, and 3% by weight of the boehmite particles.

Embodiment 760. The method of any one of embodiments 699-759, wherein the washcoat layer comprising $NO_x$ trapping particles further comprises Nano-on-Nano-on-micro (NNm) particles and boehmite particles.

Embodiment 761. The method of embodiment 760, wherein the Nano-on-Nano-on-micro (NNm) particles comprise at least one platinum group metal.

Embodiment 762. The method of embodiment 761, wherein the platinum group metal is selected from the group consisting of ruthenium, platinum, and palladium.

Embodiment 763. The method of embodiment 760, wherein the Nano-on-Nano-on-micro (NNm) particles comprise a non-platinum group metal.

Embodiment 764. The method of embodiment 763, wherein the non-platinum group metal is selected from the group consisting of tungsten, molybdenum, niobium, manganese, and chromium.

Embodiment 765. The method of any one of embodiments 760-764, wherein the Nano-on-Nano-on-micro (NNm) particles comprise 10% to 40% by weight of the combination of the Nano-on-Nano-on-micro (NNm) particles, $NO_x$ trapping particles, and boehmite particles.

Embodiment 766. The method of any one of embodiments 760-765, wherein the $NO_x$ trapping particles comprise 50% to 90% by weight of the combination of the Nano-on-Nano-on-micro (NNm) particles, $NO_x$ trapping particles, and boehmite particles.

Embodiment 767. The method of any one of embodiments 760-766, wherein the boehmite particles comprise 2% to 5% by weight of the combination of the Nano-on-Nano-on-micro (NNm) particles, $NO_x$ trapping particles, and boehmite particles.

Embodiment 768. The method of any one of embodiments 760-767, wherein the washcoat layer comprising $NO_x$ trapping particles comprises 73% by weight of the $NO_x$ trapping particles, 23% by weight of the Nano-on-Nano-on-micro (NNm) particles, and 4% by weight of the boehmite particles.

Embodiment 769. The method of any one of embodiments 699-768, wherein the substrate comprises cordierite.

Embodiment 770. The method of any one of embodiments 699-769, wherein the substrate comprises a honeycomb structure.

Embodiment 771. The method of embodiment 718, wherein the washcoat layer comprising oxidative catalytically active Nano-on-Nano-on-micro (NNm) particles has a thickness of 25 g/L to 150 g/L.

Embodiment 772. The method of embodiment 719, wherein the washcoat layer comprising oxidative catalytically active Nano-on-Nano-in-Micro (NNiM) particles has a thickness of 25 g/L to 150 g/L.

Embodiment 773. The method of embodiment 728, wherein the washcoat layer comprising reductive catalytically active Nano-on-Nano-on-micro (NNm) particles has a thickness of 100 g/L to 400 g/L.

Embodiment 774. The method of embodiment 730, wherein the washcoat layer comprising reductive catalytically active Nano-on-Nano-in-Micro (NNiM) particles has a thickness of 100 g/L to 400 g/L.

Embodiment 775. The method of any one of embodiments 699-774, wherein the washcoat layer comprising $NO_x$ trapping particles particles has a thickness of 100 g/L to 400 g/L.

Embodiment 776. The method of any one of embodiments 699-775, wherein the coated substrate has a platinum group metal loading of 4 g/L or less and a light-off temperature for carbon monoxide at least 5° C. lower than the light-off temperature of a substrate with the same platinum group metal loading deposited by wet-chemistry methods.

Embodiment 777. The method of any one of embodiments 699-776, said coated substrate having a platinum group metal loading of about 3.0 g/L to about 5.5 g/L, wherein after 125,000 miles of operation in a vehicular catalytic converter, the coated substrate has a light-off temperature for carbon monoxide at least 5° C. lower than a coated substrate prepared by depositing platinum group metals by wet chemical methods having the same platinum group metal loading after 125,000 miles of operation in a vehicular catalytic converter.

Embodiment 778. The method of any one of embodiments 699-777, said coated substrate having a platinum group metal loading of about 3.0 g/L to about 5.5 g/L, wherein after aging for 16 hours at 800° C., the coated substrate has a light-off temperature for carbon monoxide at least 5° C. lower than a coated substrate prepared by depositing platinum group metals by wet chemical methods having the same platinum group metal loading after aging for 16 hours at 800° C.

EXAMPLES

As discussed above, the washcoat compositions can be configured and applied in a variety of different ways. The configurations provide examples of preparing substrates coated with the washcoats.

General Procedure for Preparation of Washcoats

The washcoats are made by mixing the solid ingredients with water. Acetic acid is added to adjust the pH to about 4. The washcoat slurry is then milled to arrive at an average particle size of about 4 µm to about 15 µm. The viscosity of the washcoat is adjusted by mixing with a cellulose solution or with corn starch to the desired viscosity, typically between about 300 cP to about 1200 cP. The washcoat is aged for about 24 hours to about 48 hours after cellulose or corn starch addition. The washcoat is coated onto the substrate by either dip-coating or vacuum coating. The part(s) to be coated can be optionally pre-wetted prior to coating. Excess washcoat is blown off and recycled. The washcoat-coated substrate is then dried at about 25° C. to about 95° C. by flowing air over the coated part, until the weight levels off. The washcoat-coated substrate is then calcined at about 450° C. to about 650° C. for about 1 hour to about 2 hours.

In one of these configurations, a first washcoat composition applied to a substrate comprises 3% (or approximately 3%) boehmite, 47% (or approximately 47%) porous alumina (e.g., MI-386 or the like), and 50% (or approximately 50%) catalytic powder (i.e., the powder containing the catalytic material), wherein the porous alumina is impregnated with 15% (or approximately 15%) barium oxide and the catalytic powder is NNm powder (catalytic nanoparticle on support nanoparticle on support micro-particle), and a second washcoat composition comprises 2% (or approximately 2%) boehmite, 83% (or approximately 83%) cerium oxide particles (e.g., HSA5 or the like), and 15% (or approximately 15%) catalytic powder (i.e., the powder containing the catalytic material), wherein the cerium oxide particles are impregnated with 8% (or approximately 8%) BaO and a mixture of 10:1 (or approximately 10:1) platinum and palladium, and the catalytic powder is NNm Powder (catalytic nanoparticle on support nanoparticle on support micro-particle), The ingredients discussed above for the first washcoat composition are mixed with water and acid, such as acetic acid, and the pH is adjusted to about 4. After adjusting the viscosity to the proper levels, this first washcoat is coated onto the substrate. This first washcoat layer is then dried and calcined. Following this first washcoating step, a second washcoating step is applied, where the ingredients discussed above for the second washcoat composition are mixed with water and acid, such as acetic acid, and the pH is adjusted to about 4. After adjusting the viscosity to the proper levels, this second washcoat is coated onto the substrate. This second washcoat layer is then dried and calcined.

In another advantageous configuration, a first washcoat composition applied to a substrate comprises 3% (or approximately 3%) boehmite, 47% (or approximately 47%) porous alumina (e.g., MI-386 or the like), and 50% (or approximately 50%) catalytic powder (i.e., the powder containing the catalytic material), wherein the porous alumina is impregnated with 15% (or approximately 15%) barium oxide and the catalytic powder is NNm powder (catalytic nanoparticle on support nanoparticle on support micro-particle), a second washcoat composition comprises 3% (or approximately 3%) boehmite, 17% (or approximately 17%) porous alumina (e.g., MI-386 or the like), and 80% (or approximately 80%) catalytic powder (i.e., the powder containing the catalytic material), wherein the catalytic powder is NNm powder (catalytic nanoparticle on support nanoparticle on support micro-particle), and a third washcoat composition comprises 4% (or approximately 4%) boehmite, 73% (or approximately 73%) cerium oxide particles (e.g., HSA5 or the like) and 23% (or approximately 23%) catalytic powder (i.e., the powder containing the catalytic material), wherein the cerium oxide particles are impregnated with 8% (or approximately 8%) barium oxide and the catalytic powder is NNm powder (catalytic nanoparticle on support nanoparticle on support micro-particle), The ingredients discussed above for the first washcoat composition are mixed with water and acid, such as acetic acid, and the pH is adjusted to about 4. After adjusting the viscosity to the proper levels, this first washcoat is coated onto the substrate. This first washcoat layer is then dried and calcined. Following this first washcoating step, a second washcoating step is applied, where the ingredients discussed above for the second washcoat composition are mixed with water and acid, such as acetic acid, and the pH is adjusted to about 4. After adjusting the viscosity to the proper levels, this second washcoat is coated onto the substrate. This second washcoat layer is then dried and calcined. Following this second washcoating step, a third washcoating step is applied, where the ingredients discussed above for the third washcoat composition are mixed with water and acid, such as acetic acid, and the pH is adjusted to about 4. After adjusting the viscosity to the proper levels, this third washcoat is coated onto the substrate. This third washcoat layer is then dried and calcined.

Example 1

Two-Layer Washcoat Configuration-Separate Oxidation and Reduction Washcoat Layers, Combined Reduction and $NO_x$ Storage Layer (a) First Washcoat Composition: Approx. 85 g/L as follows:
   3% Boehmite;
   47% Porous alumina (MI-386 or the like), impregnated with 15% BaO;
   50% NNm powder (nano-on-nano-on-micro particle), the powder that contains Pt, Pd, or a mixture of Pt/Pd.
(b) Second Washcoat Composition: Approx. 326 g/L as follows:
   2% Boehmite;
   83% Cerium oxide (HSA5 or the like), impregnated with 8% BaO and 0.6% Pt, Pd, or a mixture of Pt/Pd;
   15% NNm powder (nano-on-nano-on-micro particle), the powder that contains Rh.

Mix the washcoat ingredients from (a) with water and acetic acid and adjust the pH to about 4. After adjusting the viscosity to the proper levels, the washcoat is coated onto the substrate with an approximate layer thickness of 85 g/L. Excess washcoat is blown off and recycled. This first washcoat layer is then dried and calcined. Following this first washcoating step, a second washcoating step is performed: the ingredients from (b) are mixed with water and acetic acid and the pH adjusted to about 4. After adjusting the viscosity to the proper levels, the washcoat is coated onto the substrate with an approximate layer thickness of 326 g/L. Again, excess washcoat is blown off and recycled. This second washcoat layer is then dried and calcined.

Example 2

Three-layer Washcoat Configuration-Separate Oxidation and Reduction Washcoat Layers, Separate Reduction and $NO_x$ Storage Layer (a) First Washcoat Composition: Approx. 85 g/L as follows:
   3% Boehmite;

47% Porous alumina (MI-386 or the like), impregnated with 15% BaO;

50% NNm powder (nano-on-nano-on-micro particle), the powder that contains Pt, Pd, or a mixture of Pt/Pd.

(b) Second Washcoat Composition: Approx. 75 g/L as follows:

3% Boehmite;

17% Porous alumina (MI-386 or the like);

80% NNm powder (nano-on-nano-on-micro particle), the powder that contains Rh.

(c) Third Washcoat Composition: Approx. 275 g/L as follows:

4% Boehmite;

73% Cerium oxide (HSA5 or the like), impregnated with 8% BaO;

23% NNm powder (nano-on-nano-on-micro particle), the powder that contains Pt, Pd, or Pt/Pd.

Mix the washcoat ingredients from (a) with water and acetic acid and adjust the pH to about 4. After adjusting the viscosity to the proper levels, the washcoat is coated onto the substrate with an approximate layer thickness of 85 g/L. Excess washcoat is blown off and recycled. This first washcoat layer is then dried and calcined. Following this first washcoating step, a second washcoating step is performed: the ingredients from (b) are mixed with water and acetic acid and the pH adjusted to about 4. After adjusting the viscosity to the proper levels, the washcoat is coated onto the substrate with an approximate layer thickness of 75 g/L. Again, excess washcoat is blown off and recycled. This second washcoat layer is then dried and calcined. Following this second washcoating step, a second washcoating step is performed: the ingredients from (c) are mixed with water and acetic acid and the pH adjusted to about 4. After adjusting the viscosity to the proper levels, the washcoat is coated onto the substrate with an approximate layer thickness of 275 g/L. Again, excess washcoat is blown off and recycled. This third washcoat layer is then dried and calcined.

Example 3

Figure 4:
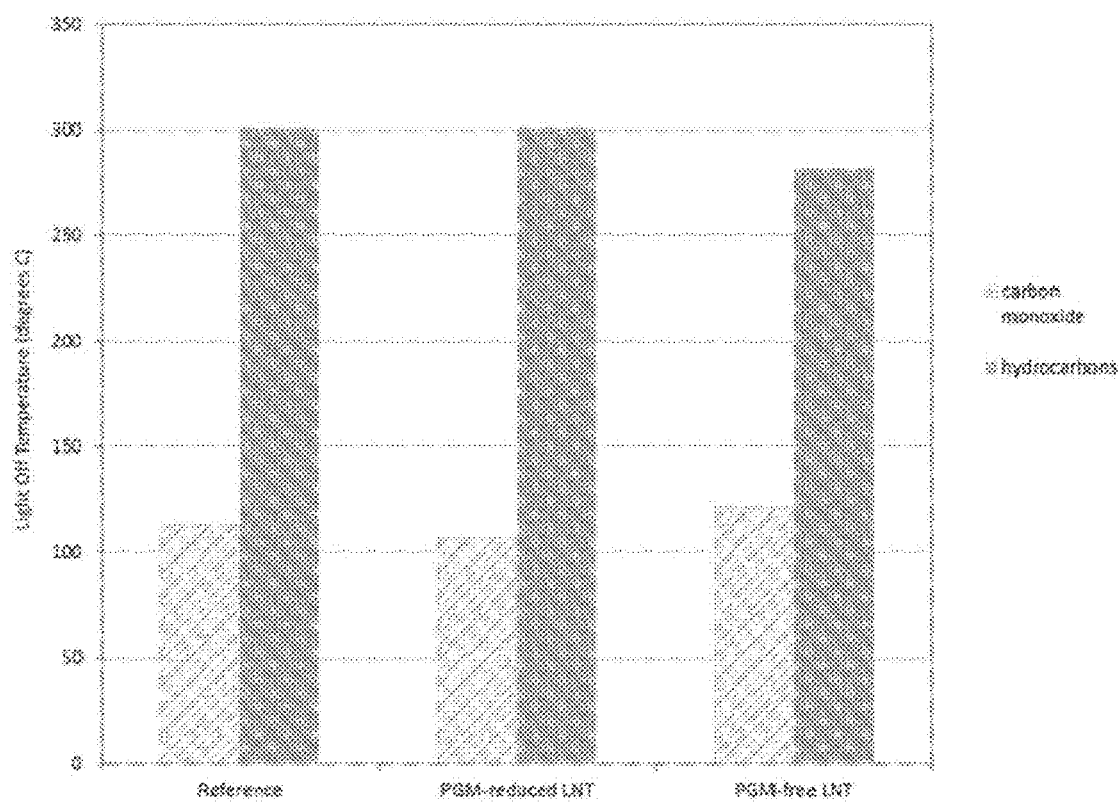
FIG. 4 is a graph comparing the performance of some embodiments of the present invention (reduced PGM in the $NO_x$ storage layer; no PGM in the $NO_x$ storage layer) to a standard commercially available catalytic converter.

Comparison of Catalytic Converter Performance Described Herein to Commercially Available Catalytic Converters FIG. 4 illustrates the performance of a coated substrate with reduced PGM in the $NO_x$ storage layer component of a catalytic converter (indicated as "PGM-reduced LNT"), and a coated substrate with no PGM in the $NO_x$ storage layer component of a catalytic converter (indicated as "PGM-free LNT"), where the coated substrates are prepared according to embodiments of the present invention, compared to a commercially available catalytic converter (indicated as "reference"). The catalysts were artificially aged at 750° C. for 25 hours to simulate operation after 125,000 miles in a car.

The commercially available coated substrate displays a CO light-off temperature of 113° C. The coated substrate with the reduced PGM loading in the $NO_x$ storage layer washcoat displays a CO light-off temperature of 107° C., or about 6° C. lower than the commercially available coated substrate. The coated substrate with no PGM in the $NO_x$ storage layer washcoat displays a CO light-off temperature of 121° C., slightly higher (about 8° C.) than the commercially available coated substrate.

The commercially available coated substrate displays a hydrocarbon light-off temperature of 301° C. The coated substrate with the reduced PGM loading in the $NO_x$ storage layer washcoat displays a hydrocarbon light-off temperature of 301° C., comparable to the commercially available coated substrate. The coated substrate with no PGM in the $NO_x$ storage layer washcoat displays a hydrocarbon light-off temperature of 282° C., or about 19° C. lower than the commercially available coated substrate.

Example 4

Comparison of a Coated Substrate with a Three-Layer Washcoat Configuration to the Euro 6 Standard A coated substrate was prepared using a three-layer washcoat configuration. The composition of the oxidation washcoat layer, reduction washcoat layer, and $NO_x$ storage layer is detailed below:

(a) Reductive Washcoat Composition: 75 g/L as follows:

20% MI-386 (15 g/L);

80% NNm powder: Rh nanoparticles (at a loading of 0.25%) on nano-sized cerium oxide particles and micron-sized cerium-zirconium-lanthanum oxide particles (equivalent to a weight percent of 86% cerium oxide, 10% zirconium oxide and 4% lanthanum oxide) (60 g/L);

(b) Oxidative Washcoat Composition: 57 g/L as follows:

26% MI-386 (15 g/L);

74% NNm powder: Pt/Pd nanoparticles (10:1 Pt:Pd at a loading of 2.4%) on nano-sized aluminum oxide particles and micron-sized aluminum oxide particles (MI-386) (42 g/L);

(c) Storage Layer Washcoat Composition: 263 g/L as follows:

76% Cerium oxide (HSA5), impregnated with 8% barium acetate (200 g/L);

24% NNm powder: Pt/Pd nanoparticles (10:1 Pt:Pd at a loading of 2.4%) on nano-sized aluminum oxide particles and micron-sized aluminum oxide particles (MI-386) (63 g/L).

Each washcoat layer additional contained about 3% of boehmite particles. The three washcoat layers were prepared and coated on the substrate as described above in Example 2.

Figure 5:
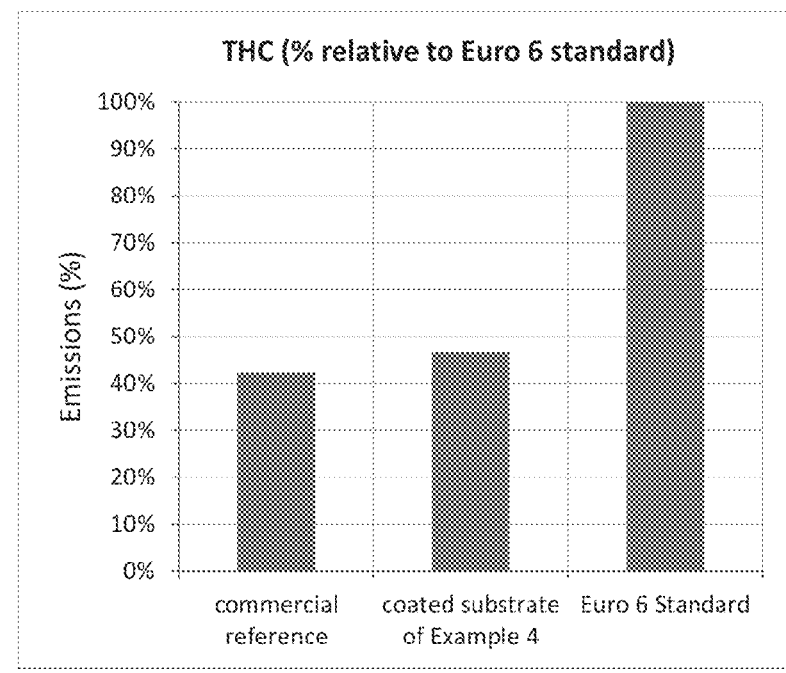
FIG. 5 is a series of graphs comparing A) the total hydrocarbon content (THC) and B) the $NO_x$ emissions of an embodiment of the present invention (coated substrate with three-layer washcoat configuration) to a commercial reference catalyst and to the Euro 6 light-duty diesel emissions standard.
Figure 5:
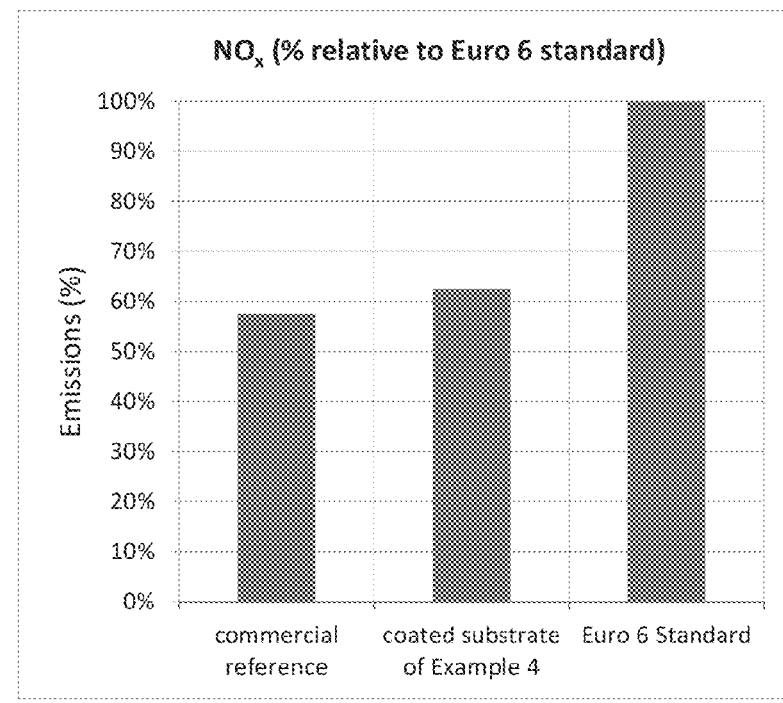

The coated substrate was evaluated using a driving test (length of 11 km). The total hydrocarbon content (THC) and $NO_x$ emissions were measured and are presented in FIG. 5 and below in Table 2. The corresponding THC and $NO_x$ emissions for a standard commercially available material and the Euro 6 standard for light-duty diesel are provided for comparison.

TABLE 2

Comparison of Substrate Coated with Three-Layer Washcoat Configuration to Euro 6 Light-Duty Diesel Standard

|  | THC (mg) | THC (% relative to Euro 6 standard) | $NO_x$ (mg) | $NO_x$ (% relative to Euro 6 standard) |
|---|---|---|---|---|
| coated substrate of present example | 462 | 47 | 550 | 63 |
| commercial reference | 418 | 42 | 506 | 58 |
| Euro 6 standard | 990 | 100 | 880 | 100 |

The disclosures of all publications, patents, patent applications, and published patent applications referred to herein by an identifying citation are hereby incorporated herein by reference in their entirety.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiments chosen for illustration without departing from the spirit and scope of the invention. Therefore, the description and examples should not be construed as limiting the scope of the invention.

We claim:

1. A coated substrate comprising:
a substrate;
a washcoat layer comprising oxidative catalytically active micron-particles, the oxidative catalytically active micron-particles comprising oxidative composite nanoparticles bonded to a first micron-sized carrier particle, the oxidative composite nanoparticles comprising a first support nanoparticle and an oxidative catalytic nanoparticle;
a washcoat layer comprising reductive catalytically active micron-particles, the reductive catalytically active micron-particles comprising reductive composite nanoparticles bonded to a second micron-sized carrier particle, the reductive composite nanoparticles comprising a second support nanoparticle and a reductive catalytic nanoparticle; and
a washcoat layer comprising $NO_x$ trapping particles, the $NO_x$ trapping particles comprising a micron-sized cerium oxide-containing material.

2. The coated substrate of claim 1, wherein the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide.

3. The coated substrate of claim 2, wherein the micron-sized cerium oxide-containing material comprises cerium-zirconium-lanthanum oxide or cerium-zirconium-lanthanum-yttrium oxide.

4. The coated substrate of claim 1, wherein the washcoat layer comprising reductive catalytically active micron-particles is located closer to the substrate than the washcoat layer comprising oxidative catalytically active micron-particles.

5. The coated substrate of claim 4, wherein the washcoat layer comprising oxidative catalytically active micron-particles is located closer to the substrate than the washcoat layer comprising $NO_x$ trapping particles.

6. The coated substrate of claim 1, wherein the $NO_x$ trapping particles further comprise barium oxide impregnated in the micron-sized cerium oxide-containing material.

7. The coated substrate of claim 6, wherein the barium oxide is impregnated in the micron-sized cerium oxide or the micron-sized cerium oxide-containing material by wet chemistry.

8. The coated substrate of claim 1, wherein the $NO_x$ trapping particles further comprise platinum or palladium impregnated in the micron-sized cerium oxide-containing material.

9. The coated substrate of claim 8, wherein the platinum or palladium is plasma-generated.

10. The coated substrate of claim 8, wherein the platinum or palladium is impregnated in the micron-sized cerium oxide-containing material by wet chemistry.

11. The coated substrate of claim 1, wherein the $NO_x$ trapping particles further comprise the perovskite $FeBaO_3$ impregnated in the micron-sized cerium oxide-containing material.

12. The coated substrate of claim 1, wherein the $NO_x$ trapping particles further comprise metal oxides selected from the group consisting of samarium, zinc, copper, iron, and silver oxides impregnated in the micron-sized cerium oxide-containing material.

13. The coated substrate of claim 1, wherein the washcoat layer comprising $NO_x$ trapping particles further comprises micron-sized aluminum oxide particles.

14. The coated substrate claim 1, wherein the oxidative catalytically active micron-particles comprise a material selected from the group comprising platinum, palladium, or a platinum-palladium alloy.

15. The coated substrate of claim 1, wherein the $NO_x$ trapping particles further comprise zirconium oxide.

16. The coated substrate of claim 1, wherein the first micron-sized carrier particle, first micron-sized porous carrier, or first support particle comprises aluminum oxide.

17. The coated substrate of claim 1, wherein the second micron-sized carrier particle, second micron-sized porous carrier, or second support particle comprises cerium oxide.

18. The coated substrate of claim 1, wherein the washcoat layer comprising oxidative catalytically active micron-particles or the washcoat layer comprising reductive catalytically active micron-particles further comprises filler particles or boehmite particles; wherein the filler particles are metal oxide particles.

19. The coated substrate according to claim 1, wherein the micron-sized cerium oxide-containing material comprises cerium oxide.

20. A catalytic converter comprising a coated substrate of claim 1.

21. An exhaust treatment system comprising a conduit for exhaust gas and a catalytic converter according to claim 20.

22. A vehicle comprising an exhaust treatment system according to claim 21.

23. A vehicle comprising a catalytic converter according to claim 20.

24. A method of treating an exhaust gas, comprising contacting the coated substrate of claim 1 with the exhaust gas.

25. A method of treating an exhaust gas, comprising contacting the coated substrate of claim 1 with the exhaust gas, wherein the substrate is housed within a catalytic converter configured to receive the exhaust gas.

26. A coated substrate comprising:
a substrate;
a washcoat layer comprising oxidative catalytically active micron-particles, the oxidative catalytically active micron-particles comprising oxidative composite nanoparticles embedded in a first micron-sized porous carrier, the oxidative composite nanoparticles comprising a first support nanoparticle and an oxidative catalytic nanoparticle;
a washcoat layer comprising reductive catalytically active micron-particles, the reductive catalytically active micron-particles comprising reductive composite nanoparticles embedded in a second micron-sized porous carrier, the reductive composite nanoparticles comprising a second support nanoparticle and a reductive catalytic nanoparticle; and a washcoat layer comprising NO$_x$ trapping particles, and the NO$_x$ trapping particles comprising a micron-sized cerium oxide-containing material.

27. The coated substrate of claim 26, wherein the micron-sized cerium oxide-containing material comprises cerium oxide, cerium-zirconium oxide, cerium-lanthanum oxide, cerium-yttrium oxide, cerium-zirconium-lanthanum oxide, cerium-zirconium-yttrium oxide, cerium-lanthanum-yttrium oxide, or cerium-zirconium-lanthanum-yttrium oxide.

28. The coated substrate of claim 27, wherein the micron-sized cerium oxide-containing material comprises cerium-zirconium-lanthanum oxide or cerium-zirconium-lanthanum-yttrium oxide.

29. The coated substrate of claim 26, wherein the washcoat layer comprising reductive catalytically active micron-particles is located closer to the substrate than the washcoat layer comprising oxidative catalytically active micron-particles.

30. The coated substrate of claim 29, wherein the washcoat layer comprising oxidative catalytically active micron-particles is located closer to the substrate than the washcoat layer comprising NO$_x$ trapping particles.

31. The coated substrate of claim 26, wherein the NO$_x$ trapping particles further comprise barium oxide impregnated in the micron-sized cerium oxide-containing material.

32. The coated substrate of claim 31, wherein the barium oxide is impregnated in the micron-sized cerium oxide or the micron-sized cerium oxide-containing material by wet chemistry.

33. The coated substrate of claim 26, wherein the NO$_x$ trapping particles further comprise platinum or palladium impregnated in the micron-sized cerium oxide-containing material.

34. The coated substrate of claim 33, wherein the platinum or palladium is plasma-generated.

35. The coated substrate of claim 33, wherein the platinum or palladium is impregnated in the micron-sized cerium oxide-containing material by wet chemistry.

36. The coated substrate of claim 26, wherein the NO$_x$ trapping particles further comprise the perovskite FeBaO$_3$ impregnated in the micron-sized cerium oxide-containing material.

37. The coated substrate of claim 26, wherein the NO$_x$ trapping particles further comprise metal oxides selected from the group consisting of samarium, zinc, copper, iron, and silver oxides impregnated in the micron-sized cerium oxide-containing material.

38. The coated substrate of claim 26, wherein the washcoat layer comprising NO$_x$ trapping particles further comprises micron-sized aluminum oxide particles.

39. The coated substrate claim 26, wherein the oxidative catalytically active micron-particles comprise a material selected from the group comprising platinum, palladium, or a platinum-palladium alloy.

40. The coated substrate of claim 26, wherein the NO$_x$ trapping particles further comprise zirconium oxide.

41. The coated substrate of claim 26, wherein the first micron-sized carrier particle, first micron-sized porous carrier, or first support particle comprises aluminum oxide.

42. The coated substrate of claim 26, wherein the second micron-sized carrier particle, second micron-sized porous carrier, or second support particle comprises cerium oxide.

43. The coated substrate of claim 26, wherein the washcoat layer comprising oxidative catalytically active micron-particles or the washcoat layer comprising reductive catalytically active micron- particles further comprises filler particles or boehmite particles; wherein the filler particles are metal oxide particles.

44. The coated substrate according to claim 26, wherein the micron-sized cerium oxide-containing material comprises cerium oxide.

45. A catalytic converter comprising a coated substrate of claim 26.

46. An exhaust treatment system comprising a conduit for exhaust gas and a catalytic converter according to claim 45.

47. A vehicle comprising a catalytic converter according to claim 46.

48. A vehicle comprising an exhaust treatment system according to claim 47.

49. A method of treating an exhaust gas, comprising contacting the coated substrate of claim 26 with the exhaust gas.

50. A method of treating an exhaust gas, comprising contacting the coated substrate of claim 26 with the exhaust gas, wherein the substrate is housed within a catalytic converter configured to receive the exhaust gas.

51. A coated substrate comprising:
  a substrate;
  a washcoat layer comprising oxidative catalytically active composite nanoparticles attached to a first micron-sized support particle, the oxidative catalytically active composite nanoparticles being plasma-generated and comprising a first support nanoparticle and an oxidative catalytic nanoparticle;
  a washcoat layer comprising reductive catalytically active composite nanoparticles attached to a second micron-sized support particle, the reductive catalytically active composite nanoparticles being plasma-generated and comprising a second support nanoparticle and a reductive catalytic nanoparticle; and
  a washcoat layer comprising NO$_x$ trapping particles, and the NO$_x$ trapping particles comprising a micron-sized cerium oxide-containing material.

52. The coated substrate according to claim 51, wherein the micron-sized cerium oxide-containing material comprises cerium oxide.

53. A method of forming a coated substrate, the method comprising:
  a) coating a substrate with a washcoat composition comprising oxidative catalytically active micron-particles, the oxidative catalytically active micron-particles comprising composite oxidative nanoparticles bonded to a first micron-sized carrier particle, the oxidative composite nanoparticles comprising a first support nanoparticle and an oxidative catalytic nanoparticle;
  b) coating the substrate with a washcoat composition comprising reductive catalytically active micron-particles, the reductive catalytically active micron-particles comprising reductive composite nanoparticles bonded to a second micron-sized carrier particle, the reductive composite nanoparticles comprising a second support nanoparticle and a reductive catalytic nanoparticle; and
  c) coating the substrate with a washcoat composition comprising NO$_x$ trapping particles, the NO$_x$ trapping particles comprising a micron-sized cerium oxide-containing material.

54. A method of forming a coated substrate, the method comprising:
  a) coating a substrate with a washcoat composition comprising oxidative catalytically active micron-particles, the oxidative catalytically active micron-particles comprising oxidative composite nanoparticles embedded in a first micron-sized porous carrier, the oxidative composite nanoparticles comprising a first support nanoparticle and an oxidative catalytic nanoparticle;

b) coating the substrate with a washcoat composition comprising reductive catalytically active micron-particles, the reductive catalytically active micron-particles comprising reductive composite nanoparticles embedded in a second micron-sized porous carrier, the reductive composite nanoparticles comprising a second support nanoparticle and reductive catalytic nanoparticle; and c) coating the substrate with a washcoat composition comprising $NO_x$ trapping particles, the $NO_x$ trapping particles comprising a micron-sized cerium oxide-containing material.

55. A method of forming a coated substrate, the method comprising:

a) coating a substrate with a washcoat composition comprising oxidative catalytically active composite nanoparticles attached to a first micron-sized support particle, the oxidative catalytically active composite nanoparticles being plasma-generated and comprising a first support nanoparticle and an oxidative catalytic nanoparticle;

b) coating the substrate with a washcoat composition comprising reductive catalytically active composite nanoparticles attached to a second micron-sized support particle, the reductive catalytically active composite nanoparticles being plasma-generated and comprising a second support nanoparticle and a reductive catalytic nanoparticle; and c) coating the substrate with a washcoat composition comprising $NO_x$ trapping particles, the $NO_x$ trapping particles comprising a micron-sized cerium oxide-containing material.

56. A coated substrate comprising:
a substrate;
a first washcoat layer comprising oxidative catalytically active micron-particles, the oxidative catalytically active micron-particles comprising oxidative composite nanoparticles bonded to a first micron-sized carrier particle, the oxidative composite nanoparticles comprising a first support nanoparticle and an oxidative catalytic nanoparticle; and
a second washcoat layer comprising reductive catalytically active micron-particles and $NO_x$ trapping particles, the reductive catalytically active micron-particles comprising reductive composite nanoparticles bonded to a second micron-sized carrier particle, the reductive composite nanoparticles comprising a second support nanoparticle and a reductive catalytic nanoparticle, and the $NO_x$ trapping particles comprising a micron-sized cerium oxide-containing material.

57. A coated substrate comprising:
a substrate;
a washcoat layer comprising oxidative catalytically active micron-particles, the oxidative catalytically active micron-particles comprising oxidative composite nanoparticles embedded in a first micron-sized porous carrier, the oxidative composite nanoparticles comprising a first support nanoparticle and an oxidative catalytic nanoparticle; and
a washcoat layer comprising reductive catalytically active micron- particles and $NO_x$ trapping particles, the reductive catalytically active micron-particles comprising reductive composite nanoparticles embedded in a second micron-sized porous carrier, the reductive composite nanoparticles comprising a second support nanoparticle and a reductive catalytic nanoparticle, and the $NO_x$ trapping particles comprising a micron-sized cerium oxide-containing material.

58. A coated substrate comprising:
a substrate;
a washcoat layer comprising oxidative catalytically active composite nanoparticles attached to a first micron-sized support particle, the oxidative catalytically active composite nanoparticles being plasma-generated and comprising a first support nanoparticle and an oxidative catalytic nanoparticle;
and a washcoat layer comprising $NO_x$ trapping particles and reductive catalytically active composite nanoparticles attached to a second micron-sized support particle, the reductive catalytically active composite nanoparticles being plasma-generated and comprising a second support nanoparticle and a reductive catalytic nanoparticle, and the $NO_x$ trapping particles comprising a micron-sized cerium oxide-containing material.

59. A method of forming a coated substrate, the method comprising:

a) coating a substrate with a washcoat composition comprising oxidative catalytically active micron-particles, the oxidative catalytically active micron-particles comprising oxidative composite nanoparticles bonded to a first micron-sized carrier particle, the oxidative composite nanoparticles comprising a first support nanoparticle and an oxidative catalytic nanoparticle; and b) coating the substrate with a washcoat composition comprising reductive catalytically active micron-particles and $NO_x$ trapping particles, the reductive catalytically active micron-particles comprising reductive composite nanoparticles bonded to second micron-sized carrier particle, the reductive composite nanoparticles comprising a second support nanoparticle and a reductive catalytic nanoparticle, and the $NO_x$ trapping particles comprising a micron-sized cerium oxide-containing material.

60. A method of forming a coated substrate, the method comprising:

a) coating a substrate with a washcoat composition comprising oxidative catalytically active micron-particles, the oxidative catalytically active micron-particles comprising oxidative composite nanoparticles embedded in a first micron-sized porous carrier, the oxidative composite nanoparticles comprising a first support nanoparticle and an oxidative catalytic nanoparticle; and b) coating the substrate with a washcoat composition comprising reductive catalytically active micron-particles and $NO_x$ trapping particles, the reductive catalytically active micron-particles comprising reductive composite nanoparticles embedded in a second micron-sized porous carrier, the reductive composite nanoparticles comprising a second support nanoparticle and a reductive catalytic nanoparticle, and the $NO_x$ trapping particles comprising a micron-sized cerium oxide-containing material.

61. A method of forming a coated substrate, the method comprising:

a) coating a substrate with a washcoat composition comprising oxidative catalytically active composite nanoparticles attached to a first micron-sized support particle, the oxidative catalytically active composite nanoparticles being plasma-generated and comprising a first support nanoparticle and an oxidative catalytic nanoparticle; and b) coating the substrate with a washcoat composition comprising $NO_x$ trapping particles and reductive catalytically active composite nanoparticles attached to a second micron-sized support particle, the reductive catalytically active composite nanoparticles being plasma-generated and comprising a second support nanoparticle and a reductive catalytic nanoparticle, and the $NO_x$ trapping particles comprising a micron-sized cerium oxide-containing material.

* * * * *